(12) United States Patent
Tanaka et al.

(10) Patent No.: US 7,408,306 B2
(45) Date of Patent: Aug. 5, 2008

(54) LAMP LIGHTING CIRCUIT AND DEVICE, AND LAMP LIGHTING APPARATUS AND DEVICE

(75) Inventors: Masato Tanaka, Tokyo (JP); Yasuo Hosaka, Gunma (JP); Mamoru Sakamoto, Gunma (JP); Akinobu Maekawa, Gunma (JP); Hidefumi Nakagome, Gunma (JP)

(73) Assignees: Taiyo Yuden, Ltd., Gunma (JP); Microspace Corporation, Tokyo (JP)

( * ) Notice: Subject to any disclaimer, the term of this patent is extended or adjusted under 35 U.S.C. 154(b) by 43 days.

(21) Appl. No.: 11/198,486

(22) Filed: Aug. 5, 2005

(65) Prior Publication Data

US 2006/0132059 A1   Jun. 22, 2006

(30) Foreign Application Priority Data

| Aug. 6, 2004 | (JP) | ............................. 2004-231308 |
| Sep. 8, 2004 | (JP) | ............................. 2004-260651 |
| Sep. 30, 2004 | (JP) | ............................. 2004-286946 |
| Feb. 14, 2005 | (JP) | ............................. 2005-035361 |
| Feb. 28, 2005 | (JP) | ............................. 2005-052537 |

(51) Int. Cl.
*H05B 41/24* (2006.01)
(52) U.S. Cl. ...................... 315/277; 315/312
(58) Field of Classification Search ........... 315/219, 315/220, 221, 222, 244, 255, 256, 258, 277, 315/312, DIG. 5
See application file for complete search history.

(56) References Cited

U.S. PATENT DOCUMENTS

| 4,912,372 | A | * | 3/1990 | Mongoven et al. .......... 315/122 |
| 5,424,615 | A | * | 6/1995 | Kang .......................... 315/219 |
| 5,475,285 | A | * | 12/1995 | Konopka ..................... 315/224 |
| 5,546,300 | A | * | 8/1996 | Lee et al. .................... 363/132 |
| 6,362,577 | B1 | * | 3/2002 | Ito et al. ..................... 315/289 |
| 6,366,030 | B1 | * | 4/2002 | Ito et al. ..................... 315/291 |

\* cited by examiner

*Primary Examiner*—Douglas W. Owens
*Assistant Examiner*—Minh Dieu A
(74) *Attorney, Agent, or Firm*—Orrick Herrington & Sutcliffe LLP

(57) ABSTRACT

The present invention relates to a lamp lighting technique for lighting multiple lamps safely without luminance irregularities. The present lamp lighting circuit includes multiple closed loops wherein a predetermined number of lamps and the secondary windings of the predetermined number of transformers are connected serially. At least one of the primary windings of the transformers employed for each closed loop is connected to the primary winding of the transformer employed for another closed loop serially. Thus, current of the lamps included in the closed loop is made uniform, and also current is made uniform even between the closed loops by connecting the primary windings of the transformers serially. According to the present invention, with regard to serial connection of the primary windings of the transformers, even if the number of transformers is limited, current uniformity can be propagated to the entirety by subjecting closed loops to catenation consecutively.

24 Claims, 48 Drawing Sheets

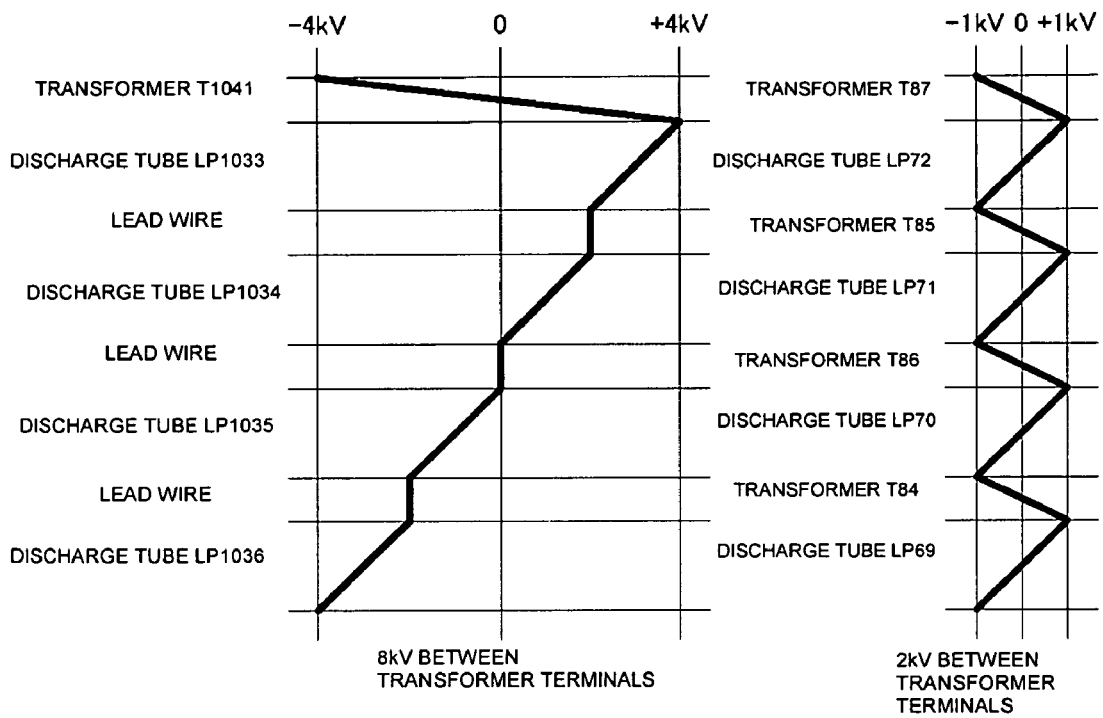
FIG.37A
FIG.37B
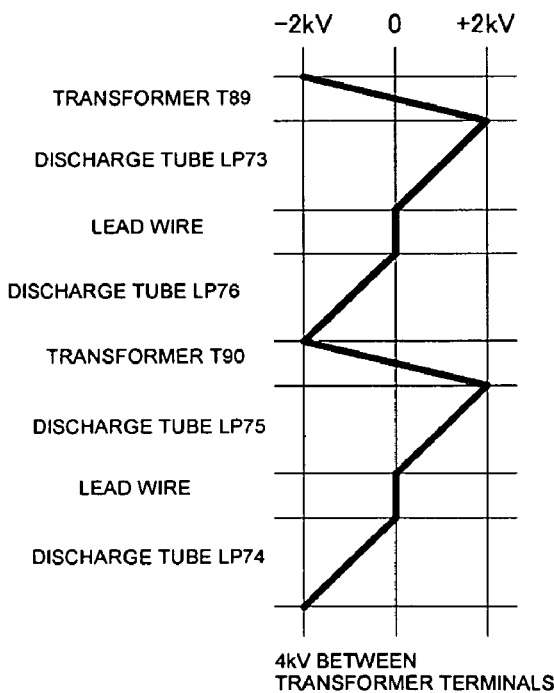
FIG.37C

LAMP LIGHTING CIRCUIT AND DEVICE, AND LAMP LIGHTING APPARATUS AND DEVICE

BACKGROUND OF THE INVENTION

1. Field of the Invention

The present invention relates to a lamp (e.g., discharge tube) lighting circuit.

2. Description of the Related Art

Heretofore, discharge tubes such as cold cathode fluorescent tubes have been frequently employed for the backlight of liquid crystal display devices, for example. FIG. 1 illustrates an example of a basic lighting circuit for a discharge tube. The lighting circuit shown in FIG. 1 includes an inverter V1001, a transformer T1001, and a discharge tube LP1001. The inverter V1001 is connected to terminals P1 and P2 of the primary winding of the transformer T1001, and one end of the discharge tube LP1001 is connected to a terminal S1 of the secondary winding of the transformer T1001. The other end of the discharge tube LP1001 and a terminal S2 of the secondary winding of the transformer T1001 are grounded. Boosting the output voltage of the inverter V1001 at the transformer T1001 lights the discharge tube.

Also, a lighting circuit according to another conventional technique is shown in FIG. 2. The lighting circuit shown in FIG. 2 includes an inverter V1002, transformers T1002 and T1003, and a discharge tube LP1002. The inverter V1002 is connected to terminals P1 and P2 of the primary winding of the transformer T1002, and terminals P1 and P2 of the primary winding of the transformer T1003. That is to say, the transformers T1002 and T1003 are connected to the inverter V1002 in parallel. Also, one end of the discharge tube LP1002 is connected to a terminal S1 of the secondary winding of the transformer T1002, and the other end of the discharge tube LP1002 is connected to a terminal S2 of the secondary winding of the transformer T1003. Note that the terminal S2 of the secondary winding of the transformer T1002 and the terminal S1 of the secondary winding of the transformer T1003 are grounded. That is to say, the left and right terminals of the discharge tube LP1002 are connected such that a reverse polarity voltage is applied thereto, thereby differentially driving the discharge tube LP1002. Accordingly, the leakage current as to stray capacitance is small, and also has a reversed phase, so becomes 0 in total, and a stable current flows, and accordingly, the luminance difference between the left and right of the discharge tube LP1002 is eliminated. However, in the event of employing two or more discharge tubes, the current between the discharge tubes cannot be made uniform without any change, resulting in increase of the number of inverters as well.

In recent years, around several through twenty discharge tubes have been employed for a single backlight due to the increased screen size of liquid crystal display devices and the like. At this time, the discharge tubes such as cold cathode fluorescent tubes have negative resistance properties wherein, upon current flowing, the voltage thereof suddenly drops, and increasing current causes the impedance thereof to gradually drop. Also, each discharge tube has an individual irregularity in impedance. These factors cause a problem wherein it is difficult to realize stable lighting and emission of each discharge tube. Accordingly, the following circuits have been employed.

FIG. 3 illustrates a lighting circuit according to a conventional technique for lighting a plurality of discharge tubes. The lighting circuit shown in FIG. 3 is a circuit for lighting four discharge tubes LP1004 through LP1007, and comprises a first circuit including an inverter V1004, a transformer T1004, a discharge tube LP1004, a resistance R1004, and a current detecting feedback line 1004, a second circuit including an inverter V1005, a transformer T1005, a discharge tube LP1005, a resistance R1005, and a current detecting feedback line 1005, a third circuit including an inverter V1006, a transformer T1006, a discharge tube LP1006, a resistance R1006, and a current detecting feedback line 1006, and a fourth circuit including an inverter V1007, a transformer T1007, a discharge tube LP1007, a resistance R1007, and a current detecting feedback line 1007. The inverter V1004 is connected to terminals P1 and P2 of the primary winding of the transformer T1004, one end of the discharge tube LP1004 is connected to a terminal S1 of the secondary winding of the transformer T1004, and the other end of the discharge tube LP1004 is connected to one end of the current detecting resistance R1004 and one end of the current detecting feedback line 1004. The other end of the resistance R1004 and a terminal S2 of the secondary winding of the transformer T1004 are grounded. The other end of the current detecting feedback line 1004 is connected to the inverter V1004. Hereafter, the connection relations regarding the second through fourth circuits are also the same as the first circuit, so description thereof will be omitted. With this lighting circuit, lighting of each discharge tube is controlled by controlling the inverter thereof according to current detected at the current detecting feedback line thereof. Thus, all of the discharge tubes are lit in a sure manner, whereby the current of all the discharge tubes can be made uniform.

FIG. 4 illustrates a lighting circuit according to another conventional technique. The lighting circuit shown in FIG. 4 is a circuit for lighting four discharge tubes LP1008 through LP1011, and includes an inverter V1008, transformers T1008 through T1011, capacitors C1008 through C1011, and discharge tubes LP1008 through LP011. The inverter V1008 is connected to terminals P1 and P2 of the primary winding of the transformer T1008; terminals P1 and P2 of the primary winding of the transformer T1009, terminals P1 and P2 of the primary winding of the transformer T1010, and terminals P1 and P2 of the primary winding of the transformer T1011. That is to say, the transformers T1008 through T1011 are connected to the inverter V1008 in parallel. Also, one end of the discharge tube LP1008 is connected to a terminal S1 of the secondary winding of the transformer T1008 via the capacitor C1008. That is to say, the discharge tube LP1008 and the capacitor C1008 are connected in series. Also, the other end of the discharge tube LP1008 and a terminal S2 of the secondary winding of the transformer T1008 are grounded. Further, one end of the discharge tube LP1009 is connected to a terminal S1 of the secondary winding of the transformer T1009 via the capacitor C1009. That is to say, the discharge tube LP1009 and the capacitor C1009 are connected in series. Also, the other end of the discharge tube LP1009 and a terminal S2 of the secondary winding of the transformer T1009 are grounded. One end of the discharge tube LP1010 is connected to a terminal S1 of the secondary winding of the transformer T1010 via the capacitor C1010. That is to say, the discharge tube LP1010 and the capacitor C1010 are connected in series. Also, the other end of the discharge tube LP1010 and a terminal S2 of the secondary winding of the transformer T1010 are grounded. One end of the discharge tube LP101 is connected to a terminal S1 of the secondary winding of the transformer T1011 via the capacitor C1011. That is to say, the discharge tube LP1011 and the capacitor C1011 are connected in series. Also, the other end of the discharge tube LP1011 and a terminal S2 of the secondary winding of the transformer T1011 are grounded. Thus, irregularities regarding current are suppressed by connecting a plurality of discharge tubes as to a single inverter in parallel, and inserting ballast condensers as to the respective discharge tubes in series for stable lighting and uniformity. Note that coils may be inserted instead of ballast condensers, or transformers also serving as ballast coils, which generate leakage inductance by intentionally deteriorating a coupling coefficient, may be provided as to the respective discharge tubes.

FIG. 5 illustrates a lighting circuit according to yet another conventional technique. The lighting circuit shown in FIG. 5 includes an inverter V1012, transformers T1012 through T0116, and discharge tubes LP1012 through LP1015. The inverter V1012 is connected to terminals P1 and P2 of the primary winding of the transformer T1012, and terminals P1 and P2 of the primary winding of the transformer T1016. That is to say, the transformers T1012 and T1016 are connected to the inverter V1012 in parallel, which realizes differential driving. Also, a terminal S1 of the secondary winding of the transformer T1012 is connected to a terminal P2 of the primary winding and a terminal S1 of the second winding of the transformer T1013. Also, a terminal P1 of the primary winding of the transformer T1013 is connected to one ends of the discharge tubes LP1014 and LP1015. Further, a terminal S2 of the secondary winding of the transformer T1013 is connected to one of the ends of the discharge tubes LP1012 and LP1013. On the other hand, the other end of the discharge tube LP1015 is connected to a terminal P1 of the primary winding of the transformer T11015, and the other end of the discharge tube LP1014 is connected to a terminal S2 of the secondary winding of the transformer T1015. A terminal P2 of the primary winding and a terminal S1 of the secondary winding of the transformer T1015 are connected to a terminal S2 of the secondary winding of the transformer T1016 and a terminal P1 of the primary winding and a terminal S2 of the secondary winding of the transformer T1014. Also, the other end of the discharge tube LP1012 is connected to a terminal S1 of the secondary winding of the transformer T1014, and the other end of the discharge tube LP1013 is connected to a terminal P2 of the primary winding of the transformer T1014. A terminal S1 of the secondary winding of the transformer T1016 and a terminal S2 of the secondary winding of the transformer T1012 are grounded. Thus, with this lighting circuit, three common mode chokes, i.e., one-on-one transformers (transformers T1013 through T1015) are employed for the four discharge tubes LP1012 through LP1015, thereby realizing stable lighting and uniformity.

FIG. 6 illustrates a lighting circuit according to yet another conventional technique. The lighting circuit shown in FIG. 6 includes an inverter V1017, transformers T1017 through T1020, and discharge tubes LP1017 through LP1020. The inverter V1017 is connected to a terminal P1 of the primary winding of the transformer T1020, and a terminal P2 of the primary winding of the transformer T1017. Also, a terminal P2 of the primary winding of the transformer T1020 and a terminal P1 of the primary winding of the transformer T1019 are connected, a terminal P2 of the primary winding of the transformer T1019 and a terminal P1 of the primary winding of the transformer T1018 are connected, and a terminal P2 of the primary winding of the transformer T1018 and a terminal P1 of the primary winding of the transformer T1017 are connected. That is to say, the transformers T1017 through T1020 and the inverter V1017 are connected in series. Further, a terminal S2 of the secondary winding of the transformer T1017 is connected to one end of the discharge tube LP1017, a terminal S2 of the secondary winding of the transformer T1018 is connected to one end of the discharge tube LP1018, a terminal S2 of the secondary winding of the transformer T1019 is connected to one end of the discharge tube LP1019, and a terminal S2 of the secondary winding of the transformer T1020 is connected to one end of the discharge tube LP1020. The other ends of the discharge tubes LP1017 through LP1020 and terminals S1 of the secondary windings of the transformers T1017 through T1020 are grounded. Thus, the secondary windings of the transformers and the discharge tubes are connected independently, thereby essentially yielding the same advantage as when connecting discharge tubes themselves to the inverter in series.

FIG. 7 illustrates a lighting circuit according to a conventional technique for lighting a plurality of discharge tubes. The lighting circuit shown in FIG. 7 is a circuit for lighting four discharge tubes LP1021 through LP1024, and comprises a first circuit including an inverter V1021, transformers T1021 and T1025, a discharge tube LP1021, a resistance R1021, and a current detecting feedback line 1021, a second circuit including an inverter V1022, transformers T1022 and T1026, a discharge tube LP1022, a resistance R1022, and a current detecting feedback line 1022, a third circuit including an inverter V1023, transformers T1023 and T1027, a discharge tube LP1023, a resistance R1023, and a current detecting feedback line 1023, and a fourth circuit including an inverter V1024, transformers T1024 and T1028, a discharge tube LP1024, a resistance R1024, and a current detecting feedback line 1024. The inverter V1021 is connected to terminals P1 and P2 of the primary winding of the transformer T1021, and terminals P1 and P2 of the primary winding of the transformer T1025. However, the inverter V1021 and the transformer T1021, and the inverter V1021 and the transformer T1025 are connected so as to generate a reversed phase. A terminal S1 of the secondary winding of the transformer T1021 is connected to a first terminal of the discharge tube LP1021, and a second terminal of the discharge tube LP1021 is connected to a terminal S1 of the secondary winding of the of the transformer T1025. A terminal S2 of the secondary winding of the transformer T1021 is grounded via the resistance R1021, and a terminal S2 of the secondary winding of the transformer T1025 is directly grounded. Also, the current detecting feedback line 1021 is connected to a terminal S2 of the secondary winding of the transformer T1021 and the inverter V1021. Hereafter, the connection relations regarding the second through fourth circuits are also the same as the first circuit, so description thereof will be omitted. With this lighting circuit, lighting of each discharge tube is controlled by controlling the inverter thereof according to current detected at the current detecting feedback line thereof. Thus, all of the discharge tubes are lit in a sure manner, whereby the current of all the discharge tubes can be made uniform. However, this technique requires many more inverters, thereby leading prohibitively high costs.

FIG. 8 illustrates a lighting circuit according to another conventional technique. The lighting circuit shown in FIG. 8 is a circuit for lighting four discharge tubes LP1025 through LP1028, and includes an inverter V1025, transformers T1029 through T1036, ballast condensers C1025 through C1028, and discharge tubes LP1025 through LP1028. The inverter V1025 is connected to terminals P1 and P2 of the primary winding of the transformer T1029, terminals P1 and P2 of the primary winding of the transformer T1030, terminals P1 and P2 of the primary winding of the transformer T1031, and terminals P1 and P2 of the primary winding of the transformer T1032. Also, the inverter V1025 is, so as to generate the reversed phase as to the phase of the above transformers, connected to terminals P1 and P2 of the primary winding of the transformer T1033, terminals P1 and P2 of the primary winding of the transformer T1034, terminals P1 and P2 of the primary winding of the transformer T1035, and terminals P1 and P2 of the primary winding of the transformer T1036. A terminal S2 of the secondary winding of the transformer T1029 is connected to a first terminal of the discharge tube LP1025 via the ballast condenser C1025, and a second terminal of the discharge tube LP1025 is connected to a terminal S2 of the secondary winding of the transformer T1033. A terminal S2 of the secondary winding of the transformer T1030 is connected to a first terminal of the discharge tube LP1026 via the ballast condenser C1026, and a second terminal of the discharge tube LP1026 is connected to a terminal S2 of the secondary winding of the transformer T1034. A terminal S2 of the secondary winding of the transformer T1031 is connected to a first terminal of the discharge tube LP1027 via the ballast condenser C1027, and a second terminal of the discharge tube LP1027 is connected to a terminal S2 of the secondary winding of the transformer T1035. A terminal S2 of the secondary winding of the transformer T1032 is connected to a first terminal of the discharge tube LP1028 via the ballast condenser C1028, and a second terminal of the discharge tube LP1028 is connected to a terminal S2 of the secondary winding of the transformer T1036. Note that the residual terminals S1 of the secondary windings of the transformers T1029 through T1036 are grounded. Employing such a lighting circuit can reduce the number of inverters, but only the irregularities of discharge tube impedance are alleviated by ballast condenser impedance, so current cannot be sufficiently made uniform. Also, a high-voltage capacity power is necessary for maintaining a high voltage even when a large current flows into a lit discharge tube to eliminate partial non-lighting of discharge tubes on startup, which deteriorates electrocution safety.

FIG. 9 illustrates a lighting circuit disclosed in Japanese Unexamined Utility Model Registration Application Publication No. 59-187097. The lighting circuit shown in FIG. 9 includes an inverter V1027, transformers T1039 and T1040, discharge tubes LP1031 and LP1032, capacitors C1029 through C1031. The inverter V1027 is connected to terminals P1 and P2 of the primary winding of the transformer T1039, and terminals P1 and P2 of the primary winding of the transformer T1040. Note that a terminal P1 of the primary winding and a terminal S1 of the secondary winding of the transformer T1039 are connected via the capacitor C1030, and a terminal P1 of the primary winding and a terminal S1 of the secondary winding of the transformer T1040 are also connected via the capacitor C1031. Further, a first terminal of the discharge tube LP1031 is connected to a terminal S1 of the secondary winding of the transformer T1039, and a second terminal of the discharge tube LP1039 is connected to a terminal S1 of the secondary winding of the transformer T1040. A first terminal of the discharge tube LP1032 is connected to a terminal S2 of the secondary winding of the transformer T1039, and a second terminal of the discharge tube LP1032 is connected to a terminal S2 of the secondary winding of the transformer T1040 via the capacitor C1029. Thus, the discharge tubes LP1031 and LP1032 are configured such that the left and right bipolarities are driven with anti-polarity floating differential driving. However, the secondary windings of the transformers T1039 and T1040 are connected to the capacitors, which provides a problem wherein current balance between both the discharge tubes LP1031 and LP1032 is shifted by only the amount of capacities of these capacitors, resulting in difference between luminance of the discharge tubes. Also, consideration is not made regarding whether or not what kind of configuration is preferable in the event of employing three or more discharge tubes.

Note that though not shown in the drawing, with Japanese Unexamined Patent Application Publication No. 61-195592, a discharge tube lighting device comprising an AC power source, a series circuit made up of a plurality of discharge lamps connected to this AC power source, sequence impedance connected to at least one of the plurality of discharge lamps in parallel, a preheating transformer of which the primary winding is connected to the AC power source, and the secondary winding is connected to each filament of the plurality of discharge lamps, a prior preheating switch subjected to through-insertion connection between the AC power source and the primary winding of the preheating transformer, and a short switch, which is connected to the primary winding of the preheating transformer in parallel, and turned on following the plurality of discharge lamps being turned on. However, this publication aims at preventing the preheating transformer from heat generation due to iron losses when the lighted discharge lamp connected to the sequence impedance in parallel is removed, which includes some description for attempting sharing of the transformer, but degree of reduction thereof is insufficient. Also, the configuration at the time of lighting the three or more discharge lamps is not necessarily cleared.

Further, as for the simplest method for subjecting current which flows into a discharge tube to uniformity, there is a method for connecting a plurality of discharge tubes to the secondary winding of a transformer in series, but voltage for the worth of the number of discharge tubes is accumulated, and accordingly, resulting in extremely high voltage, so extreme withstanding high-power is required for the transformer and wiring. Moreover, danger of electrocution increases. Further, lighting using a high-frequency inverter causes a problem wherein brightness is not made uniform since current made to flow differs according to the position of a discharge tube due to the influence of a leakage current made to flow into stray capacitance such as an electroconductive backplane and the like from a discharge tube or a lead wire.

See Japanese Unexamined Patent Application Publication No. 9-237686, Japanese Examined Utility Model Registration Application Publication No. 64-005360, Japanese Unexamined Utility Model Registration Application Publication No. 59-187097, and Japanese Unexamined Patent Application Publication No. 61-195592, regarding the conventional art described here.

In the case of the lighting circuit such as shown in FIG. 3, current made to flow into each discharge tube is independently controlled, thereby achieving stable lighting and uniformity with ease, but this needs to provide an expensive inverter for each discharge tube, so as a whole, resulting in too expensive costs.

Also, in the case of the lighting circuit such as shown in FIG. 4, the lighting circuit can be configured at low costs, but this simply alleviates the irregularities of the total impedance as to the discharge tubes by series impedance, so ballast effects are limited, and the irregularities of loading for each discharge tube cannot be sufficiently absorbed, and accordingly, uniformity is limited. Also, the voltage of previously lighted discharge tubes deteriorates at the time of lighting, which attempts to prevent the other unlighted discharge tubes from lighting, so it is necessary to provide a powerful inverter circuit so as to prevent deterioration of the voltage, and accordingly, a great current is necessary at the moment of start-up. Also, the output voltage of the inverter needs to be increased for the worth of ballast, resulting in increase of power loss.

Further, in the case of the lighting circuit such as shown in FIG. 5, the light circuit can be configured at low cost, and uniformity can be achieved as well, but the inverter has a large-current driving capability appropriate for high-voltage output and the number of the discharge tubes, which is very dangerous when short-circuiting electrocution.

Also, the lighting circuit such as shown in FIG. 6 has various excellent features, but as liquid crystal display devices increase in size and finer definition, the number of cold cathode fluorescent tubes to be employed as a backlight increases, and realizing a circuit having also more uniform brightness and less noise than the circuit such as shown in FIG. 6 is demanded.

Further, as described above, in the event of lighting three or more discharge tubes, the conventional lighting circuits cause various problems such as increase of the number of transformers, problems regarding reliability and safety of lighting, difficulty in uniformity of current made to flow into each discharge tube, and the like.

SUMMARY OF THE INVENTION

Accordingly, it is an object of the present invention to provide a new lamp lighting apparatus for realizing more uniform brightness and less noise, in the event of lighting a plurality of lamps.

Also, it is another object of the present invention to provide a new lamp lighting apparatus for realizing uniformity of current made to flow into each lamp without increasing the number of transformers as to the number of lamps, in the event of lighting three or more lamps.

Further, it is another object of the present invention to provide a new lamp lighting apparatus and device for realizing uniformity of current made to flow into each lamp without safety problems, in the event of lighting three or more lamps.

Further, it is another object of the present invention to provide a new lamp lighting apparatus for realizing uniformity of current made to flow into lamps such as discharge tubes while stabilizing an electric potential on the secondary winding side of a transformer.

Further, it is another object of the present invention to provide a technique for lighting lamps in a stable manner while suppressing the irregularities of luminance of the lamps, even in the event that the number of the lamps increases.

A lamp lighting apparatus according to a first aspect of the present invention comprises a plurality of first transformers and a second transformer. The primary winding of each first transformer is connected to the primary winding of another first transformer in series, and the secondary winding of each first transformer is connected to a first terminal of a discharge tube (lamp) corresponding to the secondary winding of this first transformer. Also, the secondary winding of the second transformer is connected to a second terminal of the lamp so as to supply an anti-polarity voltage as to the first transformer, the primary windings of the first and second transformers are electrically connected to an AC power source. Thus, the plurality of lamps are differentially driven by the plurality of first transformers and the single second transformer or the plurality of second transformers, thereby realizing uniform brightness regarding all the lamps, and reducing noise.

Note that the plurality of lamps may be connected with the single second transformer. That is to say, the number of the first transformers may be made to be less than the number of the second transformers.

Also, the primary windings of the plurality of first transformers and the primary winding of the second transformer may be disposed in series as to the AC power source, or the primary windings of the plurality of first transformers and the primary winding of the second transformer may be disposed in parallel as to the AC power source.

Further, the secondary windings of the first transformers and the lamps may be connected such that an anti-polarity current flows into the two lamps connected to the secondary windings of the two first transformers which are connected to the primary windings of the plurality of first transformers in series. Thus, canceling out is performed in an area where influence on ground and the like is small, so noise is further reduced. Note that the second transformer has a center tap, so this center tap may be grounded.

Also, a lamp lighting apparatus according to a second aspect of the present invention is a discharge tube lighting device comprising a plurality of transformers each of which the primary winding is electrically connected to an AC power source, and the secondary winding is connected to lamps, for lighting a plurality of discharge tubes (lamps) by high-power output of the each transformer, the plurality of transformers are allocated into a first group connected to first terminals of the lamps, and a second group connected to second terminals of the lamps. The plurality of lamps are lighted by differential driving between the transformer belonged to the first group and the transformer belonged to the second group, at least one or both of the first and second groups include the transformer of which the primary winding is connected to the primary winding of another transformer in series.

Also, at least any one of the first terminal and the second terminal of the plurality of lamps may be connected with the transformer of which the primary winding is connected to the primary winding of another transformer in series.

Further, the AC power source may be connected to the transformers belonged to the first group and the transformers belonged to the second group in parallel.

Also, the AC power source may be connected to the transformers belonged to the first group and the transformers belonged to the second group in series.

A lamp lighting device according to a third aspect of the present invention for differentially driving lamps comprises a first transformer which is associated with first terminals of first and second lamps, and a second transformer which is associated with second terminals of the first and second lamps. A plurality of differential groups including the first and second transformers and the first and second lamps are configured. With each differential group, a closed loop is configured by the secondary windings of the first and second transformers and the first and second lamps, and the primary winding of the first transformer is connected to the primary winding of the first transformer of another differential group in series.

Also, with each differential group, the primary winding of the second transformer may be connected to the primary winding of the second transformer of another differential group in series.

Further, with the plurality of differential groups, the first transformer may be shared.

Also, the primary windings of the first and second transformers may be electrically connected to an AC power source, and the primary windings of the plurality of first transformers and the primary winding of the second transformer may be connected to the AC power source in series.

Further, the primary windings of the first and second transformers may be electrically connected to an AC power source, and the primary windings of the plurality of first transformers and the primary winding of the second transformer may be connected to the AC power source in parallel.

A lamp lighting apparatus according to a fourth aspect of the present invention comprises at least a single transformer corresponding to lamps in pairs, and forms a loop together with the secondary winding of the transformer corresponding to a pair of lamps, and the primary winding of at least a single transformer corresponding to each pair of a plurality of pairs of lamps is connected in series, and further connected to power source. As described above, at least the primary winding of a single transformer corresponding to each pair of a plurality of pairs of lamps is connected in series, and further a loop is formed together with the secondary winding of the transformer corresponding to a pair of lamps, thereby realizing uniformity of current made to flow into the lamps without increasing the number of transformers.

Also, the above loop is sometimes formed by both ends of the secondary winding of the transformer corresponding to a pair of lamps being connected with the lamps included in the pair of lamps respectively, and the residual terminals of the pair of lamps being connected each other. Thus, a single transformer is allocated to a pair of lamps, thereby reducing the number of transformers.

Further, the above loop is sometimes formed by both ends of the secondary winding of the transformer corresponding to a pair of lamps being connected with the lamps included in the pair of lamps respectively, and the residual terminals of the pair of lamps being connected with the different terminals of the secondary winding of another transformer corresponding to the pair of lamps. That is to say, this results in two transformers for each pair of lamps, which greatly facilitates alternately disposing a plurality of lamps so to be at anti-polarity, and influence on an external device such as a liquid crystal panel and the like is cancelled out within a small area, thereby preventing noise from occurring.

Also, the primary windings of other transformers corresponding to the respective pairs of the plurality of pairs of lamps are sometimes connected in series.

Also, upon further comprising a single second transformer corresponding to the plurality of pairs of lamps, the above loop is sometimes formed by both ends of the secondary winding of the transformer corresponding to a pair of lamps being connected with the lamps included in the pair of lamps respectively, and the residual terminals of the pair of lamps being connected with the different terminals of the secondary winding of the second transformer. Thus, the number of transformers becomes the number of lamps/2+1, thereby extremely reducing the number of transformers.

Further, the transformer connected to any one of the terminals of the pair of lamps includes a center tap, so this center tap is grounded in some cases.

Also, the residual terminals of the pair of lamps are grounded in some cases.

Further, the plurality of pairs of lamps are divided into a first group and a second group for each pair, circuit wiring is sometimes configured such that the residual terminals of the pair of lamps belonged to the first group, and the residual terminals of the pair of lamps belonged to the second group are alternately disposed every same number of pairs or different number of pairs. Thus, the number of transformers can be reduced, and also luminance of the lamps can be symmetrically made uniform.

Also, the plurality of pairs of lamps are divided into a first group and a second group for each pair, so circuit wiring is sometimes configured such that the residual terminals of the lamps belonged to the first group, and the residual terminals of the lamps belonged to the second group are alternately disposed every same number of pairs or different number of pairs. For example, the lamps are sometimes alternately disposed for each pair of lamps, or sometimes alternately disposed for each lamp.

Further, with the case of the plurality of lamps being disposed in parallel with a specific straight line, the plurality of lamps are divided into a first group and a second group, and circuit wiring is configured such that the residual terminals of the lamps belonged to the first group facing a first direction on the specific straight line, so circuit wiring may be configured such that the residual terminals of the lamps belonged to the second group facing a second direction opposed to the first direction.

A lamp lighting apparatus (also called a "lamp lighting circuit) according to a fifth aspect of the present invention comprises at least first through third transformers. A first terminal of the secondary winding of the second transformer is connected to the secondary winding of the first transformer via a first lamp (e.g., a discharge tube), a second terminal of the secondary winding of the second transformer is connected to the secondary winding of the third transformer via a second lamp, the secondary windings of the first through third transformers are connected in series via the first and second lamps, and the primary windings of the first through third transformers are connected to an AC power source such that an anti-polarity voltage is applied to both ends of the first lamp and the second lamp.

With the lamp lighting apparatus according to the fifth aspect of the present invention, the above configuration can be established even if at least two or more transformers are regarded as the second transformers, thereby essentially subjecting current made to flow into three or more lamps to uniformity without safety problems.

A lamp lighting apparatus according to a sixth aspect of the present invention comprises at least first through third transformers. A first terminal of the secondary winding of the second transformer is connected to a first terminal of the secondary winding of the first transformer via a single first lamp or a plurality of first lamps, a second terminal of the secondary winding of the second transformer is connected to a first terminal of the secondary winding of the third transformer via a single second lamp or a plurality of second lamps, the first through third transformers, the single first lamp or plurality of first lamps, and the single second lamp or plurality of second lamps are connected in series, and the primary windings of the first through third transformers are connected to an AC power source such that an anti-polarity voltage is generated at the first terminal of the secondary winding of the second transformer and at the first terminal of the secondary winding of the first transformer, and an anti-polarity voltage is generated at the second terminal of the secondary winding of the second transformer and at the first terminal of the secondary winding of the third transformer. Thus, a plurality of lamps to be connected between the secondary windings of transformers may be employed. In this case, brightness sometimes differs symmetrically, but devising placement of lamps and circuit wiring can compensate non-uniformity of this brightness.

A lamp lighting apparatus according to a seventh aspect of the present invention comprises a first transformer, n (n is an integer greater than 1) intermediate transformers, and a second transformer. The secondary winding of the first transformer, the secondary windings of the n intermediate transformers, the secondary winding of the second transformer, and a plurality of lamps are connected in series, of the secondary winding of the first transformer, the secondary windings of the n intermediate transformers, and the secondary winding of the second transformer, such that an anti-polarity voltage is generated at the terminals of the secondary windings of two transformers connected via the lamp, the primary windings of the two transformers are connected to an AC power source. The lamps are connected to the secondary windings of the first and second transformers and the n intermediate transformers in series, so current made to flow into each lamp can be made uniform, and further, safety can be improved by suppressing accumulation of voltage caused by each lamp to the minimum.

Note that a plurality of lamps are sometimes connected between the terminals of the secondary windings of the two transformers.

Further, a loop is sometimes configured of the secondary winding of the first transformer, the secondary windings of the n intermediate transformers, the secondary winding of the second transformer, and the plurality of lamps. In addition to these factors, a loop is sometimes configured by adding another circuit factor.

Also, the secondary windings of the n intermediate transformers and the plurality of lamps are connected in series between a first terminal of the secondary winding of the first transformer and a first terminal of the secondary winding of the second transformer, so a second terminal of the secondary winding of the first transformer, and a second terminal of the secondary winding of the second transformer may be connected via the lamp.

Further, circuit wiring may be performed such that the polarity of voltage to be applied to one side of a plurality of lamps to be disposed in parallel alternately differs every same number of the lamps, or different number of lamps. Thus, noise can be reduced.

Also, the secondary winding of the second transformer includes a center tap, and this center tap may be grounded.

Further, circuit wiring may be performed such that the polarity of voltage to be applied to one side of a plurality of lamps to be disposed in parallel varies without leaning to one side. Thus, eliminating leaning to one side can reduce noise, and prevent symmetric contrast of the lamps from leaning to one side.

Further, the above loop may be configured of a plurality of loops. Moreover, the above loop may be configured of a plurality of loops, and circuit wiring may be performed such that the lamps in each loop are alternately disposed every same number of lamps or different number of lamps.

A lamp lighting apparatus according to an eighth aspect of the present invention comprises a single transformer or a plurality of transformers of which a plurality of secondary windings are provided in at least a single core. A first terminal of each of the plurality of secondary windings is connected to a terminal of another first secondary winding via a first lamp, a second terminal of each of the plurality of secondary windings is connected to a terminal of another second secondary winding via a second lamp, and the primary winding of a single transformer or the primary windings of a plurality of transformers are connected to an AC power source. Thus, even if a multi-output transformer is employed, current made to flow into each lamp can be made uniform, and accumulation of voltage due to the lamps can be suppressed, thereby eliminating safety problems.

Also, there may be cases wherein the plurality of second windings are wound around the core with a polarity wherein an anti-polarity voltage is applied to both ends of each lamp.

A lamp lighting apparatus according to a ninth aspect of the present invention comprises a first transformer of which a plurality of secondary windings are provided in at least a single core, and a second transformer of which a plurality of secondary windings are provided in at least a single core. A first terminal of a first secondary winding of the first transformer is connected to a first secondary winding of the second transformer via a lamp, a second terminal of the first secondary winding of the first transformer is connected to a second secondary winding of the second transformer via a lamp, the plurality of secondary windings of the first transformer, and the plurality of second windings of the second transformer and a lamp are connected in series, and the first windings of the first and second transformers are connected to an AC power source such that an anti-polarity voltage is applied to both ends of each lamp.

A lamp lighting apparatus according to a tenth of the present invention comprises a single transformer or a plurality of transformers of which a plurality of secondary windings are provided in at least a single core. The plurality of secondary windings and lamps are connected in series, a first terminal of each of the plurality of secondary windings is associated with a set made up of a first lamp and another first secondary winding, a second terminal of each of the plurality of secondary windings is associated with a set made up of a second lamp and another second secondary winding, and the primary winding of the single transformer or the primary windings of the plurality of transformers are connected to an AC power source such that an anti-polarity voltage is applied to both ends of each lamp.

A lamp lighting apparatus according to an eleventh aspect of the present invention comprises at least first and second transformers. A plurality of lamps connected in series are connected between a first terminal of the secondary winding of the first transformer and a first terminal of the secondary winding of the second transformer, a plurality of other lamps connected in series are connected between a second terminal of the secondary winding of the first transformer and a second terminal of the secondary winding of the second transformer, and the primary windings of the first and second transformers are connected to an AC power source such that an anti-polarity voltage is generated at the first terminal of the secondary winding of the first transformer and at the first terminal of the secondary winding of the second transformer, and an anti-polarity voltage is generated at the second terminal of the secondary winding of the first transformer and at the second terminal of the secondary winding of the second transformer.

Also, at least two groups made up of the first and second transformers may be included, and circuit wiring may be performed such that the lamps to be connected to the first group and the lamps to be connected to a first group and the lamps to be connected to a second group are alternately disposed every same number of lamps or different number of lamps.

A lamp lighting device according to a twelfth aspect of the present invention comprises first through third secondary windings provided by a single transformer or a plurality of transformers, a first lamp connected between a first terminal of the second secondary winding and the first secondary winding, and a second lamp connected between a second terminal of the second secondary winding and the third secondary winding. The first through third secondary windings and the first and second lamps are connected in series, and the primary winding of a single transformer or the primary windings of a plurality of transformers are connected to an AC power source.

A lamp lighting device according to a thirteenth aspect of the present invention of which three or more secondary windings and a plurality of lamps, which are provided by a single transformer or a plurality of transformers, are connected in series to form a closed loop, and at least two portions where the lamps are connected are included in the downstream of the secondary winding when the circulating direction of the closed loop is defined as one direction.

A lamp lighting device according to a fourteenth embodiment of the present invention, of which a plurality of secondary windings and a plurality of lamps, which are provided by a single transformer or a plurality of transformers, are connected in series to form a closed loop, and at least the single lamp is disposed between at least the three secondary windings respectively.

A lamp lighting apparatus according to a fifteenth aspect of the present invention comprises a plurality of transformers, the secondary windings of the plurality of transformers and two or more lamps are connected in series to make up a closed loop, the primary windings of the plurality of transformers are connected to an AC power source, and at least one point of the closed loop is grounded in a DC manner. Upon employing such a configuration, with the closed loop, i.e., the secondary winding side of the transformers, a grounded state in a DC manner, and a floating state in an AC manner is formed, resulting in the lamps being connected in series in an AC manner, and accordingly, current is balanced well, and also electric potential at the secondary winding side of the transformers can be maintained in a stable state. Note that grounding in a DC manner of at least one point of the closed loop may be performed via a resistance having a predetermined resistance value or more, or via a predetermined coil or the like.

Note that when the circulating direction of the above closed loop is defined as one direction, the closed loop may include at least two portions where the lamps are connected in the downstream of the secondary winding. Also, with the above closed loop, at least the single lamp may be disposed between the secondary windings respectively. A configuration, which generates an anti-polarity electric potential at both ends of the lamp, is preferable even in respect of safety and noise. Thus, in the event of generating an anti-polarity electric potential, both lines wherein each polarity electric potential occurs are preferably grounded serially.

Further, at least the single transformer has a center tap on the secondary winding side, and grounding in a DC manner of at least one point of the above closed loop may be performed via this center tap. In this state wherein current is balanced well, no electric potential difference occurs both ends of the resistance, resulting in reducing loss.

Note that each of the plurality of transformers includes a center tap on the secondary winding side, and grounding in a DC manner of the above closed loop may be performed via this center tap. Thus, even if the lamp becomes an open state, the electric potential thereof can be stabilized.

Also, at least the single transformer includes a center tap on the secondary winding side, and grounding in a DC manner of at least one point of the closed loop may be performed via this center tap. Further, a circuit for subjecting the driving voltage of the AC power source to automatic adjustment or shutdown by dividing the voltage of grounding of the center tap to detect an unbalanced voltage, and feeding back the detected voltage, may be included. Thus, the lamp lighting apparatus can be operated with safety and stability.

Also, at least the single transformer includes a center tap on the secondary winding side, and grounding in a DC manner of at least one point of the closed loop may be performed via this center tap. Further, a circuit for subjecting the driving voltage of the AC power source to automatic adjustment or shutdown by simultaneously using the voltage of the primary winding of the transformer or the voltage of a voltage detecting tertiary winding, and an unbalanced voltage detected by dividing the voltage of grounding of the center tap, and feeding back these, may be included. Thus, the lamp lighting apparatus can be operated with safety and stability.

Also, at least the single transformer includes a center tap on the secondary winding side, and grounding in a DC manner of at least one point of the closed loop may be performed via the center tap. Further, a circuit for subjecting the driving voltage of the AC power source to automatic adjustment or shutdown by feeding back the weighted sum voltage between the maximum absolute value of the voltage of the primary winding of the transformer or the voltage of a voltage detecting tertiary winding, and the maximum absolute value of an unbalanced voltage detected by dividing the voltage of grounding of the center tap, may be included.

Also, at least the single transformer includes a center tap on the secondary winding side, and grounding in a DC manner of at least one point of the closed loop may be performed via the center tap. Further, a circuit for subjecting the driving voltage of the AC power source to automatic adjustment or shutdown by simultaneously feeding back the weighted sum voltage and the weighted differential voltage between the voltage of the primary winding of the transformer or the voltage of a voltage detecting tertiary winding, and an unbalanced voltage detected by dividing the voltage of grounding of the center tap, may be included. Thus, the lamp lighting apparatus can be operated with safety and stability.

A lamp lighting apparatus according to a sixteenth aspect of the present invention comprises first and second transformers each of which the primary winding is connected to an AC power source, wherein a closed loop is formed in which lamps are disposed in series between the secondary windings of the first and second transformers, the first and second transformers apply first and second voltage, which have a different polarity, to both ends of the lamps, and the closed loop is grounded in a DC manner with a line where the first voltage occurs and with a line where the second voltage occurs respectively.

A lamp lighting apparatus according to a seventeenth aspect of the present invention comprises first and second transformers each of which the primary winding is connected to an AC power source, wherein a closed loop is formed in which lamps are disposed in series between the secondary windings of the first and second transformers, the first and second transformers apply first and second voltage, which have a different polarity, to both ends of the lamps, a center tap is provided on the secondary windings of the first and second transformers, and the closed loop is grounded in a DC manner via the center tap.

A lamp lighting circuit according to a eighteenth aspect of the present invention comprises a plurality of closed loops where a predetermined number of lamps and the secondary windings of a predetermined number of transformers are connected in series. At least one of the primary windings of the transformers employed for each closed loop is connected to the primary winding of the transformer employed for another closed loop in series. Employing such a configuration subjects current of the lamp included in the closed loop to uniformity, and also subjects current between the closed loops to uniformity by the primary windings of the transformers being connected in series. Note that according to the present invention, even if the number of transformers regarding the primary windings of the transformers being connected in series is restricted, uniformity of current can be propagated entirely by catenating the closed loops one after another.

A lamp lighting circuit according to a nineteenth aspect of the present invention comprises a plurality of closed loops where a predetermined number of lamps and the secondary windings of a predetermined number of transformers are connected in series. All of the primary windings of the transformers employed for each closed loop are connected to the primary winding of the transformer employed for another different closed loop in series respectively. Thus, the link between the closed loops becomes strong, and current uniformity is readily propagated entirely.

Note that the above predetermined number is sometimes 2. In the event that the predetermined number is 2, the closed loops are linked so as to make a round in beans.

A lamp lighting circuit according to a twentieth aspect of the present invention comprises a first closed loop in which two lamps and the secondary windings of two transformers are connected in series such that the lamps and the secondary windings of the transformers are alternately disposed, a second closed loop in which two lamps and the secondary windings of two transformers are connected in series such that the lamps and the secondary windings of the transformers are alternately disposed, and a third closed loop in which two lamps and the secondary windings of two transformers are connected in series such that the lamps and the secondary windings of the transformers are alternately disposed. The primary winding of the first transformer employed for the first closed loop, and the primary winding of any one of the transformers employed for the second closed loop are connected in series, the primary winding of the second transformer employed for the first closed loop, and the primary winding of any one of the transformers employed for the third closed loop are connected in series. Thus, the closed loops are catenated in bead fashion, so current uniformity is propagated along the catenation.

A lamp lighting circuit according to a twenty-first aspect of the present invention comprises a plurality of closed loops where a first predetermined number of lamps and the secondary windings of the first predetermined number of transformers are connected in series. Of the transformers employed for the plurality of closed loops, the primary windings of a second predetermined number of transformers employed for the different closed loop are connected in series, and at least one of the primary windings of other transformers employed for the group of a closed loop part of which the secondary windings of the second predetermined number of transformers make up is connected to the primary winding of the transformer employed for the closed loop other than the group of the closed loop in series. Even if such a configuration is employed, current of the lamp included in the closed loop is made uniform.

A lamp lighting circuit according to a twenty-second aspect of the present invention comprises a plurality of closed loops where a first predetermined number of lamps and the secondary windings of the first predetermined number of transformers are connected in series. The transformers employed in the plurality of closed loop are grouped for each second predetermined number, and the primary windings of the transformers within the group are connected in series, other transformers employed in the closed loop part of which the secondary windings of the transformers within the group make up are belonged to another group. Thus, the link between the closed loops becomes strong, resulting in improving the precision of current uniformity.

A lamp lighting circuit according to a twenty-third aspect of the present invention is a lamp lighting circuit including a plurality of transformers each of which the primary winding is connected to a power source, and the secondary winding is connected to a lamp, and comprises a plurality of primary side closed loops in which at least the two primary windings are disposed in series, and a plurality of secondary side closed loops in which at least the two secondary windings are disposed in series. The primary side closed loops and the secondary closed loops are linked via the transformers, and at least one of the secondary side closed loops is linked with at least two of other secondary side closed loops via the primary side closed loop.

Note that with the lamp lighting circuit according to the twenty-third aspect of the present invention, at least one of the secondary side closed loops may be linked with one of other secondary side closed loops via the primary side closed loop.

A lamp lighting circuit according to a twenty-fourth aspect of the present invention is a lamp lighting circuit including a plurality of transformers each of which the primary winding is connected to a power source, and the secondary winding is connected to a lamp, and comprises a plurality of primary side closed loops in which at least the two primary windings are disposed in series, and a plurality of secondary side closed loops in which at least the two secondary windings are disposed in series. The primary side closed loops and the secondary closed loops are linked via the transformers, all of the secondary side closed loops are linked with all of other secondary side closed loops via the primary side closed loops, or the primary side closed loops and other secondary side closed loops.

With the lamp lighting circuit according to a twenty-fifth aspect of the present invention, the total number of the transformers may be smaller than the product between the total number of the primary side closed loops and the total number of the secondary side closed loops.

A lamp lighting circuit according to a twenty-sixth aspect of the present invention is a lamp lighting circuit including a plurality of transformers each of which the primary winding is connected to a power source, and the secondary winding is connected to a lamp, and comprises a plurality of primary side closed loops in which at least the two primary windings are disposed in series, and a plurality of secondary side closed loops in which at least the two secondary windings are disposed in series. The primary side closed loops and the secondary closed loops are linked via the transformers, at least one of the primary side closed loops is linked with at least two of other primary side closed loops via the secondary side closed loop.

Also, with the lamp lighting circuit according to the twenty-sixth aspect of the present invention, at least one of the primary side closed loops may be linked with one of other primary side closed loops via the primary side closed loop.

A lamp lighting circuit according to a twenty-seventh aspect of the present invention is a lamp lighting circuit including a plurality of transformers each of which the primary winding is connected to a power source, and the secondary winding is connected to a lamp, and comprises a plurality of primary side closed loops in which at least the two primary windings are disposed in series, and a plurality of secondary side closed loops in which at least the two secondary windings are disposed in series. The primary side closed loops and the secondary closed loops are linked via the transformers, and all of the primary side closed loops are linked with all of other primary side closed loops via the secondary side closed loops, or the secondary side closed loops and other primary side closed loops.

With the lamp lighting circuit according to the twenty-seventh aspect of the present invention, the total number of the transformers may be smaller than the product between the total number of the primary side closed loops and the total number of the secondary side closed loops.

A lamp lighting circuit according to a twenty-eighth aspect of the present invention is a lamp lighting circuit including a plurality of transformers each of which the primary winding is connected to a power source, and the secondary winding is connected to a lamp, and comprises a plurality of primary side closed loops in which at least the two primary windings are disposed in series, and a plurality of secondary side closed loops in which at least the two secondary windings are disposed in series. The primary side closed loops and the secondary closed loops are linked via the transformers, at least one of the secondary side closed loops is linked with at least two of other secondary side closed loops via the primary side closed loop, and at least one of the primary side closed loops is linked with at least two of other primary side closed loops via the secondary side closed loop.

A lamp lighting circuit according to a twenty-ninth aspect of the present invention is a lamp lighting circuit including a plurality of transformers each of which the primary winding is connected to a power source, and the secondary winding is connected to a lamp, and comprises a plurality of primary side closed loops in which at least the two primary windings are disposed in series, and a plurality of secondary side closed loops in which at least the two secondary windings are disposed in series. The primary side closed loops and the secondary closed loops are alternately concatenated via the transformers, at least three alternating linked portions between the primary side closed loop and the secondary side closed loop are provided.

A plurality of circuits for realizing a configuration such as described above exist, and specific examples thereof will be described in the embodiments of the present invention, but the present invention is not restricted to these.

BRIEF DESCRIPTION OF THE DRAWINGS

FIG. 36 is a circuit diagram of a circuit to be compared with.

FIG. 37A is a diagram for describing regarding voltage accumulation due to discharge tubes.

FIG. 37B is a diagram for describing regarding voltage accumulation due to discharge tubes.

FIG. 37C is a diagram for describing regarding voltage accumulation due to discharge tubes.

DESCRIPTION OF THE PREFERRED EMBODIMENTS

First Embodiment

Figure 10:
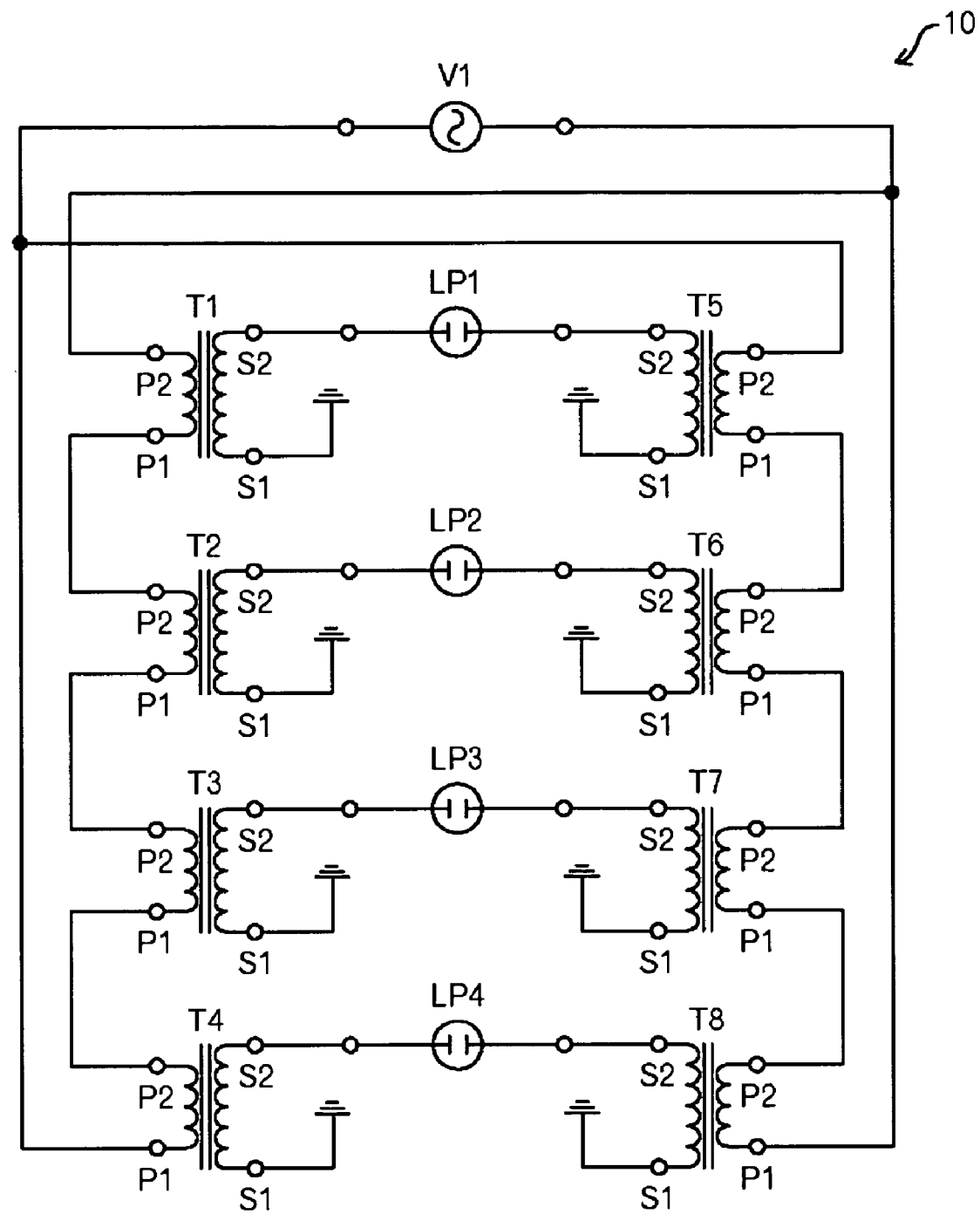
FIG. 10 is a circuit diagram according to a first embodiment of the present invention.

FIG. 10 illustrates a discharge tube lighting circuit according to a first embodiment of the present invention. A discharge tube lighting circuit 10 in FIG. 10 comprises an AC power source V1, transformers T1 through T8, and discharge tubes LP1 through LP4 such as a cold cathode fluorescent tube. The AC power source V1 includes a switching-type inverter power source, and full-bridge, half-bridge, and the like can be conceived as examples of the switching circuit. In all of the embodiments described in the present Specification, the AC power source V1 is connected to a terminal P1 of the primary winding of the transformer T4 and a terminal P2 of the primary winding of the transformer T1, and also a terminal P1 of the primary winding of the transformer T8 and a terminal P2 of the primary winding of the transformer T5. Also, a terminal P2 of the primary winding of the transformer T4 and a terminal P1 of the primary winding of the transformer T3, a terminal P2 of the primary winding of the transformer T3 and a terminal P1 of the primary winding of the transformer T2, and a terminal P2 of the primary winding of the transformer T2 and a terminal P1 of the primary winding of the transformer T1, each pair of which is connected. That is to say, the primary windings of the transformers T1 through T4 are connected to the AC power source V1 in series. Further, a terminal P2 of the primary winding of the transformer T8 and a terminal P1 of the primary winding of the transformer T7, a terminal P2 of the primary winding of the transformer T7 and a terminal P1 of the primary winding of the transformer T6, and a terminal P2 of the primary winding of the transformer T6 and a terminal P1 of the primary winding of the transformer T5, each pair of which is connected. That is to say, the primary windings of the transformers T5 through T8 are also connected to the AC power source V1 in series.

Also, a terminal S2 of the secondary winding of the transformer T1 is connected to one end of the discharge tube LP1, and a terminal S2 of the secondary winding of the transformer T5 is connected to the other end of the discharge tube LP1. Note that a terminal S1 of the secondary winding of the transformer T1 and a terminal S1 of the secondary winding of the transformer T5 are grounded. Similarly, a terminal S2 of the secondary winding of the transformer T2 is connected to one end of the discharge tube LP2, and a terminal S2 of the secondary winding of the transformer T6 is connected to the other end of the discharge tube LP2. Note that a terminal S1 of the secondary winding of the transformer T2 and a terminal S1 of the secondary winding of the transformer T6 are grounded. Further, a terminal S2 of the secondary winding of the transformer T3 is connected to one end of the discharge tube LP3, and a terminal S2 of the secondary winding of the transformer T7 is connected to the other end of the discharge tube LP3. Note that a terminal S1 of the secondary winding of the transformer T3 and a terminal S1 of the secondary winding of the transformer T7 are grounded. Also, a terminal S2 of the secondary winding of the transformer T4 is connected to one end of the discharge tube LP4, and a terminal S2 of the secondary winding of the transformer T8 is connected to the other end of the discharge tube LP4. Note that a terminal S1 of the secondary winding of the transformer T4 and a terminal S1 of the secondary winding of the transformer T8 are grounded.

Thus, the AC power source V1 and the transformers T1 through T4, and the AC power source V1 and the transformers T5 through T8, each pair of which is connected in series, and accordingly, current which flows into the transformers T1 through T4 and current which flows into the transformers T5 through T8 become the same. Voltage of the pressurized ratio m power is output between the terminals of the secondary windings of the transformers, and also with the property of transformers, current which flows into the secondary winding becomes 1/m of current which flows into the primary winding. The transformers T1 through T8 are transformers all having the same pressurized ratio m, so current which flows into the secondary winding is always the same one. Also, the transformers are connected to the discharge tubes such that an anti-polarity voltage is applied to both ends of the discharge tubes, thereby subjecting each discharge tube to differential driving. Thus, symmetrically made uniform discharge can be obtained, thereby eliminating symmetric luminance difference of each discharge tube.

Further, even if a part of the discharge tubes attempt to become unlighted, as with the serial connection of the discharge tubes themselves, voltage concentrates on unlighted discharge tubes which current is scarcely flowed into, thereby providing effects for forcibly discharging the unlighted discharge tubes, and accordingly, all of the discharge tubes can be lighted in a sure manner. That is to say, the AC power source V1 can light many discharge tubes in a stable and uniform manner, even with a single circuit. On the other hand, the secondary windings of the transformers are actually not connected in series, so only the same voltage occurs as that in the case of individual lighting which lights discharge tubes one after another or parallel lighting. Accordingly, leakage current due to stray capacitance as to the ground and the adjacent discharge tube never increases as compared with the case of individual lighting and parallel lighting. Further, as viewed from the primary winding side, the discharge tubes on the secondary winding side seem like being connected in series, so even in the event of the transformer on the secondary winding side or a high-power circuit of the discharge tube is shorted, this is equivalent to one lamp short-circuit of n lamps in series, increase of current is little more than that of one lamp current at normal operation, i.e., n/(n−1) times the current at normal operation, thereby preventing secondary failure, smoking or ignition, or the like, from occurring. However, in the event of performing constant current control of the AC power source, this converges to n/n=1 times. Also, the shorted portion itself never generates heat since the current is that value and the voltage is 0. Similarly, even in the event of the secondary winding side being accidentally subjected to electrocution, only one lamp current at normal operation flows at the maximum, so this is an extremely lower current, meaning higher safety, as compared with parallel lighting.

Figure 1:
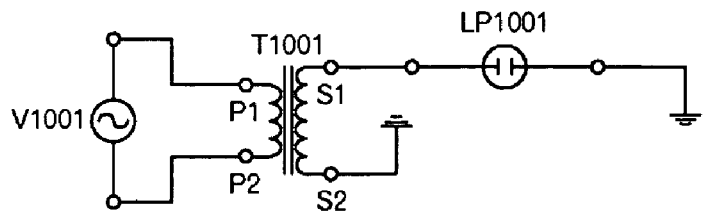
FIG. 1 is a diagram illustrating a first conventional example.
Figure 3:
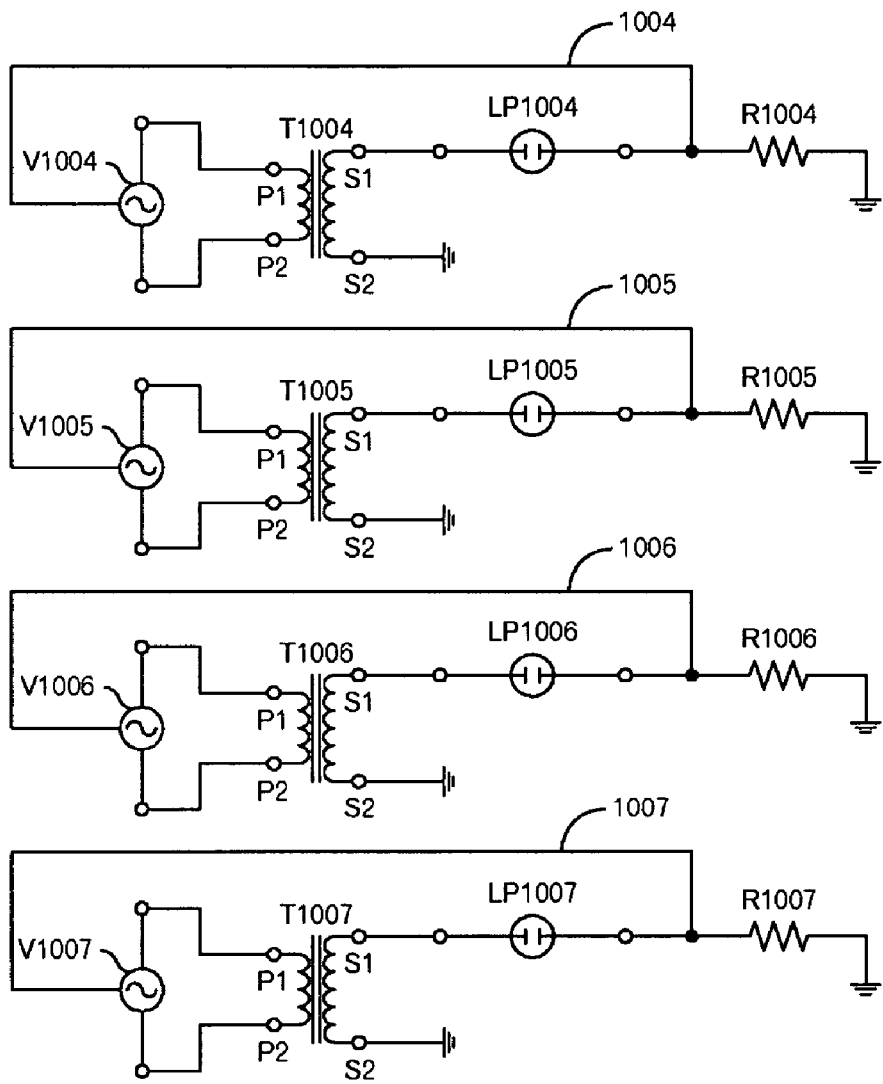
FIG. 3 is a diagram illustrating a third conventional example.
Figure 2:
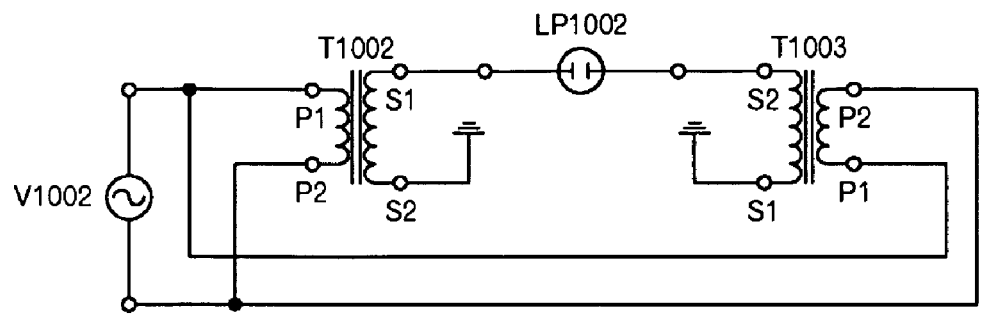
FIG. 2 is a diagram illustrating a second conventional example.
Figure 4:
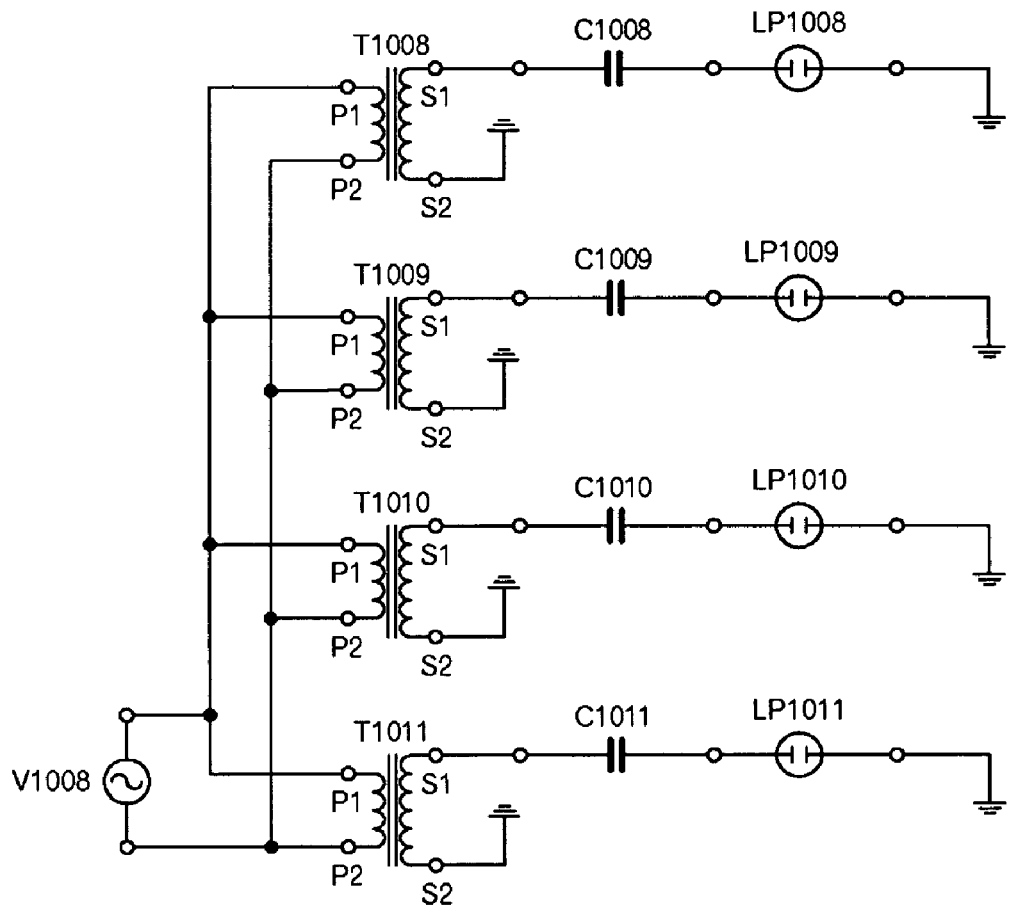
FIG. 4 is a diagram illustrating a fourth conventional example.
Figure 5:
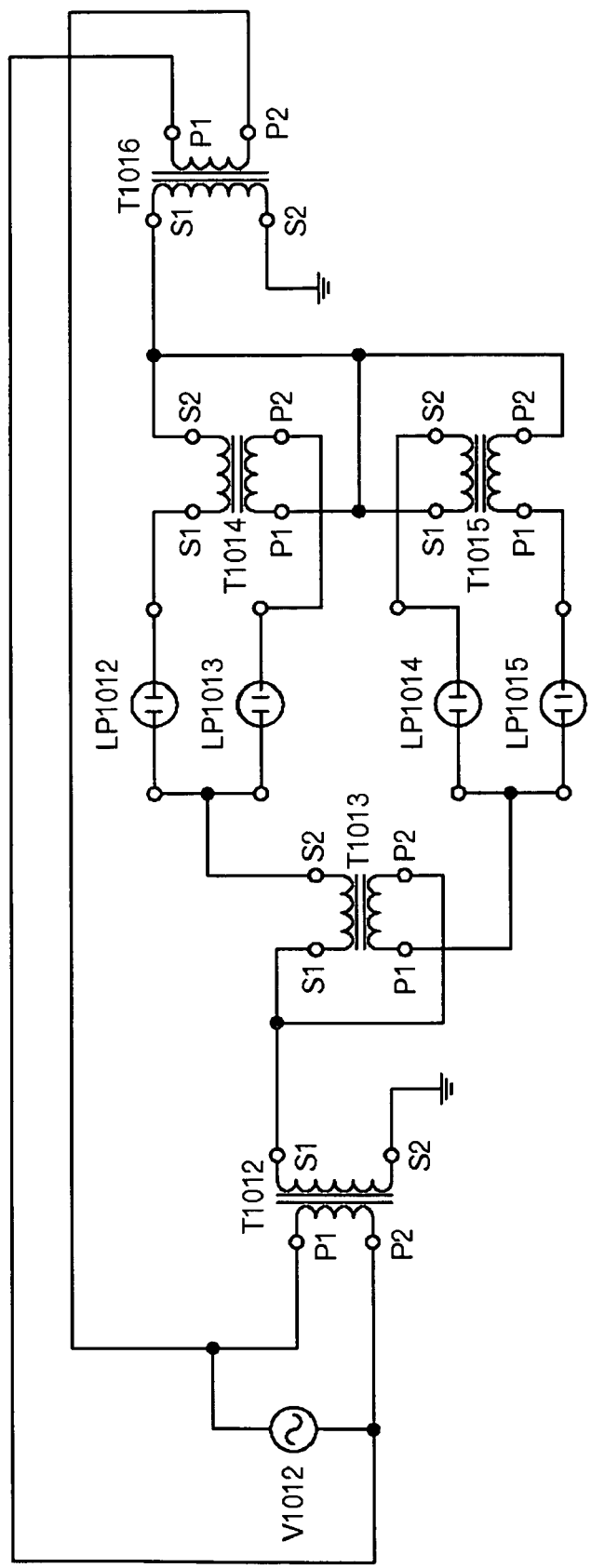
FIG. 5 is a diagram illustrating a fifth conventional example.
Figure 6:
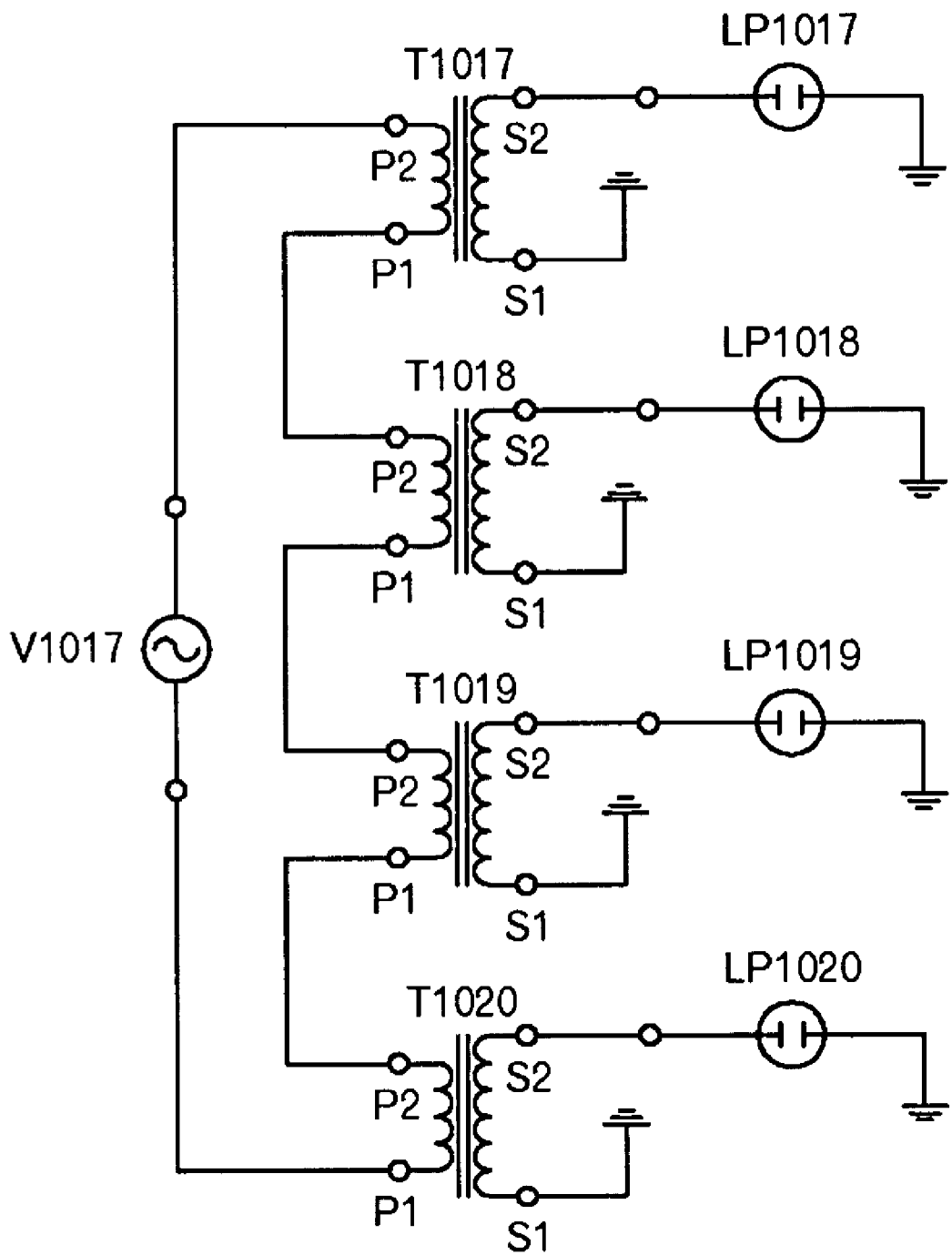
FIG. 6 is a diagram illustrating a sixth conventional example.
Figure 7:
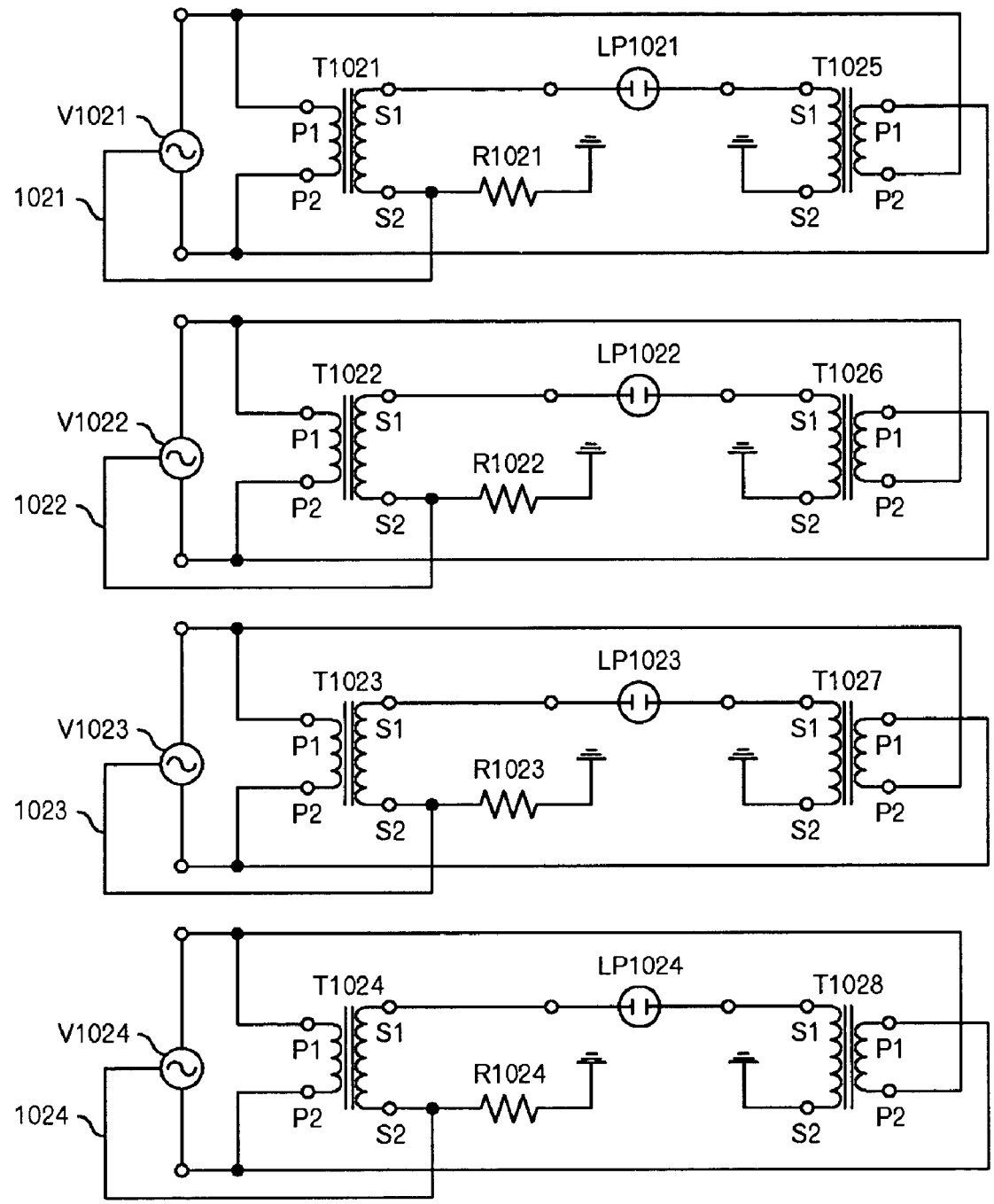
FIG. 7 is a diagram illustrating a seventh conventional example.

Let us say that with regard to the transformers employed in the present embodiment, the core-copper volume, and the cross-sectional area and the number of windings in the secondary winding are the same as those of the transformers shown in FIG. 2, but n (in the case of n discharge tubes) times regarding the cross-sectional area of the primary winding, 1/n times regarding the number of windings in the primary winding as compared with those of the transformers shown in FIG. 2.

Second Embodiment

Figure 11:
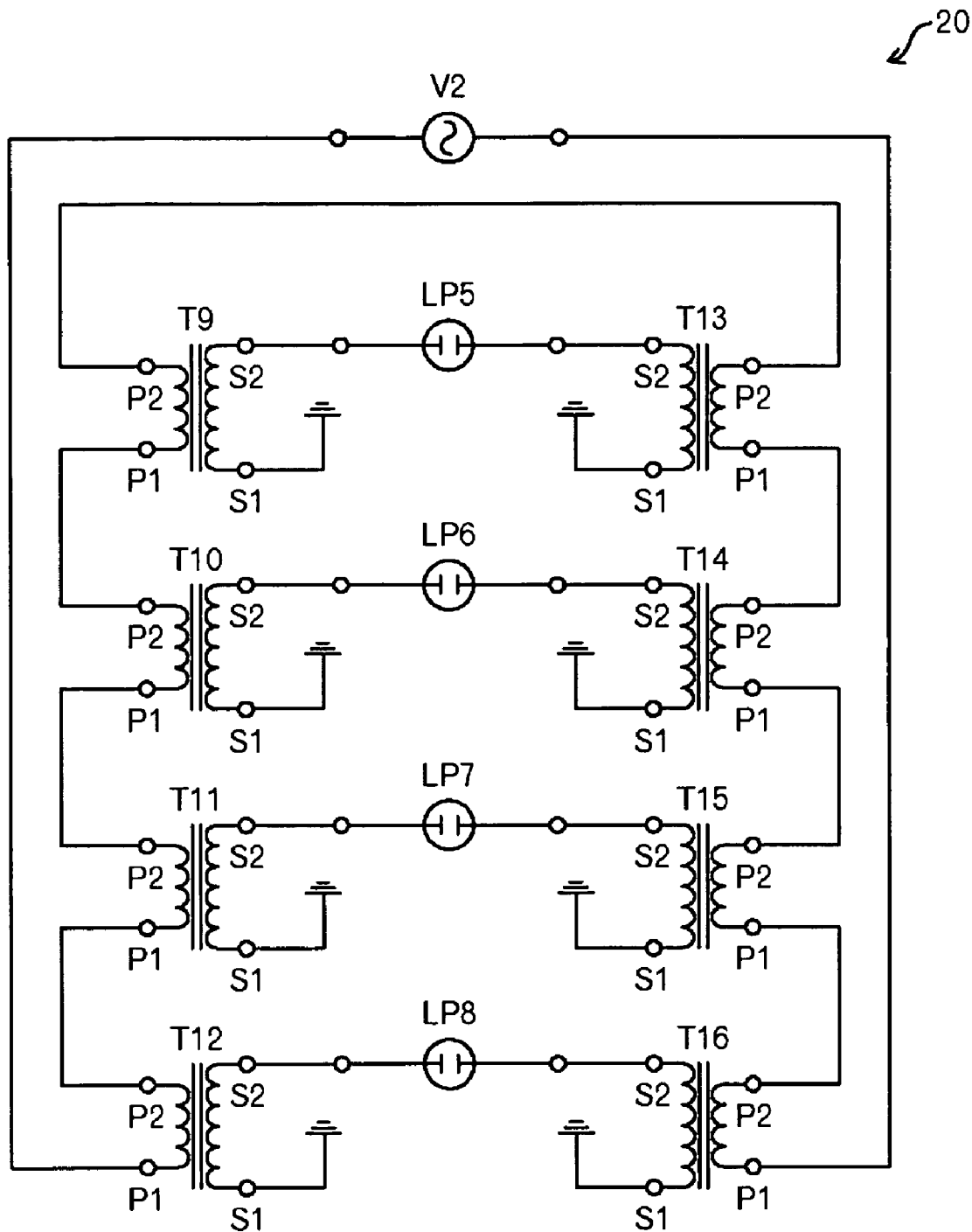
FIG. 11 is a circuit diagram according to a second embodiment of the present invention.

FIG. 11 illustrates a discharge tube lighting circuit according to a second embodiment of the present invention. A discharge tube lighting circuit 20 in FIG. 11 comprises an AC power source V2, transformers T9 through T16, and discharge tubes LP5 through LP8. The AC power source V2 is connected to a terminal P1 of the primary winding of the transformer T12 and a terminal P1 of the primary winding of the transformer T16. Also, a terminal P2 of the primary winding of the transformer T12 and a terminal P1 of the primary winding of the transformer T11, a terminal P2 of the primary winding of the transformer T11 and a terminal P1 of the primary winding of the transformer T10, a terminal P2 of the primary winding of the transformer T10 and a terminal P1 of the primary winding of the transformer T9, a terminal P2 of the primary winding of the transformer T9 and a terminal P2 of the primary winding of the transformer T13, a terminal P1 of the primary winding of the transformer T13 and a terminal P2 of the primary winding of the transformer T14, a terminal P1 of the primary winding of the transformer T14 and a terminal P2 of the primary winding of the transformer T15, and a terminal P1 of the primary winding of the transformer T15 and a terminal P2 of the primary winding of the transformer T16, each pair of which is connected. That is to say, all of the primary windings of the transformers T12 through T9 and the transformers T13 through T16 are connected to the AC power source V2 in series.

Also, a terminal S2 of the secondary winding of the transformer T9 is connected to one end of the discharge tube LP5, and a terminal S2 of the secondary winding of the transformer T13 is connected to the other end of the discharge tube LP5. Note that a terminal S1 of the secondary winding of the transformer T9 and a terminal S1 of the secondary winding of the transformer T13 are grounded. Similarly, a terminal S2 of the secondary winding of the transformer T10 is connected to one end of the discharge tube LP6, and a terminal S2 of the secondary winding of the transformer T14 is connected to the other end of the discharge tube LP6. Note that a terminal S1 of the secondary winding of the transformer T10 and a terminal S1 of the secondary winding of the transformer T14 are grounded. Further, a terminal S2 of the secondary winding of the transformer T11 is connected to one end of the discharge tube LP7, and a terminal S2 of the secondary winding of the transformer T15 is connected to the other end of the discharge tube LP7. Note that a terminal S1 of the secondary winding of the transformer T1 and a terminal S1 of the secondary winding of the transformer T15 are grounded. Also, a terminal S2 of the secondary winding of the transformer T12 is connected to one end of the discharge tube LP8, and a terminal S2 of the secondary winding of the transformer T16 is connected to the other end of the discharge tube LP8. Note that a terminal S1 of the secondary winding of the transformer T12 and a terminal S1 of the secondary winding of the transformer T16 are grounded.

Thus, the AC power source V2, and the transformers T12 through T9 and the transformers T13 through T16 are connected in series, and accordingly, current which flows into all of the transformers become the same. That is to say, the current flowing at the secondary winding side is also the same for all transformers. Accordingly, total leakage to ground (and a liquid crystal panel in the case of being employed for a liquid crystal device) and the like can be reduced more than the discharge tube lighting circuit 10 according to the first embodiment shown in FIG. 10. Also, the transformers are connected to the discharge tubes such that an anti-polarity voltage is applied to both ends of the discharge tubes, thereby subjecting each discharge tube to differential driving. Thus, symmetric luminance difference of each discharge tube is eliminated, and symmetrically made uniform discharge can be obtained. Other effects are the same as those in the case of discharge tube lighting circuit 10 according to the first embodiment shown in FIG. 10.

Let us say that with regard to the transformers T9 through T16 employed in the present embodiment, the core-copper volume, and the cross-sectional area and the number of winding in the secondary winding are the same as those of the transformers shown in FIG. 2, but 2n (in the case of n discharge tubes) times regarding the cross-sectional area of the primary winding, 1/2n times regarding the number of winding in the primary winding as compared with those of the transformers shown in FIG. 2.

Third Embodiment

Figure 12:
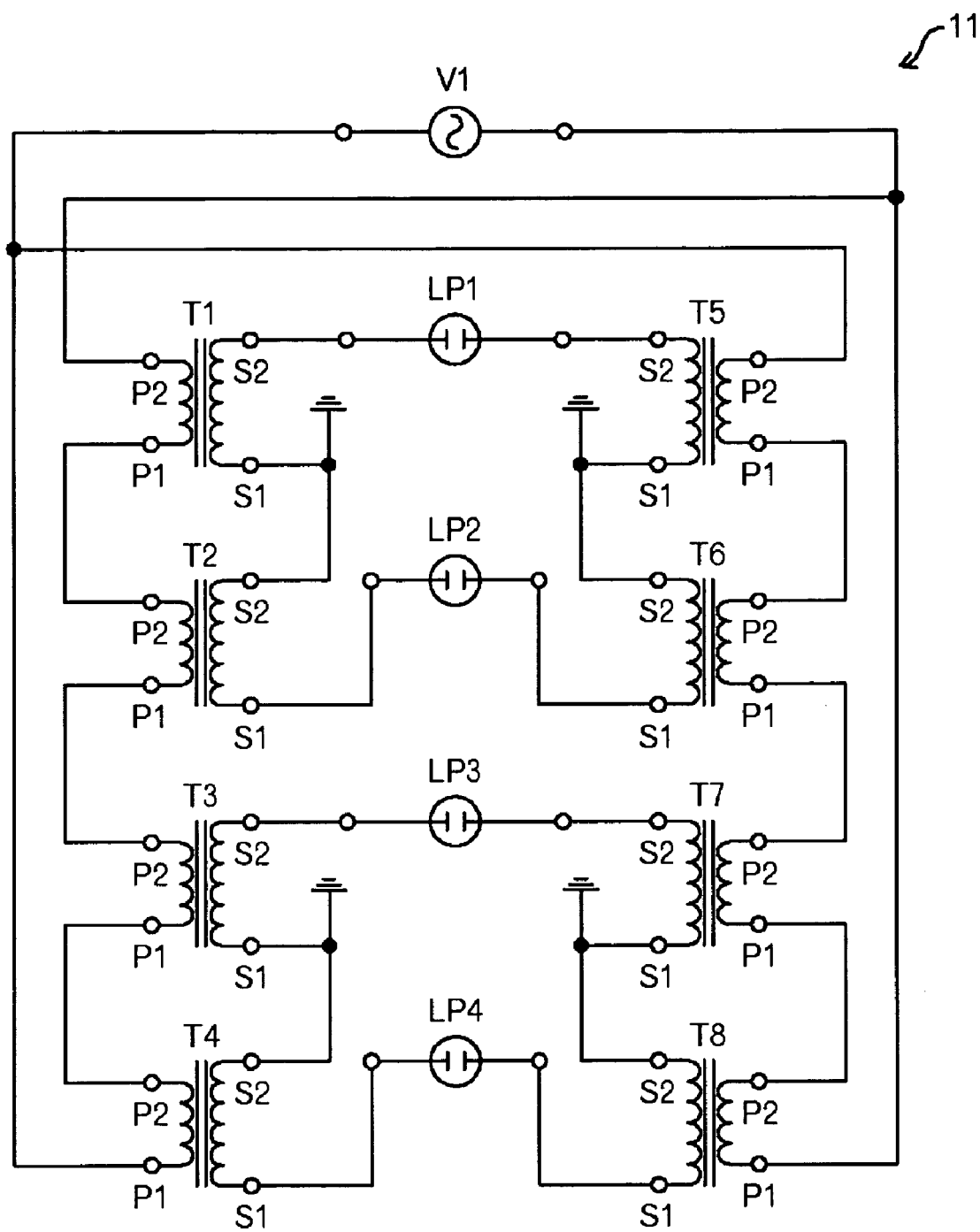
FIG. 12 is a circuit diagram according to a third embodiment of the present invention.

FIG. 12 illustrates a discharge tube lighting circuit according to a third embodiment of the present invention. A discharge tube lighting circuit 11 in FIG. 12 is a modification of the discharge tube lighting circuit 10 shown in FIG. 10, and comprises an AC power source V1, transformers T1 through T8, and discharge tubes LP1 through LP4. The AC power source V1 is connected to a terminal P1 of the primary winding of the transformer T4 and a terminal P2 of the primary winding of the transformer T1, and also a terminal P1 of the primary winding of the transformer T8 and a terminal P2 of the primary winding of the transformer T5. Also, a terminal P2 of the primary winding of the transformer T4 and a terminal P1 of the primary winding of the transformer T3, a terminal P2 of the primary winding of the transformer T3 and a terminal P1 of the primary winding of the transformer T2, and a terminal P2 of the primary winding of the transformer T2 and a terminal P1 of the primary winding of the transformer T1, each pair of which is connected. That is to say, the primary windings of the transformers T1 through T4 are connected to the AC power source V1 in series. Further, a terminal P2 of the primary winding of the transformer T8 and a terminal P1 of the primary winding of the transformer T7, a terminal P2 of the primary winding of the transformer T7 and a terminal P1 of the primary winding of the transformer T6, and a terminal P2 of the primary winding of the transformer T6 and a terminal P1 of the primary winding of the transformer T5, each pair of which is connected. That is to say, the primary windings of the transformers T5 through T8 are also connected to the AC power source V1 in series. So far the configuration is the same as FIG. 10.

Also, a terminal S2 of the secondary winding of the transformer T1 is connected to one end of the discharge tube LP1, and a terminal S2 of the secondary winding of the transformer T5 is connected to the other end of the discharge tube LP1. Note that a terminal S1 of the secondary winding of the transformer T1 and a terminal S1 of the secondary winding of the transformer T5 are grounded. On the contrary, a terminal S1 of the secondary winding of the transformer T2 is connected to one end of the discharge tube LP2, and a terminal S1 of the secondary winding of the transformer T6 is connected to the other end of the discharge tube LP2. Note that a terminal S2 of the secondary winding of the transformer T2 and a terminal S2 of the secondary winding of the transformer T6 are grounded. The terminals of the secondary windings of the transformers T2 and T6 to be connected to both terminals of the discharge tube LP2 are inverted as compared with the discharge tube lighting circuit 10 shown in FIG. 10, i.e., the transformers T2 and T6 are connected to the discharge tube LP2 such that an anti-polarity voltage as to the discharge tube LP1, which is adjacently disposed, and the later-described discharge tube LP3 is applied to the LP2.

Further, a terminal S2 of the secondary winding of the transformer T3 is connected to one end of the discharge tube LP3, and a terminal S2 of the secondary winding of the transformer T7 is connected to the other end of the discharge tube LP3. Note that a terminal S1 of the secondary winding of the transformer T3 and a terminal S1 of the secondary winding of the transformer T7 are grounded. On the contrary, a terminal S1 of the secondary winding of the transformer T4 is connected to one end of the discharge tube LP4, and a terminal S1 of the secondary winding of the transformer T8 is connected to the other end of the discharge tube LP4. Note that a terminal S2 of the secondary winding of the transformer T4 and a terminal S2 of the secondary winding of the transformer T8 are grounded. The terminals of the secondary windings of the transformers T4 and T8 to be connected to both terminals of the discharge tube LP4 are inverted as compared with the discharge tube lighting circuit 10 shown in FIG. 10, i.e., the transformers T4 and T8 are connected to the discharge tube LP4 such that an anti-polarity voltage as to the discharge tube LP3, which is adjacently disposed, is applied to the LP4.

The discharge tube lighting circuit 11 shown in FIG. 12 operates basically in the same way as the discharge tube lighting circuit 10 shown in FIG. 10, but the adjacent discharge tubes as the discharge tubes LP1 through LP4 are connected so as to be applied with an anti-polarity voltage, so the electric field as to ground and the like (and a liquid crystal panel in the case of being employed for a liquid crystal display device) is cancelled out in a smaller area, and accordingly, noise is further reduced.

Fourth Embodiment

Figure 13:
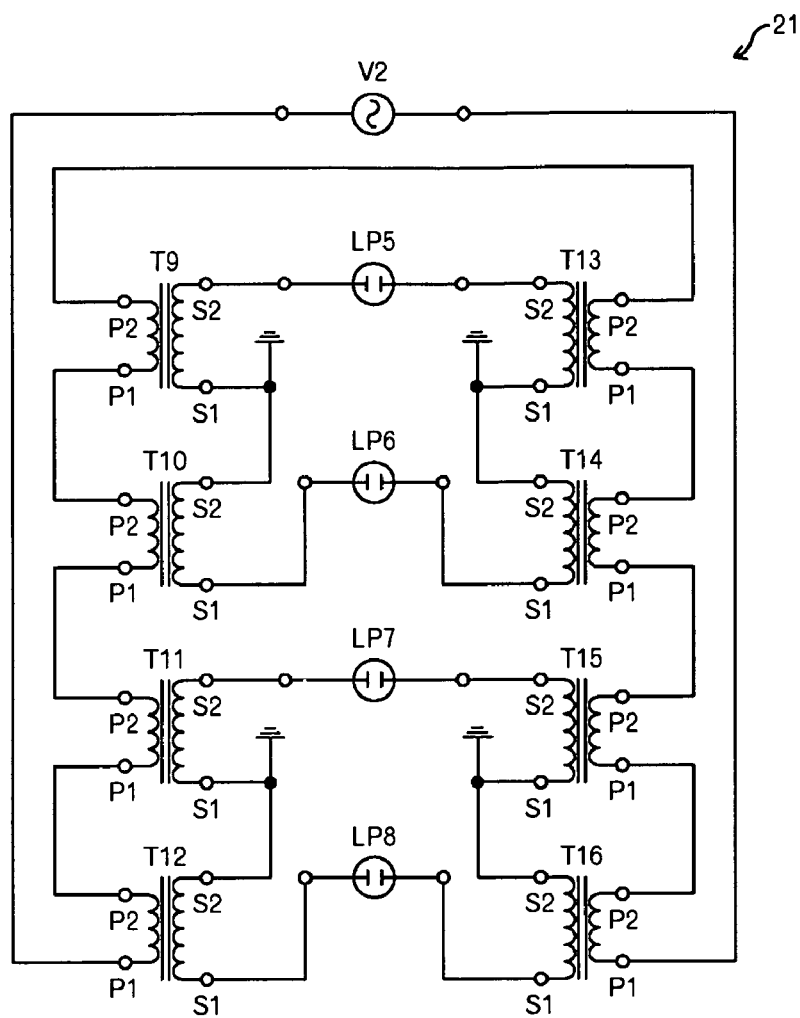
FIG. 13 is a circuit diagram according to a fourth embodiment of the present invention.

FIG. 13 illustrates a discharge tube lighting circuit according to a fourth embodiment of the present invention. A discharge tube lighting circuit 21 in FIG. 13 is a modification of the discharge tube lighting circuit 20 shown in FIG. 11, and comprises an AC power source V2, transformers T9 through T16, and discharge tubes LP5 through LP8. The AC power source V2 is connected to a terminal P1 of the primary winding of the transformer T12 and a terminal P1 of the primary winding of the transformer T16. Also, a terminal P2 of the primary winding of the transformer T12 and a terminal P1 of the primary winding of the transformer T11, a terminal P2 of the primary winding of the transformer T11 and a terminal P1 of the primary winding of the transformer T10, a terminal P2 of the primary winding of the transformer T10 and a terminal P1 of the primary winding of the transformer T9, a terminal P2 of the primary winding of the transformer T9 and a terminal P2 of the primary winding of the transformer T13, a terminal P1 of the primary winding of the transformer T13 and a terminal P2 of the primary winding of the transformer T14, a terminal P1 of the primary winding of the transformer T14 and a terminal P2 of the primary winding of the transformer T15, and a terminal P1 of the primary winding of the transformer T15 and a terminal P2 of the primary winding of the transformer T16, each pair of which is connected. That is to say, all of the primary windings of the transformers T12 through T9 and the transformers T13 through T16 are connected to the AC power source V2 in series. So far the configuration is the same as FIG. 11.

On the other hand, a terminal S2 of the secondary winding of the transformer T9 is connected to one end of the discharge tube LP5, and a terminal S2 of the secondary winding of the transformer T13 is connected to the other end of the discharge tube LP5. Note that a terminal S1 of the secondary winding of the transformer T9 and a terminal S1 of the secondary winding of the transformer T13 are grounded. On the contrary, a terminal S1 of the secondary winding of the transformer T10 is connected to one end of the discharge tube LP6, and a terminal S1 of the secondary winding of the transformer T14 is connected to the other end of the discharge tube LP6. Note that a terminal S2 of the secondary winding of the transformer T10 and a terminal S2 of the secondary winding of the transformer T14 are grounded. The terminals of the secondary windings of the transformers T10 and T14 to be connected to both terminals of the discharge tube LP6 are inverted as compared with the discharge tube lighting circuit 20 shown in FIG. 11, i.e., the transformers T10 and T14 are connected to the discharge tube LP6 such that an anti-polarity voltage as to the discharge tube LP5, which is adjacently disposed, and the later-described discharge tube LP7 is applied to the LP6.

Further, a terminal S2 of the secondary winding of the transformer T11 is connected to one end of the discharge tube LP7, and a terminal S2 of the secondary winding of the transformer T15 is connected to the other end of the discharge tube LP7. Note that a terminal S1 of the secondary winding of the transformer T11 and a terminal S1 of the secondary winding of the transformer T15 are grounded. Also, a terminal S1 of the secondary winding of the transformer T12 is connected to one end of the discharge tube LP8, and a terminal S1 of the secondary winding of the transformer T16 is connected to the other end of the discharge tube LP8. Note that a terminal S2 of the secondary winding of the transformer T12 and a terminal S2 of the secondary winding of the transformer T16 are grounded. The terminals of the secondary windings of the transformers T12 and T16 to be connected to both terminals of the discharge tube LP8 are inverted as compared with the discharge tube lighting circuit 20 shown in FIG. 11, i.e., the transformers T12 and T16 are connected to the discharge tube LP8 such that an anti-polarity voltage as to the discharge tube LP7, which is adjacently disposed, is applied to the LP8.

The discharge tube lighting circuit 21 shown in FIG. 13 operates basically in the same way as the discharge tube lighting circuit 20 shown in FIG. 11, but the adjacent discharge tubes as the discharge tubes LP5 through LP8 are connected so as to be applied with an anti-polarity voltage, so the electric field as to ground and the like (and a liquid crystal panel in the case of being employed for a liquid crystal display device) is cancelled out in a smaller area, and accordingly, noise is further reduced.

Modifications

Figure 14A:
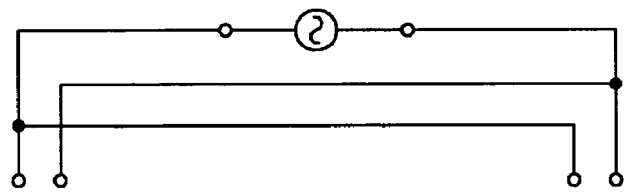
FIG. 14A is a diagram summarizing modifications in an embodiment of the present invention.
Figure 14B:
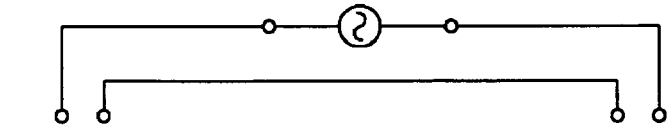
FIG. 14B is a diagram summarizing modifications in an embodiment of the present invention.

With the present embodiment, there are both arrangements in the case in which the AC power source is connected in parallel to each series of the transformers, which are connected to the left and right terminals of the discharge tubes, as shown in FIGS. 14A, 10, and 12, and in the case in which the AC power source is serially connected to all of the transformers, which are connected to the left and right terminals of the discharge tubes, as shown in FIGS. 14B, 11, and 13. The former is referred to as interpolar parallel connection, and the latter is referred to as interpolar serial connection. With the following embodiments, examples regarding the interpolar serial connection will be described, but modifying these to the interpolar parallel connection can be performed with ease as long as the present embodiment can be understood.

Note that according to the interpolar parallel connection, current to be applied to the left and right of the discharge tubes is balanced, so the electric field to be radiated from each discharge tube to ground or a liquid crystal panel is cancelled out in a smaller region, and as a result, influence of electric field noise can be reduced. Accordingly, electric field noise as to a liquid crystal can be reduced.

Also, according to the interpolar serial connection, current made to flow to the left and right of the discharge tubes is balanced, so both ends of each discharge tube become symmetric bright, and also the total leakage of current made to flow to ground and a liquid crystal panel is reduced, whereby influence of current noise can be reduced. Accordingly, radiant noise unnecessary for the outside is reduced. Also, reduction of magnetic field noise for a liquid crystal can be expected.

Figure 14C:
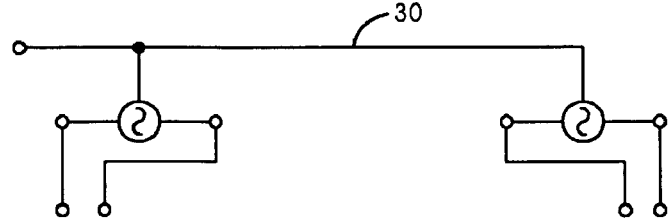
FIG. 14C is a diagram summarizing modifications in an embodiment of the present invention.

Also, as shown in FIG. 14C, different AC power sources may be connected to the primary winding side of transformers which are connected with the right terminals of discharge tubes, and the primary winding side of transformers which are connected with the left terminals of discharge tubes, but this needs to synchronize both AC power sources with a synchronized signal in a synchronized signal line 30 for example in order to actually light the discharge tubes, so this is essentially the same as a single AC power source. With the present application, the case such as shown in FIG. 14C is also handled as a single AC power source. It is needless to say that a discharge tube lighting circuit may be configured with a plurality of AC power sources by connecting the plurality of AC power sources in series, but this also needs to be operated in the same way as a single AC power source, so this is also handled as a single AC power source with the present application.

Fifth Embodiment

Figure 15:
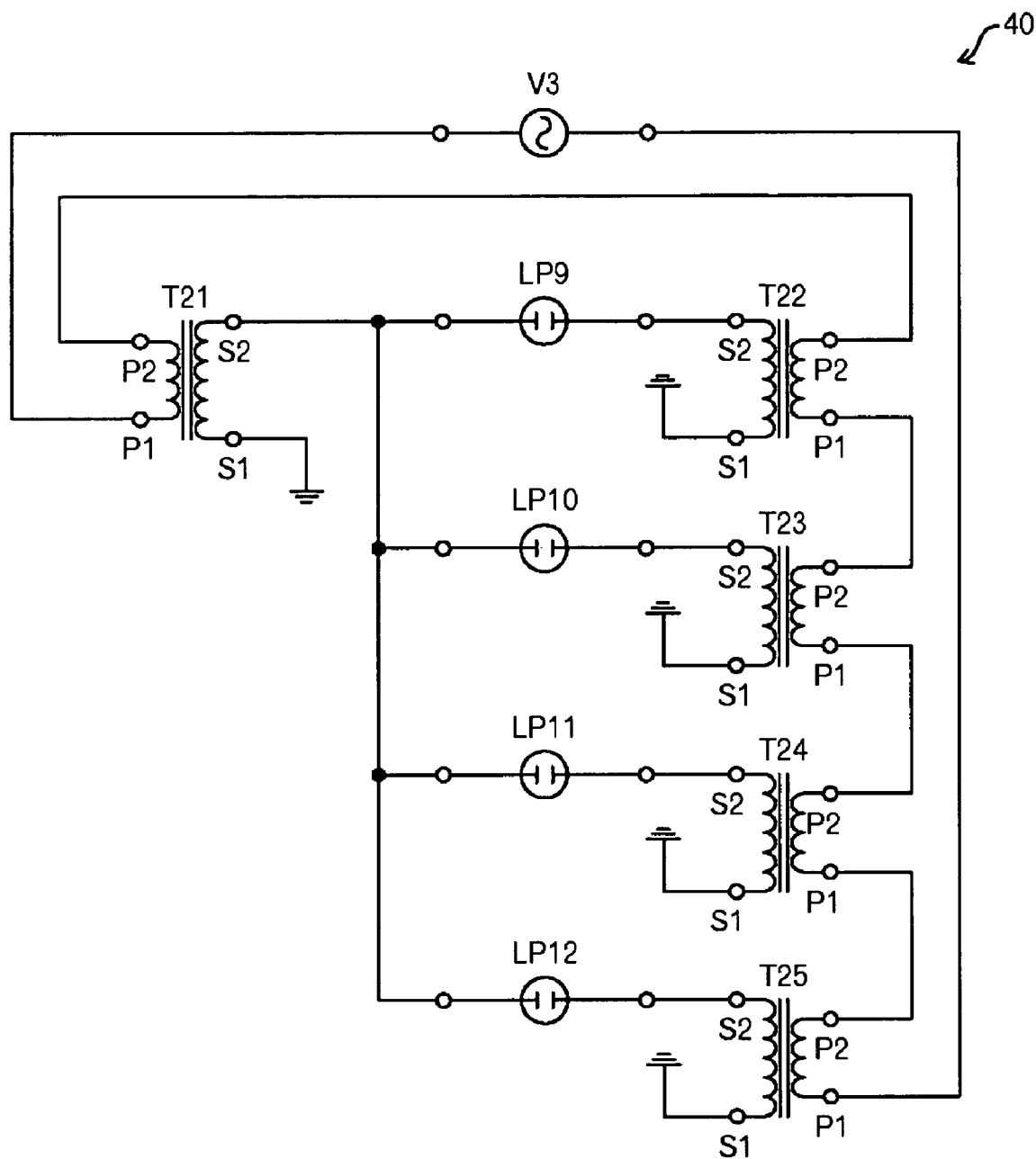
FIG. 15 is a circuit diagram according to a fifth embodiment of the present invention.

FIG. 15 illustrates a discharge tube lighting circuit according to a fifth embodiment of the present invention. A discharge tube lighting circuit 40 in FIG. 15 comprises an AC power source V3, transformers T21 through T25, and discharge tubes LP9 through LP12. The AC power source V3 is connected to a terminal P1 of the primary winding of the transformer T21 and a terminal P1 of the primary winding of the transformer T25. Also, a terminal P2 of the primary winding of the transformer T21 is connected to a terminal P2 of the primary winding of the transformer T22, a terminal P1 of the primary winding of the transformer T22 is connected to a terminal P2 of the primary winding of the transformer T23, a terminal P1 of the primary winding of the transformer T23 is connected to a terminal P2 of the primary winding of the transformer T24, and a terminal P1 of the primary winding of the transformer T24 is connected to a terminal P2 of the primary winding of the transformer T25. Thus described above, this represents the interpolar serial connection.

Also, one end of the discharge tube LP9 is connected to a terminal S2 of the secondary winding of the transformer T21, and the other end of the discharge tube LP9 is connected to a terminal S2 of the secondary winding of the transformer T22. Also, one end of the discharge tube LP10 is connected to the terminal S2 of the secondary winding of the transformer T21, and the other end of the discharge tube LP10 is connected to a terminal S2 of the secondary winding of the transformer T23. Further, one end of the discharge tube LP11 is connected to the terminal S2 of the secondary winding of the transformer T21, and the other end of the discharge tube LP11 is connected to a terminal S2 of the secondary winding of the transformer T24. Also, one end of the discharge tube LP12 is connected to the terminal S2 of the secondary winding of the transformer T21, and the other end of the discharge tube LP12 is connected to a terminal S2 of the secondary winding of the transformer T25. A terminal S1 of the secondary winding of the transformer T21, a terminal S1 of the secondary winding of the transformer T22, a terminal S1 of the secondary winding of the transformer T23, a terminal S1 of the secondary winding of the transformer T24, and a terminal S1 of the secondary winding of the transformer T25 are grounded.

Thus, the transformer T21 is employed as a common transformer on one side of the discharge tubes, thereby reducing the number of parts. Also, the transformers T22 through T25 realize current uniformity, and the transformer T21 supplies current having an anti-polarity of that in the transformers T22 through T25 to the discharge tubes.

Let us say that with regard to the transformers T22 through T25 employed in the present embodiment, the core-copper volume, and the cross-sectional area and the number of winding in the secondary winding are the same as those of the transformers shown in FIG. 2, but 2n (in the case of n discharge tubes) times regarding the cross-sectional area of the primary winding, 1/2n times regarding the number of winding in the primary winding as compared with those of the transformers shown in FIG. 2.

Also, upon the interpolar parallel connection being employed for the present embodiment, let us say that with regard to the transformers T22 through T25, the core-copper volume, and the cross-sectional area and the number of winding in the secondary winding are the same as those of the transformers shown in FIG. 2, but n times regarding the cross-sectional area of the primary winding, 1/n times regarding the number of winding in the primary winding as compared with those of the transformers shown in FIG. 2.

Further, let us say that with regard to the transformer T21 employed in the present embodiment, the core-copper volume is n times, the cross-sectional area of the primary winding is 2n times, the number of winding is 1/2 times, the cross-sectional area of the secondary winding is n times, and the number of winding in the secondary winding is the same as compared with those of the transformers shown in FIG. 2.

Also, upon the interpolar parallel connection being employed for the present embodiment, let us say that with regard to the transformer T21, the core-copper volume is n times, the cross-sectional area of the primary winding is n times, the number of winding is the same, the cross-sectional area of the secondary winding is n times, and the number of winding in the secondary winding is the same as compared with those of the transformers shown in FIG. 2.

Sixth Embodiment

Figure 16:
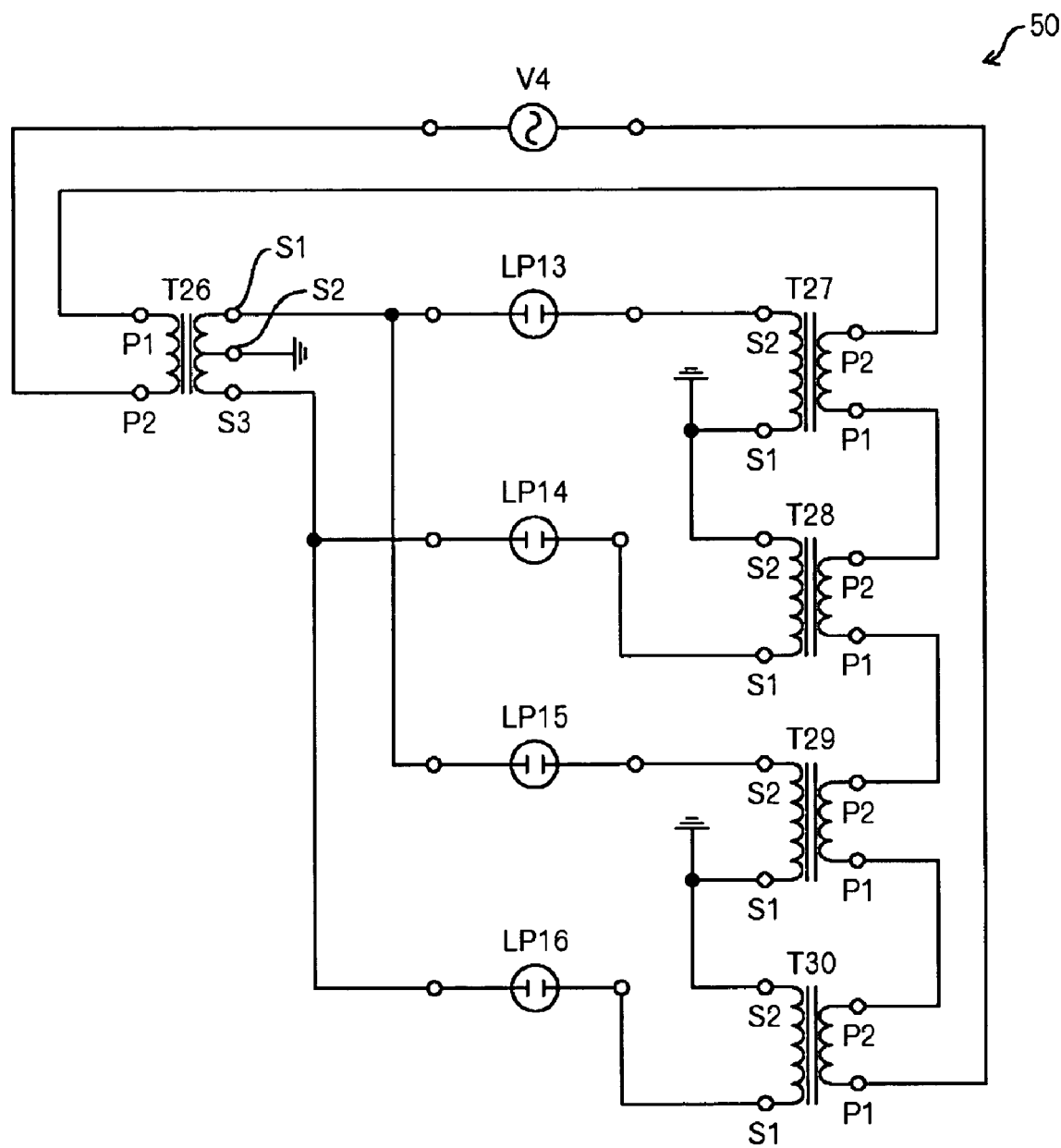
FIG. 16 is a circuit diagram according to a sixth embodiment of the present invention.

FIG. 16 illustrates a discharge tube lighting circuit according to a sixth embodiment of the present invention. A discharge tube lighting circuit 50 in FIG. 16 comprises an AC power source V4, a transformer T26 of which the secondary winding side is provided with a center tap, transformers T27 through T30, and discharge tubes LP13 through LP16. The AC power source V4 is connected to a terminal P2 of the primary winding of the transformer T26 and a terminal P1 of the primary winding of the transformer T30. Also, a terminal P1 of the primary winding of the transformer T26 is connected to a terminal P2 of the primary winding of the transformer T27, a terminal P1 of the primary winding of the transformer T27 is connected to a terminal P2 of the primary winding of the transformer T28, a terminal P1 of the primary winding of the transformer T28 is connected to a terminal P2 of the primary winding of the transformer T29, and a terminal P1 of the primary winding of the transformer T29 is connected to a terminal P2 of the primary winding of the transformer T30. Thus described above, this represents the interpolar serial connection.

Also, one end of the discharge tube LP13 is connected to a terminal S1 of the secondary winding of the transformer T26, and the other end of the discharge tube LP13 is connected to a terminal S2 of the secondary winding of the transformer T27. One end of the discharge tube LP14 is connected to a terminal S3 of the secondary winding of the transformer T26, and the other end of the discharge tube LP14 is connected to a terminal S1 of the secondary winding of the transformer T28. A terminal S1 of the secondary winding of the transformer T27 and a terminal S2 of the secondary winding of the transformer T28 are grounded. Further, one end of the discharge tube LP15 is connected to the terminal S1 of the secondary winding of the transformer T26, and the other end of the discharge tube LP15 is connected to a terminal S2 of the secondary winding of the transformer T29. One end of the discharge tube LP16 is connected to the terminal S3 of the secondary winding of the transformer T26, and the other end of the discharge tube LP16 is connected to a terminal S1 of the secondary winding of the transformer T30. A terminal S1 of the secondary winding of the transformer T29 and a terminal S2 of the secondary winding of the transformer T30 are grounded. The center tap S2 of the transformer T26 is grounded.

Such as the discharge tube lighting circuit 40 shown in FIG. 15, the transformer T26 is employed as a common transformer on one side of the discharge tubes, thereby reducing the number of parts. Also, the transformers T27 through T30 realize current uniformity, but the discharge tubes are connected such that an anti-polarity current is alternately supplied to the adjacent discharge tubes with the discharge tube lighting circuit 50. With regard to the transformer T26, the center tap S2 is grounded, so an anti-polarity equal current is output to the discharge tubes connected to the terminal S1 and terminal S3 of the secondary winding of the transformer T26. Accordingly, the brightness of the discharge tubes, which are adjacently disposed, becomes more uniform.

Seventh Embodiment

Figure 17:
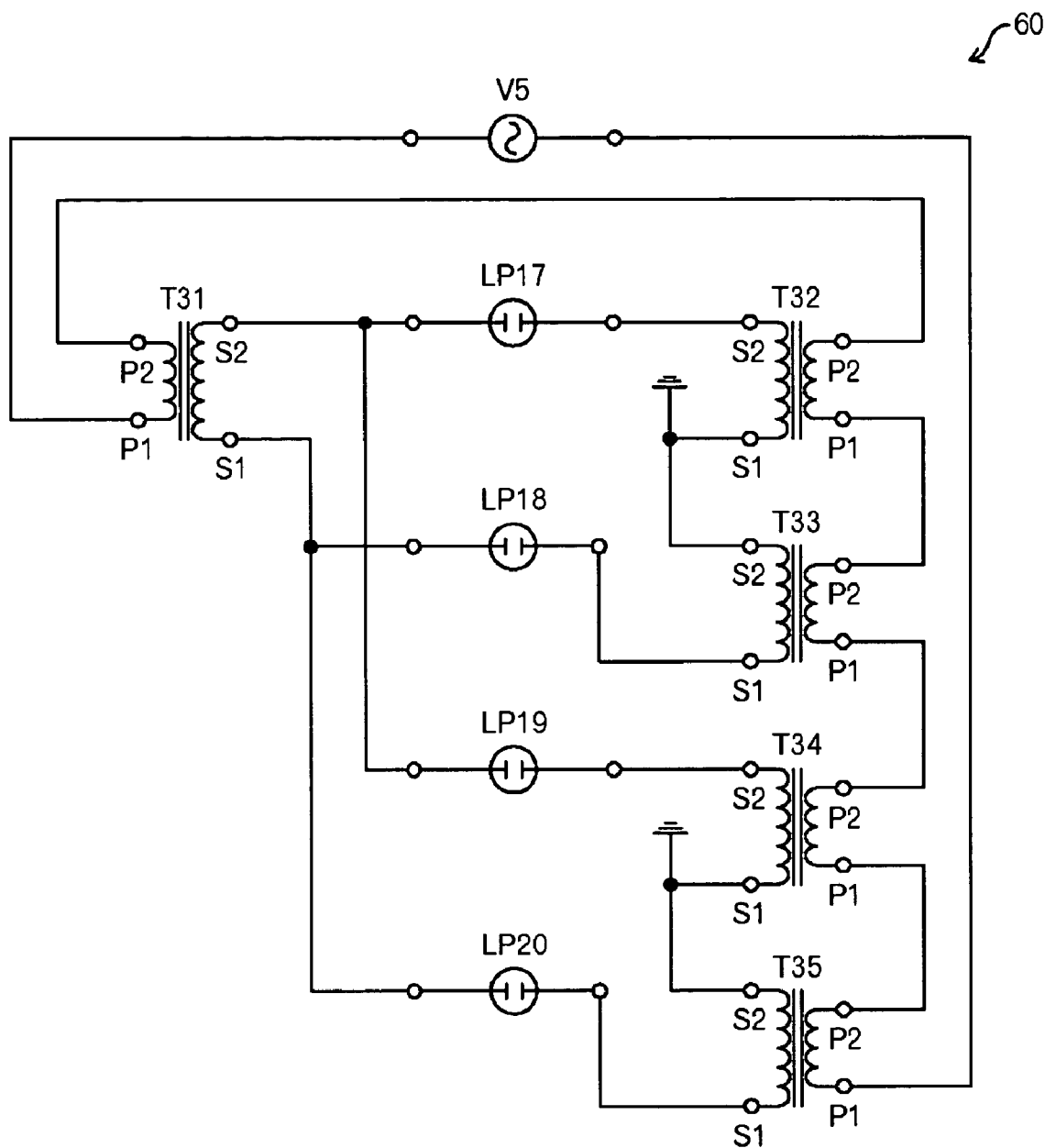
FIG. 17 is a circuit diagram according to a seventh embodiment of the present invention.

FIG. 17 illustrates a discharge tube lighting circuit according to a seventh embodiment of the present invention. A discharge tube lighting circuit 60 in FIG. 17 comprises an AC power source V5, transformers T31 through T35, and discharge tubes LP17 through LP20. The AC power source V5 is connected to a terminal P1 of the primary winding of the transformer T31 and a terminal P1 of the primary winding of the transformer T35. Also, a terminal P2 of the primary winding of the transformer T31 is connected to a terminal P2 of the primary winding of the transformer T32, a terminal P1 of the primary winding of the transformer T32 is connected to a terminal P2 of the primary winding of the transformer T33, a terminal P1 of the primary winding of the transformer T33 is connected to a terminal P2 of the primary winding of the transformer T34, and a terminal P1 of the primary winding of the transformer T34 is connected to a terminal P2 of the primary winding of the transformer T35. Thus described above, this represents the interpolar serial connection.

Also, one end of the discharge tube LP17 is connected to a terminal S2 of the secondary winding of the transformer T31, and the other end thereof is connected to a terminal S2 of the secondary winding of the transformer T32. Also, one end of the discharge tube LP18 is connected to a terminal S1 of the secondary winding of the transformer T31, and the other end thereof is connected to a terminal S1 of the transformer T33. Note that a terminal S1 of the secondary winding of the transformer T32 and a terminal S2 of the secondary winding of the transformer T33 are grounded. Also, one end of the discharge tube LP19 is connected to the terminal S2 of the secondary winding of the transformer T31, and the other end thereof is connected to a terminal S2 of the secondary winding of the transformer T34. Also, one end of the discharge tube LP20 is connected to the terminal S1 of the secondary winding of the transformer T31, and the other end thereof is connected to a terminal S1 of the transformer T35. Note that a terminal S1 of the secondary winding of the transformer T34 and a terminal S2 of the secondary winding of the transformer T35 are grounded.

With the discharge tube lighting circuit 60 thus configured, the electric potential of the transformer T31 is not fixed but stays in a floating state, and the transformers T32 through T35 supply a more uniform current to each of the discharge tubes. Further, the discharge tubes, which are adjacently disposed, are connected so as to be alternately supplied with an anti-polarity current. Thus, with the adjacent discharge tubes, noise due to unbalanced stray capacitance is prevented.

Eighth Embodiment

Figure 18:
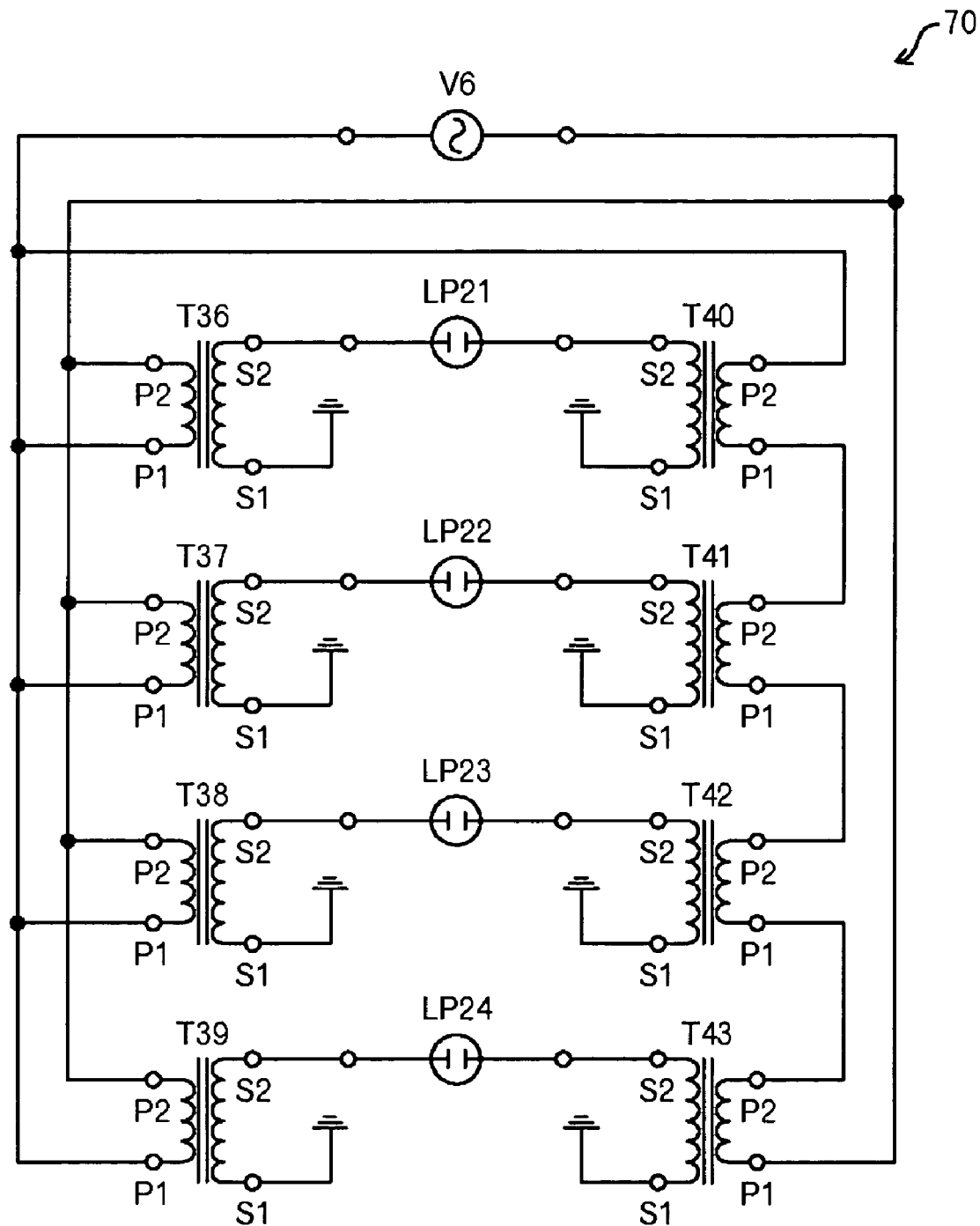
FIG. 18 is a circuit diagram according to an eighth embodiment of the present invention.

FIG. 18 illustrates a discharge tube lighting circuit according to an eighth embodiment of the present invention. A discharge tube lighting circuit 70 in FIG. 18 comprises an AC power source V6, transformers T36 through T43, and discharge tubes LP21 through LP24. The AC power source V6 is connected to a terminal P1 of the primary winding of the transformer T36, a terminal P1 of the primary winding of the transformer T37, a terminal P1 of the primary winding of the transformer T38, a terminal P1 of the primary winding of the transformer T39, a terminal P2 of the primary winding of the transformer T40, a terminal P2 of the primary winding of the transformer T36, a terminal P2 of the primary winding of the transformer T37, a terminal P2 of the primary winding of the transformer T38, a terminal P2 of the primary winding of the transformer T39, and a terminal P1 of the primary winding of the transformer T43. Also, a terminal P1 of the primary winding of the transformer T40 is connected to a terminal P2 of the primary winding of the transformer T41, a terminal P1 of the primary winding of the transformer T41 is connected to a terminal P2 of the primary winding of the transformer T42, and a terminal P1 of the primary winding of the transformer T42 is connected to a terminal P2 of the primary winding of the transformer T43. That is to say, the primary windings of the transformers T36 through T39 provided on the left side in FIG. 18 are connected in parallel, and on the other hand, the primary windings of the transformers T40 through T43 provided on the right side in FIG. 18 are connected in series.

Also, a terminal S2 of the secondary winding of the transformer T36 is connected to one end of the discharge tube LP21, and a terminal S2 of the secondary winding of the transformer T40 is connected to the other end of the discharge tube LP21. Note that a terminal S1 of the secondary winding of the transformer T36 and a terminal S1 of the secondary winding of the transformer T40 are grounded. Similarly, a terminal S2 of the secondary winding of the transformer T37 is connected to one end of the discharge tube LP22, and a terminal S2 of the secondary winding of the transformer T41 is connected to the other end of the discharge tube LP22. Note that a terminal S1 of the secondary winding of the transformer T37 and a terminal S1 of the secondary winding of the transformer T41 are grounded. Further, a terminal S2 of the secondary winding of the transformer T38 is connected to one end of the discharge tube LP23, and a terminal S2 of the secondary winding of the transformer T42 is connected to the other end of the discharge tube LP23. Note that a terminal S1 of the secondary winding of the transformer T38 and a terminal S1 of the secondary winding of the transformer T42 are grounded. Also, a terminal S2 of the secondary winding of the transformer T39 is connected to one end of the discharge tube LP24, and a terminal S2 of the secondary winding of the transformer T43 is connected to the other end of the discharge tube LP24. Note that a terminal S1 of the secondary winding of the transformer T39 and a terminal S1 of the secondary winding of the transformer T43 are grounded.

Thus configured, the transformers T40 through T43 can uniform current made to flow into the discharge tubes LP21 through LP24, and on the other hand, the transformers T36 through T39 can supply an anti-polarity voltage the corresponding transformer (any one of the transformers T40 through T43). That is to say, discharge of each discharge tube is made uniform, and further, each discharge tube is subjected to differential driving, so luminance difference between the left and right of each discharge tube is eliminated.

Note that with the specifications of the transformers, the same specifications shown in FIG. 2 are employed for the transformers T36 through T39, and the same specifications shown in FIG. 10 are employed for the transformers T40 through T43.

Ninth Embodiment

Figure 19:
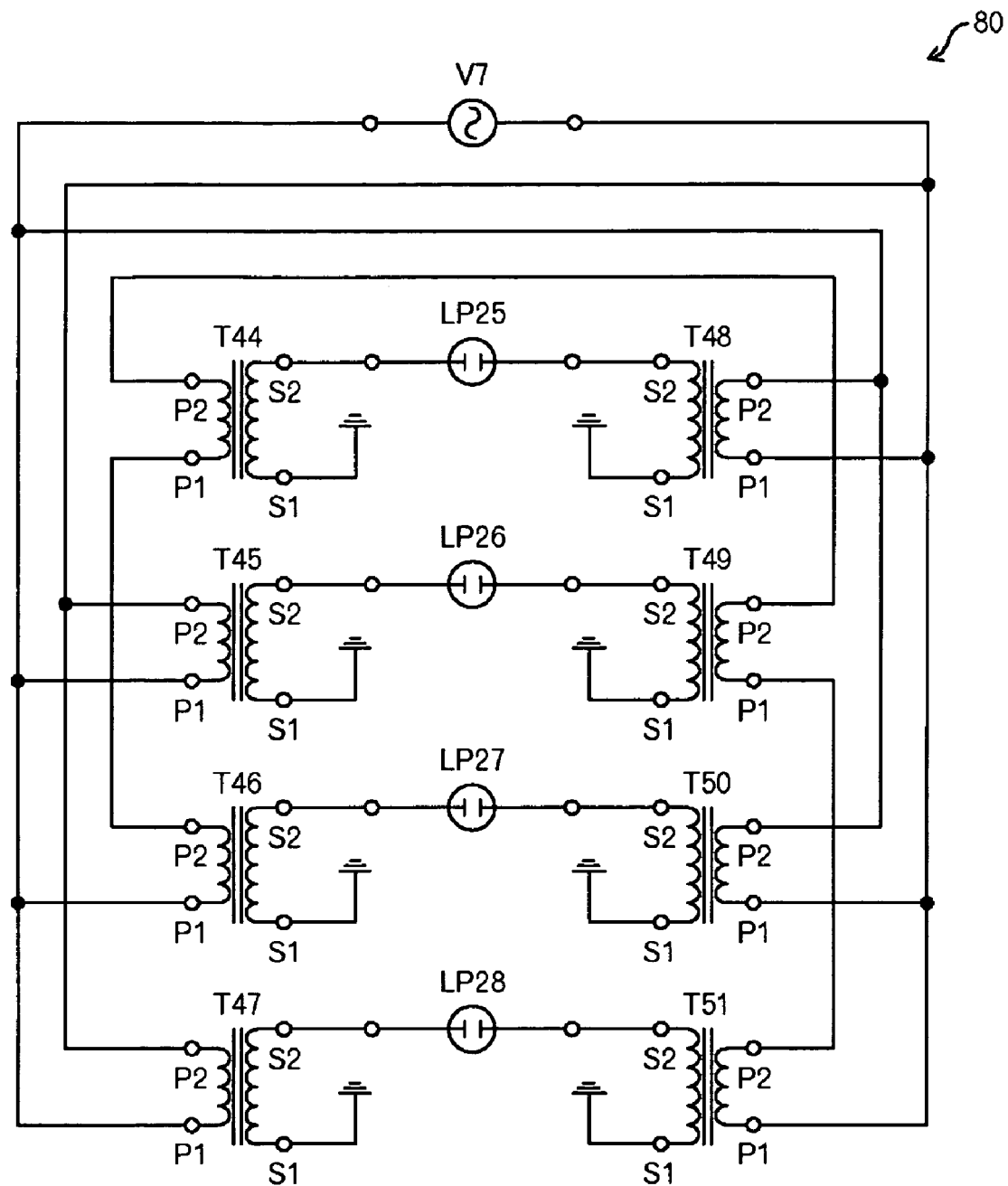
FIG. 19 is a circuit diagram according to a ninth embodiment of the present invention.

FIG. 19 illustrates a discharge tube lighting circuit according to a ninth embodiment of the present invention. A discharge tube lighting circuit 80 in FIG. 19 comprises an AC power source V7, transformers T44 through T51, and discharge tubes LP25 through LP28. The AC power source V7 is connected to a terminal P1 of the primary winding of the transformer T45, a terminal P1 of the primary winding of the transformer T47, a terminal P2 of the primary winding of the transformer T48, a terminal P2 of the primary winding of the transformer T50, a terminal P2 of the primary winding of the transformer T45, a terminal P2 of the primary winding of the transformer T47, a terminal P1 of the primary winding of the transformer T48, and a terminal P1 of the primary winding of the transformer T50. That is to say, the primary windings of the transformers T45, T47, T48, and T50 are connected in parallel.

Also, the AC power source V7 is connected to a terminal P1 of the primary winding of the transformer T46, and a terminal P1 of the primary winding of the transformer T51. Also, a terminal P2 of the primary winding of the transformer T46 is connected to a terminal P1 of the primary winding of the transformer T44, a terminal P2 of the primary winding of the transformer T44 is connected to a terminal P2 of the primary winding of the transformer T49, a terminal P1 of the primary winding of the transformer T49 is connected to a terminal P2 of the primary winding of the transformer T51. That is to say, the primary windings of the transformers T46, T44, T49, and T51 are connected in series.

Thus, the primary windings of the first and third transformers from the top, which are provided on the left side in FIG. 19, and the primary windings of the second and fourth transformers from the top, which are provided on the right side are connected in series. On the other hand, the primary windings of the second and fourth transformers from the top, which are provided on the left side in FIG. 19, and the primary windings of the first and third transformers from the top, which are provided on the right side are connected in parallel.

Also, a terminal S2 of the secondary winding of the transformer T44 is connected to one end of the discharge tube LP25, and a terminal S2 of the secondary winding of the transformer T48 is connected to the other end of the discharge tube LP25. Note that a terminal S1 of the secondary winding of the transformer T44 and a terminal S1 of the secondary winding of the transformer T48 are grounded. Similarly, a terminal S2 of the secondary winding of the transformer T45 is connected to one end of the discharge tube LP26, and a terminal S2 of the secondary winding of the transformer T49 is connected to the other end of the discharge tube LP26. Note that a terminal S1 of the secondary winding of the transformer T45 and a terminal S1 of the secondary winding of the transformer T49 are grounded. Further, a terminal S2 of the secondary winding of the transformer T46 is connected to one end of the discharge tube LP27, and a terminal S2 of the secondary winding of the transformer T50 is connected to the other end of the discharge tube LP27. Note that a terminal S1 of the secondary winding of the transformer T46 and a terminal S1 of the secondary winding of the transformer T50 are grounded. Also, a terminal S2 of the secondary winding of the transformer T47 is connected to one end of the discharge tube LP28, and a terminal S2 of the secondary winding of the transformer T51 is connected to the other end of the discharge tube LP28. Note that a terminal S1 of the secondary winding of the transformer T47 and a terminal S1 of the secondary winding of the transformer T51 are grounded.

Thus, the transformer on one side of each discharge tube is connected in series, and the transformer on the other side of each discharge tube is connected in parallel. Thus configured, the transformer on one side of each discharge tube uniforms current made to flow in to each discharge tube, and the transformer on the other side thereof supplies an anti-polarity voltage. That is to say, discharge of each discharge tube is made uniform, and further, each discharge tube is subjected to differential driving, so luminance difference between the left and right of each discharge tube is eliminated.

Note that with the specifications of the transformers, the same specifications shown in FIG. 2 are employed for the transformers T45, T47, T48, and T50, connected in parallel, and the same specifications shown in FIG. 10 are employed for the serially-connected transformers T44, T46, T49, and T51.

Note that with the above embodiments, examples regarding four discharge tubes have been shown, but the number of discharge tubes is not restricted, and a discharge tube lighting circuit can be configured by arbitrarily combining the methods of the above embodiments for all discharge tubes. A plurality of similar-type methods may also be combined.

Tenth Embodiment

Figure 20:
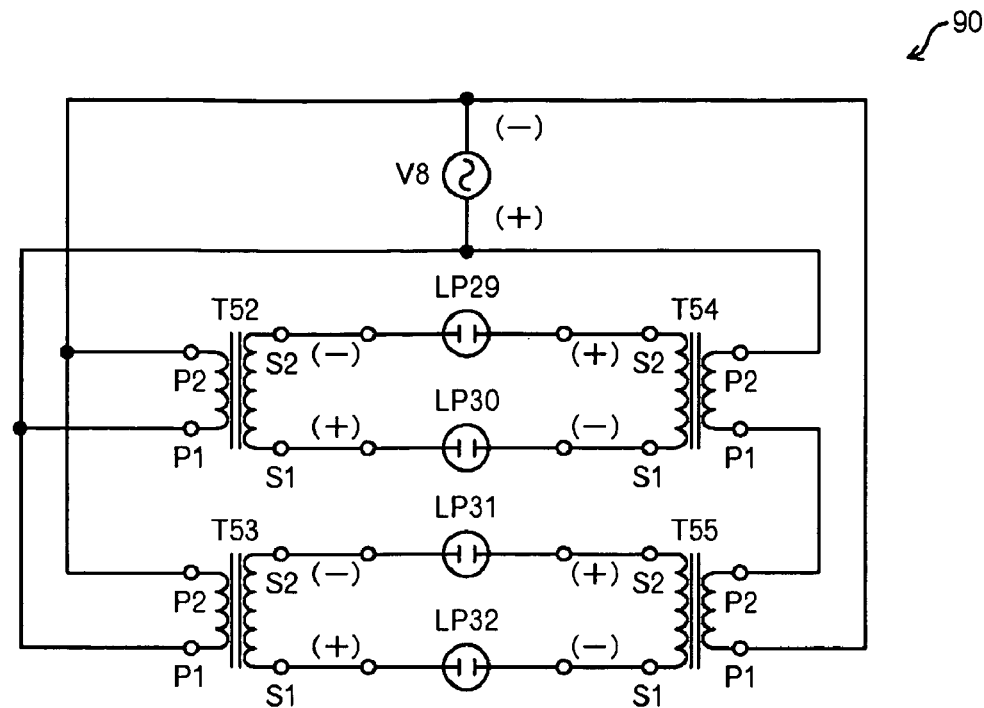
FIG. 20 is a circuit diagram according to a tenth embodiment of the present invention.

FIG. 20 illustrates a discharge tube lighting circuit according to a tenth embodiment of the present invention. A discharge tube lighting circuit 90 in FIG. 20 is a floating differential driving lighting circuit, and comprises an AC power source V8, transformers T52 through T55, and discharge tubes LP29 through LP32 such as a cold cathode fluorescent tube. The AC power source V8 is connected to terminals P1 and P2 of the primary winding of the transformer T52, terminals P1 and P2 of the primary winding of the transformer T53, a terminal P2 of the primary winding of the transformer T54, and a terminal P1 of the primary winding of the transformer T55. That is to say, the primary winding of the transformer T52 and the primary winding of the transformer T53 are connected in parallel. Also, the primary winding of the transformer T54 and the primary winding of the transformer T55 are connected in series. Note that the transformer T52 and the transformer T53, and the transformer T54 and the transformer T55 are connected to the AC power source V8 so as to become a reversed phase.

A first terminal of the discharge tube LP29 is connected to a terminal S2 of the secondary winding of the transformer T52, and a second terminal of the discharge tube LP29 is connected to a terminal S2 of the secondary winding of the transformer T54. Also, a first terminal of the discharge tube LP30 is connected to a terminal S1 of the secondary winding of the transformer T52, and a second terminal of the discharge tube LP30 is connected to a terminal S1 of the secondary winding of the transformer T54. Similarly, a first terminal of the discharge tube LP31 is connected to a terminal S2 of the secondary winding of the transformer T53, and a second terminal of the discharge tube LP31 is connected to a terminal S2 of the secondary winding of the transformer T55. Also, a first terminal of the discharge tube LP32 is connected to a terminal S1 of the secondary winding of the transformer T53, and a second terminal of the discharge tube LP32 is connected to a terminal S1 of the secondary winding of the transformer T55. Thus, a loop is configured with the discharge tubes LP29 and LP30 and the secondary windings of the transformers T52 and T54, and further, a loop is configured with the discharge tubes LP31 and LP32 and the secondary windings of the transformers T53 and T55.

Thus, current made to flow into each loop is made uniform, and further, the primary windings of the transformers T54 and T55 are connected in series, so current made to flow into each discharge tube is also made uniform. Also, the transformers and the discharge tubes are alternately connected in series, so voltage is never accumulated while lighting. Also, the discharge tube lighting circuit according to the present embodiment employs floating differential driving, which does not readily lend itself to electrocution since a high-power current does not flow on a full scale unless two portions are touched. Also, as shown in FIG. 20, the left and right polarities of the discharge tubes exhibit a reversed phase for each adjacent discharge tube, thereby providing a property for preventing noise from occurring as well. Further, the number of the transformers is the same as the number of the discharge tubes.

Eleventh Embodiment

Figure 21:
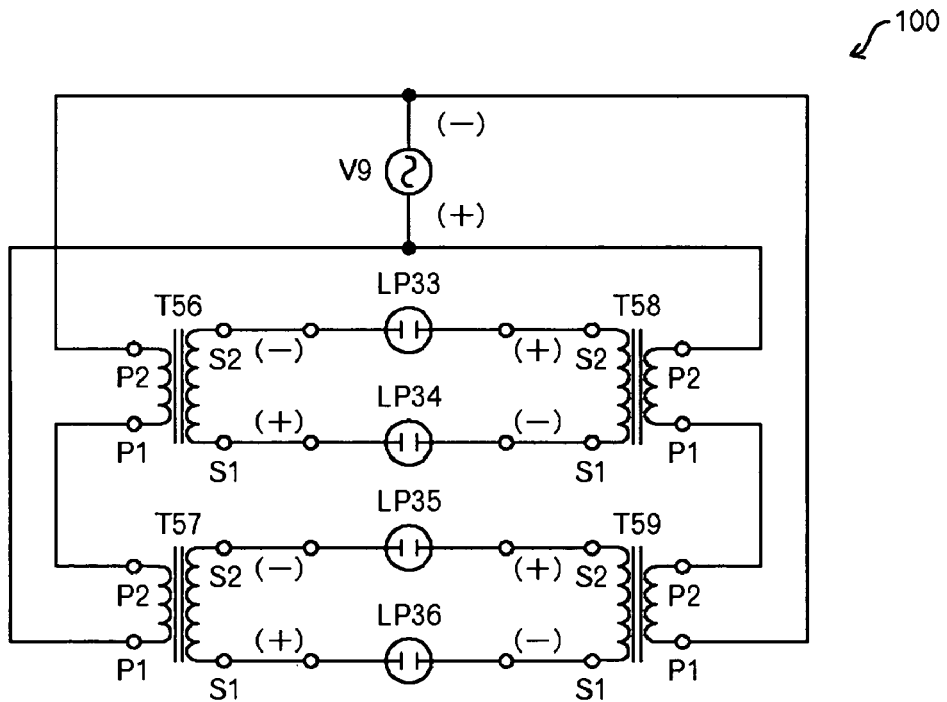
FIG. 21 is a circuit diagram according to an eleventh embodiment of the present invention.

FIG. 21 illustrates a discharge tube lighting circuit according to an eleventh embodiment of the present invention. A discharge tube lighting circuit 100 in FIG. 21 is a floating differential driving lighting circuit, and comprises an AC power source V9, transformers T56 through T59, and discharge tubes LP33 through LP36 such as a cold cathode fluorescent tube. The AC power source V9 is connected to a terminal P1 of the primary winding of the transformer T57, a terminal P2 of the primary winding of the transformer T58, a terminal P2 of the primary winding of the transformer T56, and a terminal P1 of the primary winding of the transformer T59. That is to say, the primary winding of the transformer T56 and the primary winding of the transformer T57 are connected in series. Also, the primary winding of the transformer T58 and the primary winding of the transformer T59 are connected in series. Also, the primary windings of the transformers T56 and T57 and the primary windings of the transformers T58 and T59 are connected in parallel. Note that the transformer T56 and the transformer T57, and the transformer T58 and the transformer T59 are connected to the AC power source V9 so as to become a reversed phase.

A first terminal of the discharge tube LP33 is connected to a terminal S2 of the secondary winding of the transformer T56, and a second terminal of the discharge tube LP33 is connected to a terminal S2 of the secondary winding of the transformer T58. Also, a first terminal of the discharge tube LP34 is connected to a terminal S1 of the secondary winding of the transformer T56, and a second terminal of the discharge tube LP34 is connected to a terminal S1 of the secondary winding of the transformer T58. Similarly, a first terminal of the discharge tube LP35 is connected to a terminal S2 of the secondary winding of the transformer T57, and a second terminal of the discharge tube LP35 is connected to a terminal S2 of the secondary winding of the transformer T59. Also, a first terminal of the discharge tube LP36 is connected to a terminal S1 of the secondary winding of the transformer T57, and a second terminal of the discharge tube LP36 is connected to a terminal S1 of the secondary winding of the transformer T59. Thus, a loop is configured with the discharge tubes LP33 and LP34 and the secondary windings of the transformers T56 and T58, and further, a loop is configured with the discharge tubes LP35 and LP36 and the secondary windings of the transformers T57 and T59.

The difference between the present embodiment and the tenth embodiment show in FIG. 20 is in that the transformers T56 and T57 on the left side are connected in not parallel but series, and the present embodiment has basically the same properties as the tenth embodiment. However, each of the transformers on the left and right of each discharge tube can prevent unbalance due to leakage, thereby obtaining more uniform emission, as compared with the tenth embodiment.

Though the following is the same as the tenth embodiment, current made to flow into each loop is made uniform, and further, the primary windings of the transformers T56 and T57, and the transformers T58 and T59 are connected in series, so current made to flow into each discharge tube is also made uniform. Also, the transformers and the discharge tubes are alternately connected in series, so voltage is never accumulated while lighting. Also, the discharge tube lighting circuit according to the present embodiment employs floating differential driving, which does not readily lend itself to electrocution since a high-power current does not flow on a full scale unless two portions are touched. Also, as shown in FIG. 21, the left and right polarities of the discharge tubes exhibit a reversed phase for each adjacent discharge tube, thereby providing a property for preventing noise from occurring as well. Further, the number of the transformers is the same as the number of the discharge tubes.

Twelfth Embodiment

Figure 22:
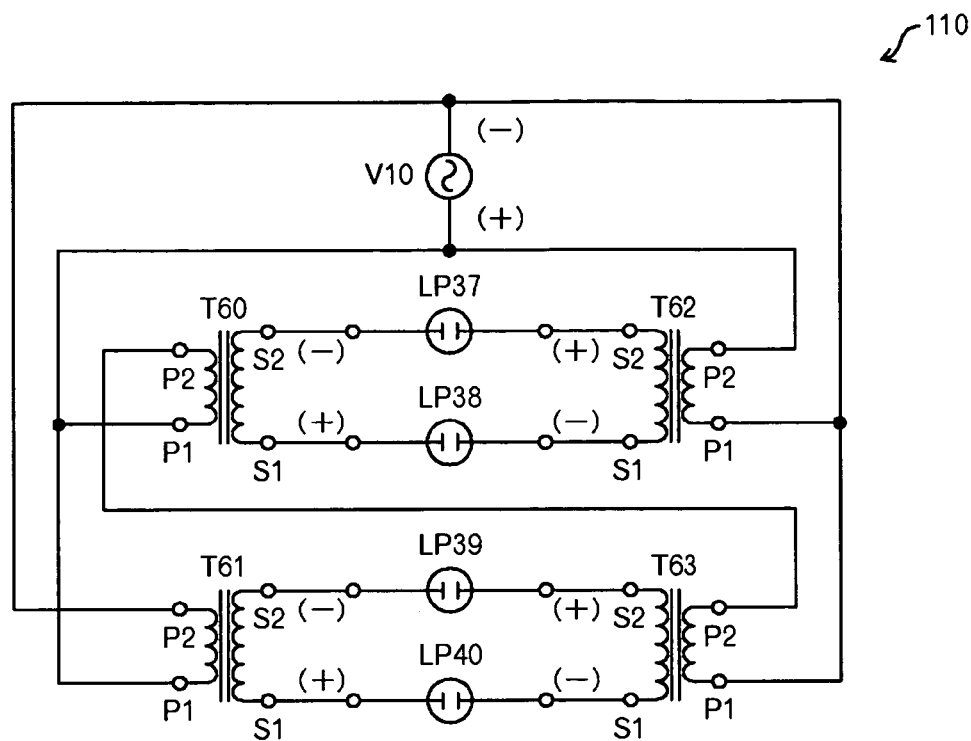
FIG. 22 is a circuit diagram according to a twelfth embodiment of the present invention.

FIG. 22 illustrates a discharge tube lighting circuit according to a twelfth embodiment of the present invention. A discharge tube lighting circuit 110 in FIG. 22 is a floating differential driving lighting circuit, and comprises an AC power source V10, transformers T60 through T63, and discharge tubes LP37 through LP40 such as a cold cathode fluorescent tube. The AC power source V10 is connected to a terminal P1 of the primary winding of the transformer T60, a terminal P1 of the primary winding of the transformer T63, terminals P1 and P2 of the primary winding of the transformer T61, and terminals P1 and P2 of the primary winding of the transformer T62. That is to say, the primary winding of the transformer T60 and the primary winding of the transformer T63 are connected in series. Also, the primary winding of the transformer T61 and the primary winding of the transformer T62 are connected in parallel. Note that the transformer T60 and the transformer T61, and the transformer T62 and the transformer T63 are connected to the AC power source V10 so as to become a reversed phase.

A first terminal of the discharge tube LP37 is connected to a terminal S2 of the secondary winding of the transformer T60, and a second terminal of the discharge tube LP37 is connected to a terminal S2 of the secondary winding of the transformer T62. Also, a first terminal of the discharge tube LP38 is connected to a terminal S1 of the secondary winding of the transformer T60, and a second terminal of the discharge tube LP38 is connected to a terminal S1 of the secondary winding of the transformer T62. Similarly, a first terminal of the discharge tube LP39 is connected to a terminal S2 of the secondary winding of the transformer T61, and a second terminal of the discharge tube LP39 is connected to a terminal S2 of the secondary winding of the transformer T63. Also, a first terminal of the discharge tube LP40 is connected to a terminal S1 of the secondary winding of the transformer T61, and a second terminal of the discharge tube LP40 is connected to a terminal S1 of the secondary winding of the transformer T63. Thus, a loop is configured with the discharge tubes LP37 and LP38 and the secondary windings of the transformers T60 and T62, and further, a loop is configured with the discharge tubes LP39 and LP40 and the secondary windings of the transformers T61 and T63.

The difference between the present embodiment and the tenth embodiment show in FIG. 20 is in that only the primary windings of the transformers disposed on the right side cannot be connected in series, but regardless of the placement of the transformers, for example, the primary winding of the transformer on the upper left can be connected to the primary winding of the transformer on the lower right in series, and the present embodiment has basically the same properties as the tenth embodiment. That is to say, current made to flow into each loop is made uniform, and further, the primary windings of the transformers T60 and T63 are connected in series, so current made to flow into each discharge tube is also made uniform. Also, the transformers and the discharge tubes are alternately connected in series, so voltage is never accumulated while lighting. Also, the discharge tube lighting circuit according to the present embodiment employs floating differential driving, which does not lend itself to electrocution since a high-power current does not flow on a full scale unless two portions are touched. Also, as shown in FIG. 22, the left and right polarities of the discharge tubes exhibit a reversed phase for each adjacent discharge tube, thereby providing a property for preventing noise from occurring as well. Further, the number of the transformers is the same as the number of the discharge tubes.

Thirteenth Embodiment

Figure 23:
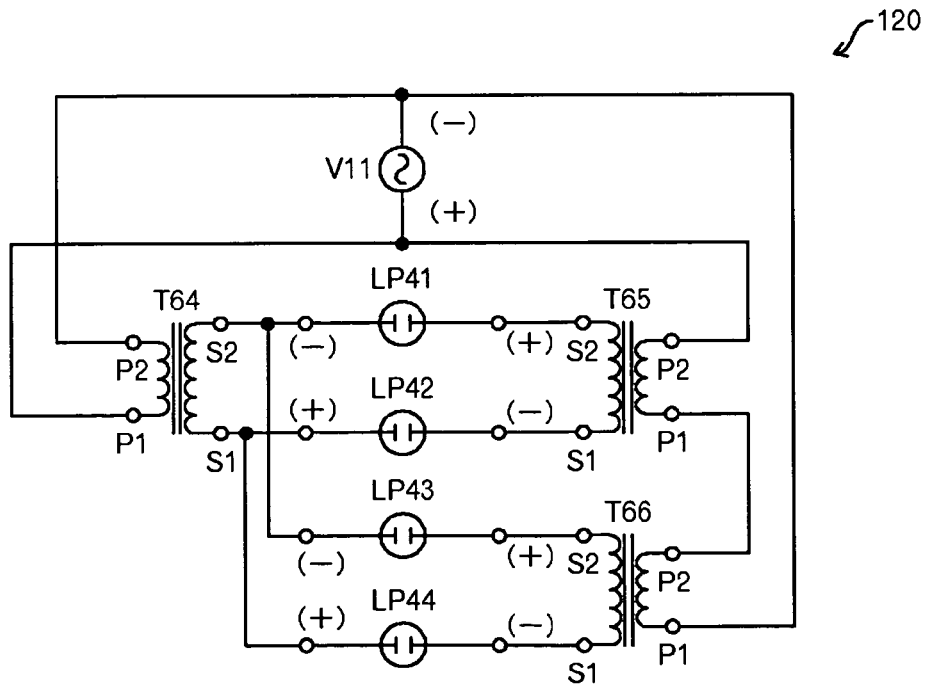
FIG. 23 is a circuit diagram according to a thirteenth embodiment of the present invention.

FIG. 23 illustrates a discharge tube lighting circuit according to a thirteenth embodiment of the present invention. A discharge tube lighting circuit 120 in FIG. 23 is a floating differential driving lighting circuit, and comprises an AC power source V11, transformers T64 through T66, and discharge tubes LP41 through LP44 such as a cold cathode fluorescent tube. The AC power source V11 is connected to terminals P1 and P2 of the primary winding of the transformer T64, a terminal P2 of the primary winding of the transformer T65, and a terminal P1 of the primary winding of the transformer T65. That is to say, the primary winding of the transformer T65 and the primary winding of the transformer T66 are connected in series. Note that the transformer T64, and the transformer T65 and the transformer T66 are connected to the AC power source V11 so as to become a reversed phase.

A first terminal of the discharge tube LP41 is connected to a terminal S2 of the secondary winding of the transformer T64, and a second terminal of the discharge tube LP41 is connected to a terminal S2 of the secondary winding of the transformer T65. Also, a first terminal of the discharge tube LP42 is connected to a terminal S1 of the secondary winding of the transformer T64, and a second terminal of the discharge tube LP42 is connected to a terminal S1 of the secondary winding of the transformer T65. Similarly, a first terminal of the discharge tube LP43 is connected to a terminal S2 of the secondary winding of the transformer T64, and a second terminal of the discharge tube LP43 is connected to a terminal S2 of the secondary winding of the transformer T66. Also, a first terminal of the discharge tube LP44 is connected to a terminal S1 of the secondary winding of the transformer T64, and a second terminal of the discharge tube LP44 is connected to a terminal S1 of the secondary winding of the transformer T66. Thus, a loop is configured with the discharge tubes LP41 and LP42 and the secondary windings of the transformers T64 and T65, and further, a loop is configured with the discharge tubes LP43 and LP44 and the secondary windings of the transformers T64 and T66.

The difference between the present embodiment and the tenth embodiment show in FIG. 20 is in that the transformer disposed on the left side is shared, thereby reducing the number of transformers. That is to say, the number of transformers becomes the number of discharge tubes/2+1. However, the transformer T64 serving as a shared transformer becomes a transformer greater than the transformers T65 and T66. The portions other than this have basically the same properties as those in the tenth embodiment. That is to say, current made to flow into each loop is made uniform, and further, the primary windings of the transformers T65 and T66 are connected in series, so current made to flow into each discharge tube is also made uniform. Also, the transformers and the discharge tubes are alternately connected in series, so voltage is never accumulated while lighting. Also, the discharge tube lighting circuit according to the present embodiment employs floating differential driving, which does not lend itself to electrocution since a high-power current does not flow on a full scale unless two portions are touched. Also, as shown in FIG. 23, the left and right polarities of the discharge tubes exhibit a reversed phase for each adjacent discharge tube, thereby providing a property for preventing noise from occurring as well.

Fourteenth Embodiment

Figure 24:
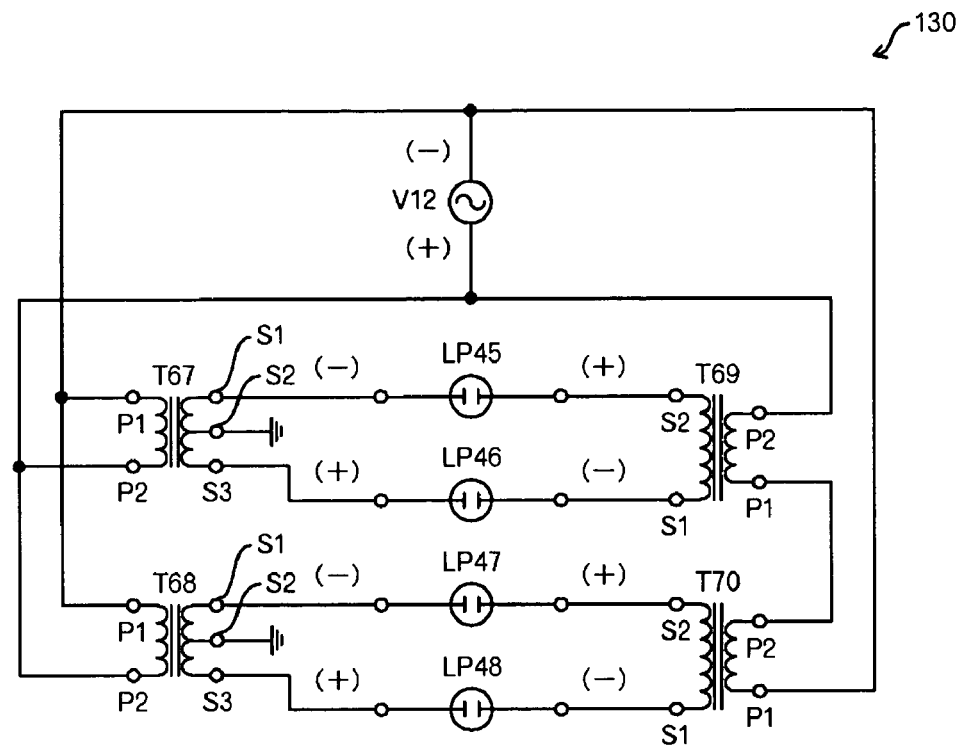
FIG. 24 is a circuit diagram according to a fourteenth embodiment of the present invention.

FIG. 24 illustrates a discharge tube lighting circuit according to a fourteenth embodiment of the present invention. A discharge tube lighting circuit 130 in FIG. 24 is a floating differential driving lighting circuit, and comprises an AC power source V12, transformers T67 through T70, and discharge tubes LP45 through LP48 such as a cold cathode fluorescent tube. The AC power source V12 is connected to terminals P1 and P2 of the primary winding of the transformer T67, terminals P1 and P2 of the primary winding of the transformer T68, a terminal P2 of the primary winding of the transformer T69, and a terminal P1 of the primary winding of the transformer T70. That is to say, the primary winding of the transformer T67 and the primary winding of the transformer T68 are connected in parallel. Also, the primary winding of the transformer T69 and the primary winding of the transformer T70 are connected serially. Note that the transformer T67 and the transformer T68, and the transformer T69 and the transformer T70 are connected to the AC power source V12 so as to become a reversed phase. Also, the transformers T67 and T68 are, unlike the tenth embodiment shown in FIG. 20, transformers of a type having a center tap S2, and the center taps S2 are grounded. Accordingly, this is not floating differential driving.

A first terminal of the discharge tube LP45 is connected to a terminal S1 of the secondary winding of the transformer T67, and a second terminal of the discharge tube LP45 is connected to a terminal S2 of the secondary winding of the transformer T69. Also, a first terminal of the discharge tube LP46 is connected to a terminal S3 of the secondary winding of the transformer T67, and a second terminal of the discharge tube LP46 is connected to a terminal S1 of the secondary winding of the transformer T69. Similarly, a first terminal of the discharge tube LP47 is connected to a terminal S1 of the secondary winding of the transformer T68, and a second terminal of the discharge tube LP47 is connected to a terminal S2 of the secondary winding of the transformer T70. Also, a first terminal of the discharge tube LP48 is connected to a terminal S3 of the secondary winding of the transformer T68, and a second terminal of the discharge tube LP48 is connected to a terminal S1 of the secondary winding of the transformer T70. Thus, a loop is configured with the discharge tubes LP45 and LP46 and the secondary windings of the transformers T67 and T69, and further, a loop is configured with the discharge tubes LP47 and LP48 and the secondary windings of the transformers T68 and T70.

Thus, current made to flow into each loop is made uniform, and further, the primary windings of the transformers T69 and T70 are connected in series, so current made to flow into each discharge tube is also made uniform. Also, the transformers and the discharge tubes are alternately connected in series, so voltage is never accumulated while lighting. Also, the number of the transformers is the same as the number of the discharge tubes. Further, an anti-polarity equal voltage is supplied to the even-numbered discharge tubes and the odd-numbered discharge tubes by grounding the center taps S2 of the transformers T67 and T68. That is to say, the brightness of the discharge tubes is made uniform. However, electrocution is readily caused. Note that detection of disconnection is made by monitoring impedance of each root of the discharge tubes as with FIG. 20.

Fifteenth Embodiment

Figure 25:
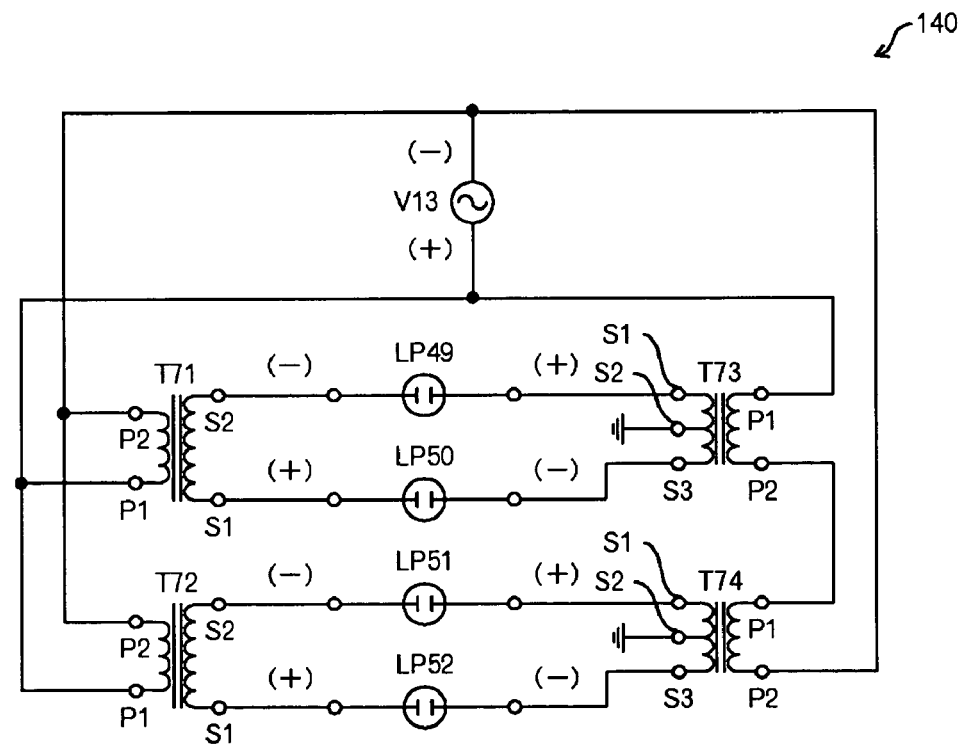
FIG. 25 is a circuit diagram according to a fifteenth embodiment of the present invention.

FIG. 25 illustrates a discharge tube lighting circuit according to a fourteenth embodiment of the present invention. A discharge tube lighting circuit 140 in FIG. 25 comprises an AC power source V13, transformers T71 through T74, and discharge tubes LP49 through LP52 such as a cold cathode fluorescent tube. The AC power source V13 is connected to terminals P1 and P2 of the primary winding of the transformer T71, terminals P1 and P2 of the primary winding of the transformer T72, a terminal P1 of the primary winding of the transformer T73, and a terminal P2 of the primary winding of the transformer T74. That is to say, the primary winding of the transformer T71 and the primary winding of the transformer T72 are connected in parallel. Also, the primary winding of the transformer T73 and the primary winding of the transformer T74 are connected in series. Note that the transformer T71 and the transformer T72, and the transformer T73 and the transformer T74 are connected to the AC power source V13 so as to become a reversed phase. Also, the transformers T73 and T74 are, unlike the tenth embodiment shown in FIG. 20, transformers having a center tap S2, and the center taps S2 are grounded. The difference between FIG. 25 and FIG. 24 is in that the positions of the transformers having the center tap S2 are not on the left side but on the right side.

A first terminal of the discharge tube LP49 is connected to a terminal S2 of the secondary winding of the transformer T71, and a second terminal of the discharge tube LP49 is connected to a terminal S1 of the secondary winding of the transformer T73. Also, a first terminal of the discharge tube LP50 is connected to a terminal S1 of the secondary winding of the transformer T71, and a second terminal of the discharge tube LP50 is connected to a terminal S3 of the secondary winding of the transformer T73. Similarly, a first terminal of the discharge tube LP51 is connected to a terminal S2 of the secondary winding of the transformer T72, and a second terminal of the discharge tube LP51 is connected to a terminal S1 of the secondary winding of the transformer T74. Also, a first terminal of the discharge tube LP52 is connected to a terminal S1 of the secondary winding of the transformer T72, and a second terminal of the discharge tube LP52 is connected to a terminal S3 of the secondary winding of the transformer T74. Thus, a loop is configured with the discharge tubes LP49 and LP50 and the secondary windings of the transformers T71 and T73, and further, a loop is configured with the discharge tubes LP51 and LP52 and the secondary windings of the transformers T72 and T74.

Thus, current made to flow into each loop is made uniform, and further, the primary windings of the transformers T73 and T74 are connected in series, so current made to flow into each discharge tube is also made uniform. Also, the transformers and the discharge tubes are alternately connected in series, so voltage is never accumulated while lighting. Also, the number of the transformers is the same as the number of the discharge tubes. Further, an anti-polarity equal voltage is supplied to the even-numbered discharge tubes and the odd-numbered discharge tubes by grounding the center taps S2 of the transformers T73 and T74. That is to say, the brightness of the discharge tubes is made uniform. However, electrocution is readily caused.

Sixteenth Embodiment

Figure 26:
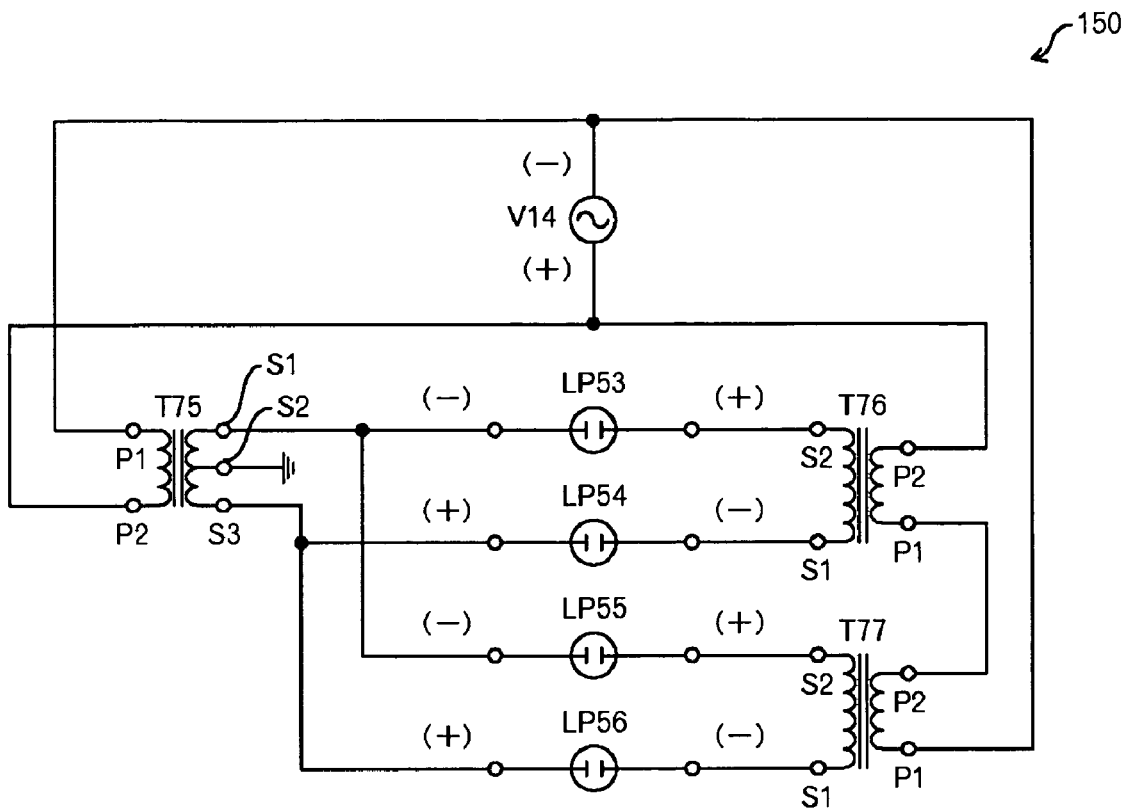
FIG. 26 is a circuit diagram according to a sixteenth embodiment of the present invention.

FIG. 26 illustrates a discharge tube lighting circuit according to a sixteenth embodiment of the present invention. A discharge tube lighting circuit 150 in FIG. 26 comprises an AC power source V14, a transformer T75 having a center tap S2, normal transformers T76 and T77, and discharge tubes LP53 through LP56 such as a cold cathode fluorescent tube. The AC power source V14 is connected to terminals P1 and P2 of the primary winding of the transformer T75, a terminal P2 of the primary winding of the transformer T76, and a terminal P1 of the primary winding of the transformer T77. That is to say, the primary winding of the transformer T76 and the primary winding of the transformer T77 are connected in series. Note that the transformer T75, and the transformer T76 and the transformer T77 are connected to the AC power source V14 so as to become a reversed phase.

A first terminal of the discharge tube LP53 is connected to a terminal S1 of the secondary winding of the transformer T75, and a second terminal of the discharge tube LP53 is connected to a terminal S2 of the secondary winding of the transformer T76. Also, a first terminal of the discharge tube LP54 is connected to a terminal S3 of the secondary winding of the transformer T75, and a second terminal of the discharge tube LP54 is connected to a terminal S1 of the secondary winding of the transformer T76. Similarly, a first terminal of the discharge tube LP55 is connected to a terminal S1 of the secondary winding of the transformer T75, and a second terminal of the discharge tube LP55 is connected to a terminal S2 of the secondary winding of the transformer T77. Also, a first terminal of the discharge tube LP56 is connected to a terminal S3 of the secondary winding of the transformer T75, and a second terminal of the discharge tube LP56 is connected to a terminal S1 of the secondary winding of the transformer T77. Thus, a loop is configured with the discharge tubes LP53 and LP54 and the secondary windings of the transformers T75 and T76, and further, a loop is configured with the discharge tubes LP55 and LP56 and the secondary windings of the transformers T75 and T77.

The discharge tube lighting circuit 150 shown in FIG. 26 is a circuit obtained by sharing the transformers on the left side in FIG. 24, the number of transformers becomes the number of discharge tubes/2+1, thereby reducing the number of transformers. However, with regard to the transformer T75, a transformer greater than the transformer T67 is necessary. The portions other than this have basically the same properties as those in the fourteenth embodiment. That is to say, current made to flow into each loop is made uniform, and further, the primary windings of the transformers T76 and T77 are connected in series, so current made to flow into each discharge tube is also made uniform. Also, the transformers and the discharge tubes are alternately connected in series, so voltage is never accumulated while lighting. Further, an anti-polarity equal voltage is supplied to the even-numbered discharge tubes and the odd-numbered discharge tubes by grounding the center tap S2 of the transformer T75. That is to say, the brightness of the discharge tubes is made uniform. However, electrocution is readily caused.

Connection Variation to AC Power Source

Figure 27A:
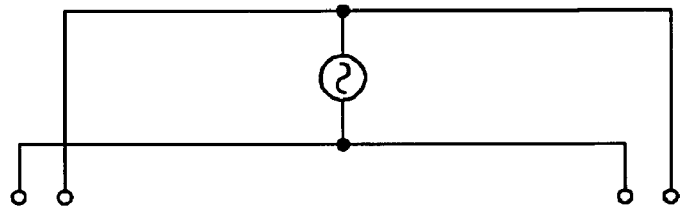
FIG. 27A is a diagram summarizing modifications in an embodiment of the present invention.
Figure 27B:
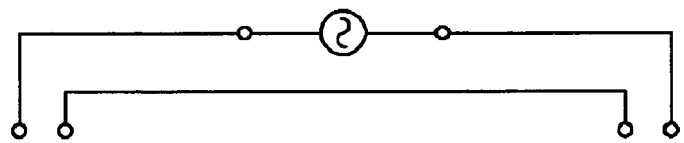
FIG. 27B is a diagram summarizing modifications in an embodiment of the present invention.

With the tenth through sixteenth embodiments of the present invention shown in FIG. 20 through FIG. 26, a configuration is employed wherein at least the transformers on the left side or the right side of the discharge tubes are connected in series, and the transformers on the other side are connected in series or parallel. However, with regard to connection to the AC power source, the transformers on the left side and the transformers on the right side of the discharge tubes are connected in parallel. That is to say, in the event of showing only the connection relation as to the AC power source, the relation between the transformers connected to both ends of the discharge tubes are parallel as to the AC power source, as shown in FIG. 27A. However, it is a principal technical concept with the embodiments of the present invention to connect at least the transformers on the left side or the right side of the discharge tubes in series, so the connection relation to the AC power source is optional, as shown in FIG. 27B, the transformers on the left and right sides of the discharge tubes may be connected in series while maintaining a reversed phase.

Figure 27C:
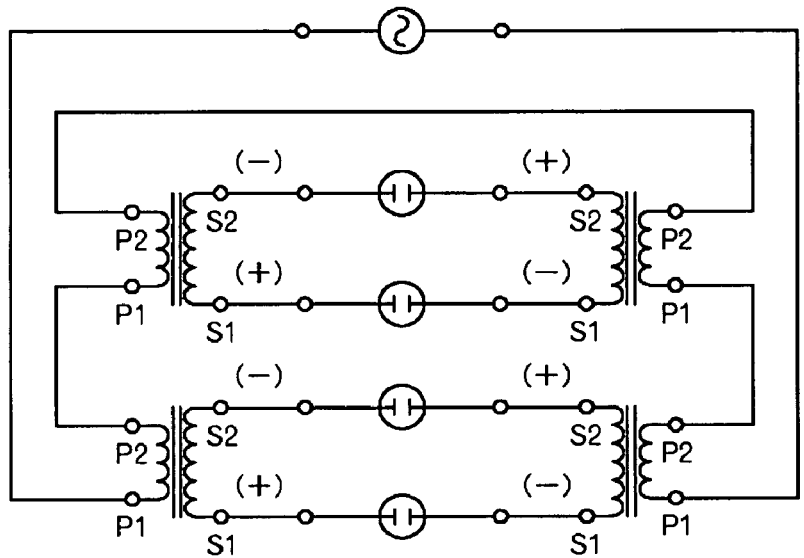
FIG. 27C is a circuit diagram for describing FIG. 27B.

For example, FIG. 27C illustrates a discharge tube lighting circuit in the case of modifying the discharge tube lighting circuit 100 in FIG. 21 so as to connect the transformers on the left and right sides of the discharge tubes in series. In the example in FIG. 27C, four transformers are all connected in series. Even with such a configuration, a uniform current flows into the discharge tubes, so the same advantages as those in FIG. 21 are realized.

Figure 27D:
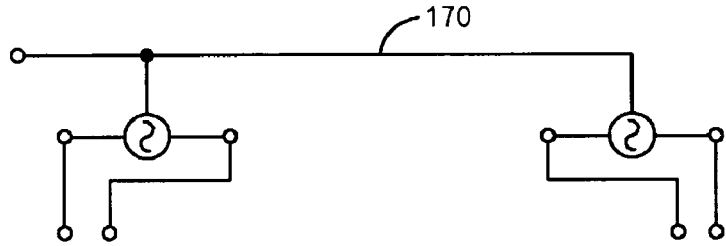
FIG. 27D is a diagram summarizing modifications in an embodiment of the present invention.

Also, as shown in FIG. 27D, different AC power sources may be connected to the primary winding side of the transformers which are connected with the right terminals of discharge tubes, and the primary winding side of the transformers which are connected with the left terminals of discharge tubes, but this needs to synchronize both AC power sources with a synchronized signal in a synchronized signal line 170 for example in order to actually light the discharge tubes, so this is essentially the same as a single AC power source. With the present application, the case such as shown in FIG. 27D is also handled as a single AC power source. It is needless to say that a discharge tube lighting circuit may be configured with a plurality of AC power sources by connecting the plurality of AC power sources in series, but this also needs to be operated in the same way as a single AC power source, so this is also handled as a single AC power source with the present application.

The above variations can be applied to all of the embodiments of the present application.

Seventeenth Embodiment

Figure 28:
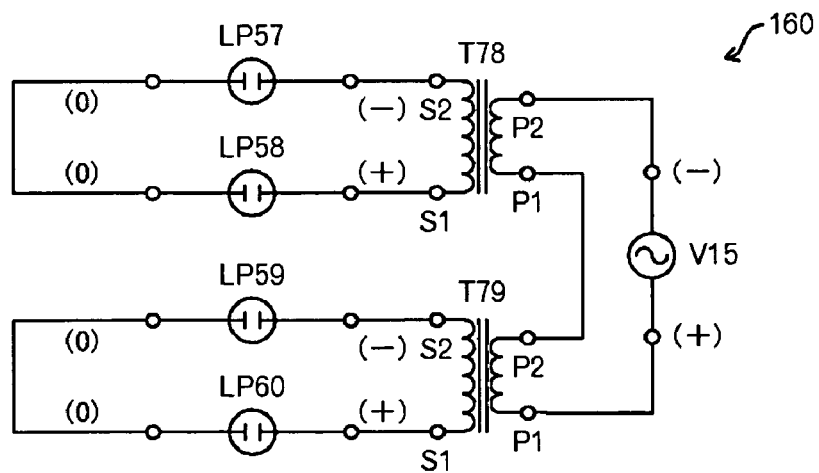
FIG. 28 is a circuit diagram according to a seventeenth embodiment of the present invention.

FIG. 28 illustrates a discharge tube lighting circuit according to a seventeenth embodiment of the present invention. A discharge tube lighting circuit 160 in FIG. 28 comprises an AC power source V15, transformers T78 and T79, and discharge tubes LP57 through LP60 such as a cold cathode fluorescent tube. The AC power source V15 is connected to a terminal P2 of the primary winding of the transformer T78, and a terminal P1 of the primary winding of the transformer T79. That is to say, the primary winding of the transformer T78 and the primary winding of the transformer T79 are connected in series.

A first terminal of the discharge tube LP57 is connected to a terminal S2 of the secondary winding of the transformer T78, and a second terminal of the discharge tube LP57 is connected to a first terminal of the discharge tube LP58. A second terminal of the discharge tube LP58 is connected to a terminal S1 of the secondary winding of the transformer T78. Similarly, a first terminal of the discharge tube LP59 is connected to a terminal S2 of the secondary winding of the transformer T79, and a second terminal of the discharge tube LP59 is connected to a first terminal of the discharge tube LP60. A second terminal of the discharge tube LP60 is connected to a terminal S1 of the secondary winding of the transformer T79. Thus, a loop is configured with the discharge tubes LP57 and LP58 and the secondary winding of the transformer T78, and further, a loop is configured with the discharge tubes LP59 and LP60 and the secondary winding of the transformer T79.

Thus, the number of the transformers can be reduced to one half of the number of the transformers in the tenth embodiment shown in FIG. 20. Also, current made to flow into each loop is made uniform, and further, the primary windings of the transformers T78 and T79 are connected in series, so current made to flow into each discharge tube is also made uniform. However, the electric field on the left side where the discharge tubes LP57 and LP58 and the discharge tubes LP59 and LP60 are directly connected becomes 0, i.e., becomes dark. Accordingly, luminance difference between the left and right of the discharge tubes is caused.

Figure 29:
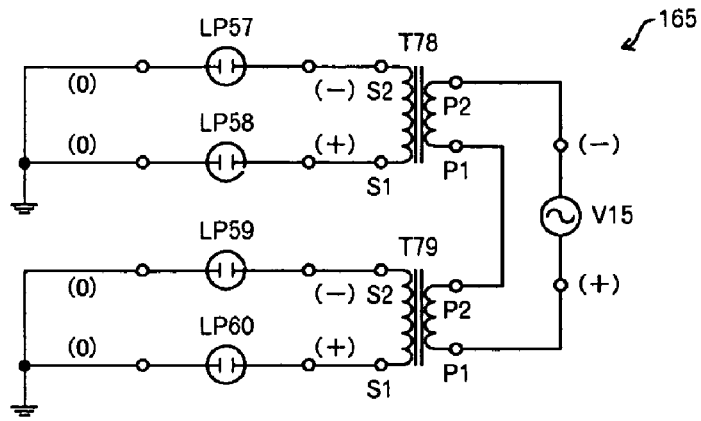
FIG. 29 is another circuit diagram according to the seventeenth embodiment of the present invention.

Note that the discharge tube lighting circuit 160 shown in FIG. 28 may be changed to the discharge tube lighting circuit 165 such as shown in FIG. 29. That is to say, the terminals on the side where the discharge tubes LP57 and LP58 are directly connected are grounded, and in the same way the terminals on the side where the discharge tubes LP59 and LP60 are directly connected are grounded. Even with such a modification, the same advantages as those in FIG. 28 can be realized.

Eighteenth Embodiment

Figures 30A, 30B:
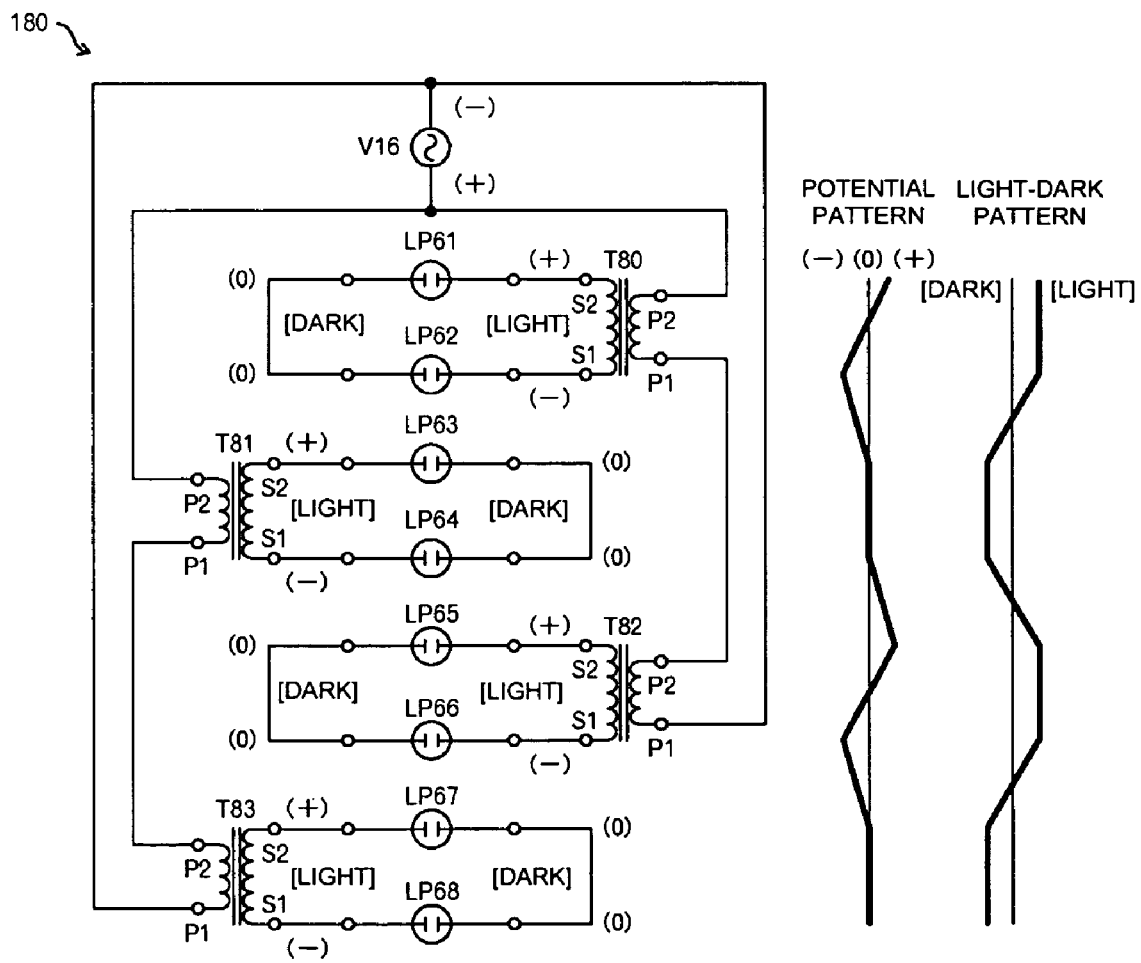
FIG. 30A is a circuit diagram according to an eighteenth embodiment of the present invention.
FIG. 30B is a diagram illustrating an electric potential pattern and a light-dark pattern in the circuit in FIG. 30A.

FIG. 30A illustrates a discharge tube lighting circuit according to an eighteenth embodiment of the present invention. A discharge tube lighting circuit 180 in FIG. 30A comprises an AC power source V16, transformers T80 through T83, and discharge tubes LP61 through LP68 such as a cold cathode fluorescent tube. The AC power source V16 is connected to a terminal P2 of the primary winding of the transformer T81, a terminal P1 of the primary winding of the transformer T83, a terminal P2 of the primary winding of the transformer T80, and a terminal P1 of the primary winding of the transformer T82. That is to say, the primary winding of the transformer T81 and the primary winding of the transformer T83 are connected in series. Similarly, the primary winding of the transformer T80 and the primary winding of the transformer T82 are connected in series.

A first terminal of the discharge tube LP61 is connected to a terminal S2 of the secondary winding of the transformer T80, and a second terminal of the discharge tube LP61 is connected to a first terminal of the discharge tube LP62. A second terminal of the discharge tube LP62 is connected to a terminal S1 of the secondary winding of the transformer T80. Similarly, a first terminal of the discharge tube LP63 is connected to a terminal S2 of the secondary winding of the transformer T81, and a second terminal of the discharge tube LP63 is connected to a first terminal of the discharge tube LP64. A second terminal of the discharge tube LP64 is connected to a terminal S1 of the secondary winding of the transformer T81. Though repeatedly speaking, a first terminal of the discharge tube LP65 is connected to a terminal S2 of the secondary winding of the transformer T82, and a second terminal of the discharge tube LP65 is connected to a first terminal of the discharge tube LP66. A second terminal of the discharge tube LP66 is connected to a terminal S1 of the secondary winding of the transformer T82. Similarly, a first terminal of the discharge tube LP67 is connected to a terminal S2 of the secondary winding of the transformer T83, and a second terminal of the discharge tube LP67 is connected to a first terminal of the discharge tube LP68. A second terminal of the discharge tube LP68 is connected to a terminal S1 of the secondary winding of the transformer T83. Thus, a loop is configured with the discharge tubes LP61 and LP62 and the secondary winding of the transformer T80, a loop is configured with the discharge tubes LP63 and LP64 and the secondary winding of the transformer T81, a loop is configured with the discharge tubes LP65 and LP66 and the secondary winding of the transformer T82, and a loop is configured with the discharge tubes LP67 and LP68 and the secondary winding of the transformer T83.

Figure 8:
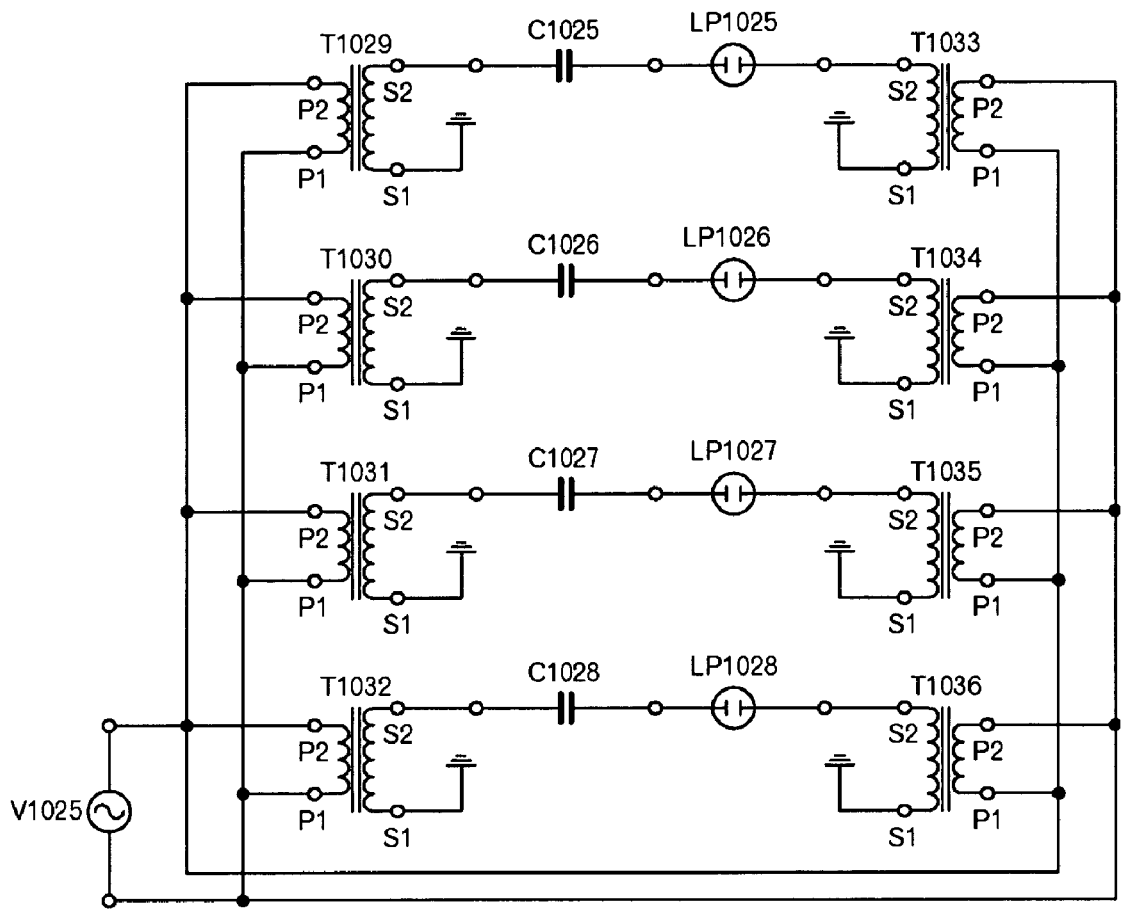
FIG. 8 is a diagram illustrating an eighth conventional example.
Figure 9:
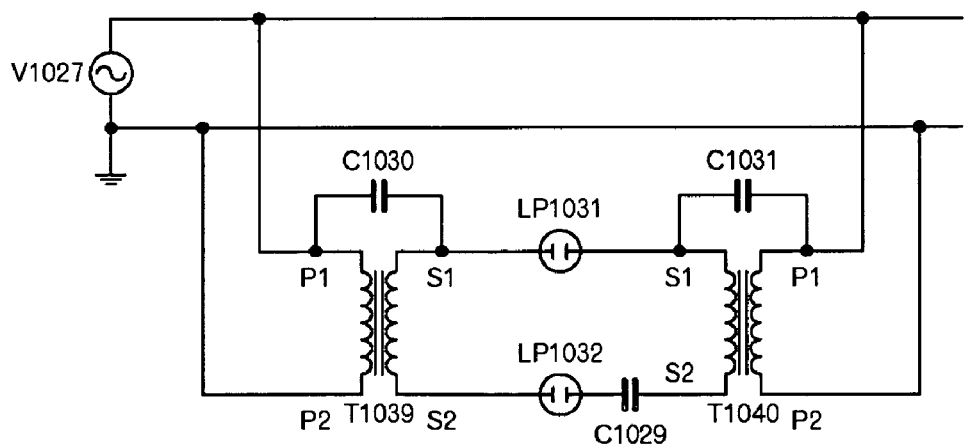
FIG. 9 is a diagram illustrating a ninth conventional example.

Thus, FIG. 30A changes the number of the discharge tubes of the discharge tube lighting circuit 160 shown in FIG. 28 to 8, and alleviates difference in brightness between the left and right of the discharge tubes by devising the placement of the transformers. That is to say, the discharge tubes in the discharge tube lighting circuit 160 such as shown in FIG. 28 become lighter on the side where the terminals thereof are connected to the transformers, and become darker on the other side, so in order to overcome this problem, the two light and dark discharge tubes are repeated in the vertical direction by alternately disposing the connection terminals between the discharge tubes and the transformers in the horizontal direction. A luminance distribution situation in the tube right edge portions at this time is shown in the right side of FIG. 30B. Thus, light-light-dark-dark pattern is repeated. Also, as shown in FIG. 28 as well, the electric field (polarity) of the secondary windings of the transformers are determined by a connection arrangement between the primary windings thereof and the AC power source, and further, the terminals wherein the discharge tubes are connected become 0 in the electric filed. That is to say, an electric potential distribution in the tube right edge portions in the example of FIG. 30A exhibits a repeated pattern of +−00 from top to bottom, as shown in the left side of FIG. 30B. Thus, the electric field is not leaned to + or −, so noise for a liquid crystal panel or the like is cancelled out.

The residual properties are the same as those shown in FIG. 28, current made to flow into each loop is made uniform, and further, the primary windings of the transformers T80 and T82 and the primary windings of the transformers T81 and T83 are connected in series, so current made to flow into each discharge tube is also made uniform. Note that the example wherein the discharge tubes in pairs are alternately disposed has been shown, the discharge tubes may be alternately disposed every a plurality of pairs. Also, the discharge tubes may be alternately disposed not every same number of pairs but different number of pairs in some cases.

Nineteenth Embodiment

Figure 31A:
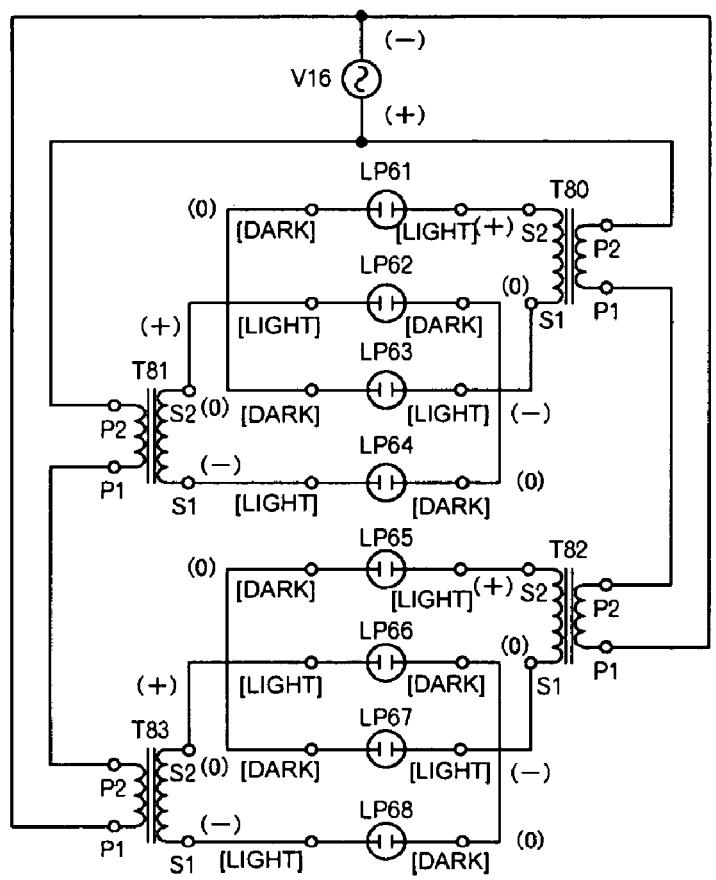
FIG. 31A is a circuit diagram according to a nineteenth embodiment of the present invention.

FIG. 31A illustrates a discharge tube lighting circuit 185 according to a nineteenth embodiment of the present invention. The discharge tube lighting circuit 185 in FIG. 31A has the same electrical connection relations as those in the discharge tube lighting circuit 180 shown in FIG. 30A, so description thereof will be omitted here.

However, the placements of the discharge tubes are different from those in FIG. 30A. That is to say, in FIG. 30A, the two discharge tubes connected to the same transformer have been taken as a pair, and the terminals on the side where the discharge tubes are connected (terminals on the side to become [dark]) in the group where the transformers connected are disposed on the right side, and the terminals on the side where the discharge tubes are connected in the group where the transformers connected are disposed on the left side have been alternately disposed in the horizontal direction from top to bottom for each pair. More specifically, the terminals on the side where the discharge tubes LP61 and LP62 are directly connected are disposed to the left, the terminals on the side where the discharge tubes LP63 and LP64 are directly connected are disposed to the right, the terminals on the side where the discharge tubes LP65 and LP66 are directly connected are disposed to the left, and the terminals on the side where the discharge tubes LP67 and LP68 are directly connected are disposed to the right in order from top. Thus, each two discharge tubes are alternately disposed, which thickens the width of [light] and [dark].

On the other hand, in FIG. 31A, the terminals on the side where the discharge tubes are connected (terminals on the side to become [dark]) in the group where the transformers connected are disposed on the right side (right group), and the terminals on the side where the discharge tubes are connected in the group where the transformers connected are disposed on the left side (left group) have been alternately disposed in the horizontal direction from top to bottom for not each pair but each discharge tube. More specifically, the terminal of the discharge tube LP61 connected to the discharge tube LP63 of the right group is disposed to the left, the terminal of the discharge tube LP62 connected to the discharge tube LP64 of the left group is disposed to the right, the terminal of the discharge tube LP63 connected to the discharge tube LP61 of the right group is disposed to the left, and the terminal of the discharge tube LP64 connected to the discharge tube LP62 of the left group is disposed to the right respectively. Similarly, the terminal of the discharge tube LP65 connected to the discharge tube LP67 of the right group is disposed to the left, the terminal of the discharge tube LP66 connected to the discharge tube LP68 of the left group is disposed to the right, the terminal of the discharge tube LP65 connected to the discharge tube LP67 of the right group is disposed to the left, and the terminal of the discharge tube LP68 connected to the discharge tube LP66 of the left group is disposed to the right respectively.

Figure 31B:
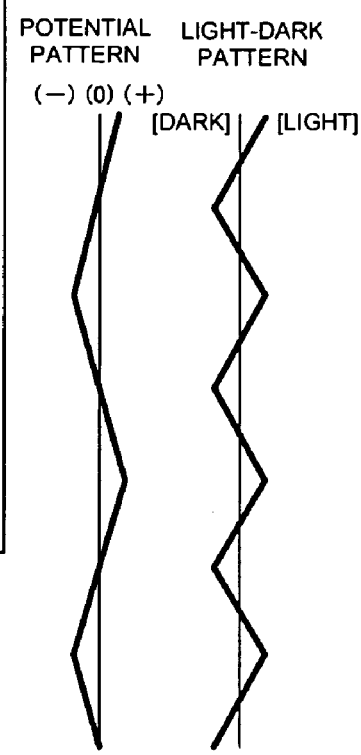
FIG. 31B is a diagram illustrating an electric potential pattern and a light-dark pattern in the circuit in FIG. 31A.

Thus, as shown in the right side of FIG. 31B, with regard to a light-dark pattern, [light] and [dark] are finely repeated for each discharge tube. Accordingly, luminance irregularities on the left and right sides are each cancelled out and suppressed as a whole. Also, as shown in the left side of FIG. 31B, an electric potential also repeats 0+0−, and such a fine electric potential pattern cancels out noise for a liquid crystal panel or the like. Note that the example wherein the discharge tubes are alternately disposed for each discharge tube has been shown, but the discharge tubes may be alternately disposed every a plurality of discharge tubes. Also, the discharge tubes may be alternately disposed not every same number of discharge tubes but different number of discharge tubes in some cases.

The other properties are the same as the case of the eighteenth embodiment.

Note that a circuit, which combines the above plurality of embodiment, may be employed. Also, a circuit which combines a circuit according to the present invention and a circuit other than a circuit according to the present invention may be employed.

Twentieth Embodiment

Figure 32:
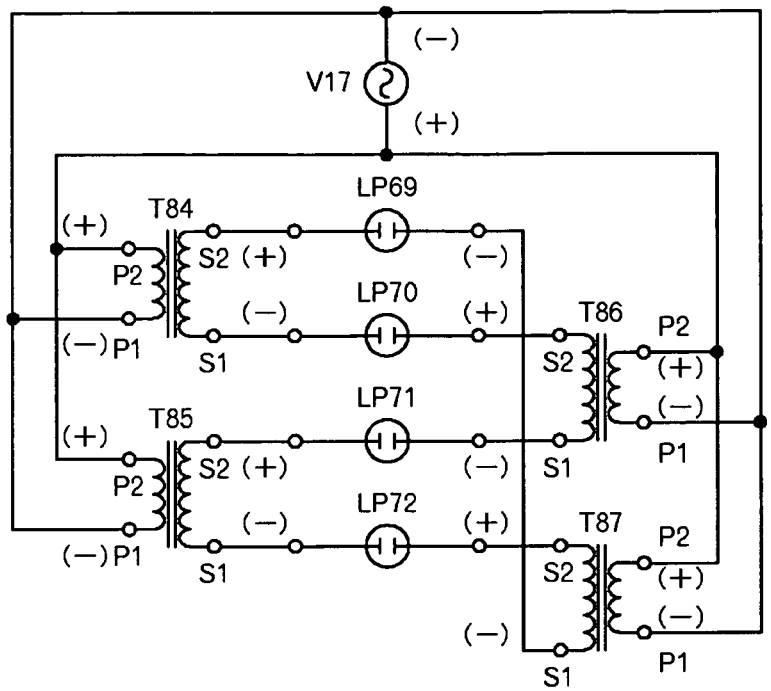
FIG. 32 is a circuit diagram according to a twentieth embodiment of the present invention.

FIG. 32 illustrates a discharge tube lighting circuit according to a twentieth embodiment of the present invention. A discharge tube lighting circuit 190 in FIG. 32 is a floating differential driving lighting circuit, and comprises an AC power source V17, transformers T84 through T87, and discharge tubes LP69 through LP72 such as a cold cathode fluorescent tube. The AC power source V17 is connected to terminals P1 and P2 of the primary winding of the transformer T84, terminals P1 and P2 of the primary winding of the transformer T85, terminals P1 and P2 of the primary winding of the transformer T86, and terminals P1 and P2 of the primary winding of the transformer T87. That is to say, all of the primary windings of the transformers T84 through T87 are connected to the AC power source V17 in parallel.

A first terminal of the discharge tube LP69 is connected to a terminal S2 of the secondary winding of the transformer T84, and a second terminal of the discharge tube LP69 is connected to a terminal S1 of the secondary winding of the transformer T87. Thus, in the event that the discharge tubes LP69 through LP72 are disposed in parallel, and also each transformer is disposed to both sides of the discharge tubes, the secondary windings of the transformers T84 and T87, which are diagonally disposed, are connected via the discharge tube. Also, a first terminal of the discharge tube LP70 is connected to a terminal S1 of the secondary winding of the transformer T84, and a second terminal of the discharge tube LP70 is connected to a terminal S2 of the secondary winding of the transformer T86. Similarly, a first terminal of the discharge tube LP71 is connected to a terminal S1 of the secondary winding of the transformer T86, and a second terminal of the discharge tube LP71 is connected to a terminal S2 of the secondary winding of the transformer T85. Also, a first terminal of the discharge tube LP72 is connected to a terminal S1 of the secondary winding of the transformer T85, and a second terminal of the discharge tube LP72 is connected to a terminal S2 of the secondary winding of the transformer T87. Thus, the discharge tube LP69, the secondary winding of the transformer T84, the discharge tube LP70, the secondary winding of the transformer T86, the discharge tube LP71, the secondary winding of the transformer T85, the discharge tube LP72, and the secondary winding of the transformer T87 are connected in series, and in addition, the secondary winding of the transformer T87 and the discharge tube LP69 are also connected, and accordingly, these circuit components makes up a loop.

Also, the primary windings of the transformers T84 through T87 are connected to the AC power source V17, and also the secondary windings of the transformers T84 through T87 are connected to the discharge tubes LP69 through LP72 such that an anti-polarity voltage is applied to both ends of any of the discharge tubes LP69 through LP72. Also, a different polarity voltage is alternately applied to the right side terminals of the discharge tubes LP69 through LP72, and similarly, a different polarity voltage is alternately applied to the left side terminals of the discharge tubes LP69 through LP72 as well.

With the present embodiment, the number of the transformers is 4, and on the other hand, the number of the discharge tubes is also 4, i.e., the number of the transformers is not increased as compared with the number of the discharge tubes. Also, the present embodiment provides a configuration wherein the discharge tubes are connected in series at the secondary winding side of the transformers, but the secondary windings of the transformers and the discharge tubes are alternately connected in series, so accumulation of voltage while lighting is suppressed at the minimum. Also, with the present embodiment, the floating differential driving method is employed, so current does not flow on a full scale unless two portions where a high voltage is applied are touched, which scarcely causes electrocution, and provides high-safety. Also, as described above, an anti-polarity voltage is applied to both ends of the discharge tubes, and further, polarity is reversed regarding the discharge tubes which are adjacently disposed, which provides an advantage wherein noise scarcely occurs. In addition, luminance irregularities between the discharge tubes are eliminated.

Twenty-first Embodiment

Figure 33:
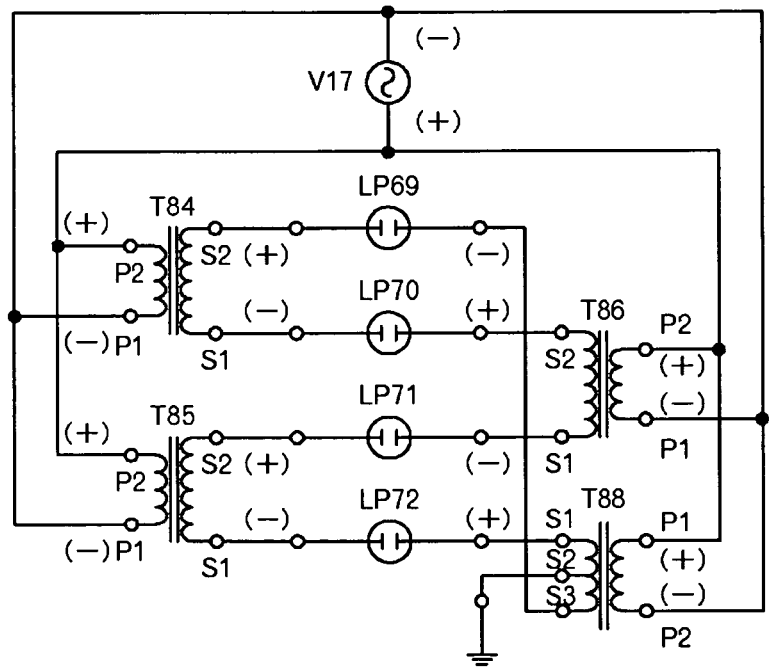
FIG. 33 is a circuit diagram according to a twenty-first embodiment of the present invention.

FIG. 33 illustrates a discharge tube lighting circuit according to a twenty-first embodiment of the present invention. A discharge tube lighting circuit 200 in FIG. 33 comprises an AC power source V17, transformers T84 through T86, a transformer T88 of which the secondary winding side is provided with a center tap S2, and discharge tubes LP69 through LP72 such as a cold cathode fluorescent tube. With the present embodiment, the above transformer T88 is employed instead of the transformer T87 in the discharge tube lighting circuit 190 according to the twentieth embodiment, a second terminal of the discharge tube LP69 is connected to a terminal S3 of the secondary winding of the transformer T88, and a second terminal of the discharge tube LP72 is connected to a terminal S1 of the secondary winding to the transformer T88. Also, the center tap S2 is grounded, so floating driving is not employed.

With the present embodiment, the secondary windings of the transformers and the discharge tubes are alternately connected in series as with the twentieth embodiment, so accumulation of voltage while lighting is eliminated. Accordingly, this provides high-safety. Also, the center tap S2 provided on the secondary winding side of the transformer T88 is grounded, but this portion originally shows ground potential, so current is seldom flowed into ground, and noise seldom occurs.

Twenty-second Embodiment

Figure 34:
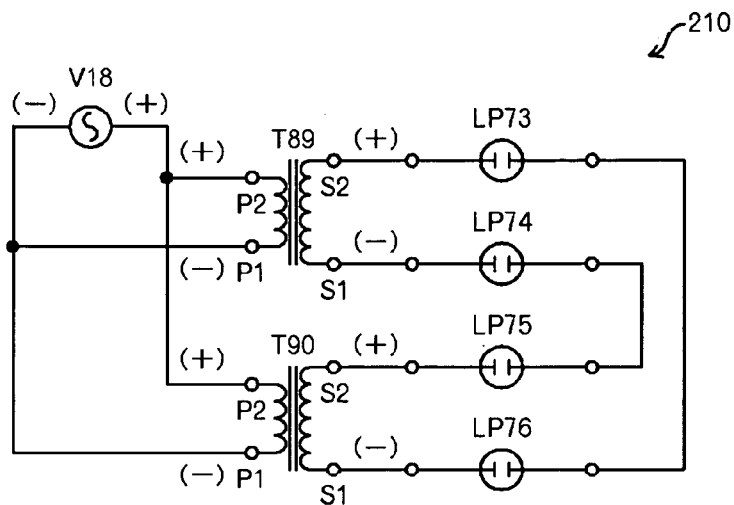
FIG. 34 is a circuit diagram according to a twenty-second embodiment of the present invention.

FIG. 34 illustrates a discharge tube lighting circuit according to a twenty-second embodiment of the present invention. A discharge tube lighting circuit 210 in FIG. 34 is a floating differential driving lighting circuit, and comprises an AC power source V18, transformers T89 and T90, and discharge tubes LP73 through LP76 such as a cold cathode fluorescent tube. The AC power source V18 is connected to terminals P1 and P2 of the primary winding of the transformer T89, and terminals P1 and P2 of the primary winding of the transformer T90. That is to say, the primary windings of the transformers T89 and T90 are connected to the AC power source V18 in parallel.

A first terminal of the discharge tube LP73 is connected to a terminal S2 of the secondary winding of the transformer T89, and a second terminal of the discharge tube LP73 is connected to a first terminal of the discharge tube LP76. Also, a second terminal of the discharge tube LP76 is connected to a terminal S1 of the secondary winding of the transformer T90. Further, a first terminal of the discharge tube LP74 is connected to a terminal S1 of the secondary winding of the transformer T89, and a second terminal of the discharge tube LP74 is connected to a first terminal of the discharge tube LP75. Also, a second terminal of the discharge tube LP75 is connected to a terminal S2 of the secondary winding of the transformer T90. Thus, the secondary winding of the transformer T89 is connected to the secondary winding of the transformer T90 in series via the two discharge tubes LP73 and LP76, and LP74 and LP75, which are connected in series. Further, the secondary winding of the transformer T89, the discharge tubes LP74 and LP75, the secondary winding of the transformer T90, and the discharge tubes LP76 and LP73 are connected in series, and accordingly, these circuit components makes up a loop.

Thus, the number of the transformers is one half of the number of the discharge tubes, thereby reducing costs. Also, the secondary winding of the transformer and the two discharge tubes are alternately connected in series, so voltage to be accumulated is restricted to the worth of two discharge tubes, though the four discharge tubes are lighted. Also, the floating differential driving method is employed, so current does not flow on a full scale unless two portions where a high voltage is applied are touched, which scarcely causes electrocution, and provides high-safety. In addition, it is another advantage that noise scarcely occurs. Note that the right side of the discharge tubes in FIG. 34, i.e., the connection points of the two discharge tubes are balanced in positive and negative effects due to stray capacitance leakage even with the floating differential driving method, and accordingly, become almost ground potential.

Twenty-third Embodiment

Figure 35:
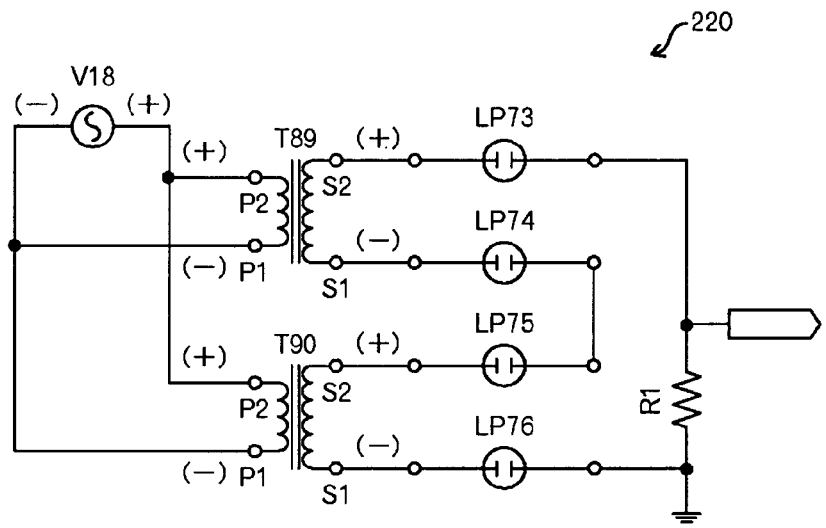
FIG. 35 is a circuit diagram according to a twenty-third embodiment of the present invention.

FIG. 35 illustrates a discharge tube lighting circuit according to a twenty-third embodiment of the present invention. A discharge tube lighting circuit 220 in FIG. 35 comprises an AC power source V18, transformers T89 and T90, discharge tubes LP73 through LP76 such as a cold cathode fluorescent tube, a resistance R1 which is a low resistance for detecting a secondary side current, and a secondary side current detecting terminal. The difference between the discharge tube lighting circuit 220 according to the present embodiment and the discharge tube lighting circuit 210 according to the twenty-second embodiment is in that the resistance R1 is newly provided between the discharge tube LP73 and the discharge tube LP76, and also the connection point between the discharge tube LP76 and the resistance R1 is grounded.

With the present embodiment, the resistance R1 is inserted between a loop made up of the secondary winding of the transformer T89, the discharge tubes LP74 and LP75, the secondary winding of the transformer T90, and the discharge tubes LP76 and LP73, but provides no particular effect except that the resistance R1 is grounded, so the floating differential driving method is not employed. Accordingly, in the event that detection of current is not performed, the resistance R1 may be removed and grounded. Also, this portion originally shows ground potential, so current is seldom flowed into ground, and noise seldom occurs.

Regarding Accumulation of Voltage

Figure 36:
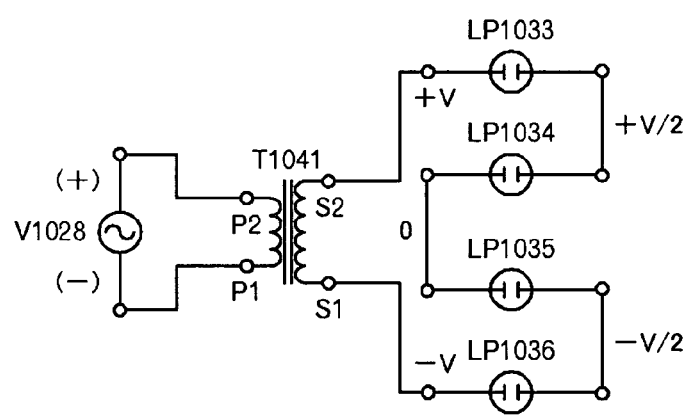

Now, description will be made regarding accumulation of voltage by discharge tubes. The above twentieth through twenty-third embodiments will be compared, with a circuit such as shown in FIG. 36 as a standard, for example. A discharge tube lighting circuit shown in FIG. 36 comprises an AC power source V1028, a transformer T1041, and discharge tubes LP1033 through LP1036. Terminals P1 and P2 of the primary winding of the transformer T1041 are connected to the AC power source V1028. Also, a terminal S2 of the secondary winding of the transformer T1041 is connected to a first terminal of the discharge tube LP1033, and a second terminal of the discharge tube LP1033 is connected to a first terminal of the discharge tube LP1034. Also, a second terminal of the discharge tube LP1034 is connected to a first terminal of the LP1035, and a second terminal of the discharge tube LP1035 is connected to a first terminal of the discharge tube LP1036. A second terminal of the discharge tube LP1306 is connected to a terminal S1 of the secondary winding of the transformer T1041. That is to say, the secondary winding of the transformer T1041 is connected to the discharge tubes LP1033 through LP1036 in series, which makes up a loop.

With such a discharge tube lighting circuit, in the event that +V is applied to the first terminal of the discharge tube LP1033, and −V is applied to the connection point between the discharge tube LP1036 and the terminal S1 of the secondary winding of the transformer T1041, the voltage of the second terminal of the discharge tube LP1033 becomes +V/2. Also, the voltage of the connection point between the discharge tube LP1034 and the discharge tube LP1035 is 0 V, and the voltage of the connection point between the discharge tube LP1035 and the discharge tube LP1036 becomes −V/2.

With the discharge tube lighting circuit such as shown in FIG. 36, current to be followed into each discharge tube is made uniform in theory. However, voltage caused by the discharge tubes is all accumulated, and a high voltage is applied to between the transformers, lead wires, discharge tubes, and ground. Consequently, a leakage current to ground increases, and current applied to the intermediate discharge tubes LP1034 and LP1035 decreases, resulting in darker illumination.

Now, let us say that the end-to-end voltage of a single discharge tube is ±1000 V, i.e., end-to-end electric potential difference is 2000 V, with the discharge tube lighting circuit shown in FIG. 36, the four discharge tubes are connected in series, so ±1000 V is consecutively accumulated, which becomes end-to-end voltage of ±4000 V in total, i.e., becomes end-to-end electric potential difference of 8000 V as shown in FIG. 37A, and accordingly, such a high voltage needs to be supplied to between both ends of the secondary winding of the transformer T1041. In this example, the four discharge tubes are connected in series, but the more the number of the discharge tubes to be connected in series increases, the more voltage supplied from the transformers increases proportionately. For example, in the event of connecting 10 discharge tubes in series, electric potential difference between the terminals of the secondary winding of a transformer reaches 20,000 V. This provides a problem regarding safety and the like.

On the other hand, with regard to the discharge tube lighting circuits according to the twentieth and twenty-first embodiments, as shown in FIG. 37B, the supply voltage from the transformer is equal to the load voltage of the discharge tube for each single discharge tube, so the original electric potential is restored for each pair made up of a single discharge tube and a transformer, voltage to be accumulated is restricted to the worth of a single discharge tube (2000 V in the above example) even if the number of the discharge tubes increases.

Also, with regard to the discharge tube lighting circuits according to the twenty-second and twenty-third embodiments, as shown in FIG. 37C, the supply voltage from the transformer is equal to the load voltage of the discharge tube for each two discharge tubes, so the original electric potential is restored for each pair made up of two discharge tubes and a transformer, voltage to be accumulated is restricted to the worth of two discharge tubes (4000 V in the above example) even if the number of the discharge tubes increases.

Twenty-fourth Embodiment

Figure 38:
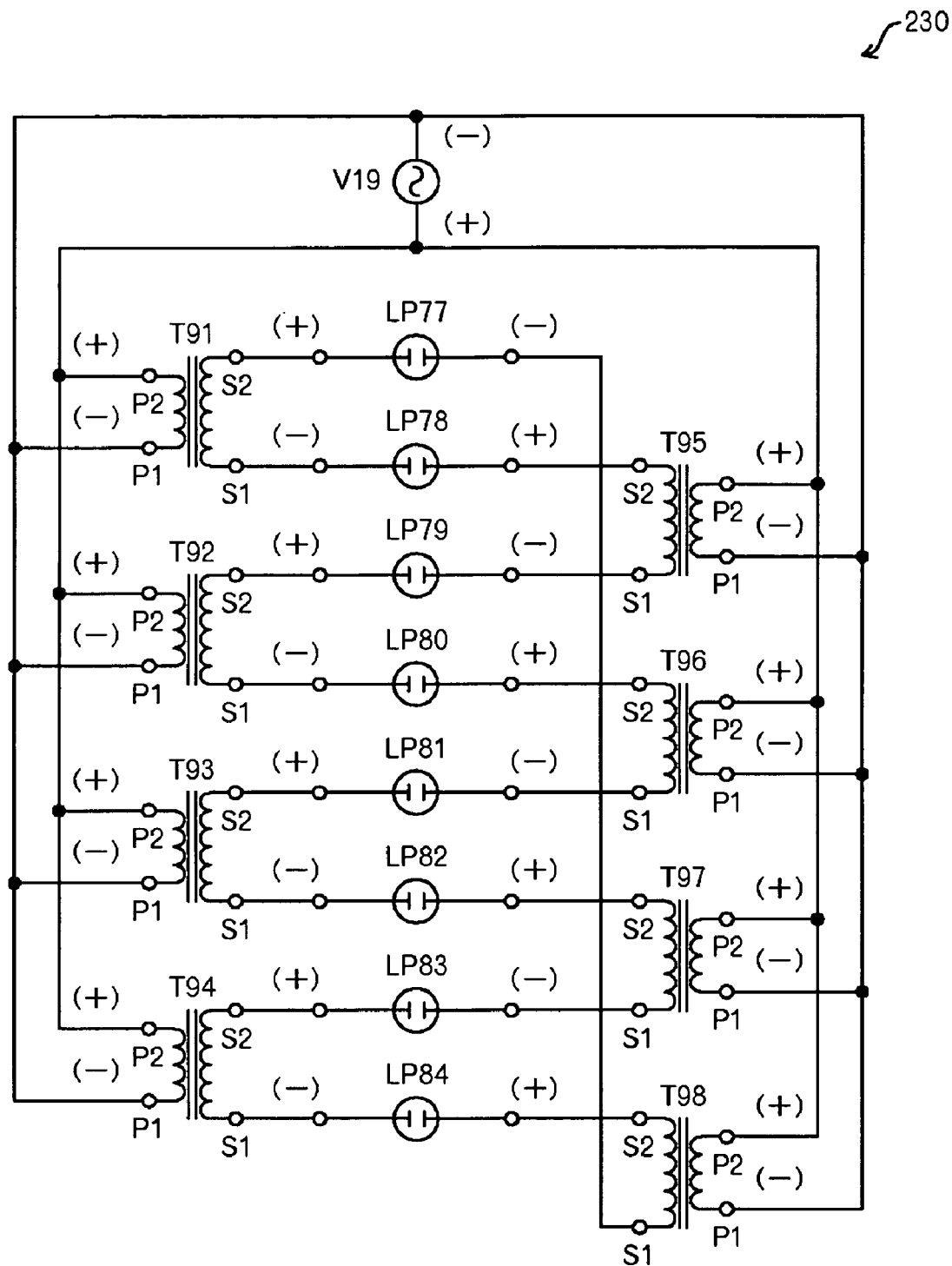
FIG. 38 is a circuit diagram according to a twenty-fourth embodiment of the present invention.

FIG. 38 illustrates a discharge tube lighting circuit according to a twenty-fourth embodiment of the present invention. A discharge tube lighting circuit 230 in FIG. 38 is a floating differential driving lighting circuit, and comprises an AC power source V19, transformers T91 through T98, and discharge tubes LP77 through LP84 such as a cold cathode fluorescent tube. The discharge tube lighting circuit 230 according to the present embodiment is a circuit wherein the discharge tube lighting circuit 190 according to the twentieth embodiment is expanded from 4 lamps to 8 lamps. The AC power source V19 of the discharge tube lighting circuit 230 is connected to terminals P1 and P2 of the primary winding of the transformer T91, terminals P1 and P2 of the primary winding of the transformer T92, terminals P1 and P2 of the primary winding of the transformer T93, terminals P1 and P2 of the primary winding of the transformer T94, terminals P1 and P2 of the primary winding of the transformer T95, terminals P1 and P2 of the primary winding of the transformer T96, terminals P1 and P2 of the primary winding of the transformer T97, and terminals P1 and P2 of the primary winding of the transformer T98. That is to say, all of the primary windings of the transformers T91 through T98 are connected to the AC power source V19 in parallel.

A first terminal of the discharge tube LP77 is connected to a terminal S2 of the secondary winding of the transformer T91, and a second terminal of the discharge tube LP77 is connected to a terminal S1 of the secondary winding of the transformer T98. Thus, in the event that the discharge tubes LP77 through LP84 are disposed in parallel, and also each transformer is disposed to both sides of the discharge tubes, the secondary windings of the transformers T91 and T98, which are diagonally disposed, are connected via the discharge tube. Also, a first terminal of the discharge tube LP78 is connected to a terminal S1 of the secondary winding of the transformer T91, and a second terminal of the discharge tube LP78 is connected to a terminal S2 of the secondary winding of the transformer T95. Similarly, a first terminal of the discharge tube LP79 is connected to a terminal S1 of the secondary winding of the transformer T95, and a second terminal of the discharge tube LP79 is connected to a terminal S2 of the secondary winding of the transformer T92. Also, a first terminal of the discharge tube LP80 is connected to a terminal S1 of the secondary winding of the transformer T92, and a second terminal of the discharge tube LP80 is connected to a terminal S2 of the secondary winding of the transformer T96. A first terminal of the discharge tube LP81 is connected to a terminal S1 of the secondary winding of the transformer T96, and a second terminal of the discharge tube LP81 is connected to a terminal S2 of the secondary winding of the transformer T93. Also, a first terminal of the discharge tube LP82 is connected to a terminal S1 of the secondary winding of the transformer T93, and a second terminal of the discharge tube LP82 is connected to a terminal S2 of the secondary winding of the transformer T97. Similarly, a first terminal of the discharge tube LP83 is connected to a terminal S1 of the secondary winding of the transformer T97, and a second terminal of the discharge tube LP83 is connected to a terminal S2 of the secondary winding of the transformer T94. Also, a first terminal of the discharge tube LP84 is connected to a terminal S1 of the secondary winding of the transformer T94, and a second terminal of the discharge tube LP84 is connected to a terminal S2 of the secondary winding of the transformer T98.

Thus, the discharge tube LP77, the secondary winding of the transformer T91, the discharge tube LP78, the secondary winding of the transformer T95, the discharge tube LP79, the secondary winding of the transformer T92, the discharge tube LP80, the secondary winding of the transformer T96, the discharge tube LP81, the secondary winding of the transformer T93, the discharge tube LP82, the secondary winding of the transformer T97, the discharge tube LP83, the secondary winding of the transformer T94, the discharge tube LP84, and the secondary winding of the transformer T98 are connected in series, and in addition, the secondary winding of the transformer T98 and the discharge tube LP77 are also connected, and accordingly, these circuit components makes up a loop.

Also, the primary windings of the transformers T91 through T98 are connected to the AC power source V19, and also the secondary windings of the transformers T91 through T98 are connected to the discharge tubes LP77 through LP84 such that an anti-polarity voltage is applied to both ends of any of the discharge tubes LP77 through LP84. Also, a different polarity voltage is alternately applied to the right side terminals of the discharge tubes LP77 through LP84, and similarly, a different polarity voltage is alternately applied to the left side terminals of the discharge tubes LP77 through LP84 as well.

With the present embodiment, the number of the transformers is 8, and on the other hand, the number of the discharge tubes is also 8, i.e., the number of the transformers is not increased as compared with the number of the discharge tubes. Also, the present embodiment provides a configuration wherein the discharge tubes are connected in series at the secondary winding side of the transformers, but the secondary windings of the transformers and the discharge tubes are alternately connected in series, so accumulation of voltage while lighting is suppressed at the minimum. Also, with the present embodiment, the floating differential driving method is employed, so current does not flow on a full scale unless two portions where a high voltage is applied are touched, which scarcely causes electrocution, and provides high-safety. Also, as described above, an anti-polarity voltage is applied to both ends of the discharge tubes, and further, polarity is reversed regarding the discharge tubes which are adjacently disposed, and accordingly, an advantage is provided wherein noise scarcely occurs.

Twenty-fifth Embodiment

Figure 39:
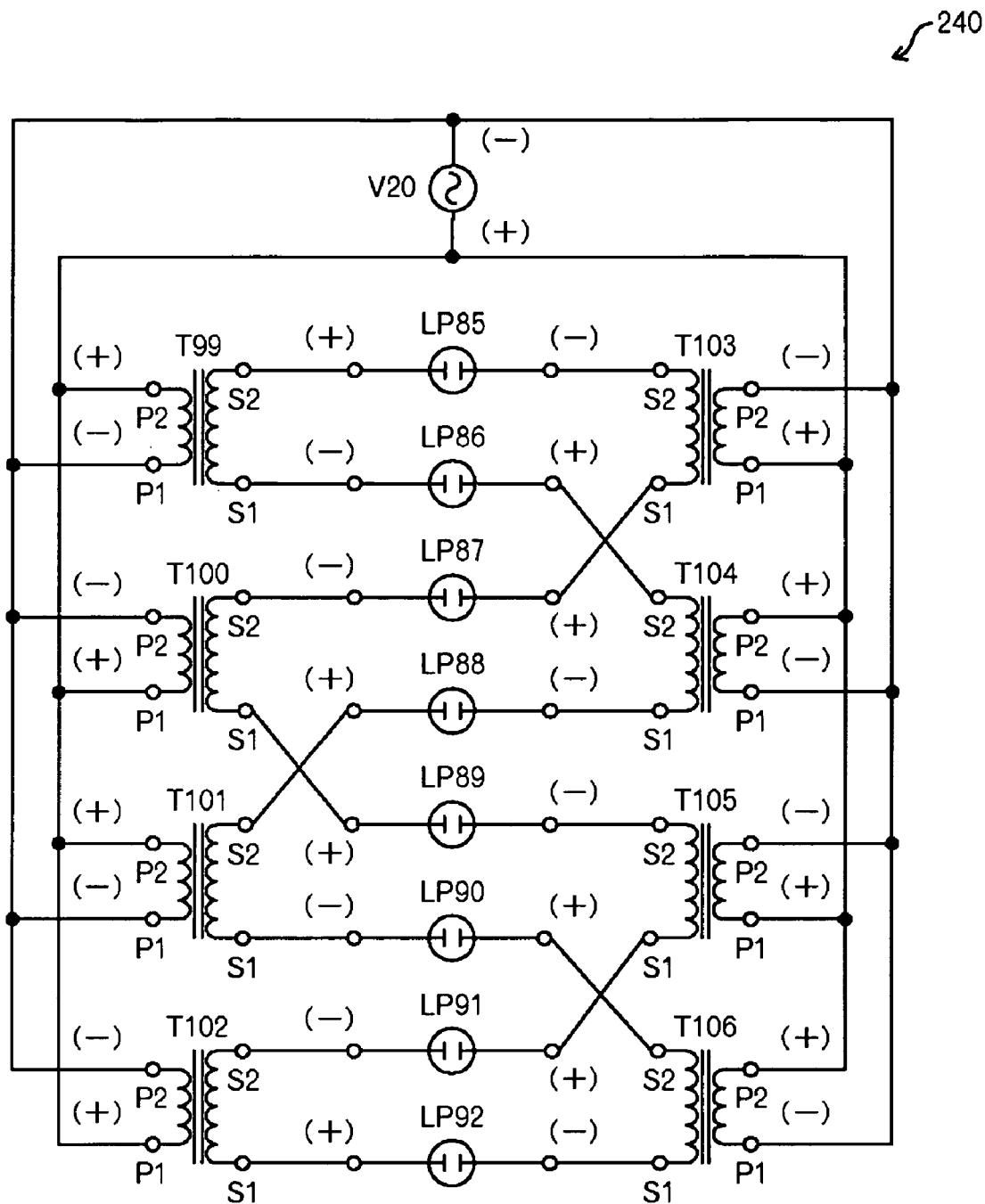
FIG. 39 is a circuit diagram according to a twenty-fifth embodiment of the present invention.

FIG. 39 illustrates a discharge tube lighting circuit according to a twenty-fifth embodiment of the present invention. A discharge tube lighting circuit 240 in FIG. 39 is a floating differential driving lighting circuit, and comprises an AC power source V20, transformers T99 through T106, and discharge tubes LP85 through LP92 such as a cold cathode fluorescent tube. The discharge tube lighting circuit 240 according to the present embodiment is a circuit wherein wiring for connecting the secondary windings of the transformers with the discharge tubes is modified in the discharge tube lighting circuit 230 according to the twenty-fourth embodiment. The AC power source V20 of the discharge tube lighting circuit 240 is connected to terminals P1 and P2 of the primary winding of the transformer T99, terminals P1 and P2 of the primary winding of the transformer T100, terminals P1 and P2 of the primary winding of the transformer T101, terminals P1 and P2 of the primary winding of the transformer T102, terminals P1 and P2 of the primary winding of the transformer T103, terminals P1 and P2 of the primary winding of the transformer T104, terminals P1 and P2 of the primary winding of the transformer T105, and terminals P1 and P2 of the primary winding of the transformer T106. That is to say, all of the primary windings of the transformers T99 through T106 are connected to the AC power source V20 in parallel.

A first terminal of the discharge tube LP85 is connected to a terminal S2 of the secondary winding of the transformer T99, and a second terminal of the discharge tube LP85 is connected to a terminal S2 of the secondary winding of the transformer T103. Also, a first terminal of the discharge tube LP86 is connected to a terminal S1 of the secondary winding of the transformer T99, and a second terminal of the discharge tube LP86 is connected to a terminal S2 of the secondary winding of the transformer T104. Further, a first terminal of the discharge tube LP88 is connected to a terminal S1 of the secondary winding of the transformer T104, and a second terminal of the discharge tube LP88 is connected to a terminal S2 of the secondary winding of the transformer T101. Similarly, a first terminal of the discharge tube LP90 is connected to a terminal S1 of the secondary winding of the transformer T101, and a second terminal of the discharge tube LP90 is connected to a terminal S2 of the secondary winding of the transformer T106. Also, a first terminal of the discharge tube LP92 is connected to a terminal S1 of the secondary winding of the transformer T106, and a second terminal of the discharge tube LP92 is connected to a terminal S1 of the secondary winding of the transformer T102. Further, a first terminal of the discharge tube LP91 is connected to a terminal S2 of the secondary winding of the transformer T102, and a second terminal of the discharge tube LP91 is connected to a terminal S1 of the secondary winding of the transformer T105. Similarly, a first terminal of the discharge tube LP89 is connected to a terminal S2 of the secondary winding of the transformer T105, and a second terminal of the discharge tube LP89 is connected to a terminal S1 of the secondary winding of the transformer T100. Also, a first terminal of the discharge tube LP87 is connected to a terminal S2 of the secondary winding of the transformer T100, and a second terminal of the discharge tube LP87 is connected to a terminal S1 of the secondary winding of the transformer T103. Thus, the discharge tube LP85, the secondary winding of the transformer T99, the discharge tube LP86, the secondary winding of the transformer T104, the discharge tube LP88, the secondary winding of the transformer T101, the discharge tube LP90, the secondary winding of the transformer T106, the discharge tube LP92, the secondary winding of the transformer T102, the discharge tube LP91, the secondary winding of the transformer T105, the discharge tube LP89, the secondary winding of the transformer T100, the discharge tube LP87, and the secondary winding of the transformer T103 are connected in series, and in addition, the secondary winding of the transformer T103 and the discharge tube LP85 are also connected, and accordingly, these circuit components makes up a loop.

Also, the primary windings of the transformers T99 through T106 are connected to the AC power source V20, and also the secondary windings of the transformers T99 through T106 are connected to the discharge tubes LP85 through LP92 such that an anti-polarity voltage is applied to both ends of any of the discharge tubes LP85 through LP92. Also, a reversed polarity voltage such as ++−− is applied to the right side terminals of the discharge tubes LP85 through LP92 every two tubes, and similarly, a reversed polarity voltage such as ++−− is applied to the left side terminals of the discharge tubes LP85 through LP92 every two tubes as well.

As compared with the discharge tube lighting circuit 230 according to the twenty-fourth embodiment shown in FIG. 38, the circuit configuration according to the present embodiment is basically the same, but the difference is in that the adjacent transformers and discharge tubes are connected such that wiring of a high voltage is not lengthened. More specifically, as shown in FIG. 39, in the event that the discharge tubes LP85 through LP92 are disposed in parallel, and further, the transformers T99 through T106 are disposed on both sides of the discharge tubes, wiring between the discharge tube and the secondary winding of the transformer is crossed regarding the adjacent discharge tubes and transformers.

Note that the polarity distribution of voltage applied to the discharge tubes LP85 through LP92 is ++--, so noise canceling property is somewhat inferior to that in the discharge tube lighting circuit 230 according to the twenty-fourth embodiment shown in FIG. 38.

Twenty-sixth Embodiment

Figure 40:
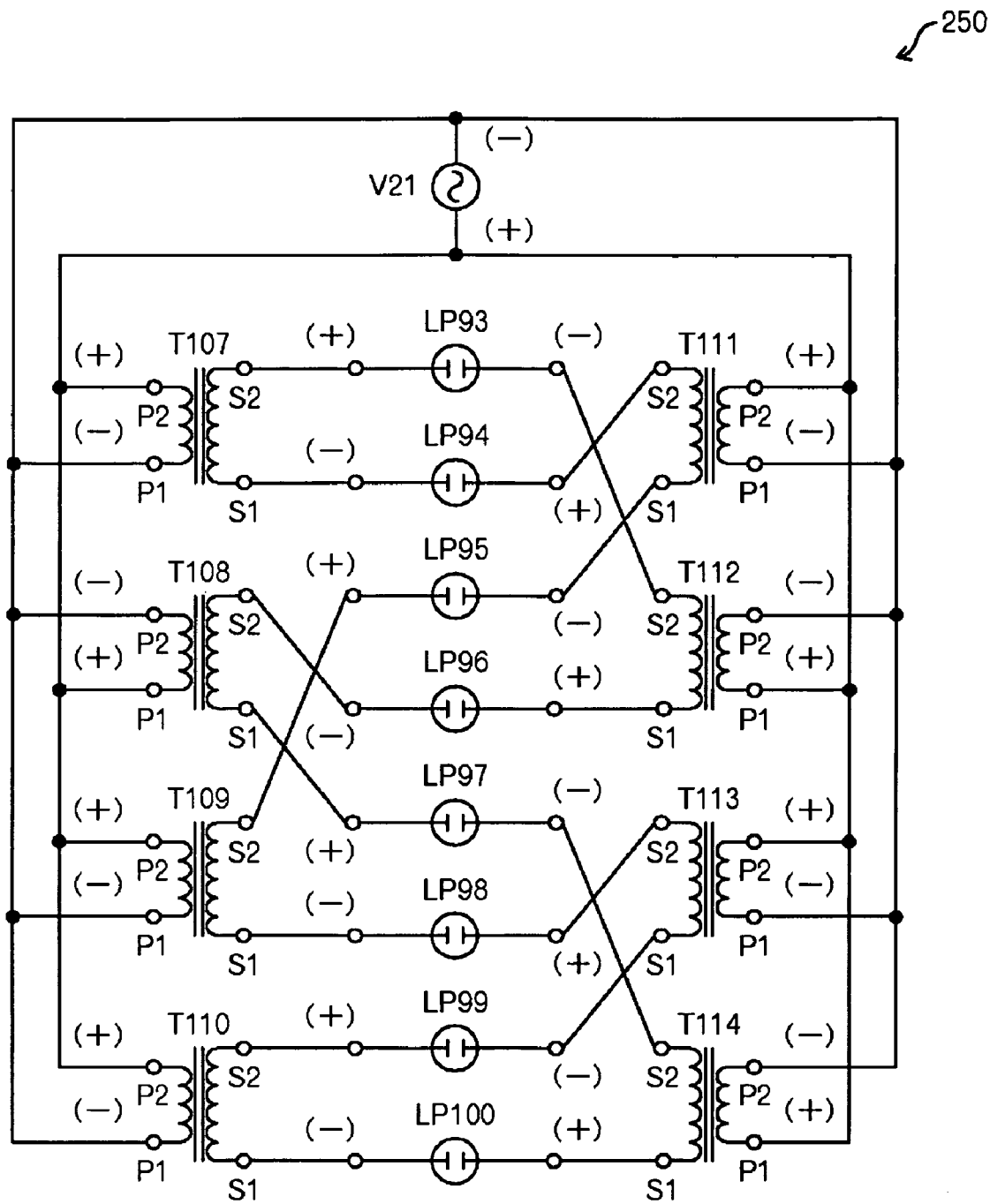
FIG. 40 is a circuit diagram according to a twenty-sixth embodiment of the present invention.

FIG. 40 illustrates a discharge tube lighting circuit according to a twenty-sixth embodiment of the present invention. A discharge tube lighting circuit 250 in FIG. 40 is a floating differential driving lighting circuit, and comprises an AC power source V21, transformers T107 through T114, and discharge tubes LP93 through LP100 such as a cold cathode fluorescent tube. The discharge tube lighting circuit 250 according to the present embodiment is a circuit wherein wiring for connecting the transformers with the discharge tubes is modified in the discharge tube lighting circuit 230 according to the twenty-fourth embodiment. The AC power source V21 of the discharge tube lighting circuit 250 is connected to terminals P1 and P2 of the primary winding of the transformer T107, terminals P1 and P2 of the primary winding of the transformer T108, terminals P1 and P2 of the primary winding of the transformer T109, terminals P1 and P2 of the primary winding of the transformer T110, terminals P1 and P2 of the primary winding of the transformer T111, terminals P1 and P2 of the primary winding of the transformer T112, terminals P1 and P2 of the primary winding of the transformer T113, and terminals P1 and P2 of the primary winding of the transformer T114. That is to say, all of the primary windings of the transformers T107 through T114 are connected to the AC power source V21 in parallel.

A first terminal of the discharge tube LP93 is connected to a terminal S2 of the secondary winding of the transformer T107, and a second terminal of the discharge tube LP93 is connected to a terminal S2 of the secondary winding of the transformer T112. Also, a first terminal of the discharge tube LP94 is connected to a terminal S1 of the secondary winding of the transformer T107, and a second terminal of the discharge tube LP94 is connected to a terminal S2 of the secondary winding of the transformer T111. Further, a first terminal of the discharge tube LP95 is connected to a terminal S1 of the secondary winding of the transformer T111, and a second terminal of the discharge tube LP95 is connected to a terminal S2 of the secondary winding of the transformer T109. Similarly, a first terminal of the discharge tube LP98 is connected to a terminal S1 of the secondary winding of the transformer T109, and a second terminal of the discharge tube LP98 is connected to a terminal S2 of the secondary winding of the transformer T113. Also, a first terminal of the discharge tube LP99 is connected to a terminal S1 of the secondary winding of the transformer T113, and a second terminal of the discharge tube LP99 is connected to a terminal S2 of the secondary winding of the transformer T110. Further, a first terminal of the discharge tube LP100 is connected to a terminal S1 of the secondary winding of the transformer T110, and a second terminal of the discharge tube LP100 is connected to a terminal S1 of the secondary winding of the transformer T114. Similarly, a first terminal of the discharge tube LP97 is connected to a terminal S2 of the secondary winding of the transformer T114, and a second terminal of the discharge tube LP97 is connected to a terminal S1 of the secondary winding of the transformer T108. Also, a first terminal of the discharge tube LP96 is connected to a terminal S2 of the secondary winding of the transformer T108, and a second terminal of the discharge tube LP96 is connected to a terminal S1 of the secondary winding of the transformer T112. Thus, the discharge tube LP93, the secondary winding of the transformer T107, the discharge tube LP94, the secondary winding of the transformer T111, the discharge tube LP95, the secondary winding of the transformer T109, the discharge tube LP98, the secondary winding of the transformer T113, the discharge tube LP99, the secondary winding of the transformer T110, the discharge tube LP100, the secondary winding of the transformer T114, the discharge tube LP97, the secondary winding of the transformer T108, the discharge tube LP96, and the secondary winding of the transformer T112 are connected in series, and in addition, the secondary winding of the transformer T112 and the discharge tube LP93 are also connected, and accordingly, these circuit components makes up a loop.

Also, the primary windings of the transformers T107 through T114 are connected to the AC power source V21, and also the secondary windings of the transformers T107 through T114 are connected to the discharge tubes LP93 through LP100 such that an anti-polarity voltage is applied to both ends of any of the discharge tubes LP93 through LP100. Also, a different polarity voltage is alternately applied to the right side terminals of the discharge tubes LP93 through LP100, and similarly, a different polarity voltage is alternately applied to the left side terminals of the discharge tubes LP93 through LP100 as well, and accordingly, an advantage is provided wherein noise scarcely occurs.

As compared with the discharge tube lighting circuit 230 according to the twenty-fourth embodiment shown in FIG. 38, the circuit configuration according to the present embodiment is basically the same, but the difference is in that the relatively closed transformer secondary winding and discharge tubes are connected such that wiring of a high voltage is not lengthened. More specifically, as shown in FIG. 40, wiring of a high voltage is disposed so as to straddle wiring of two wires.

Twenty-seventh Embodiment

Figures 41A, 41B:
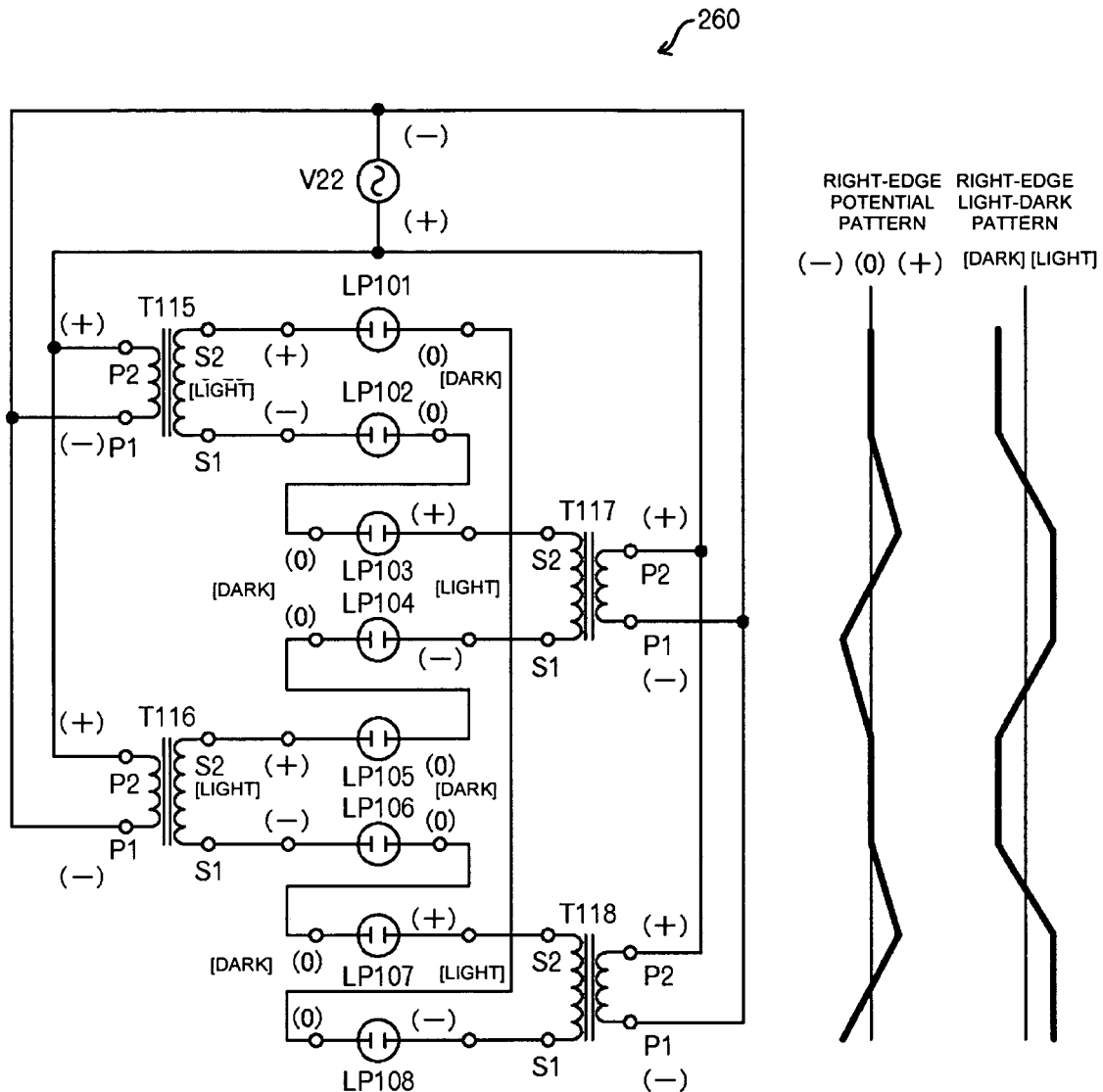
FIG. 41A is a circuit diagram according to a twenty-seventh embodiment of the present invention.
FIG. 41B is a diagram illustrating an electric potential pattern and a light-dark pattern in the circuit in FIG. 41A.

FIG. 41A illustrates a discharge tube lighting circuit according to a twenty-seventh embodiment of the present invention. A discharge tube lighting circuit 260 in FIG. 41A is a floating differential driving lighting circuit, and comprises an AC power source V22, transformers T115 through T118, and discharge tubes LP101 through LP108 such as a cold cathode fluorescent tube. The discharge tube lighting circuit 260 according to the present embodiment is a circuit wherein the two discharge tubes connected in series are connected between the secondary windings of the transformers, which can light twice as many discharge tubes as the number of transformers. The AC power source V22 of the discharge tube lighting circuit 260 is connected to terminals P1 and P2 of the primary winding of the transformer T115, terminals P1 and P2 of the primary winding of the transformer T116, terminals P1 and P2 of the primary winding of the transformer T117, and terminals P1 and P2 of the primary winding of the transformer T118. That is to say, all of the primary windings of the transformers T115 through T118 are connected to the AC power source V22 in parallel.

A first terminal of the discharge tube LP01 is connected to a terminal S2 of the secondary winding of the transformer T115, and a second terminal of the discharge tube LP101 is connected to a first terminal of the discharge tube LP108. A second terminal of the discharge tube LP108 is connected to a terminal S1 of the secondary winding of the transformer T118. Also, the discharge tubes LP102 and LP103 are connected in series, the other terminal of the discharge tube LP102 is connected to a terminal S1 of the secondary winding of the transformer T115, and the other terminal of the discharge tube LP103 is connected to a terminal S2 of the secondary winding of the transformer T117. Similarly, the discharge tubes LP104 and LP105 are connected in series, the other terminal of the discharge tube LP104 is connected to a terminal S1 of the secondary winding of the transformer T117, and the other terminal of the discharge tube LP105 is connected to a terminal S2 of the secondary winding of the transformer T116. Further, the discharge tubes LP106 and LP107 are connected in series, the other terminal of the discharge tube LP106 is connected to a terminal S1 of the secondary winding of the transformer T116, and the other terminal of the discharge tube LP107 is connected to a terminal S2 of the secondary winding of the transformer T118.

Thus, the discharge tube LP101, the secondary winding of the transformer T115, the discharge tubes LP102 and LP103, the secondary winding of the transformer T117, the discharge tubes LP104 and LP105, the secondary winding of the transformer T116, the discharge tubes LP106 and LP107, the secondary winding of the transformer T118, and the discharge tube LP108 are connected in series, and further, the discharge tube LP108 and the discharge tube LP101 are connected, and accordingly, these circuit components makes up a loop.

Also, the primary windings of the transformers T115 through T118 are connected to the AC power source V22, and also the secondary windings of the transformers T115 through T118 are connected to the discharge tubes LP101 through LP108 such that an anti-polarity voltage is applied to both ends of any of the serially connected two discharge tubes LP101 and LP108, the discharge tubes LP102 and LP103, the discharge tubes LP104 and LP105, and the discharge tubes LP106 and LP107. Note that the connection point between the two discharge tubes becomes a median point electric potential (ground), which is shown as (0) in FIG. 41A. Upon the discharge tubes LP101 through LP108 being disposed in parallel such as shown in FIG. 41A, the electric potential pattern of the right edge of the discharge tubes changes such as 00+−00+−, as shown in the graph on the left side of FIG. 41B. Also, in the event of such an electric potential pattern, the discharge tubes in the portion of which electric potential is (0) become dark as shown in the graph on the right side of FIG. 41B, which makes up a light-dark pattern such as dark-dark-light-light-dark-dark-light-light.

Thus, the discharge tubes and the secondary windings of the transformers are connected in series, so current regarding all of the discharge tubes becomes the same one. However, as described above, the luminance of the discharge tube regarding the portion of which electric potential becomes 0 somewhat deteriorates. Note that the two discharge tubes are connected in series, so accumulation of voltage for the worth of the two discharge tubes occurs, but never exceeds that. Also, the connection line between the discharge tube LP101 and the discharge tube LP108 extends long, but this portion is the above-described median point electric potential (ground), and accordingly, this does not cause problems such as a leakage current and occurrence of noise. Also, with the present embodiment, the floating differential driving method is employed, so current does not flow on a full scale unless two portions where a high voltage is applied are touched, which scarcely causes electrocution, and provides high-safety.

Twenty-eighth Embodiment

Figures 42A, 42B:
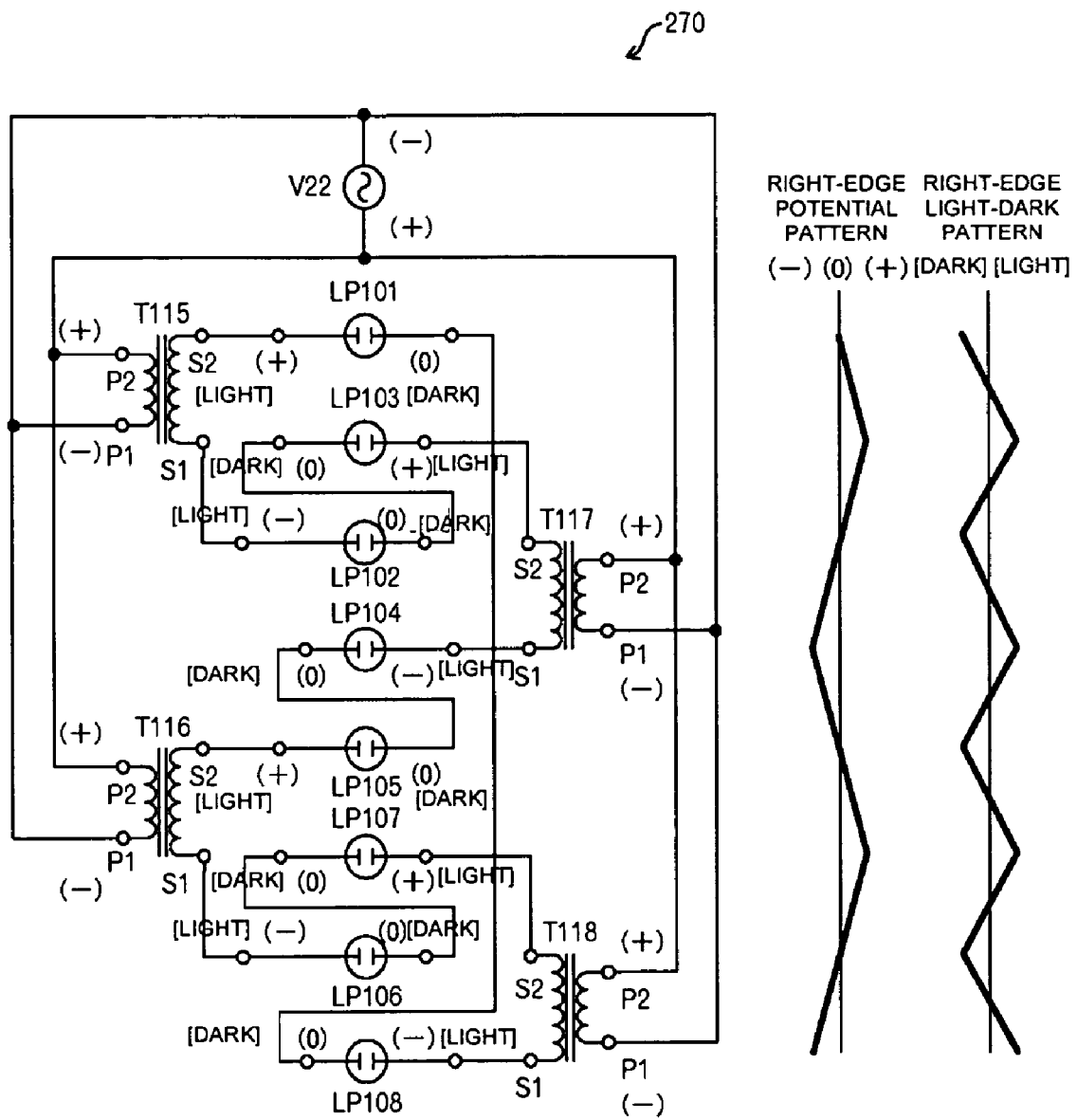
FIG. 42A is a circuit diagram according to a twenty-eighth embodiment of the present invention.
FIG. 42B is a diagram illustrating an electric potential pattern and a light-dark pattern in the circuit in FIG. 42A.

FIG. 42A illustrates a discharge tube lighting circuit according to a twenty-eighth embodiment of the present invention. A discharge tube lighting circuit 270 in FIG. 42A is a floating differential driving lighting circuit, and comprises an AC power source V22, transformers T115 through T118, and discharge tubes LP11 through LP108 such as a cold cathode fluorescent tube. The discharge tube lighting circuit 270 according to the present embodiment is a circuit wherein the placements of the discharge tubes are modified in the discharge tube lighting circuit 260 according to the twenty-seventh embodiment. More specifically, while the discharge tubes LP101, LP102, LP103, LP104, LP105, LP106, LP107, and LP108 have been disposed in this order from top in FIG. 41A, the discharge tubes LP101, LP103, LP102, LP104, LP105, LP107, LP106, and LP108 are disposed in this order from top in FIG. 42A. The underlined parts represent portions of which order is changed. Thus, luminance of the discharge tubes on both sides becomes light and dark repetitions, thereby reducing luminance irregularities. This can be understood from the graph of a light-dark pattern on the right side of FIG. 42B as well. Also, the electric potential pattern of the discharge tubes (right side) finely varies such as 0+0−0+0− centered on 0, as shown in the left side of FIG. 42B. Accordingly, noise canceling effects are also improved.

Twenty-ninth Embodiment

Figures 43A, 43B:
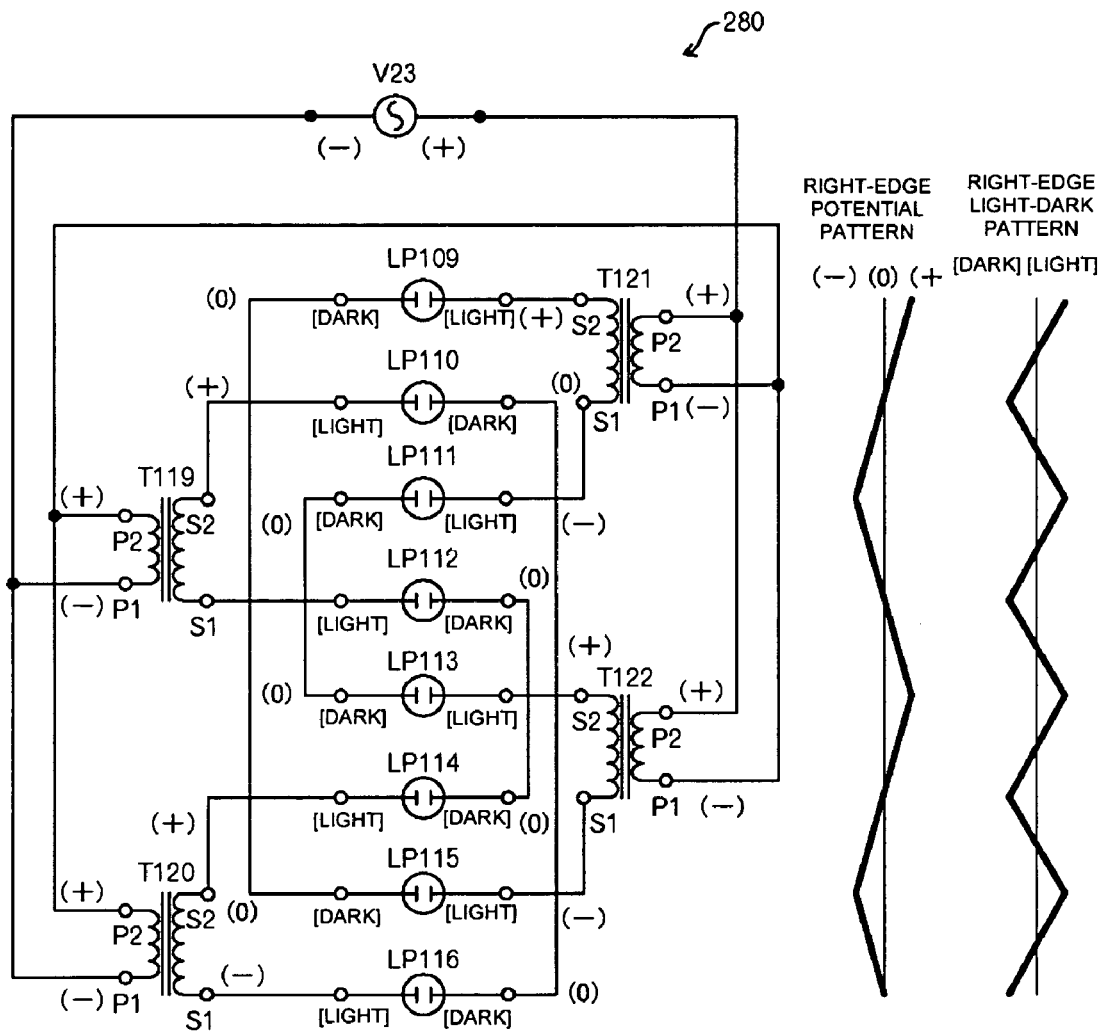
FIG. 43A is a circuit diagram according to a twenty-ninth embodiment of the present invention.
FIG. 43B is a diagram illustrating an electric potential pattern and a light-dark pattern in the circuit in FIG. 43A.

FIG. 43A illustrates a discharge tube lighting circuit according to a twenty-ninth embodiment of the present invention. A discharge tube lighting circuit 280 in FIG. 43A is a floating differential driving lighting circuit, and comprises an AC power source V23, transformers T119 through T122, and discharge tubes LP109 through LP116 such as a cold cathode fluorescent tube. The discharge tube lighting circuit 280 according to the present embodiment is a circuit wherein the two discharge tube lighting circuits 210 according to the twenty-second embodiment shown in FIG. 34 are prepared and disposed on both sides, the discharge tubes are alternately arrayed for each lamp, and the primary winding sides of the two discharge tube lighting circuits 210 are connected in series. This allows an electric potential pattern and a light-dark pattern to become a preferred pattern without lengthening wiring of a high voltage not too long.

The AC power source V23 of the discharge tube lighting circuit 280 is connected to a terminal P2 of the primary winding of the transformer T121, a terminal P2 of the primary winding of the transformer T122, a terminal P1 of the primary winding of the transformer T119, and a terminal P1 of the primary winding of the transformer T120. That is to say, the primary winding of the transformer T121 and the primary winding of the transformer T122 are connected in parallel, and also the primary winding of the transformer T119 and the primary winding of the transformer T120 are connected in parallel. Also, the primary windings of the transformers T121 and T122 and the primary windings of the transformers T119 and T120 are connected in series. Such a relation between the primary windings of the transformers is established since current on the primary side is forcibly divided into fifty-fifty due to influence of serial connection of the discharge tubes on the secondary side.

A first terminal of the discharge tube LP109 is connected to a terminal S2 of the secondary winding of the transformer T121, and a second terminal of the discharge tube LP109 is connected to a first terminal of the discharge tube LP115. A second terminal of the discharge tube LP115 is connected to a terminal S1 of the secondary winding of the transformer T122. Also, a first terminal of the discharge tube LP110 is connected to a terminal S2 of the secondary winding of the transformer T119, and a second terminal of the discharge tube LP110 is connected to a first terminal of the discharge tube LP116. A second terminal of the discharge tube LP116 is connected to a terminal S1 of the secondary winding of the transformer T120. The discharge tubes LP111 and LP113 are connected in series, the other terminal of the discharge tube LP111 is connected to a terminal S1 of the secondary winding of the transformer T121, and the other terminal of the discharge tube LP113 is connected to a terminal S2 of the secondary winding of the transformer T122. Similarly, the discharge tubes LP112 and LP114 are connected in series, the other terminal of the discharge tube LP112 is connected to a terminal S1 of the secondary winding of the transformer T119, and the other terminal of the discharge tube LP114 is connected to a terminal S2 of the secondary winding of the transformer T120.

Thus, the discharge tube LP109, the discharge tube LP115, the secondary winding of the transformer T122, the discharge tubes LP113 and LP111, the secondary winding of the transformer T121 are connected in series, and further, the discharge tube LP109 and the secondary winding of the transformer T121 are connected, and accordingly, these circuit components make up a loop. Similarly, the discharge tube LP110, the discharge tube LP116, the secondary winding of the transformer T120, the discharge tube LP114, the discharge tube LP112, the secondary winding of the transformer T119 are connected in series, and further, the discharge tube LP110 and the secondary winding of the transformer T119 are connected, and accordingly, these circuit components make up a loop.

Also, the primary windings of the transformers T119 through T122 are connected to the AC power source V23, and also the secondary windings of the transformers T119 through T122 are connected to the discharge tubes LP109 through LP116 such that an anti-polarity voltage is applied to both ends of any of the serially connected two discharge tubes LP109 and LP115, the discharge tubes LP110 and LP116, the discharge tubes LP111 and LP113, and the discharge tubes LP112 and LP114. Note that the connection point between the two discharge tubes becomes a median point electric potential (ground), which is shown as (0) in FIG. 43A. Upon the discharge tubes LP109 through LP116 being disposed in parallel as shown in FIG. 43A, the electric potential pattern of the right edge of the discharge tubes changes such as +0–0+ 0–0, as shown in the graph on the left side of FIG. 43B. Also, in the event of such an electric potential pattern, the discharge tubes in the portion of which electric potential is (0) become dark as shown in the graph on the right side of FIG. 43B, which makes up a light-dark pattern such as light-dark-light-dark-light-dark-light-dark.

Thus, the electric potential pattern and light-dark pattern at the right edges or left edges of the discharge tubes is the same as those in FIG. 42B, but the electric potential pattern and light-dark pattern as described above are realized without extending only wiring of a high voltage as shown in FIG. 42A.

Thirtieth Embodiment

Figure 44:
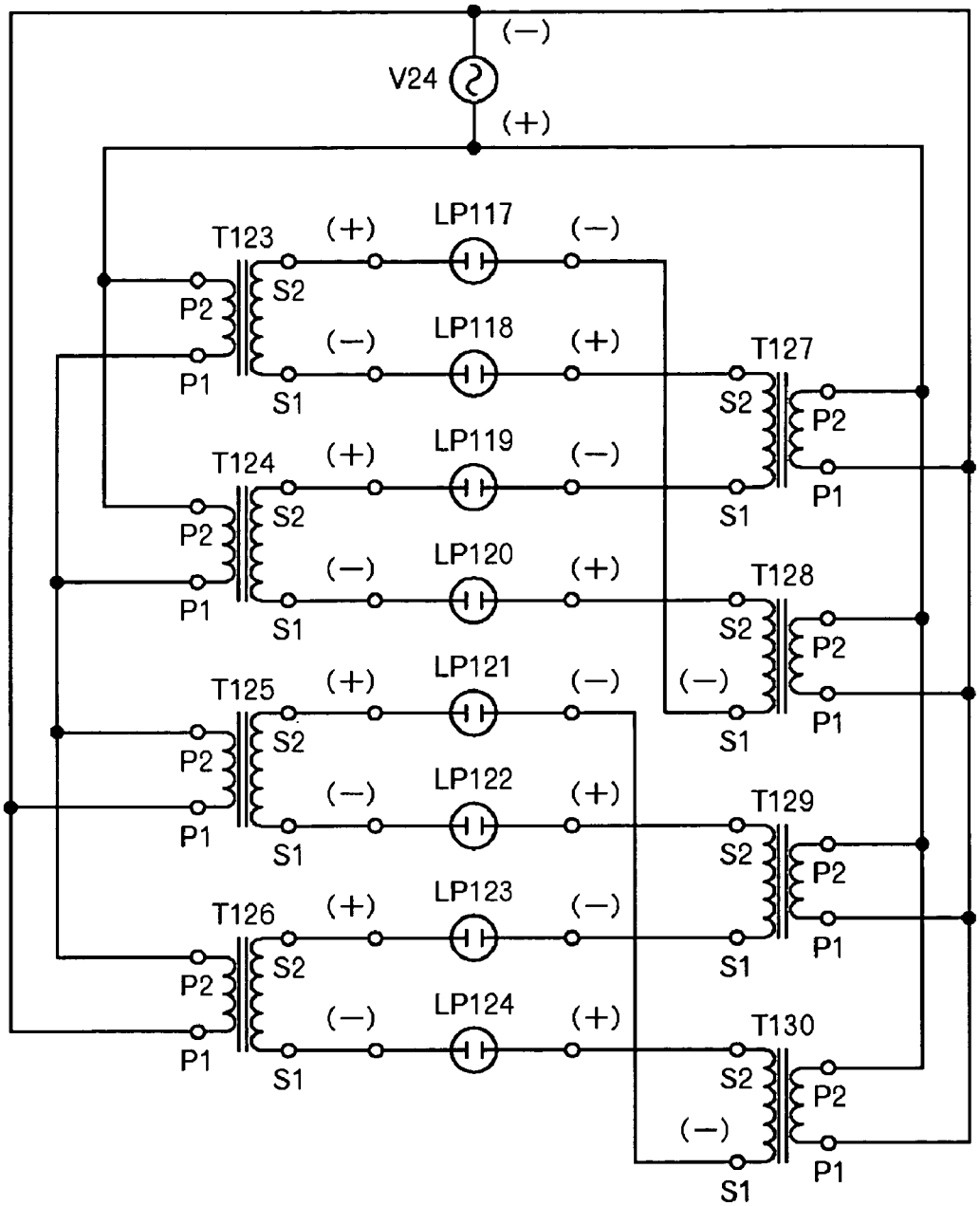
FIG. 44 is a circuit diagram according to a thirtieth embodiment of the present invention.

FIG. 44 illustrates a discharge tube lighting circuit according to a thirtieth embodiment of the present invention. A discharge tube lighting circuit 290 in FIG. 44 is a floating differential driving lighting circuit, and comprises an AC power source V24, transformers T123 through T130, and discharge tubes LP117 through LP124 such as a cold cathode fluorescent tube. The discharge tube lighting circuit 290 according to the present embodiment is a circuit wherein the two discharge tube lighting circuits 190 according to the twentieth embodiment are disposed up and down, the left-side disposed transformers T123 and T124, and transformers T125 and T126 are connected in parallel, and the right-side disposed transformers T127 through T130 are connected in parallel. Also, the transformer T123 and the transformer T124 are connected in parallel, and the transformer T125 and the transformer T126 are connected in parallel. The AC power source V24 of the discharge tube lighting circuit 290 is connected to a terminal P2 of the primary winding of the transformer T123, a terminal P2 of the primary winding of the transformer T124, a terminal P1 of the primary winding of the transformer T125, a terminal P1 of the primary winding of the transformer T126, terminals P1 and P2 of the primary winding of the transformer T127, terminals P1 and P2 of the primary winding of the transformer T128, terminals P1 and P2 of the primary winding of the transformer T129, and terminals P1 and P2 of the primary winding of the transformer T130. Such a relation that the transformers within the upper-half circuit are connected in parallel, and further, the transformers within the lower-half circuit are connected in parallel is established since current on the primary side is forcibly quartered due to influence of serial connection of the discharge tubes on the secondary side regarding the upper-half circuit and the lower-half circuit. However, an arrangement may be made wherein the transformers on the left side are connected such that all of the transformers are connected in parallel, as with the transformers on the right side.

A first terminal of the discharge tube LP117 is connected to a terminal S2 of the secondary winding of the transformer T123, and a second terminal of the discharge tube LP117 is connected to a terminal S1 of the secondary winding of the transformer T128. Thus, in the event that the discharge tubes LP117 through LP120 are disposed in parallel, the secondary windings of the diagonally disposed transformers T123 and T128 are connected via the discharge tubes. Also, a first terminal of the discharge tube LP118 is connected to a terminal S1 of the secondary winding of the transformer T123, and a second terminal of the discharge tube LP118 is connected to a terminal S2 of the secondary winding of the transformer T127. Similarly, a first terminal of the discharge tube LP119 is connected to a terminal S1 of the secondary winding of the transformer T127, and a second terminal of the discharge tube LP119 is connected to a terminal S2 of the secondary winding of the transformer T124. A first terminal of the discharge tube LP120 is connected to a terminal S1 of the secondary winding of the transformer T124, and a second terminal of the discharge tube LP120 is connected to a terminal S2 of the secondary winding of the transformer T128. Thus, the discharge tube LP117, the secondary winding of the transformer T123, the discharge tube LP118, the secondary winding of the transformer T127, the discharge tube LP119, the secondary winding of the transformer T124, the discharge tube LP120, the secondary winding of the transformer T128 are connected in series, and further, the secondary winding of the transformer T128 and the discharge tube LP117 are connected, and accordingly, these circuit components makes up a loop.

Similarly, a first terminal of the discharge tube LP121 is connected to a terminal S2 of the secondary winding of the transformer T125, and a second terminal of the discharge tube LP121 is connected to a terminal S1 of the secondary winding of the transformer T130. Thus, in the event that the discharge tubes LP121 through LP124 are disposed in parallel, the secondary windings of the diagonally disposed transformers T125 and T130 are connected via the discharge tubes. Also, a first terminal of the discharge tube LP122 is connected to a terminal S1 of the secondary winding of the transformer T125, and a second terminal of the discharge tube LP122 is connected to a terminal S2 of the secondary winding of the transformer T129. Similarly, a first terminal of the discharge tube LP123 is connected to a terminal S1 of the secondary winding of the transformer T129, and a second terminal of the discharge tube LP123 is connected to a terminal S2 of the secondary winding of the transformer T126. Further, a first terminal of the discharge tube LP124 is connected to a terminal S1 of the secondary winding of the transformer T126, and a second terminal of the discharge tube LP124 is connected to a terminal S2 of the secondary winding of the transformer T130. Thus, the discharge tube LP121, the secondary winding of the transformer T125, the discharge tube LP122, the secondary winding of the transformer T129, the discharge tube LP123, the secondary winding of the transformer T126, the discharge tube LP124, the secondary winding of the transformer T130 are connected in series, and further, the secondary winding of the transformer T130 and the discharge tube LP121 are connected, and accordingly, these circuit components makes up a loop.

Also, the primary windings of the transformers T123 through T130 are connected to the AC power source V24, and also the secondary windings of the transformers T123 through T130 are connected to the discharge tubes LP117 through LP124 such that an anti-polarity voltage is applied to both ends of any of the discharge tubes LP117 through LP124. Also, a different polarity voltage is alternately applied to the right side terminals of the discharge tubes LP117 through LP124, and similarly, a different polarity voltage is alternately applied to the left side terminals of the discharge tubes LP117 through LP124 as well.

With the present embodiment, the number of the transformers is 8, and on the other hand, the number of the discharge tubes is also 8, i.e., the number of the transformers is not increased as compared with the number of the discharge tubes. Also, the present embodiment provides a configuration wherein the discharge tubes are connected in series at the secondary side of the transformers, but the secondary windings of the transformers and the discharge tubes are alternately connected in series, so accumulation of voltage while lighting is suppressed at the minimum. Also, with the present embodiment, the floating differential driving method is employed, so current does not flow on a full scale unless two portions where a high voltage is applied are touched, which scarcely causes electrocution, and provides high-safety. Also, as described above, an anti-polarity voltage is applied to both ends of the discharge tubes, and further, polarity is reversed regarding the discharge tubes which are adjacently disposed, and accordingly, an advantage is provided wherein noise scarcely occurs.

Note that current is made uniform at the secondary side of the upper half circuit, and also current is made uniform at the secondary side of the lower half circuit. Also, the primary side of the upper half circuit and the primary side of the lower half circuit are also connected in series, so current of the upper half circuit and the lower half circuit is made uniform.

Thirty-first Embodiment

Figure 45:
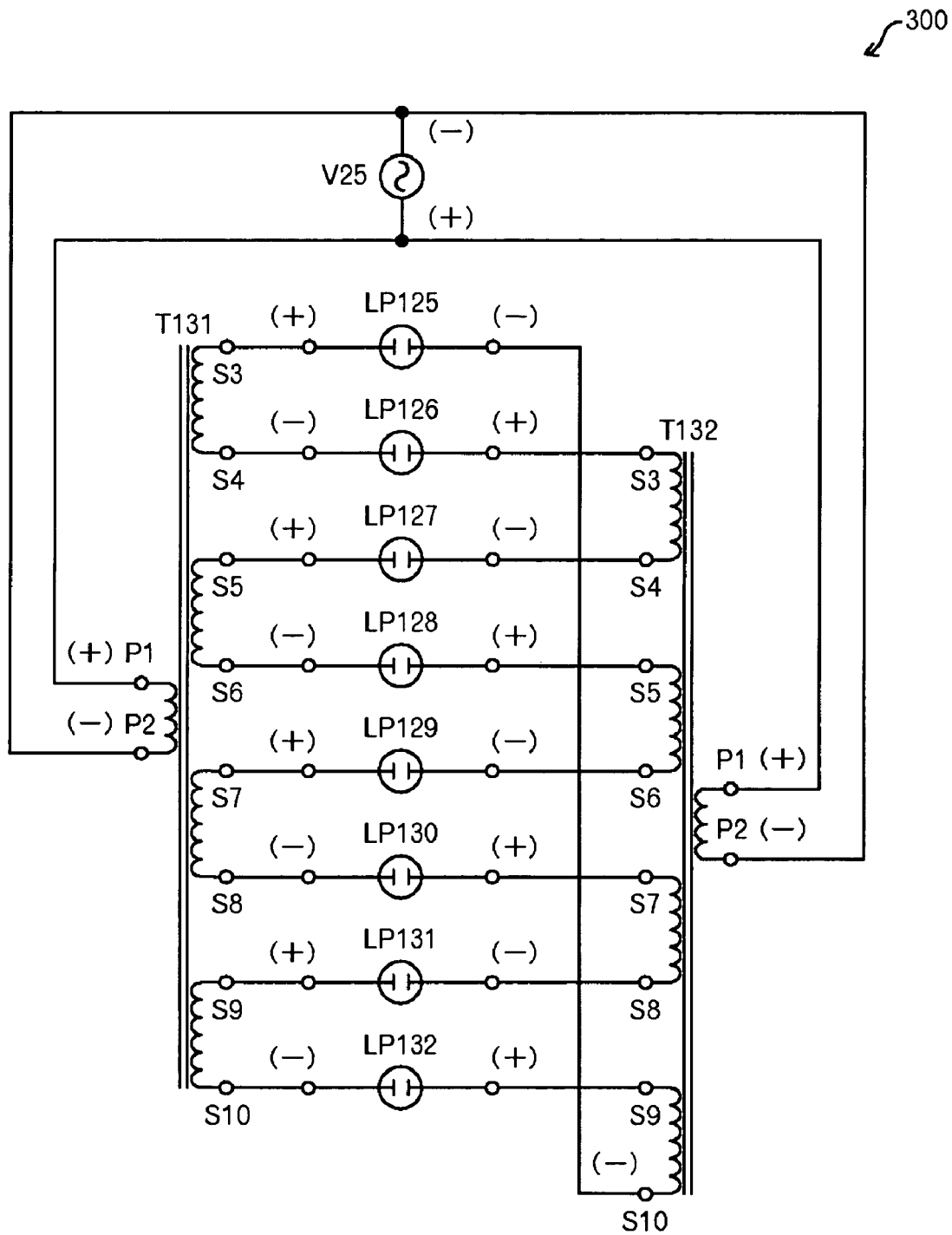
FIG. 45 is a circuit diagram according to a thirty-first embodiment of the present invention.

FIG. 45 illustrates a discharge tube lighting circuit according to a thirty-first embodiment of the present invention. A discharge tube lighting circuit 300 in FIG. 45 is a floating differential driving lighting circuit, and comprises an AC power source V25, 4-output compound transformers T131 and T132, and discharge tubes LP125 through LP132 such as a cold cathode fluorescent tube. The discharge tube lighting circuit 300 according to the present embodiment is a circuit wherein 4-output compound transformers are employed instead of the normal transformers employed in the circuit shown in FIG. 38. The AC power source V25 of the discharge tube lighting circuit 300 is connected to terminals P1 and P2 of the primary winding of the transformer T131, and terminals P1 and P2 of the primary winding of the transformer T132. That is to say, the primary windings of the transformers T131 and T132 are connected to the AC power source V25 in parallel.

The primary winding and all of the secondary windings of the compound transformer T131 are subjected to magnetic coupling at a common core, a first secondary winding is made up of terminals S3 and S4, a second secondary winding is made up of terminals S5 and S6, a third secondary winding is made up of terminals S7 and S8, and a fourth secondary winding is made up of terminals S9 and S10. Similarly, The primary winding and all of the secondary windings of the compound transformer T132 are subjected to magnetic coupling at a common core, a first secondary winding is made up of terminals S3 and S4, a second secondary winding is made up of terminals S5 and S6, a third secondary winding is made up of terminals S7 and S8, and a fourth secondary winding is made up of terminals S9 and S10.

A first terminal of the discharge tube LP125 is connected to a terminal S3 of the first secondary winding of the transformer T131, and a second terminal of the discharge tube LP125 is connected to a terminal S10 of the fourth secondary winding of the transformer T132. Thus, in the event that the discharge tubes LP125 through LP132 are disposed in parallel, and also each transformer is disposed to both sides of the discharge tubes, the diagonal secondary windings are connected via the discharge tube. Also, a first terminal of the discharge tube LP126 is connected to a terminal S4 of the first secondary winding of the transformer T131, and a second terminal of the discharge tube LP126 is connected to a terminal S3 of the first secondary winding of the transformer T132. Similarly, a first terminal of the discharge tube LP127 is connected to a terminal S4 of the first secondary winding of the transformer T132, and a second terminal of the discharge tube LP127 is connected to a terminal S5 of the second secondary winding of the transformer T131. Also, a first terminal of the discharge tube LP128 is connected to a terminal S6 of the second secondary winding of the transformer T131, and a second terminal of the discharge tube LP128 is connected to a terminal S5 of the second secondary winding of the transformer T132. A first terminal of the discharge tube LP129 is connected to a terminal S6 of the second secondary winding of the transformer T132, and a second terminal of the discharge tube LP129 is connected to a terminal S7 of the third secondary winding of the transformer T131. Also, a first terminal of the discharge tube LP130 is connected to a terminal S8 of the third secondary winding of the transformer T131, and a second terminal of the discharge tube LP130 is connected to a terminal S7 of the third secondary winding of the transformer T132. Similarly, a first terminal of the discharge tube LP131 is connected to a terminal S8 of the third secondary winding of the transformer T132, and a second terminal of the discharge tube LP131 is connected to a terminal S9 of the fourth secondary winding of the transformer T131. Also, a first terminal of the discharge tube LP132 is connected to a terminal S10 of the fourth secondary winding of the transformer T131, and a second terminal of the discharge tube LP132 is connected to a terminal S9 of the fourth secondary winding of the transformer T132. Thus, the discharge tube LP125, the first secondary winding of the transformer T131, the discharge tube LP126, the first secondary winding of the transformer T132, the discharge tube LP127, the second secondary winding of the transformer T131, the discharge tube LP128, the second secondary winding of the transformer T132, the discharge tube LP129, the third secondary winding of the transformer T131, the discharge tube LP130, the third secondary winding of the transformer T132, the discharge tube LP131, the fourth secondary winding of the transformer T131, the discharge tube LP132, and the fourth secondary winding of the transformer T132 are connected in series, and in addition, the fourth secondary winding of the transformer T132 and the discharge tube LP125 are also connected, and accordingly, these circuit components makes up a loop.

Also, the primary windings of the transformers T131 and T132 are connected to the AC power source V25, and also the secondary windings of the transformers T131 and T132 are connected to the discharge tubes LP125 through LP132 such that an anti-polarity voltage is applied to both ends of any of the discharge tubes LP125 through LP132. Also, a different polarity voltage is alternately applied to the right side terminals of the discharge tubes LP125 through LP132, and similarly, a different polarity voltage is alternately applied to the left side terminals of the discharge tubes LP125 through LP132 as well.

With the present embodiment, the number of the transformers is 2, and on the other hand, the number of the discharge tubes is also 8, i.e., the number of the transformers is reduced though multi-output compound transformer is necessary. Also, the present embodiment provides a configuration wherein the discharge tubes are connected in series at the secondary side of the transformers, but the secondary windings of the transformers and the discharge tubes are alternately connected in series, so accumulation of voltage while lighting is suppressed at the minimum. Also, with the present embodiment, the floating differential driving method is employed, so current does not flow on a full scale unless two portions where a high voltage is applied are touched, which scarcely causes electrocution, and provides high-safety. Also, as described above, an anti-polarity voltage is applied to both ends of the discharge tubes, and further, polarity is reversed regarding the discharge tubes which are adjacently disposed, and accordingly, an advantage is provided wherein noise scarcely occurs. In addition, luminance irregularities between the discharge tubes are eliminated.

Thirty-second Embodiment

Figure 46:
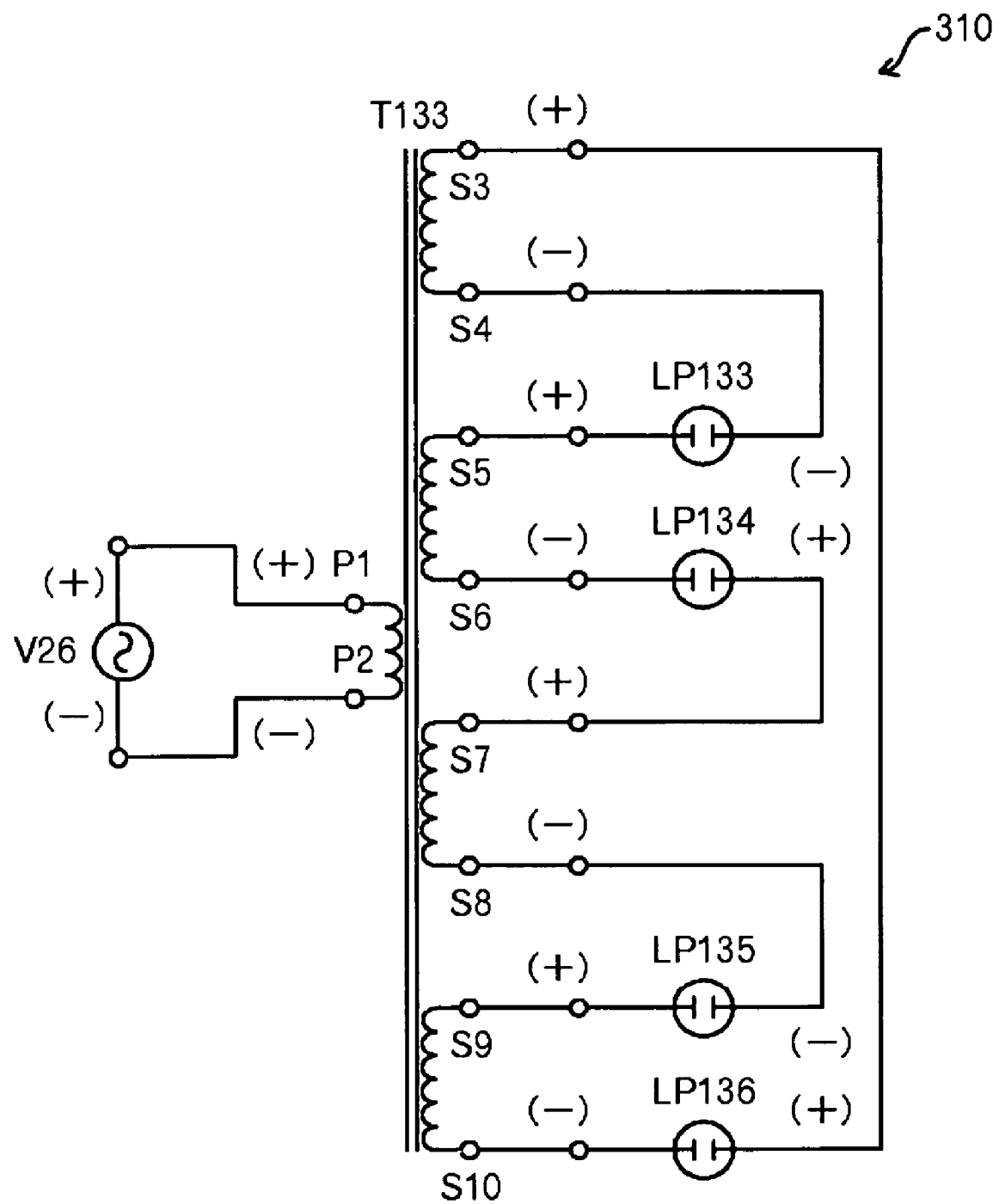
FIG. 46 is a circuit diagram according to a thirty-second embodiment of the present invention.

FIG. 46 illustrates a discharge tube lighting circuit according to a thirty-second embodiment of the present invention. A discharge tube lighting circuit 310 in FIG. 46 comprises an AC power source V26, a 4-output compound transformers T133, and discharge tubes LP133 through LP136 such as a cold cathode fluorescent tube. The discharge tube lighting circuit 310 according to the present embodiment is a circuit which supplies the same output of the compound transformer to both polarities of the discharge tubes of the discharge tube lighting circuit 300 shown in FIG. 45. The AC power source V26 of the discharge tube lighting circuit 310 is connected to terminals P1 and P2 of the primary winding of the transformer T133.

Also, the primary winding and all of the secondary windings of the compound transformer T133 are subjected to magnetic coupling at a common core, a first secondary winding is made up of terminals S3 and S4, a second secondary winding is made up of terminals S5 and S6, a third secondary winding is made up of terminals S7 and S8, and a fourth secondary winding is made up of terminals S9 and S10.

A first terminal of the discharge tube LP133 is connected to a terminal S4 of the first secondary winding of the transformer T133, and a second terminal of the discharge tube LP133 is connected to a terminal S5 of the second secondary winding of the transformer T133. Also, a first terminal of the discharge tube LP134 is connected to a terminal S6 of the second secondary winding of the transformer T133, and a second terminal of the discharge tube LP134 is connected to a terminal S7 of the third secondary winding of the transformer T133. Similarly, a first terminal of the discharge tube LP135 is connected to a terminal S8 of the third secondary winding of the transformer T133, and a second terminal of the discharge tube LP135 is connected to a terminal S9 of the fourth secondary winding of the transformer T133. Also, a first terminal of the discharge tube LP136 is connected to a terminal S10 of the fourth first secondary winding of the transformer T133, and a second terminal of the discharge tube LP136 is connected to a terminal S3 of the first secondary winding of the transformer T133. Thus, the discharge tube LP133, the second secondary winding of the transformer T133, the discharge tube LP134, the third secondary winding of the transformer T133, the discharge tube LP135, the fourth secondary winding of the transformer T133, and the discharge tube LP136 are connected in series, and in addition, the first secondary winding of the transformer T133 and the discharge tube LP136 are also connected, and accordingly, these circuit components makes up a loop.

Thus, an anti-polarity voltage is applied to both ends of any of the discharge tubes LP133 through LP136 by connecting the secondary windings of the transformers T133 with the discharge tubes LP133 through LP136. Also, a different polarity voltage is alternately applied to the right side terminals of the discharge tubes LP133 through LP136, and similarly, a different polarity voltage is alternately applied to the left side terminals of the discharge tubes LP133 through LP136 as well.

With the present embodiment, the number of the transformers is 1, and on the other hand, the number of the discharge tubes is also 4, and accordingly, a multi-output compound transformer is necessary, but in theory, upon the number of the secondary windings being increased, the number of the discharge tubes can be increased without increasing the number of the transformers. Also, the present embodiment provides a configuration wherein the discharge tubes are connected in series at the secondary side of the transformer, but the secondary windings of the transformer and the discharge tubes are alternately connected in series, so accumulation of voltage while lighting is suppressed at the minimum. Also, as described above, an anti-polarity voltage is applied to both ends of the discharge tubes, and further, polarity is reversed regarding the discharge tubes which are adjacently disposed, and accordingly, an advantage is provided wherein noise scarcely occurs. In addition, luminance irregularities between the discharge tubes are eliminated.

Thirty-third Embodiment

Figure 47A:
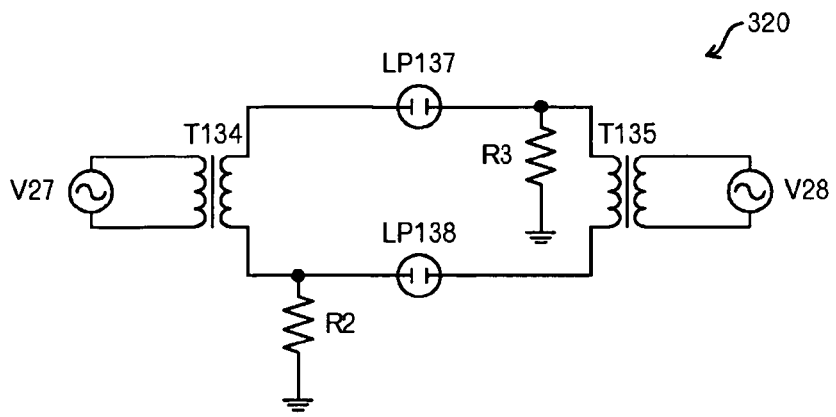
FIG. 47A is a circuit diagram according to a thirty-third embodiment of the present invention.

FIG. 47A illustrates a discharge tube driving circuit 320 according to a thirty-third embodiment of the present invention. The discharge tube driving circuit 320 in FIG. 47A comprises AC power sources V27 and V28, discharge tubes LP137 and LP138 such as a cold cathode fluorescent tube, resistances R2 and R3, and transformers T134 and T135. The resistance values of the resistances R2 and R3 are preferably 10 MΩ through 100 MΩ from the perspective of ground properties and current balance, for example.

The AC power source V27 is connected to the primary winding of the transformer T134, and the AC power source V28 is connected to the primary winding of the transformer T135. The AC power sources V27 and V28 are controlled such that an anti-polarity voltage occurs at both ends of the discharge tubes LP137 and LP138, though not shown in the drawing. That is to say, the discharge tubes are subjected to differential driving. Also, an arrangement may be made wherein a single AC power source is connected to the primary windings of the transformers T134 and T135 without separating an AC power source. Also, one end of the secondary winding of the transformer T134 is connected to one end of the discharge tube LP137, and the other end of the secondary winding of the transformer T134 is connected to one end of the resistance R2 and one end of the discharge tube LP138. The other end of the resistance R2 is grounded. Also, the other end of the discharge tube LP137 is connected to one end of the secondary winding of the transformer T135 and one end of the resistance R3. The other end of the resistance R3 is grounded. The other end of the discharge tube LP138 is connected to the other end of the secondary winding of the transformer T135.

Thus, a closed loop is made up of the secondary winding of the transformer T134, the discharge tube LP137, the secondary winding of the transformer T135, and the discharge tube LP138. Also, this loop is grounded at two points via the resistances R2 and R3, which are high-resistances, in a DC manner, so an electric potential on the secondary winding side of the transformers T134 and T135 stabilizes. On the other hand, the secondary windings of the transformers T134 and T135 are in a floating state in an AC manner. Accordingly, the discharge tubes LP137 and LP138 are loop-connected in series in an AC manner, so current is made uniform, and also luminance irregularities of the discharge tubes are eliminated.

Note that with the present embodiment, the floating differential driving method is employed, so current does not flow on a full scale unless two portions where a high voltage is applied are touched, which scarcely causes electrocution, and provides high-safety. Also, an anti-polarity voltage is applied to both ends of the discharge tubes, and further, polarity is reversed regarding the discharge tubes which are adjacently disposed, and accordingly, an advantage is provided wherein noise scarcely occurs.

Figure 47B:
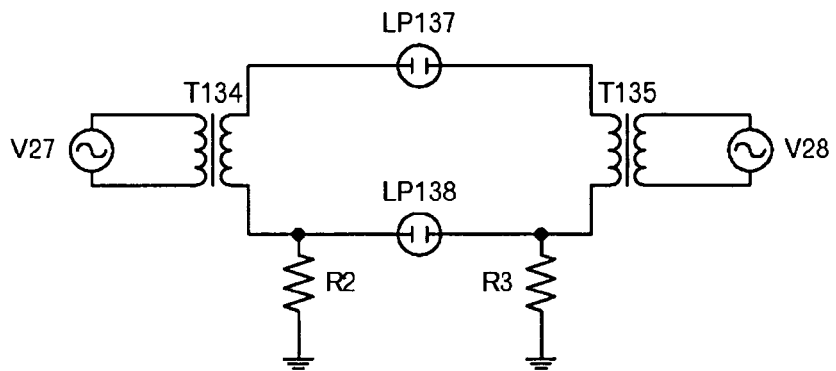
FIG. 47B is another circuit diagram according to the thirty-third embodiment of the present invention.

FIG. 47B illustrates a modification of the thirty-third embodiment. In FIG. 47A, resistance R2 has been connected to the discharge tube LP138, and the resistance R3 has been connected to the discharge tube LP137, but in the modification of FIG. 47B, the resistance R2 is connected to one end of the discharge tube LP38, and the resistance R3 is connected to the other end of the discharge tube LP138. Note that the resistances R2 and R3 may be connected to the discharge tube LP137 instead of the discharge tube LP138. Even if the resistances R2 and R3 are connected in this way, almost the same advantages as FIG. 47A can be realized.

Note that all that is required regarding the resistance R2 and R3 for grounding is to be grounded in a DC manner, so coils or the like may be employed, for example.

Thirty-fourth Embodiment

Figure 48:
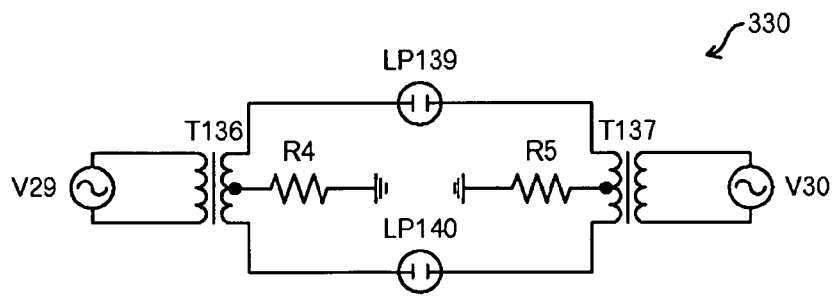
FIG. 48 is a circuit diagram according to a thirty-fourth embodiment of the present invention.

FIG. 48 illustrates a discharge tube driving circuit 330 according to a thirty-fourth embodiment of the present invention. The discharge tube driving circuit 330 in FIG. 48 comprises AC power sources V29 and V30, discharge tubes LP139 and LP140, resistances R4 and R5, and transformers T136 and T137 of which the secondary winding side is provided with a center tap.

The AC power source V29 is connected to the primary winding of the transformer T136, and the AC power source V30 is connected to the primary winding of the transformer T137. Though not shown in the drawing, the AC power sources V29 and V30 are controlled such that an anti-polarity voltage occurs at both ends of the discharge tubes LP139 and LP140. That is to say, the discharge tubes are subjected to differential driving. Also, an arrangement may be made wherein a single AC power source is connected to the primary windings of the transformers T136 and T137 without separating an AC power source. Also, one end of the secondary winding of the transformer T136 is connected to one end of the discharge tube LP139, and the other end of the discharge tube LP139 is connected to one end of the secondary winding of the transformer T137. The other end of the secondary winding of the transformer T137 is connected to one end of the discharge tube LP140, and the other end of the discharge tube LP140 is connected to the other end of the secondary winding of the transformer T136. The center tap of the secondary winding of the transformer T136 is grounded via the resistance R4 which is a high resistance, and the center tap of the secondary winding of the transformer T137 is grounded via the resistance R5 which is a high resistance.

Thus, with the thirty-fourth embodiment as well, a closed loop is made up of the secondary winding of the transformer T136, the discharge tube LP139, the secondary winding of the transformer T137, and the discharge tube LP140. Also, this loop is grounded at two points via the resistances R4 and R5, which are high-resistances, in a DC manner, so an electric potential on the secondary winding side of the transformers T139 and T140 stabilizes. On the other hand, the secondary windings of the transformers T139 and T140 are in a floating state in an AC manner. Accordingly, the discharge tubes LP139 and LP140 are loop-connected in series in an AC manner, so current is made uniform, and also luminance irregularities of the discharge tubes are eliminated.

Note that with the thirty-fourth embodiment, the floating differential driving method is employed, as with the thirty-third embodiment, but the difference between the two embodiments is in that the center taps of the secondary windings of the transformers T136 and T137 are grounded via the resistances. Accordingly, with the thirty-fourth embodiment, current is in a balanced state, electric potential difference is not caused at both ends of the resistances R4 and R5, current does not flow, thereby reducing loss as compared with the thirty-third embodiment.

Thirty-fifth Embodiment

Figure 49:
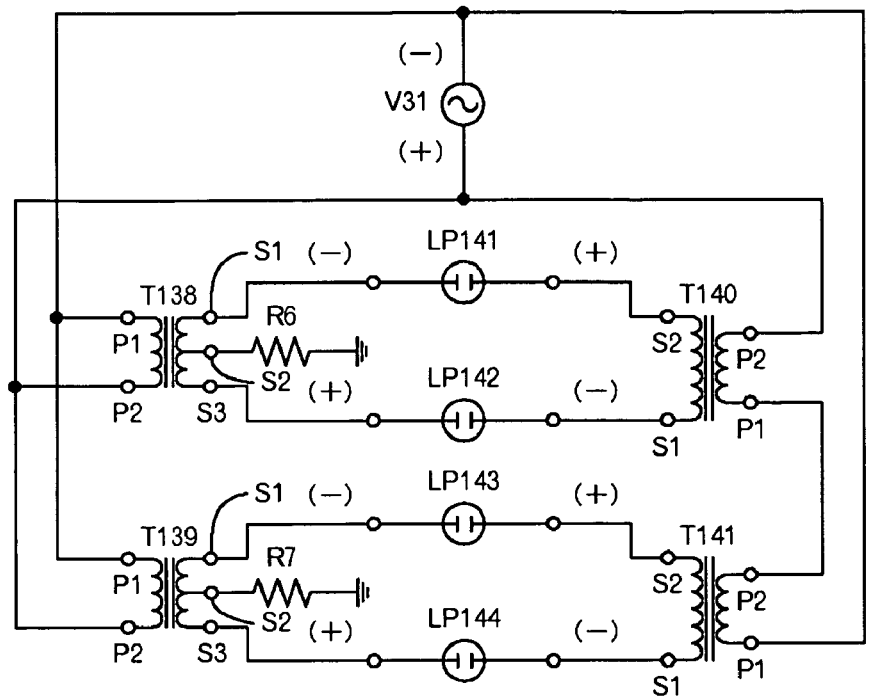
FIG. 49 is a circuit diagram according to a thirty-fifth embodiment of the present invention.

FIG. 49 illustrates a discharge tube driving circuit 340 according to a thirty-fifth embodiment of the present invention. The discharge tube driving circuit 340 in FIG. 49 comprises an AC power source V31, transformers T138 through T141, and discharge tubes LP141 through LP144, and resistances R6 and R7. The AC power source V31 is connected to terminals P1 and P2 of the primary winding of the transformer T138, terminals P1 and P2 of the primary winding of the transformer T139, a terminal P2 of the primary winding of the transformer T140, and a terminal P1 of the primary winding of the transformer T141. Also, a terminal P1 of the primary winding of the transformer T140 is connected to a terminal P2 of the primary winding of the transformer T141. That is to say, the primary winding of the transformer T138 and the primary winding of the transformer T139 are connected in parallel. Also, the primary winding of the transformer T140 and the primary winding of the transformer T141 are connected in series. Note that the transformer T138 and the transformer T140, and the transformer T139 and the transformer T141 are connected to the AC power source V31 so as to become a reversed phase. That is to say, the discharge tubes are subjected to differential driving. Also, the transformers T138 and T139 are transformers having a center tap S2 on the secondary winding side, and the center tap S2 of the secondary winding of the transformer T138 is grounded via the resistance R6 which is a high resistance. Also, the center tap S2 of the secondary winding of the transformer T139 is grounded via the resistance R7 which is a high resistance.

A first terminal of the discharge tube LP141 is connected to a terminal S1 of the secondary winding of the transformer T138, and a second terminal of the discharge tube LP141 is connected to a terminal S2 of the secondary winding of the transformer T140. Also, a first terminal of the discharge tube LP142 is connected to a terminal S3 of the secondary winding of the transformer T138, and a second terminal of the discharge tube LP142 is connected to a terminal S1 of the secondary winding of the transformer T140. Similarly, a first terminal of the discharge tube LP143 is connected to a terminal S1 of the secondary winding of the transformer T139, and a second terminal of the discharge tube LP143 is connected to a terminal S2 of the secondary winding of the transformer T141. Also, a first terminal of the discharge tube LP144 is connected to a terminal S3 of the secondary winding of the transformer T139, and a second terminal of the discharge tube LP144 is connected to a terminal S1 of the secondary winding of the transformer T144. Thus, a loop is configured with the discharge tubes LP141 and LP142 and the secondary windings of the transformers T138 and T140, and further, a loop is configured with the discharge tubes LP143 and LP144 and the secondary windings of the transformers T139 and T141.

According to such a configuration, current made to flow into each loop is made uniform, and further, the primary windings of the transformers T140 and T141 are connected in series, so current made to flow into each discharge tube belonged to both loops is also made uniform. That is to say, brightness of the discharge tubes is made uniform. Also, the secondary windings of the transformers and the discharge tubes are alternately connected in series, so voltage is never accumulated while lighting. Also, the number of the transformers is the same as the number of the discharge tubes.

Further, grounding the center taps S2 of the secondary windings of the transformers T138 and T139 via the resistances stabilizes the electric potential of the secondary windings of the transformers. On the other hand, this is in a floating state in an AC manner, so floating differential driving is performed. Note that current does not flow into both ends of the resistance in a balanced state, and accordingly, loss is reduced.

Note that with regard to the transformers T140 and T141 as well, an arrangement may be made wherein transformers having a center tap on the secondary winding side are employed, and the center taps are grounded via the resistances. Thus, the electric potential on the secondary winding side of the transformers stabilizes.

Thirty-sixth Embodiment

Figure 50:
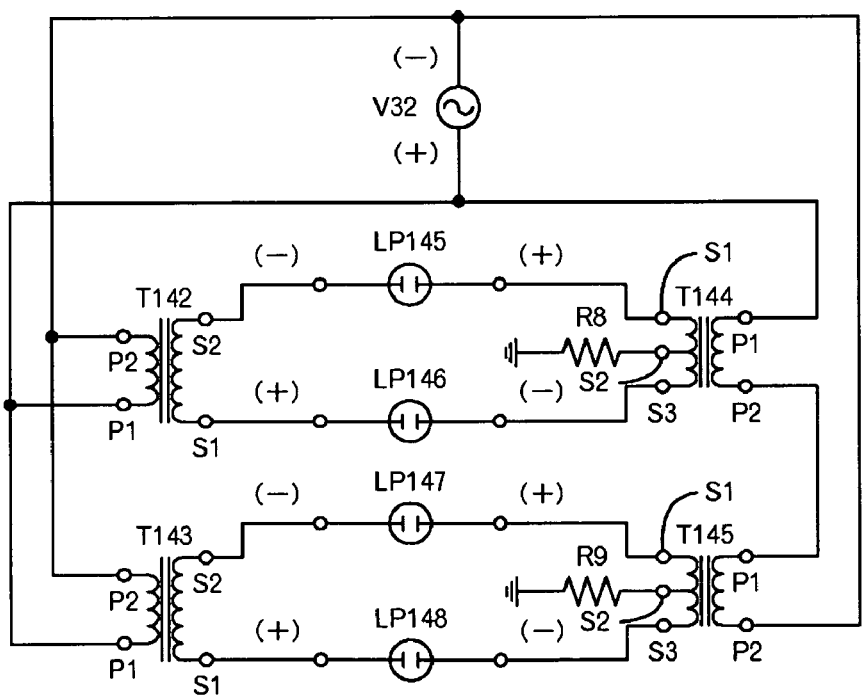
FIG. 50 is a circuit diagram according to a thirty-sixth embodiment of the present invention.

FIG. 50 illustrates a discharge tube driving circuit 350 according to a thirty-sixth embodiment of the present invention. The discharge tube driving circuit 350 in FIG. 50 comprises an AC power source V32, transformers T142 through T145, and discharge tubes LP145 through LP148, and resistances R8 and R9. The AC power source V32 is connected to terminals P1 and P2 of the primary winding of the transformer T142, terminals P1 and P2 of the primary winding of the transformer T143, a terminal P1 of the primary winding of the transformer T144, and a terminal P2 of the primary winding of the transformer T145. Also, a terminal P2 of the primary winding of the transformer T144 and a terminal P1 of the primary winding of the transformer T145 are connected. That is to say, the primary winding of the transformer T142 and the primary winding of the transformer T143 are connected in parallel. Also, the primary winding of the transformer T144 and the primary winding of the transformer T145 are connected in series. Note that the transformer T142 and the transformer T143, and the transformer T144 and the transformer T145 are connected to the AC power source V32 so as to become a reversed phase. That is to say, the discharge tubes are subjected to differential driving. Also, the transformers T144 and T145 are transformers having a center tap S2 on the secondary winding side, and the center tap S2 of the secondary winding of the transformer T144 is grounded via the resistance R8 which is a high resistance, and the center tap S2 of the secondary winding of the transformer T145 is grounded via the resistance R9 which is a high resistance. The difference as to FIG. 49 is in that the transformers having the center tap S2 are disposed not on the left side but on the right side.

A first terminal of the discharge tube LP145 is connected to a terminal S2 of the secondary winding of the transformer T142, and a second terminal of the discharge tube LP145 is connected to a terminal S1 of the secondary winding of the transformer T144. Also, a first terminal of the discharge tube LP146 is connected to a terminal S1 of the secondary winding of the transformer T142, and a second terminal of the discharge tube LP146 is connected to a terminal S3 of the secondary winding of the transformer T144. Similarly, a first terminal of the discharge tube LP147 is connected to a terminal S2 of the secondary winding of the transformer T143, and a second terminal of the discharge tube LP147 is connected to a terminal S1 of the secondary winding of the transformer T145. Also, a first terminal of the discharge tube LP148 is connected to a terminal S1 of the secondary winding of the transformer T143, and a second terminal of the discharge tube LP148 is connected to a terminal S3 of the secondary winding of the transformer T145. Thus, a loop is configured with the discharge tubes LP145 and LP146 and the secondary windings of the transformers T142 and T144, and further, a loop is configured with the discharge tubes LP147 and LP148 and the secondary windings of the transformers T143 and T145.

According to such a configuration, current made to flow into each loop is made uniform, and further, the primary windings of the transformers T144 and T145 are connected in series, so current made to flow into each discharge tube belonged to both loops is also made uniform. That is to say, brightness of the discharge tubes is made uniform. Also, the transformers and the discharge tubes are alternately connected in series, so voltage is never accumulated while lighting. Also, the number of the transformers is the same as the number of the discharge tubes.

Further, grounding the center taps S2 of the secondary windings of the transformers T144 and T145 via the resistances stabilizes the electric potential of the secondary windings of the transformers. On the other hand, this is in a floating state in an AC manner, so floating differential driving is performed. Note that current does not flow into both ends of the resistance in a balanced state, and accordingly, loss is reduced.

Thirty-seventh Embodiment

Figure 51:
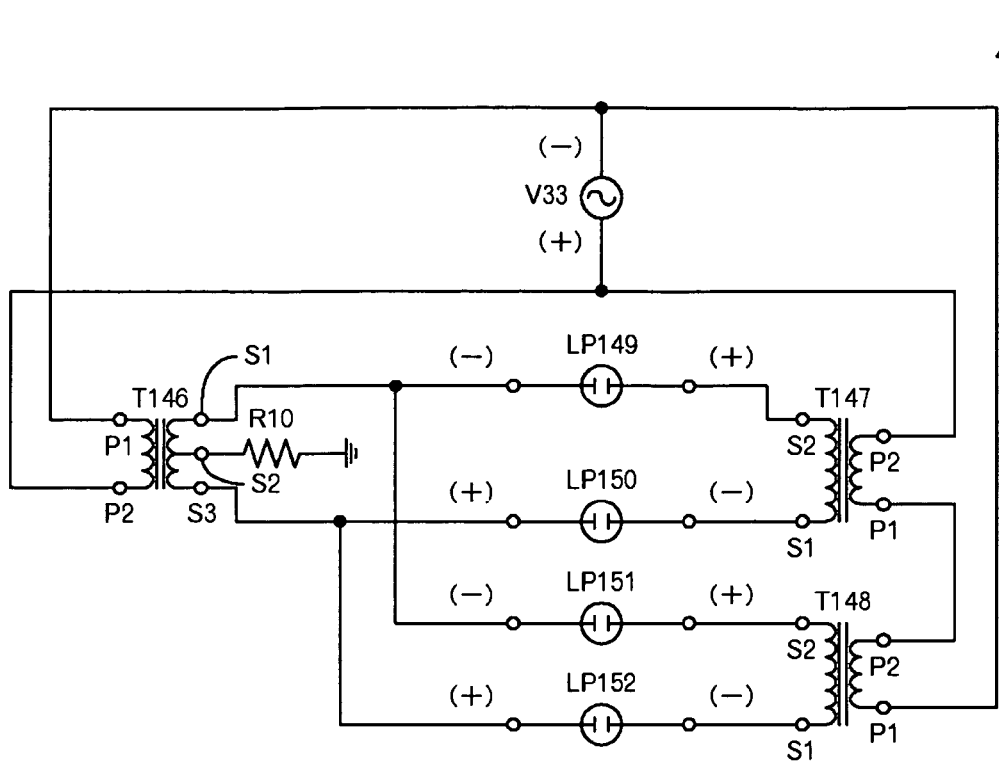
FIG. 51 is a circuit diagram according to a thirty-seventh embodiment of the present invention.

FIG. 51 illustrates a discharge tube driving circuit 360 according to a thirty-seventh embodiment of the present invention. The discharge tube driving circuit 360 in FIG. 51 comprises an AC power source V33, a transformer T146 having a center tap S2 on the secondary winding side, normal transformers T147 and T148, discharge tubes LP149 through LP152, and a resistance R10. The AC power source V33 is connected to terminals P1 and P2 of the primary winding of the transformer T146, a terminal P2 of the primary winding of the transformer T147, and a terminal P1 of the primary winding of the transformer T148. Also, a terminal P1 of the primary winding of the transformer T147 and a terminal P2 of the primary winding of the transformer T148 are connected. That is to say, the primary winding of the transformer T147 and the primary winding of the transformer T148 are connected in series. Note that the transformer T146, and the transformer T147 and the transformer T148 are connected to the AC power source V33 so as to become a reversed phase. That is to say, the discharge tubes are subjected to differential driving.

A first terminal of the discharge tube LP149 is connected to a terminal S1 of the secondary winding of the transformer T146, and a second terminal of the discharge tube LP149 is connected to a terminal S2 of the secondary winding of the transformer T147. Also, a first terminal of the discharge tube LP150 is connected to a terminal S3 of the secondary winding of the transformer T146, and a second terminal of the discharge tube LP150 is connected to a terminal S1 of the secondary winding of the transformer T147. Similarly, a first terminal of the discharge tube LP151 is connected to a terminal S1 of the secondary winding of the transformer T146, and a second terminal of the discharge tube LP151 is connected to a terminal S2 of the secondary winding of the transformer T148. Also, a first terminal of the discharge tube LP152 is connected to a terminal S3 of the secondary winding of the transformer T146, and a second terminal of the discharge tube LP152 is connected to a terminal S1 of the secondary winding of the transformer T148. Thus, a loop is configured with the discharge tubes LP149 and LP150 and the secondary windings of the transformers T146 and T147, and further, a loop is configured with the discharge tubes LP151 and LP152 and the secondary windings of the transformers T146 and T148. Also, the center tap S2 of the secondary winding of the transformer T146 is grounded via the resistance R10 which is a high resistance.

The discharge tube driving circuit 360 shown in FIG. 51 is a circuit obtained by sharing the transformers on the left side in FIG. 49, the number of transformers becomes (the number of discharge tubes/2+1), thereby reducing the number of transformers. However, with regard to the transformer T146, a transformer greater than the transformer T138 is necessary. The portions other than this have basically the same properties as those in the thirty-fifth embodiment. That is to say, current made to flow into each loop belonged to both loops is made uniform, and further, the primary windings of the transformers T147 and T148 are connected in series, so current made to flow into each discharge tube is also made uniform. That is to say, brightness of the discharge tubes is made uniform. Also, the transformers and the discharge tubes are alternately connected in series, so voltage is never accumulated while lighting.

Further, grounding the center taps S2 of the secondary windings of the transformer T146 via the high-resistance resistance R10 stabilizes the electric potential of the secondary winding of the transformer. On the other hand, this is in a floating state in an AC manner, so floating differential driving is performed. Note that current does not flow into both ends of the resistance in a balanced state, and accordingly, loss is reduced.

Note that with regard to the transformers T147 and T148 as well, an arrangement may be made wherein transformers having a center tap on the secondary winding side are employed, and the center taps are grounded via the resistances. Thus, the electric potential on the secondary winding side of the transformers stabilizes.

Thirty-eighth Embodiment

Figure 52:
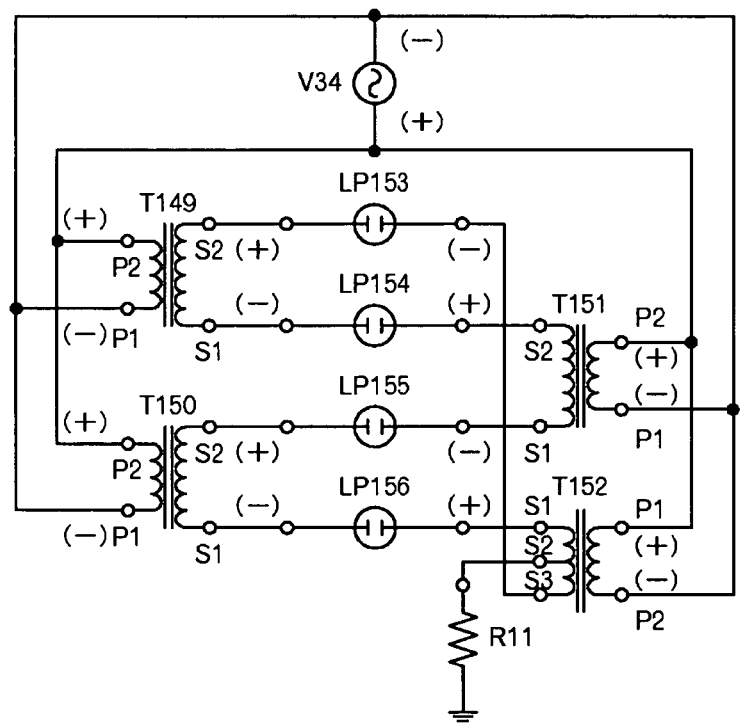
FIG. 52 is a circuit diagram according to a thirty-eighth embodiment of the present invention.

FIG. 52 illustrates a discharge tube driving circuit 370 according to a thirty-eighth embodiment of the present invention. The discharge tube driving circuit 370 in FIG. 52 comprises an AC power source V34, transformers T149 through T152, and discharge tubes LP153 through LP156, and a resistance R11. The AC power source V34 is connected to terminals P1 and P2 of the primary winding of the transformer T149, terminals P1 and P2 of the primary winding of the transformer T150, terminals P1 and P2 of the primary winding of the transformer T151, and terminals P1 and P2 of the primary winding of the transformer T152. That is to say, all of the primary windings of the transformers T149 through T152 are connected to the AC power source in parallel.

A first terminal of the discharge tube LP153 is connected to a terminal S2 of the secondary winding of the transformer T149, and a second terminal of the discharge tube LP153 is connected to a terminal S3 of the secondary winding of the transformer T152. Thus, in the event that the discharge tubes LP153 through LP156 are disposed in parallel, and also each transformer is disposed to both sides of the discharge tubes, the secondary windings of the transformers T149 and T152, which are diagonally disposed, are connected via the discharge tube. Also, a first terminal of the discharge tube LP154 is connected to a terminal S1 of the secondary winding of the transformer T149, and a second terminal of the discharge tube LP154 is connected to a terminal S2 of the secondary winding of the transformer T151. Similarly, a first terminal of the discharge tube LP155 is connected to a terminal S1 of the secondary winding of the transformer T151, and a second terminal of the discharge tube LP155 is connected to a terminal S2 of the secondary winding of the transformer T150. Also, a first terminal of the discharge tube LP156 is connected to a terminal S1 of the secondary winding of the transformer T150, and a second terminal of the discharge tube LP156 is connected to a terminal S1 of the secondary winding of the transformer T152. Thus, a loop is configured with the discharge tube LP153, the secondary winding of the transformer T149, the discharge tube LP154, the secondary winding of the transformer T151, the discharge tube LP155, the secondary winding of the transformer T150, the discharge tube LP156, and the secondary winding of the transformer T152, and further, the secondary winding of the transformer T152 and the discharge tube LP153 are connected serially, so these circuit components make up a loop. Also, the discharge tubes and the secondary windings of the transformers are alternately connected. Note that the center tap S2 of the secondary winding of the transformer T152 is grounded via the resistance R11 which is a high resistance.

Also, the primary windings of the transformers T149 through T152 are connected to the AC power source V34, and also the secondary windings of the transformers T149 through T152 are connected to the discharge tubes LP153 through LP156 such that an anti-polarity voltage is applied to both ends of any of the discharge tubes LP153 through LP156. Also, a different polarity voltage is alternately applied to the right side terminals of the discharge tubes LP153 through LP156, and similarly, a different polarity voltage is alternately applied to the left side terminals of the discharge tubes LP153 through LP156 as well.

With the present embodiment, the number of the transformers is 4, and on the other hand, the number of the discharge tubes is also 4, i.e., the number of the transformers is not increased as compared with the number of the discharge tubes. Also, the present embodiment provides a configuration wherein the discharge tubes are connected in series at the secondary winding side of the transformers, but the secondary windings of the transformers and the discharge tubes are alternately connected in series, so accumulation of voltage while lighting is suppressed at the minimum. Also, an anti-polarity voltage is applied to both ends of the discharge tubes, and further, polarity is reversed regarding the discharge tubes which are adjacently disposed, and accordingly, an advantage is provided wherein noise scarcely occurs. In addition, luminance irregularities between the discharge tubes are eliminated.

Further, grounding the center taps S2 of the secondary windings of the transformer T152 via the resistance R10 stabilizes the electric potential of the secondary winding of the transformer. On the other hand, this is in a floating state in an AC manner, so floating differential driving is performed. That is to say, current does not flow on a full scale unless two portions where a high voltage is applied are touched, which scarcely causes electrocution, and provides high-safety. Note that current does not flow into both ends of the resistance in a balanced state, and accordingly, loss is reduced.

Figure 53:
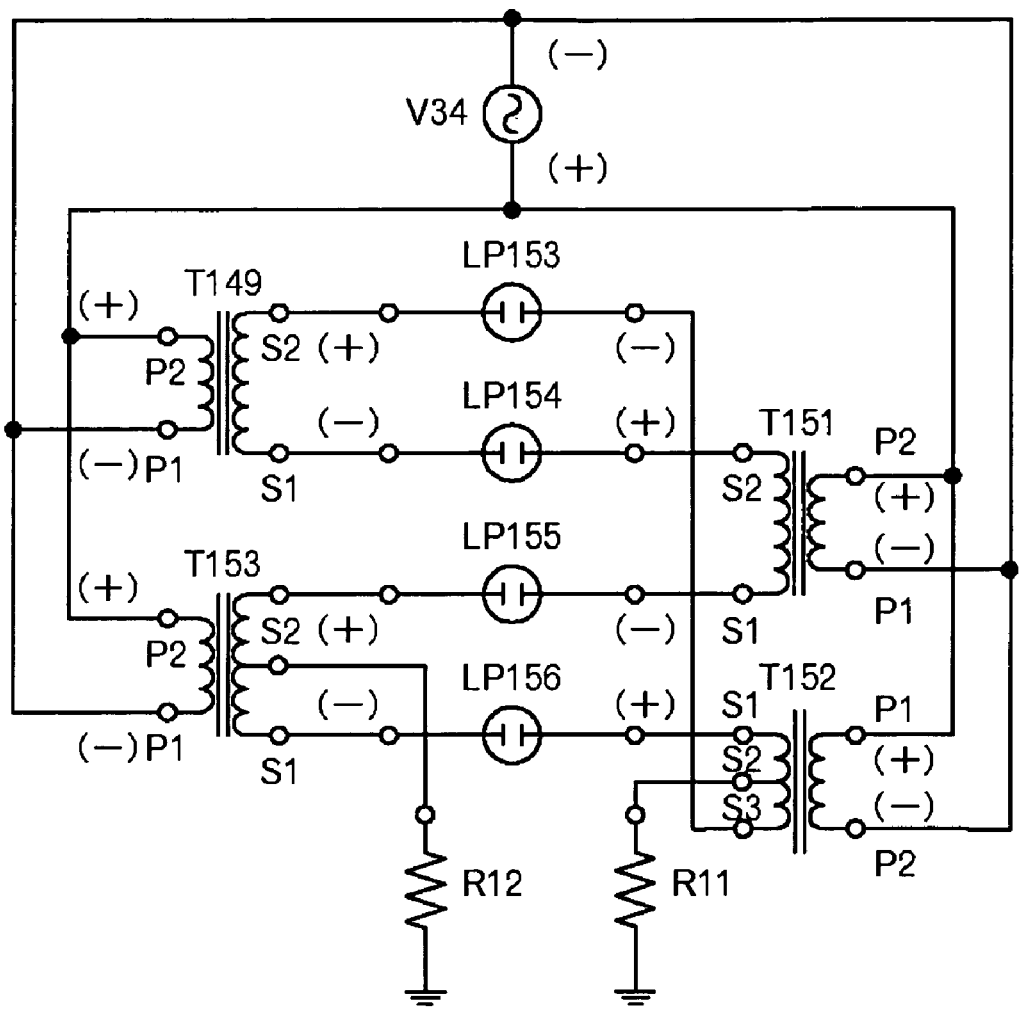
FIG. 53 is another circuit diagram according to the thirty-eighth embodiment of the present invention.

Note that FIG. 52 illustrates the example wherein only one location in the closed loop made up of the secondary winding of the transformers and discharge tubes is grounded via the resistance R11 which is a high resistance, but as shown in FIG. 53, a discharge tube driving circuit 375 wherein a transformer T153 having a center tap on the secondary winding side instead of the transformer T150 is employed, and further, a center tap S2 of the secondary winding of the transformer T153 is grounded via a resistance R12 which is a high resistance, may be employed. Thus, the electric potential in the closed loop is further stabilized. More preferably, all of the transformers are replaced with transformers having a center tap, and the center tap is grounded via a resistance.

Thirty-ninth Embodiment

Figure 54:
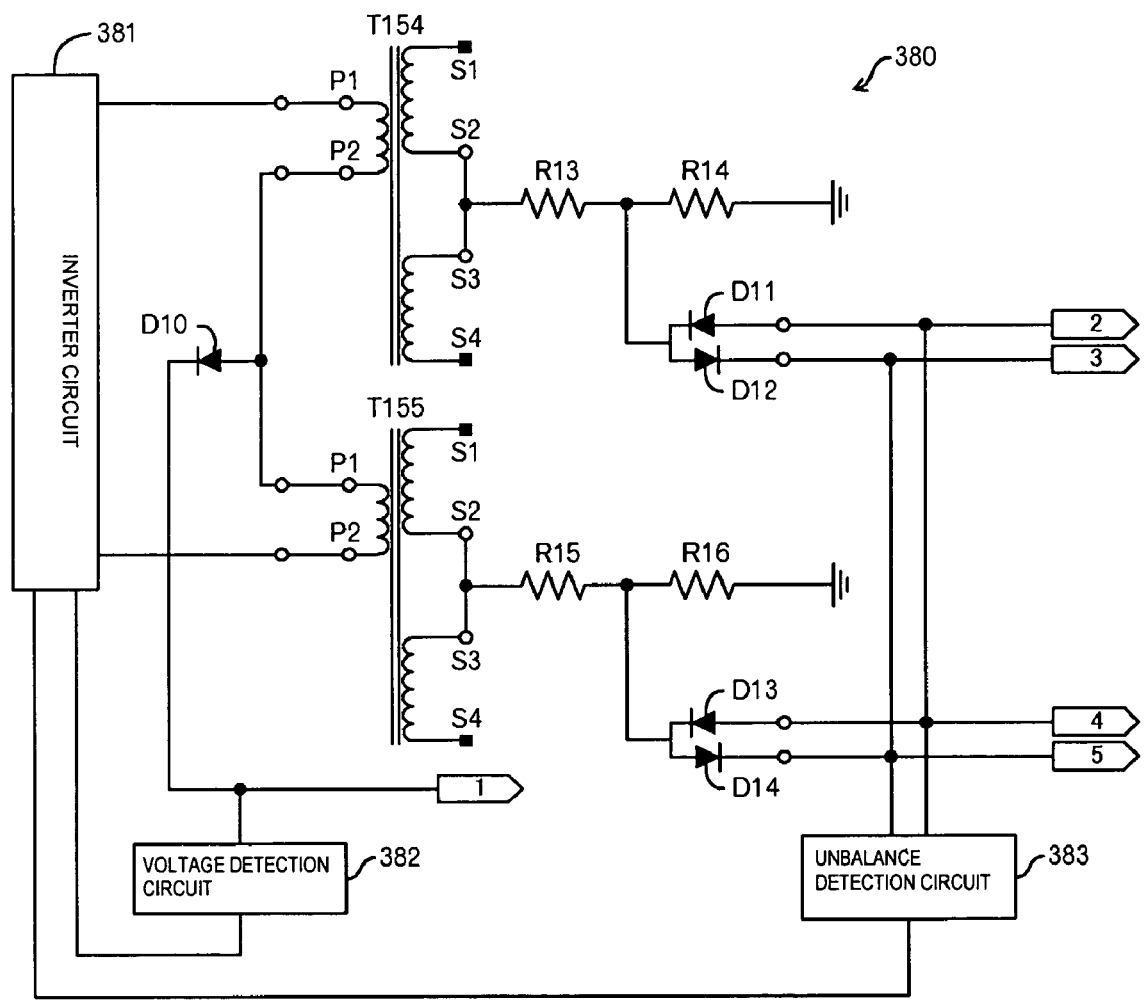
FIG. 54 is a circuit diagram according to a thirty-ninth embodiment of the present invention.

FIG. 54 illustrates a discharge tube driving circuit 380 according to a thirty-ninth embodiment of the present invention (only the left half excluding discharge tubes). The discharge tube driving circuit 380 in FIG. 54 comprises transformers T154 and T155, resistances R13 through R16, diodes D10 through D14, an inverter circuit 381 including an inverter power source and a control circuit as to the inverter power source, a voltage detection circuit 382 for detecting the maximum voltage on the primary winding side of transformers such as the transformers T154 and T155, and outputting a detection signal to the inverter circuit 381, and an unbalance detection circuit 383 for detecting unbalance of current made to flow on the secondary winding side of transformers such as the transformers T154 and T155, and outputting an unbalance detection signal to the inverter circuit 381. The transformer T154 has the primary winding including terminals P1 and P2, and the secondary winding including terminals S1 and S4 connected to unshown discharge tubes, and terminals S2 and S3 serving as center taps. Similarly, the transformer T155 has the primary winding including terminals P1 and P2, and the secondary winding including terminals S1 and S4 connected to unshown discharge tubes, and terminals S2 and S3 serving as center taps.

The terminal P1 of the primary winding of the transformer T154 is connected to one end of the inverter circuit 381, and the terminal P2 of the primary winding of the transformer T155 is connected to the other end of the inverter circuit 381. The terminal P2 of the primary winding of the transformer T154 is connected to the anode of the diode D10, and the terminal P1 of the primary winding of the transformer T155. Also, the terminal P1 of the primary winding of the transformer T155 is connected to the anode of the diode D10, and the terminal P2 of the primary winding of the transformer T154. The cathode of the diode D10 is connected to the voltage detection circuit 382 along with the cathode of a diode connected to the primary winding of a transformer on the right side of a discharge tube (not shown). Note that the cathode of the diode connected to the primary winding of the transformer on the right side of the discharge tube is connected to the voltage detection circuit 382 via a terminal 1. Thus, an arrangement is made wherein the voltage detection circuit 382 detects the maximum voltage of the voltage on the primary winding side of the transformers included in the discharge tube driving circuit 380. The voltage detection circuit 382 is connected to the inverter circuit 381, and outputs a detection signal according to the detected maximum voltage to the inverter circuit 381. The inverter circuit 381 adjusts output of the inverter circuit 381 according to the detection signal in some cases, and stops output of the inverter circuit 381 to protect the discharge tube driving circuit 380 in some cases. Upon output of the inverter circuit 381 being stopped, the discharge tube driving circuit 380 makes the transition to an operation suspended state.

On the other hand, the terminal S1 of the first secondary winding of the transformer T154 is connected to one end of an unshown first discharge tube. Also, the terminal S2 of the first secondary winding of the transformer T154 is connected to the terminal S3 of the second secondary winding, and further connected to one end of the resistance R13. The other end of the resistance R13 is connected to one end of the resistance R14, and the other end of the resistance R14 is grounded. The terminal S4 of the second secondary winding of the transformer T154 is connected to one end of an unshown second discharge tube. Thus, the intermediate terminals of the secondary winding of the transformer T154 are grounded via the resistances R13 and R14. Also, a closed loop is made up of the secondary winding of the transformer T154, the first and second discharge tubes, and the secondary winding of the unshown transformer on the right side. The cathode of the diode D11 and the anode of the diode D12 are connected to the connection point of the resistance R13 and the resistance R14, and the anode of the diode D11 is connected to the same configuration on the right side of the discharge tube via a terminal 2. Also, the cathode of the diode D12 is connected to the same configuration on the right side of the discharge tube via a terminal 3.

Further, the terminal S1 of the first secondary winding of the transformer T155 is connected to one end of an unshown third discharge tube. Also, the terminal S2 of the first secondary winding of the transformer T155 is connected to the terminal S3 of the second secondary winding, and further connected to one end of the resistance R15. The other end of the resistance R15 is connected to one end of the resistance R16, and the other end of the resistance R16 is grounded. The terminal S4 of the second secondary winding of the transformer T155 is connected to one end of an unshown fourth discharge tube. Thus, the intermediate terminals of the secondary winding of the transformer T155 are grounded via the resistances R15 and R16. Also, a closed loop is made up of the secondary winding of the transformer T155, the third and fourth discharge tubes, and the secondary winding of the unshown transformer on the right side. The cathode of the diode D13 and the anode of the diode D14 are connected to the connection point of the resistance R15 and the resistance R16.

The anode of the diode D13 is connected to the same configuration on the right side of the discharge tube via a terminal 4, and also connected to the anode of the diode D11 and the terminal 2. The cathode of the diode D14 is connected to the same configuration on the right side of the discharge tube via a terminal 5, and also connected to the cathode of the diode D12 and a terminal 3. Thus, the unbalance detection circuit 383 detects an unbalance voltage caused by current made to flow into the resistances R13 and R14, the resistances R15 and R16, and the like via the diodes D11 through D14, and the diode having the same configuration on the right side of the discharge tube. In the case of a balanced state, current seldom flows, so when the unbalance detection circuit 383 detects an unbalanced voltage, this means that something is wrong with any of the discharge tubes. The unbalance detection circuit 383 is connected to the inverter circuit 381, and outputs an unbalance detection signal corresponding to the detected unbalanced voltage to the inverter circuit 381. Upon the inverter circuit 381 detecting an unbalance detection signal indicating an abnormal situation at the time of normal operation, the inverter circuit 381 stops output of the inverter circuit 381 to protect the discharge tube driving circuit 380. Upon output of the inverter circuit 381 being stopped, the discharge tube driving circuit 380 makes the transition to an operation suspended state.

Also, in the case in which one side of the discharge tubes is not lit at the time of start-up, this is not an abnormal situation, but an unbalanced voltage is generated. At this time as well, voltage is concentrated on the unlighted side, so one side of the transformers is subjected to an excessive voltage, spark to be generated may subject the transformers and peripheral circuits to damage. To this end, as described above, an unbalance detection signal is fed back from the unbalance detection circuit 383 to the inverter circuit 381, and the inverter circuit 381 automatically adjusts the output voltage of the inverter circuit 381 so as not to become an excessive voltage.

Note that various control methods at the inverter circuit 381 may be available. For example, an arrangement may be made wherein a signal having a higher voltage is selected from the unbalance detection signal from the unbalance detection circuit 383 and the detection signal from the voltage detection circuit 383, and the output voltage of the inverter circuit 381 is adjusted or stopped based on the selected signal. Note that with the unbalance detection circuit 383, the voltage detection circuit 382 or the inverter circuit 381, at least any one of the unbalance detection signal of the unbalance detection circuit 383 and the detection signal of the voltage detection circuit 382 is subjected to weighting with a coefficient appropriate for performing a comparison.

Further, an arrangement may be made wherein with the inverter circuit 381, the electric potential of each polarity terminal on the secondary winding side of the transformers is estimated by synthesizing the unbalance detection signal of the unbalance detection circuit 383 with the detection signal of the voltage detection circuit 382 to generate a new control signal, thereby employing this for protection control of antiground potential voltage withstanding capabilities.

Fortieth Embodiment

Figure 55:
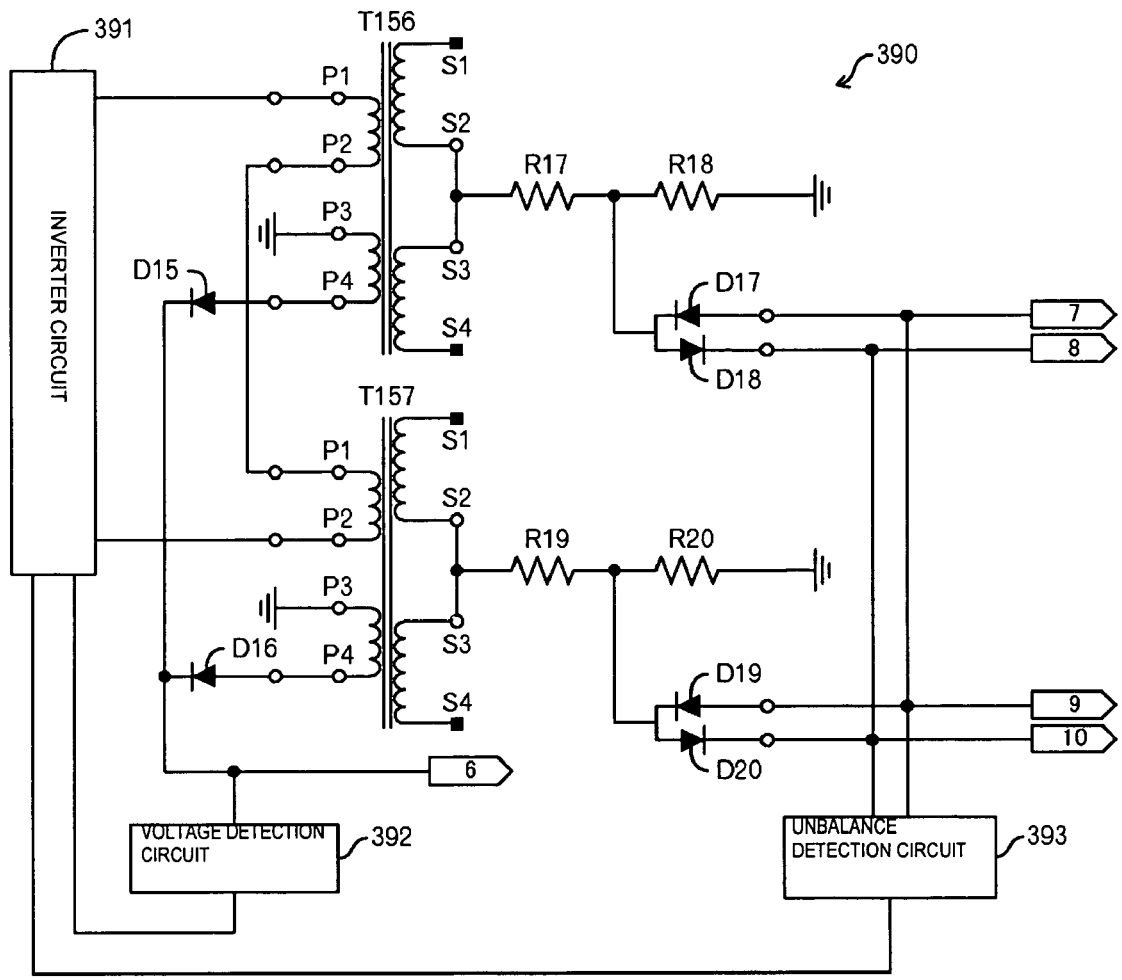
FIG. 55 is a circuit diagram according to a fortieth embodiment of the present invention.

FIG. 55 illustrates a discharge tube driving circuit 390 according to a fortieth embodiment of the present invention (only the left half excluding discharge tubes). The discharge tube driving circuit 390 in FIG. 55 comprises transformers T156 and T157, resistances R17 through R20, diodes D15 through D20, an inverter circuit 391 including an inverter power source and a control circuit as to the inverter power source, a voltage detection circuit 392 for detecting the maximum voltage on the tertiary winding side of transformers such as the transformers T156 and T157, and outputting a detection signal to the inverter circuit 391, and an unbalance detection circuit 393 for detecting unbalance of current made to flow on the secondary winding side of transformers such as the transformers T156 and T157, and outputting an unbalance detection signal to the inverter circuit 391. The transformer T156 has the primary winding including terminals P1 and P2, the secondary winding including terminals S1 and S4 connected to unshown discharge tubes and terminals S2 and S3 serving as center taps, and the tertiary winding including terminals P3 and P4. Similarly, the transformer T157 has the primary winding including terminals P1 and P2, the secondary winding including terminals S1 and S4 connected to unshown discharge tubes and terminals S2 and S3 serving as center taps, and the tertiary winding including terminals P3 and P4. The tertiary windings are provided for estimating voltage to be generated on the secondary winding side.

The terminal P1 of the primary winding of the transformer T156 is connected to one end of the inverter circuit 391, and the terminal P2 of the primary winding of the transformer T157 is connected to the other end of the inverter circuit 391. The terminal P2 of the primary winding of the transformer T156 is connected to the terminal P1 of the primary winding of the transformer T157. Also, the terminal P3 of the tertiary winding of the transformer T156 is grounded, and the terminal P4 thereof is connected to the anode of the diode D15. Similarly, the terminal P3 of the tertiary winding of the transformer T157 is grounded, and the terminal P4 thereof is connected to the anode of the diode D16. The cathodes of the diodes D15 and D16 are connected to the voltage detection circuit 392 along with the cathode of a diode connected to the tertiary winding of a transformer on the right side of a discharge tube (not shown). Note that the cathode of the diode connected to the tertiary winding of the transformer on the right side of the discharge tube is connected to the voltage detection circuit 392 via a terminal 6. Thus, an arrangement is made wherein the voltage detection circuit 392 detects the maximum voltage of the voltage on the tertiary winding side of the transformers included in the discharge tube driving circuit 390. The voltage detection circuit 392 is connected to the inverter circuit 391, and outputs a detection signal according to the detected maximum voltage to the inverter circuit 391. The inverter circuit 391 adjusts output of the inverter circuit 391 according to the detection signal in some cases, and stops output of the inverter circuit 391 to protect the discharge tube driving circuit 390 in some cases. Upon output of the inverter circuit 391 being stopped, the discharge tube driving circuit 390 makes the transition to an operation suspended state.

On the other hand, the terminal S1 of the first secondary winding of the transformer T156 is connected to one end of an unshown first discharge tube. Also, the terminal S2 of the first secondary winding of the transformer T156 is connected to the terminal S3 of the second secondary winding, and further connected to one end of the resistance R17. The other end of the resistance R17 is connected to one end of the resistance R18, and the other end of the resistance R18 is grounded. The terminal S4 of the second secondary winding of the transformer T156 is connected to one end of an unshown second discharge tube. Thus, the intermediate terminals of the secondary winding of the transformer T156 are grounded via the resistances R17 and R18. Also, a closed loop is made up of the secondary winding of the transformer T156, the first and second discharge tubes, and the secondary winding of the unshown transformer on the right side. The cathode of the diode D17 and the anode of the diode D18 are connected to the connection point of the resistance R17 and the resistance R18, and the anode of the diode D17 is connected to the same configuration on the right side of the discharge tube via a terminal 7. Also, the cathode of the diode D18 is connected to the same configuration on the right side of the discharge tube via a terminal 8.

Further, the terminal S1 of the first secondary winding of the transformer T157 is connected to one end of an unshown third discharge tube. Also, the terminal S2 of the first secondary winding of the transformer T157 is connected to the terminal S3 of the second secondary winding, and further connected to one end of the resistance R19. The other end of the resistance R19 is connected to one end of the resistance R20, and the other end of the resistance R20 is grounded. The terminal S4 of the second secondary winding of the transformer T157 is connected to one end of an unshown fourth discharge tube. Thus, the intermediate terminals of the secondary winding of the transformer T157 are grounded via the resistances R19 and R20. Also, a closed loop is made up of the secondary winding of the transformer T157, the third and fourth discharge tubes, and the secondary winding of the unshown transformer on the right side. The cathode of the diode D19 and the anode of the diode D20 are connected to the connection point of the resistance R19 and the resistance R20.

The anode of the diode D19 is connected to the same configuration on the right side of the discharge tube via a terminal 9, and also connected to the anode of the diode D17 and the terminal 7. The cathode of the diode D20 is connected to the same configuration on the right side of the discharge tube via a terminal 10, and also connected to the cathode of the diode D18 and the terminal 8. Thus, the unbalance detection circuit 393 detects an unbalance voltage caused by current made to flow into the resistances R17 and R18, the resistances R19 and R20, and the like via the diodes D17 through D20, and the diode having the same configuration on the right side of the discharge tube. In the case of a balanced state, current seldom flows, so when the unbalance detection circuit 393 detects an unbalanced voltage, this means that something is wrong with any of the discharge tubes. The unbalance detection circuit 393 is connected to the inverter circuit 391, and outputs an unbalance detection signal corresponding to the detected unbalanced voltage to the inverter circuit 391. Upon the inverter circuit 391 detecting an unbalance detection signal indicating an abnormal situation at the time of normal operation, the inverter circuit 391 stops output of the inverter circuit 391 to protect the discharge tube driving circuit 390. Upon output of the inverter circuit 391 being stopped, the discharge tube driving circuit 390 makes the transition to an operation suspended state.

With regard to the control method of the inverter circuit 391, the same method as the inverter circuit 381 may be employed.

Forty-first Embodiment

Figure 56:
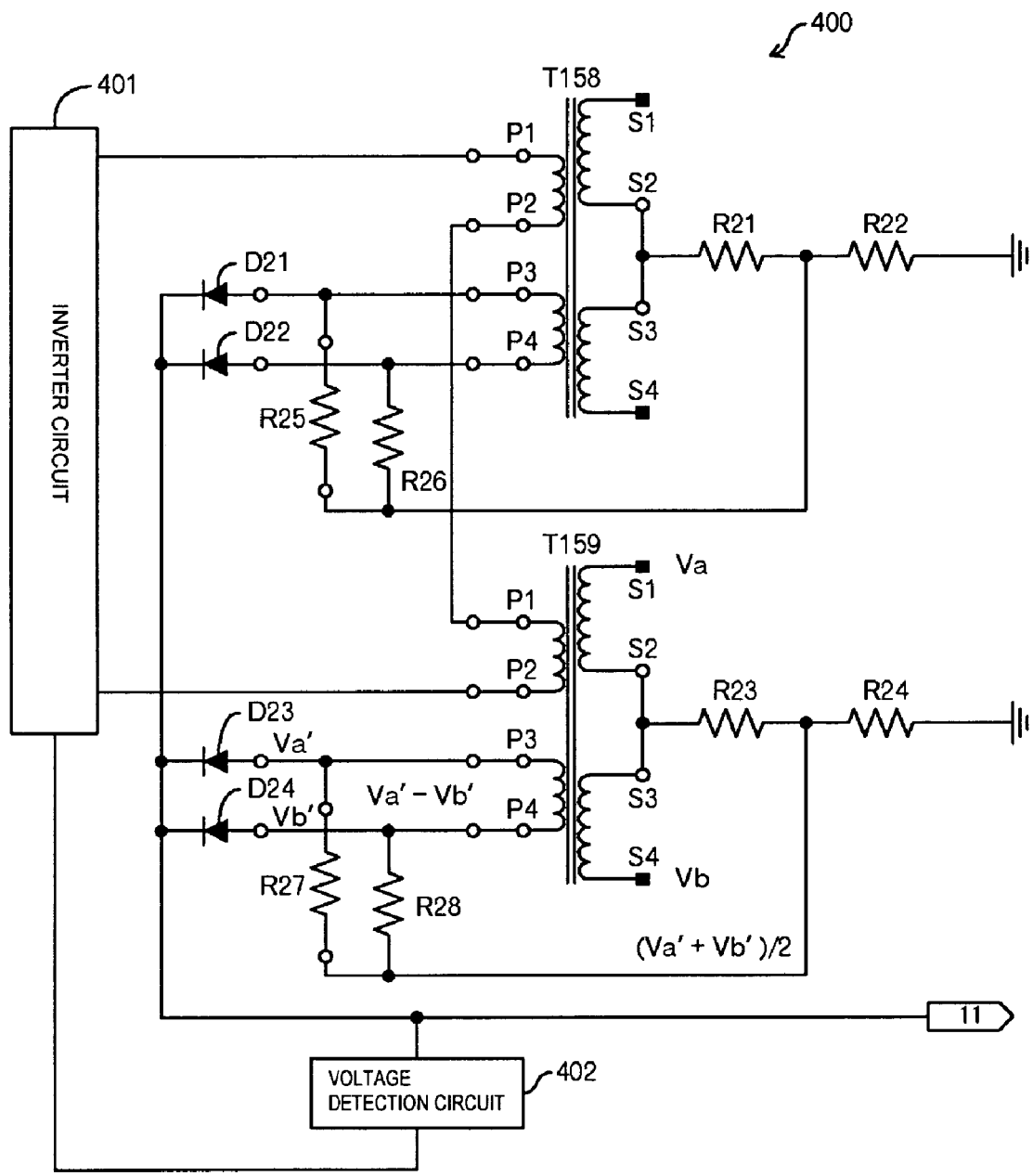
FIG. 56 is a circuit diagram according to a forty-first embodiment of the present invention.

FIG. 56 illustrates a discharge tube driving circuit 400 according to a forty-first embodiment of the present invention (only the left half excluding discharge tubes). The discharge tube driving circuit 400 in FIG. 56 comprises transformers T158 and T159, resistances R21 through R28, diodes D21 through D24, an inverter circuit 401 including an inverter power source and a control circuit as to the inverter power source, and a voltage detection circuit 402 for detecting the maximum voltage on the tertiary winding side of transformers such as the transformers T158 and T159, and outputting a detection signal to the inverter circuit 401. The transformer T158 has the primary winding including terminals P1 and P2, the secondary winding including terminals S1 and S4 connected to unshown discharge tubes and terminals S2 and S3 serving as center taps, and the tertiary winding including terminals P3 and P4. Similarly, the transformer T159 has the primary winding including terminals P1 and P2, the secondary winding including terminals S1 and S4 connected to unshown discharge tubes and terminals S2 and S3 serving as center taps, and the tertiary winding including terminals P3 and P4.

The terminal P1 of the primary winding of the transformer T158 is connected to one end of the inverter circuit 401, and the terminal P2 of the primary winding of the transformer T159 is connected to the other end of the inverter circuit 401. The terminal P2 of the primary winding of the transformer T158 is connected to the terminal P1 of the primary winding of the transformer T159. Also, the terminal P3 of the tertiary winding of the transformer T158 is connected to the anode of the diode D21 and one end of the resistance R25. The terminal P4 of the tertiary winding of the transformer T158 is connected to the anode of the diode D22 and one end of the resistance R26. For example, let us say that the resistance value of the resistance R25 is that of the resistance R26. The other end of the resistance R25 and the other end of the resistance R26 are connected to the connection point between the resistance R21 and the resistance R22. Similarly, the terminal P3 of the tertiary winding of the transformer T159 is connected to the anode of the diode D23 and one end of the resistance R27. Also, the terminal P4 of the tertiary winding of the transformer T159 is connected to the anode of the diode D24 and one end of the resistance R28. For example, let us say that the resistance value of the resistance R27 is that of the resistance R28. The other end of the resistance R27 and the other end of the resistance R28 are connected to the connection point between the resistance R23 and the resistance R24.

The cathodes of the diodes D21 and D24 are connected to the voltage detection circuit 402 along with the cathode of a diode connected to the tertiary winding of a transformer on the right side of a discharge tube (not shown). Note that the cathode of the diode connected to the tertiary winding of the transformer on the right side of the discharge tube is connected to the voltage detection circuit 402 via a terminal 11. Thus, the voltage detection circuit 402 is configured so as to detect the maximum voltage of the voltage on the tertiary winding side of the transformers included in the discharge tube driving circuit 400. The voltage detection circuit 402 is connected to the inverter circuit 401, and outputs a detection signal according to the detected maximum voltage to the inverter circuit 401. The inverter circuit 401 adjusts output of the inverter circuit 401 according to the detection signal in some cases, and stops output of the inverter circuit 401 to protect the discharge tube driving circuit 400 in some cases. Upon output of the inverter circuit 401 being stopped, the discharge tube driving circuit 400 makes the transition to an operation suspended state.

On the other hand, the terminal S1 of the first secondary winding of the transformer T158 is connected to one end of an unshown first discharge tube. Also, the terminal S2 of the first secondary winding of the transformer T158 is connected to the terminal S3 of the second secondary winding, and further connected to one end of the resistance R21. The other end of the resistance R21 is connected to one end of the resistance R22, and the other end of the resistance R22 is grounded. The terminal S4 of the second secondary winding of the transformer T158 is connected to one end of an unshown second discharge tube. Thus, the intermediate terminals of the secondary winding of the transformer T158 are grounded via the resistances R21 and R22. Also, a closed loop is made up of the secondary winding of the transformer T158, the first and second discharge tubes, and the secondary winding of the unshown transformer on the right side.

Further, the terminal S1 of the first secondary winding of the transformer T159 is connected to one end of an unshown third discharge tube. Also, the terminal S2 of the first secondary winding of the transformer T159 is connected to the terminal S3 of the second secondary winding, and further connected to one end of the resistance R23. The other end of the resistance R23 is connected to one end of the resistance R24, and the other end of the resistance R24 is grounded. The terminal S4 of the second secondary winding of the transformer T159 is connected to one end of an unshown fourth discharge tube. Thus, the intermediate terminals of the secondary winding of the transformer T159 are grounded via the resistances R23 and R24. Also, a closed loop is made up of the secondary winding of the transformer T159, the third and fourth discharge tubes, and the secondary winding of the unshown transformer on the right side.

Let us say that the electric potential as the terminal S1 of the secondary winding of the transformer 159 is Va, and the electric potential at the terminal S4 is Vb. On the other hand, let us say that voltage of (Va'−Vb') is generated between the terminals P3 and P4 of the tertiary winding from the winding ratio between the secondary winding and the tertiary winding. Further, voltage of (Va'−Vb')/2 is generated at the connection point between the resistance R23 and the resistance R24 by fitting the resistance value ratio between the resistance R23 and the resistance R24 to the winding ratio between the secondary winding and the tertiary winding. If we say that the resistance value of the resistance R27 is equal to that of the resistance R28, an electric potential Va' is generated at the anode of the diode D23 by computing an arithmetic operation of (Va'+Vb')/2+(Va'−Vb')/2, and similarly, an electric potential Vb' is generated at the anode of the diode D24 by computing an arithmetic operation of (Va'+Vb')/2−(Va'−Vb')/2. However, the Va' and Vb' are subjected to half-wave rectification by the diodes D23 and D24. Thus, the maximum value of the electric potential according to the terminal of the secondary winding of the transformer is detected at the voltage detection circuit 402. The voltage detection circuit 402 outputs a detection signal according to the detected voltage to the inverter circuit 401. The inverter circuit 401 adjusts the voltage output of the inverter circuit 401 according to the detection signal, and stops output of the inverter circuit 401 as necessary. Upon output of the inverter circuit 401 being stopped, the discharge tube driving circuit 400 makes the transition to an operation suspended state.

Forty-second Embodiment

Figure 57:
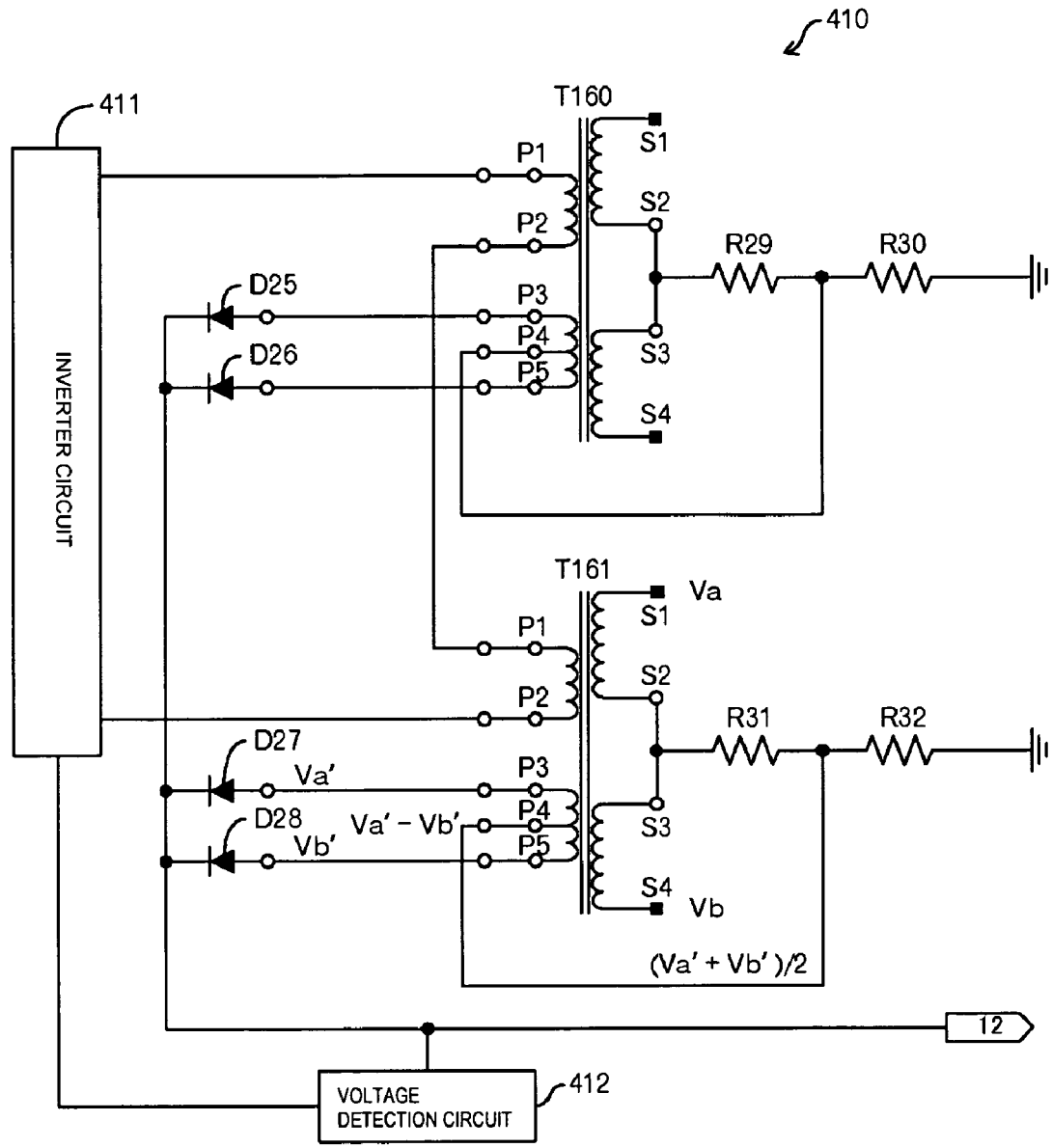
FIG. 57 is a circuit diagram according to a forty-second embodiment of the present invention.

FIG. 57 illustrates a discharge tube driving circuit 410 according to a forty-second embodiment of the present invention (only the left half excluding discharge tubes). The discharge tube driving circuit 410 in FIG. 57 comprises transformers T160 and T161, resistances R29 through R32, diodes D25 through D28, an inverter circuit 411 including an inverter power source and a control circuit as to the inverter power source, and a voltage detection circuit 412 for detecting the maximum voltage on the tertiary winding side of transformers such as the transformers T160 and T161, and outputting a detection signal to the inverter circuit 411. The transformer T160 has the primary winding including terminals P1 and P2, the secondary winding including terminals S1 and S4 connected to unshown discharge tubes and terminals S2 and S3 serving as center taps, and the tertiary winding including terminals P3 and P5 and the center tap P4. Similarly, the transformer T161 has the primary winding including terminals P1 and P2, the secondary winding including terminals S1 and S4 connected to unshown discharge tubes and terminals S2 and S3 serving as center taps, and the tertiary winding including terminals P3 and P5 and the center tap P4.

The terminal P1 of the primary winding of the transformer T160 is connected to one end of the inverter circuit 411, and the terminal P2 of the primary winding of the transformer T161 is connected to the other end of the inverter circuit 411. The terminal P2 of the primary winding of the transformer T160 is connected to the terminal P1 of the primary winding of the transformer T161. Also, the terminal P3 of the tertiary winding of the transformer T160 is connected to the anode of the diode D25. The terminal P5 of the tertiary winding of the transformer T160 is connected to the anode of the diode D26. The center tap P4 of the tertiary winding of the transformer T160 is connected to the connection point between the resistance R29 and the resistance R30. Similarly, the terminal P3 of the tertiary winding of the transformer T161 is connected to the anode of the diode D27. Also, the terminal P5 of the tertiary winding of the transformer T161 is connected to the anode of the diode D28. The center tap P4 of the tertiary winding of the transformer T161 is connected to the connection point between the resistance R31 and the resistance R32.

The cathodes of the diodes D25 through D28 are connected to the voltage detection circuit 412 along with the cathode of a diode connected to the tertiary winding of a transformer on the right side of a discharge tube (not shown). Note that the cathode of the diode connected to the tertiary winding of the transformer on the right side of the discharge tube is connected to the voltage detection circuit 412 via a terminal 12. Thus, the voltage detection circuit 412 is configured so as to detect the maximum voltage of the voltage on the tertiary winding side of the transformers included in the discharge tube driving circuit 410. The voltage detection circuit 412 is connected to the inverter circuit 411, and outputs a detection signal according to the detected maximum voltage to the inverter circuit 411. The inverter circuit 411 adjusts output of the inverter circuit 411 according to the detection signal in some cases, and stops output of the inverter circuit 411 to protect the discharge tube driving circuit 410 in some cases. Upon output of the inverter circuit 411 being stopped, the discharge tube driving circuit 410 makes the transition to an operation suspended state.

On the other hand, the terminal S1 of the first secondary winding of the transformer T160 is connected to one end of an unshown first discharge tube. Also, the terminal S2 of the first secondary winding of the transformer T160 is connected to the terminal S3 of the second secondary winding, and further connected to one end of the resistance R29. The other end of the resistance R29 is connected to one end of the resistance R30, and the other end of the resistance R30 is grounded. The terminal S4 of the second secondary winding of the transformer T160 is connected to one end of an unshown second discharge tube. Thus, the intermediate terminals of the secondary winding of the transformer T160 are grounded via the resistances R29 and R30. Also, a closed loop is made up of the secondary winding of the transformer T160, the first and second discharge tubes, and the secondary winding of the unshown transformer on the right side.

Further, the terminal S1 of the first secondary winding of the transformer T161 is connected to one end of an unshown third discharge tube. Also, the terminal S2 of the first secondary winding of the transformer T161 is connected to the terminal S3 of the second secondary winding, and further connected to one end of the resistance R31. The other end of the resistance R31 is connected to one end of the resistance R32, and the other end of the resistance R32 is grounded. The terminal S4 of the second secondary winding of the transformer T161 is connected to one end of an unshown fourth discharge tube. Thus, the intermediate terminals of the secondary winding of the transformer T161 are grounded via the resistances R31 and R32. Also, a closed loop is made up of the secondary winding of the transformer T161, the third and fourth discharge tubes, and the secondary winding of the unshown transformer on the right side.

Let us say that the electric potential as the terminal S1 of the secondary winding of the transformer 161 is Va, and the electric potential at the terminal S4 is Vb. On the other hand, let us say that voltage of (Va'−Vb') is generated between the terminals P3 and P4 of the tertiary winding from the winding ratio between the tertiary winding and the secondary winding. Further, potential of (Va'+Vb')/2 is generated at the connection point between the resistance R31 and the resistance R32 by fitting the resistance value ratio between the resistance R31 and the resistance R32 to the winding ratio between the tertiary winding and the secondary winding. This connection point between the resistance R31 and the resistance R32 is connected to the center tap P4 of the tertiary winding of the transformer T161, so the electric potential at the center tap P4 becomes (Va'+Vb')/2, and further, the voltage between the terminals P3 and P5 of the tertiary winding is (Va'−Vb'), and accordingly, the electric potential at the terminal P3 of the tertiary winding becomes Va', and the electric potential at the terminal P5 of the tertiary winding becomes Vb'. Specifically, the electric potential Va' is generated at the anode of the diode D27 by computing an arithmetic operation of (Va'+Vb')/2+ (Va'−Vb')/2, and similarly, the electric potential Vb' is generated at the anode of the diode D28 by computing an arithmetic operation of (Va'+Vb')/2−(Va'−Vb')/2. However, the Va' and Vb' are subjected to half-wave rectification by the diodes D27 and D28. Thus, the maximum value of the electric potential according to the terminal of the secondary winding of the transformer is detected at the voltage detection circuit 412. The voltage detection circuit 412 outputs a detection signal according to the detected voltage to the inverter circuit 411. The inverter circuit 411 adjusts the voltage output of the inverter circuit 411 according to the detection signal, and stops output of the inverter circuit 411 as necessary. Upon output of the inverter circuit 411 being stopped, the discharge tube driving circuit 410 makes the transition to an operation suspended state.

Forty-third Embodiment

Figure 58:
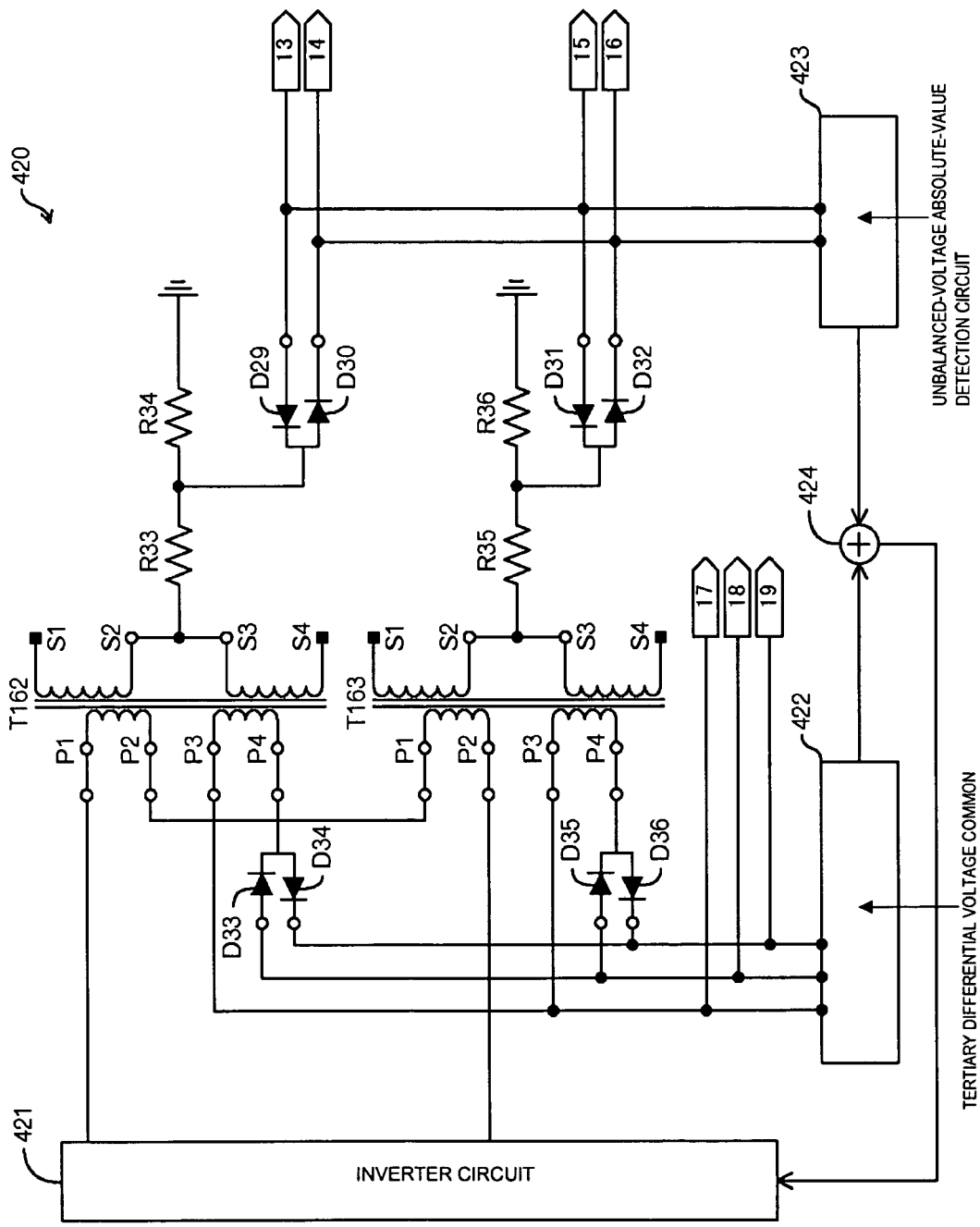
FIG. 58 is a circuit diagram according to a forty-third embodiment of the present invention.

FIG. 58 illustrates a discharge tube driving circuit 420 according to a forty-third embodiment of the present invention (only the left half excluding discharge tubes). The discharge tube driving circuit 420 in FIG. 58 comprises transformers T162 and T163, resistances R33 through R36, diodes D29 through D36, an inverter circuit 421 including an inverter power source and a control circuit as to the inverter power source, a tertiary differential voltage common frequency correction and absolute-value detection circuit 422 for detecting the maximum voltage on the tertiary winding side of transformers such as the transformers T162 and T163, and outputting a detection signal, an unbalanced-voltage absolute-value detection circuit 423 for detecting unbalance of current made to flow on the secondary winding side of transformers such as the transformers T162 and T163, and outputting an unbalance detection signal, and an adder circuit 424 for adding the output of the tertiary differential voltage common frequency correction and absolute-value detection circuit 422, and the output of the unbalanced-voltage absolute-value detection circuit 423. The transformer T162 has the primary winding including terminals P1 and P2, the secondary winding including terminals S1 and S4 connected to unshown discharge tubes and terminals S2 and S3 serving as center taps, and the tertiary winding including terminals P3 and P4. Similarly, the transformer T163 has the primary winding including terminals P1 and P2, the secondary winding including terminals S1 and S4 connected to unshown discharge tubes and terminals S2 and S3 serving as center taps, and the tertiary winding including terminals P3 and P4. The tertiary winding is provided for estimating voltage to be generated on the secondary winding side.

The terminal P1 of the primary winding of the transformer T162 is connected to one end of the inverter circuit 421, and the terminal P2 of the primary winding of the transformer T163 is connected to the other end of the inverter circuit 421. The terminal P2 of the primary winding of the transformer T162 is connected to the terminal P1 of the primary winding of the transformer T163. Also, the terminal P3 of the tertiary winding of the transformer T162 is connected to the terminal P3 of the tertiary winding of the transformer T163, also connected to the terminal P3 of the tertiary winding of the transformer on the right side of the discharge tube (not shown) via a terminal 17, and further connected to a first terminal of the tertiary differential voltage common frequency correction and absolute-value detection circuit 422.

Further, the terminal P4 of the tertiary winding of the transformer T162 is connected to the anode of the diode D34 and the cathode of the diode D33. Similarly, the terminal P4 of the tertiary winding of the transformer T163 is connected to the anode of the diode D36 and the cathode of the diode D35. The cathodes of the diodes D34 and D36 are connected to the tertiary differential voltage common frequency correction and absolute-value detection circuit 422 along with the cathode of a diode connected to the tertiary winding of a transformer on the right side of a discharge tube (not shown). Note that the cathode of the diode connected to the tertiary winding of the transformer on the right side of the discharge tube is connected to a second terminal of the tertiary differential voltage common frequency correction and absolute-value detection circuit 422 via a terminal 19. The anodes of the diodes D33 and D35 are connected to the tertiary differential voltage common frequency correction and absolute-value detection circuit 422 along with the anode of a diode connected to the tertiary winding of a transformer on the right side of a discharge tube (not shown). Note that the anode of the diode connected to the tertiary winding of the transformer on the right side of the discharge tube is connected to a third terminal of the tertiary differential voltage common frequency correction and absolute-value detection circuit 422 via a terminal 18.

Thus, the tertiary differential voltage common frequency correction and absolute-value detection circuit 422 is configured so as to detect the maximum positive voltage and the maximum negative voltage of the voltage on the tertiary winding side of the transformers included in the discharge tube driving circuit 420, and an intermediate REF voltage to be generated at the terminal P3 of the tertiary winding. Also, the tertiary differential voltage common frequency correction and absolute-value detection circuit 422 performs frequency correction as to a differential voltage at the tertiary winding based on an input voltage, and outputs a maximal absolute-value signal of the voltage at the tertiary winding to the adder circuit 424.

On the other hand, the terminal S1 of the first secondary winding of the transformer T162 is connected to one end of an unshown first discharge tube. Also, the terminal S2 of the first secondary winding of the transformer T162 is connected to the terminal S3 of the second secondary winding, and further connected to one end of the resistance R33. The other end of the resistance R33 is connected to one end of the resistance R34, and the other end of the resistance R34 is grounded. The terminal S4 of the second secondary winding of the transformer T162 is connected to one end of an unshown second discharge tube. Thus, the intermediate terminals of the secondary winding of the transformer T162 are grounded via the resistances R33 and R34. Also, a closed loop is made up of the secondary winding of the transformer T162, the first and second discharge tubes, and the secondary winding of the unshown transformer on the right side. The cathode of the diode D29 and the anode of the diode D30 are connected to the connection point between the resistance R33 and the resistance R34, and the anode of the diode D29 is connected to the same configuration on the right side of the discharge tube via a terminal 13. Also, the cathode of the diode D30 is connected to the same configuration on the right side of the discharge tube via a terminal 14.

Further, the terminal S1 of the first secondary winding of the transformer T163 is connected to one end of an unshown third discharge tube. Also, the terminal S2 of the first secondary winding of the transformer T163 is connected to the terminal S3 of the second secondary winding, and further connected to one end of the resistance R35. The other end of the resistance R35 is connected to one end of the resistance R36, and the other end of the resistance R36 is grounded. The terminal S4 of the second secondary winding of the transformer T163 is connected to one end of an unshown fourth discharge tube. Thus, the intermediate terminals of the secondary winding of the transformer T163 are grounded via the resistances R35 and R36. Also, a closed loop is made up of the secondary winding of the transformer T163, the third and fourth discharge tubes, and the secondary winding of the unshown transformer on the right side. The cathode of the diode D31 and the anode of the diode D32 are connected to the connection point between the resistance R35 and the resistance R36.

The anode of the diode D31 is connected to the same configuration on the right side of the discharge tube via a terminal 15, and also connected to the anode of the diode D29 and the terminal 13. The cathode of the diode D32 is connected to the same configuration on the right side of the discharge tube via a terminal 16, and also connected to the cathode of the diode D30 and the terminal 14. Thus, the unbalanced-voltage absolute-value detection circuit 423 detects an unbalance voltage caused by current made to flow into the resistances R33 and R34, the resistances R35 and R36, and the like via the diodes D29 through D32, and the diode having the same configuration on the right side of the discharge tube. In the case of a balanced state, current seldom flows, so when the unbalanced-voltage absolute-value detection circuit 423 detects an unbalanced voltage, this means that something is wrong with any of the discharge tubes. The unbalanced-voltage absolute-value detection circuit 423 detects the maximum positive voltage and the maximum negative voltage, generates a maximal absolute-value signal of the unbalanced voltage, and outputs this to the adder circuit 424.

The adder circuit 424 outputs a control signal obtained by adding the maximal absolute-value signal from the tertiary differential voltage common frequency correction and absolute-value detection circuit 422, and the maximal absolute-value signal from the unbalanced-voltage absolute-value detection circuit 423 to the inverter circuit 421. Thus, the control signal becomes a value closer to the output voltage of the secondary winding, and the inverter circuit 421 automatically adjusts or stops the output of the inverter circuit 421 based on this control signal to protect the discharge tube driving circuit 420. Upon output of the inverter circuit 421 being stopped, the discharge tube driving circuit 420 makes the transition to an operation suspended state.

With the thirty-ninth through forty-third embodiments, the feedback control of the inverter circuit is performed while simultaneously taking the detection voltage at the primary winding or the tertiary winding of the transformer and the unbalanced voltage obtained by diving grounding of center tap of the secondary winding into consideration, thereby enabling the entire discharge tube driving circuit to be operated in a stable manner.

Forty-fourth Embodiment

Figure 59:
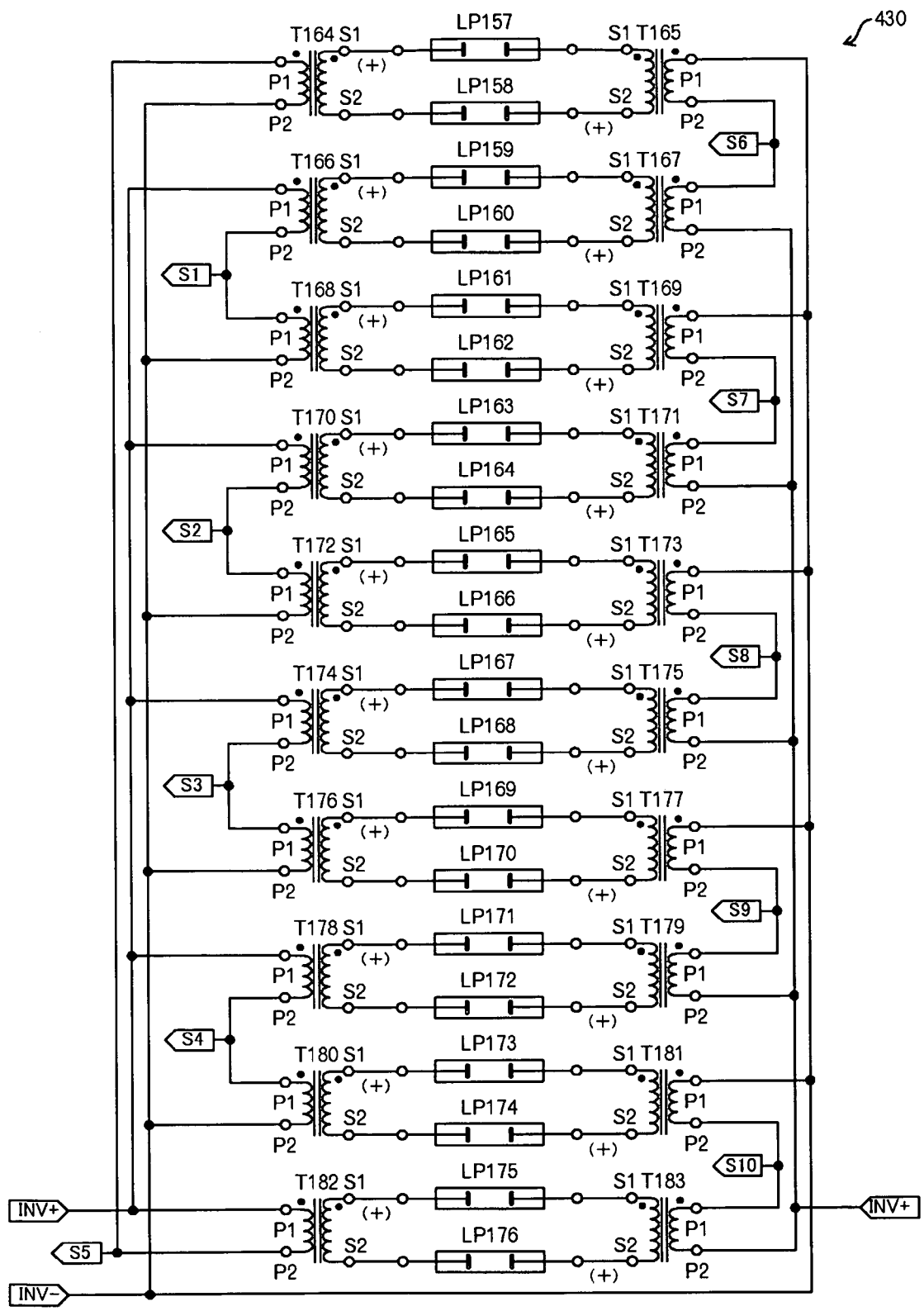
FIG. 59 is a circuit diagram according to a forty-fourth embodiment of the present invention.

FIG. 59 illustrates a discharge tube lighting circuit 430 according to a forty-fourth embodiment of the present invention. The discharge tube lighting circuit 430 comprises transformers T164 through T183, and discharge tubes LP157 through LP176 such as a cold cathode fluorescent tube. A terminal P1 of the primary winding of the transformer T164 is connected to a terminal P2 of the primary winding of the transformer T182, and a voltage detection terminal S5. A terminal P1 of the primary winding of the transformer T182 is connected to a first terminal of an unshown inverter circuit via a terminal INV+. Also, a terminal P2 of the primary winding of the transformer T164 is connected to a second terminal of the unshown inverter circuit via a terminal INV−. That is to say, the primary windings of the transformers T164 and T182 are connected in series. Also, a terminal S1 of the secondary winding of the transformer T164 is connected to one end of the discharge tube LP157, and the other end of the discharge tube LP157 is connected to a terminal S1 of the secondary winding of the transformer T165. Further, a terminal S2 of the secondary winding of the transformer T165 is connected to one end of the discharge tube LP158, and the other end of the discharge tube LP158 is connected to a terminal S2 of the secondary winding of the transformer T164. That is to say, the secondary windings of the transformers T164 and T165, and the discharge tubes LP157 and LP158 make up a closed loop. Further, a terminal P1 of the primary winding of the transformer T165 is connected to the second terminal of the unshown inverter circuit via the terminal INV−, and a terminal P2 of the primary winding of the transformer T165 is connected to a voltage detection terminal S6, and a terminal P1 of the primary winding of the transformer T167. A terminal P2 of the primary winding of the transformer T167 is connected to the terminal INV+. That is to say, the primary windings of the transformer T165 and the transformer T167 are connected in series. Thus, in the event that voltage having a polarity such as +− from the left is applied to both ends of the discharge tube LP157, voltage having a polarity such as −+ from the left is applied to both ends of the discharge tube LP158. Thus, the discharge tubes LP157 and LP158 included in one closed loop are subjected to differential floating driving.

A terminal P1 of the primary winding of the transformer T166 is connected to the first terminal of the unshown inverter circuit via the terminal INV+. Also, a terminal P2 of the primary winding of the transformer T166 is connected to a voltage detection terminal S1, and a terminal P1 of the primary winding of the transformer T168. A terminal P2 of the primary winding of the transformer T168 is connected to the terminal INV−. That is to say, the primary windings of the transformers T166 and T168 are connected in series. Also, a terminal S1 of the secondary winding of the transformer T166 is connected to one end of the discharge tube LP159, and the other end of the discharge tube LP159 is connected to a terminal S1 of the secondary winding of the transformer T167. Further, a terminal S2 of the secondary winding of the transformer T167 is connected to one end of the discharge tube LP160, and the other end of the discharge tube LP160 is connected to a terminal S2 of the secondary winding of the transformer T166. That is to say, the secondary windings of the transformers T166 and T167, and the discharge tubes LP159 and LP160 make up a closed loop. The discharge tubes LP159 and LP160 included in this closed loop are subjected to differential floating driving.

Further, a terminal S1 of the secondary winding of the transformer T168 is connected to one end of the discharge tube LP161, and the other end of the discharge tube LP161 is connected to a terminal S1 of the secondary winding of the transformer T169. Further, a terminal S2 of the secondary winding of the transformer T169 is connected to one end of the discharge tube LP162, and the other end of the discharge tube LP162 is connected to a terminal S2 of the secondary winding of the transformer T161. Thus, the secondary windings of the transformers T168 and T169, and the discharge tubes LP161 and LP162 make up a closed loop. The discharge tubes LP161 and LP162 included in this closed loop are subjected to differential floating driving as well.

A terminal P1 of the primary winding of the transformer T169 is connected to the terminal INV−, and a terminal P2 of the primary winding of the transformer T169 is connected to a voltage detection terminal S7, and a terminal P1 of the primary winding of the transformer T171. A terminal P2 of the primary winding of the transformer T171 is connected to the terminal INV+. Thus, the primary windings of the transformer T169 and the transformer T171 are connected in series.

Further, a terminal S1 of the secondary winding of the transformer T171 is connected to one end of the discharge tube LP163, and the other end of the discharge tube LP163 is connected to a terminal S1 of the secondary winding of the transformer T170. Further, a terminal S2 of the secondary winding of the transformer T170 is connected to one end of the discharge tube LP164, and the other end of the discharge tube LP164 is connected to a terminal S2 of the secondary winding of the transformer T171. Thus, the secondary windings of the transformers T170 and T171, and the discharge tubes LP163 and LP164 make up a closed loop. The discharge tubes LP163 and LP164 included in this closed loop are subjected to differential floating driving as well.

A terminal P1 of the primary winding of the transformer T170 is connected to the terminal INV+, and a terminal P2 of the primary winding of the transformer T170 is connected to a voltage detection terminal S2, and a terminal P1 of the primary winding of the transformer T172. A terminal P2 of the primary winding of the transformer T172 is connected to the terminal INV−. Thus, the primary windings of the transformer T170 and the transformer T172 are connected in series.

Further, a terminal S1 of the secondary winding of the transformer T172 is connected to one end of the discharge tube LP165, and the other end of the discharge tube LP165 is connected to a terminal S1 of the secondary winding of the transformer T173. Further, a terminal S2 of the secondary winding of the transformer T173 is connected to one end of the discharge tube LP166, and the other end of the discharge tube LP166 is connected to a terminal S2 of the secondary winding of the transformer T172. Thus, the secondary windings of the transformers T172 and T173, and the discharge tubes LP165 and LP166 make up a closed loop. The discharge tubes LP165 and LP166 included in this closed loop are subjected to differential floating driving as well.

A terminal P1 of the primary winding of the transformer T173 is connected to the terminal INV−, and a terminal P2 of the primary winding of the transformer T173 is connected to a voltage detection terminal S8, and a terminal P1 of the primary winding of the transformer T175. A terminal P2 of the primary winding of the transformer T175 is connected to the terminal INV+. Thus, the primary windings of the transformer T173 and the transformer T175 are connected in series.

Further, a terminal S1 of the secondary winding of the transformer T175 is connected to one end of the discharge tube LP167, and the other end of the discharge tube LP167 is connected to a terminal S1 of the secondary winding of the transformer T174. Further, a terminal S2 of the secondary winding of the transformer T174 is connected to one end of the discharge tube LP168, and the other end of the discharge tube LP168 is connected to a terminal S2 of the secondary winding of the transformer T175. Thus, the secondary windings of the transformers T174 and T175, and the discharge tubes LP167 and LP168 make up a closed loop. The discharge tubes LP167 and LP168 included in this closed loop are subjected to differential floating driving as well.

A terminal P1 of the primary winding of the transformer T174 is connected to the terminal INV+, and a terminal P2 of the primary winding of the transformer T174 is connected to a voltage detection terminal S3, and a terminal P1 of the primary winding of the transformer T176. A terminal P2 of the primary winding of the transformer T176 is connected to the terminal INV−. Thus, the primary windings of the transformer T174 and the transformer T176 are connected in series.

Further, a terminal S1 of the secondary winding of the transformer T176 is connected to one end of the discharge tube LP169, and the other end of the discharge tube LP169 is connected to a terminal S1 of the secondary winding of the transformer T177. Further, a terminal S2 of the secondary winding of the transformer T177 is connected to one end of the discharge tube LP170, and the other end of the discharge tube LP170 is connected to a terminal S2 of the secondary winding of the transformer T176. Thus, the secondary windings of the transformers T176 and T177, and the discharge tubes LP169 and LP170 make up a closed loop. The discharge tubes LP169 and LP170 included in this closed loop are subjected to differential floating driving as well.

A terminal P1 of the primary winding of the transformer T177 is connected to the terminal INV−, and a terminal P2 of the primary winding of the transformer T177 is connected to a voltage detection terminal S9, and a terminal P1 of the primary winding of the transformer T179. A terminal P2 of the primary winding of the transformer T179 is connected to the terminal INV+. Thus, the primary windings of the transformer T177 and the transformer T179 are connected in series.

Further, a terminal S1 of the secondary winding of the transformer T179 is connected to one end of the discharge tube LP171, and the other end of the discharge tube LP171 is connected to a terminal S1 of the secondary winding of the transformer T178. Further, a terminal S2 of the secondary winding of the transformer T178 is connected to one end of the discharge tube LP172, and the other end of the discharge tube LP172 is connected to a terminal S2 of the secondary winding of the transformer T179. Thus, the secondary windings of the transformers T178 and T179, and the discharge tubes LP171 and LP172 make up a closed loop. The discharge tubes LP171 and LP172 included in this closed loop are subjected to differential floating driving as well.

A terminal P1 of the primary winding of the transformer T178 is connected to the terminal INV+, and a terminal P2 of the primary winding of the transformer T178 is connected to a voltage detection terminal S4, and a terminal P1 of the primary winding of the transformer T180. A terminal P2 of the primary winding of the transformer T180 is connected to the terminal INV−. Thus, the primary windings of the transformer T178 and the transformer T180 are connected in series.

Further, a terminal S1 of the secondary winding of the transformer T180 is connected to one end of the discharge tube LP173, and the other end of the discharge tube LP173 is connected to a terminal S1 of the secondary winding of the transformer T181. Further, a terminal S2 of the secondary winding of the transformer T181 is connected to one end of the discharge tube LP174, and the other end of the discharge tube LP174 is connected to a terminal S2 of the secondary winding of the transformer T180. Thus, the secondary windings of the transformers T180 and T181, and the discharge tubes LP173 and LP174 make up a closed loop. The discharge tubes LP173 and LP174 included in this closed loop are subjected to differential floating driving as well.

A terminal P1 of the primary winding of the transformer T181 is connected to the terminal INV−, and a terminal P2 of the primary winding of the transformer T181 is connected to a voltage detection terminal S10, and a terminal P1 of the primary winding of the transformer T183. A terminal P2 of the primary winding of the transformer T183 is connected to the terminal INV+. Thus, the primary windings of the transformer T181 and the transformer T183 are connected in series.

Further, a terminal S1 of the secondary winding of the transformer T183 is connected to one end of the discharge tube LP175, and the other end of the discharge tube LP175 is connected to a terminal S1 of the secondary winding of the transformer T182. Further, a terminal S2 of the secondary winding of the transformer T182 is connected to one end of the discharge tube LP176, and the other end of the discharge tube LP176 is connected to a terminal S2 of the secondary winding of the transformer T183. Thus, the secondary windings of the transformers T182 and T183, and the discharge tubes LP175 and LP176 make up a closed loop. The discharge tubes LP175 and LP176 included in this closed loop are subjected to differential floating driving as well.

Thus, current is made uniform in each closed loop, and current of the closed loop including the secondary windings of the transformer T165 and the transformer T167 is also made uniform by the primary windings of the transformer T165 and the transformer T167 being connected in series. Similarly, current of the closed loop including the secondary windings of the transformer T166 and the transformer T168 is also made uniform by the primary windings of the transformer T166 and the transformer T168 being connected in series. Further, current of the closed loop including the secondary windings of the transformer T169 and the transformer T171 is also made uniform by the primary windings of the transformer T169 and the transformer T171 being connected in series. Current of the closed loop including the secondary windings of the transformer T170 and the transformer T172 is also made uniform by the primary windings of the transformer T170 and the transformer T172 being connected in series. Further, current of the closed loop including the secondary windings of the transformer T173 and the transformer T175 is also made uniform by the primary windings of the transformer T173 and the transformer T175 being connected in series. Also, current of the closed loop including the secondary windings of the transformer T174 and the transformer T176 is also made uniform by the primary windings of the transformer T174 and the transformer T176 being connected in series. Further, current of the closed loop including the secondary windings of the transformer T177 and the transformer T179 is also made uniform by the primary windings of the transformer T177 and the transformer T179 being connected in series. Also, current of the closed loop including the secondary windings of the transformer T178 and the transformer T180 is also made uniform by the primary windings of the transformer T178 and the transformer T180 being connected in series. Further, current of the closed loop including the secondary windings of the transformer T181 and the transformer T183 is also made uniform by the primary windings of the transformer T181 and the transformer T183 being connected in series. Also, current of the closed loop including the secondary windings of the transformer T182 and the transformer T164 is also made uniform by the primary windings of the transformer T182 and the transformer T164 being connected in series. Thus, uniformity of current is propagated such that the closed loops make a round in beads via the transformers. Upon the closed loops making a round, current balance capabilities somewhat deteriorate, but only some luminance inclination occurs, and no luminance irregularity occurs.

Also, the serial connection of the primary windings of the transformers is all suppressed to two series. The closed loops provided on the secondary winding side of the transformers are also suppressed to two series. In such a case, sensitivity of abnormal detection is also increased with a voltage detection circuit connected via the voltage detection terminal.

Figure 60:
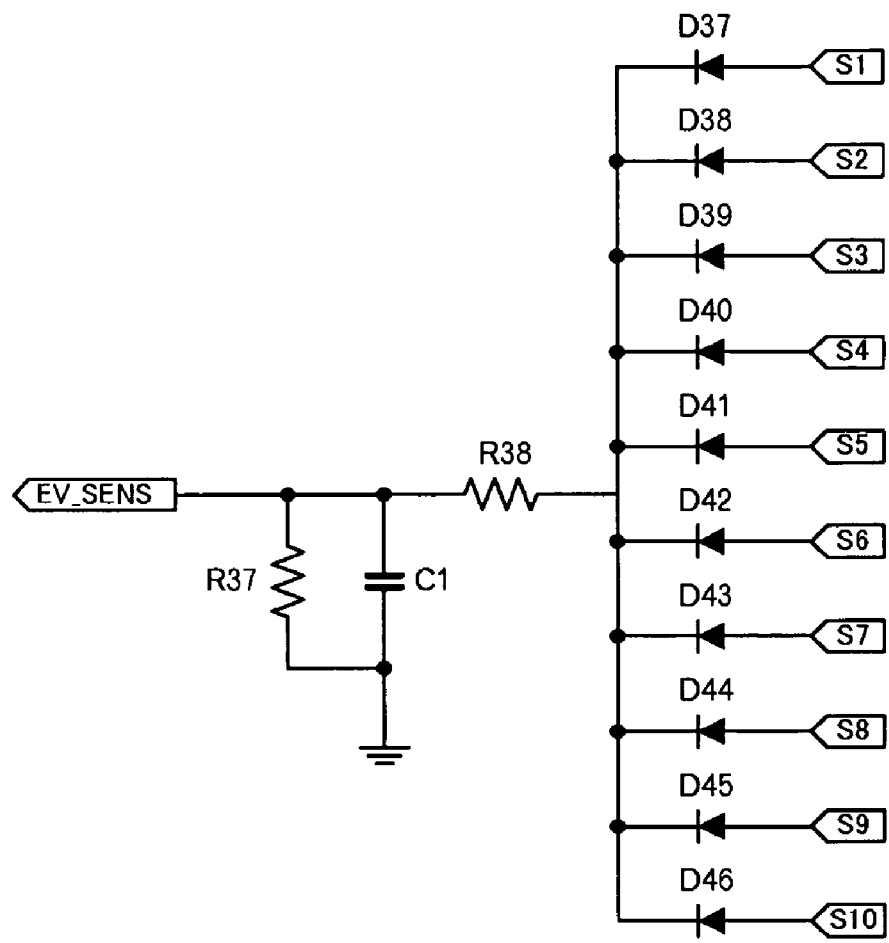
FIG. 60 is a diagram illustrating a circuit example, which is connected to a voltage detection terminal in the forty-fourth embodiment and the forty-fifth embodiment of the present invention.

A circuit example to which the voltage detection terminals S1 through S10 are connected is shown in FIG. 60. The voltage detection terminal S1 is connected to the anode of the diode D37, the voltage detection terminal S2 to the anode of the diode D38, the voltage detection terminal S3 to the anode of the diode D39, the voltage detection terminal S4 to the anode of the diode D40, the voltage detection terminal S5 to the anode of the diode D41, the voltage detection terminal S6 to the anode of the diode D42, the voltage detection terminal S7 to the anode of the diode D43, the voltage detection terminal S8 to the anode of the diode D44, the voltage detection terminal S9 to the anode of the diode D45, and the voltage detection terminal S110 to the anode of the diode D46. The cathodes of all the diodes D37 through D46 are connected to one end of a resistance R38. Thus, the maximum voltage of voltage at any one of the voltage detection terminals is applied to one end of the resistance R38. The other end of the resistance R38 is connected to one end of a capacitor C1, one end of a resistance R37, and a terminal EV_SENS. The other end of the resistance R37 and the other end of the capacitor C1 are grounded. A circuit connected to the terminal EV_SENS detects abnormality on the secondary winding side of the transformers.

Figure 61:
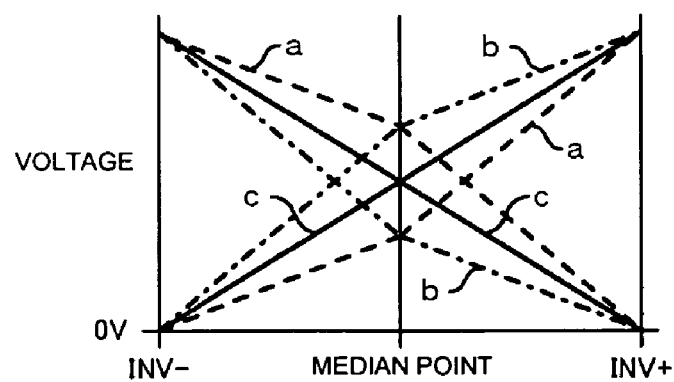
FIG. 61 is a diagram illustrating relations between a terminal and an electric potential.

Description will be made regarding an electric potential to be detected at a voltage detection terminal with reference to FIG. 61. In FIG. 61, the terminal INV+, the terminal INV−, and the voltage detection terminals S1 through S10 serving as the median point thereof are represented as a horizontal axis, and voltage is represented as a vertical axis. In FIG. 61, a thick line c represents the electric potential relation in a normal state, the thick line c inclined to the lower right represents the case in which the terminal INV− side is peak of a positive pole, the thick line inclined to the lower left represents the case in which the terminal INV+ side is peak of a positive pole. On the other hand, for example, when the terminal INV+ side becomes a low impedance state, the electric potential relation becomes such as a one-dot broken line b. That is to say, in the case in which the terminal INV− side is peak of the positive pole, the line thereof becomes a kinked line having a downward convex shape, and in the case in which the terminal INV+ side is peak of the positive pole, the line thereof becomes a kinked having a upward convex shape. Upon referring to an electric potential at the median point, it becomes higher than that in a normal state in some cases. Further, upon the terminal INV− side becoming a low impedance state, the electric potential relation becomes such as a dotted line a. That is to say, in the case in which the terminal INV− side is peak of the positive pole, the electric potential relation becomes a kinked line having a upward convex shape, and in the case in which the terminal INV+ side is peak of the positive pole, the electric potential relation becomes a kinked line having a downward convex shape. Upon referring to an electric potential at the median point, it becomes higher than that in a normal state in some cases.

Thus, when employing a method for converting the primary winding into two series as shown in FIG. 59, even if synchronous detection is not performed, an electric potential increases when an abnormal state occurs as shown in FIG. 61, and accordingly, abnormality can be detected. Also, even if two discharge tubes within a closed loop are simultaneously balanced to cause abnormality, an electric potential increases at the adjacent voltage detection terminals on both sides thereof. Consequently, with a circuit for performing an OR operation using diodes such as shown in FIG. 60, impedance abnormality can be detected regarding all of the discharge tubes.

Note that the discharge tube lighting circuits such as shown in FIG. 10, FIG. 32, and FIG. 21 may be employed in some cases. However, with the method for connecting only the primary windings in series as shown in FIG. 10, current in the secondary windings is made uniform, but this method needs two transformers per one discharge tube, and in addition, upon attempting to connect the primary windings of too many transformers in series, impedance on the primary winding side excessively decreases, the ratio of resistance components such as lead wire portions, soldered portions, and the like increases, and consequently, effectiveness may deteriorate. Also, the method for making up a closed loop by connecting the secondary windings alone of the transformers in series as shown in FIG. 32 may be employed in some cases. In this case, current on the secondary winding side of the transformers is made uniform, but connecting many discharge tubes in series causes a problem wherein the uniformity precision of current deteriorates due to influence such as stray capacitance. Also, the secondary windings of the transformers become high-power lines, which causes difficulties in respect of securing abnormal discharge voltage withstanding capabilities. Further, as shown in FIG. 21, the method for making up a closed loop by the primary winding side of the transformers in series, and further connecting the secondary windings of the transformers and the discharge tubes in series, may be employed. However, this method has less problems than those in FIG. 10 and FIG. 32, but in the event that the primary winding side is arrayed in 5 series, and the secondary winding side is arrayed in 4 series to light 20 discharge tubes for example, or in the event of lighting discharge tubes more than that, problems regarding wiring and impedance occur again.

On the other hand, with the discharge tube lighting circuit 430 shown in FIG. 59 such as the present embodiment, problems regarding current uniformity and impedance on the primary winding side do not occur.

Forty-fifth Embodiment

Figure 62:
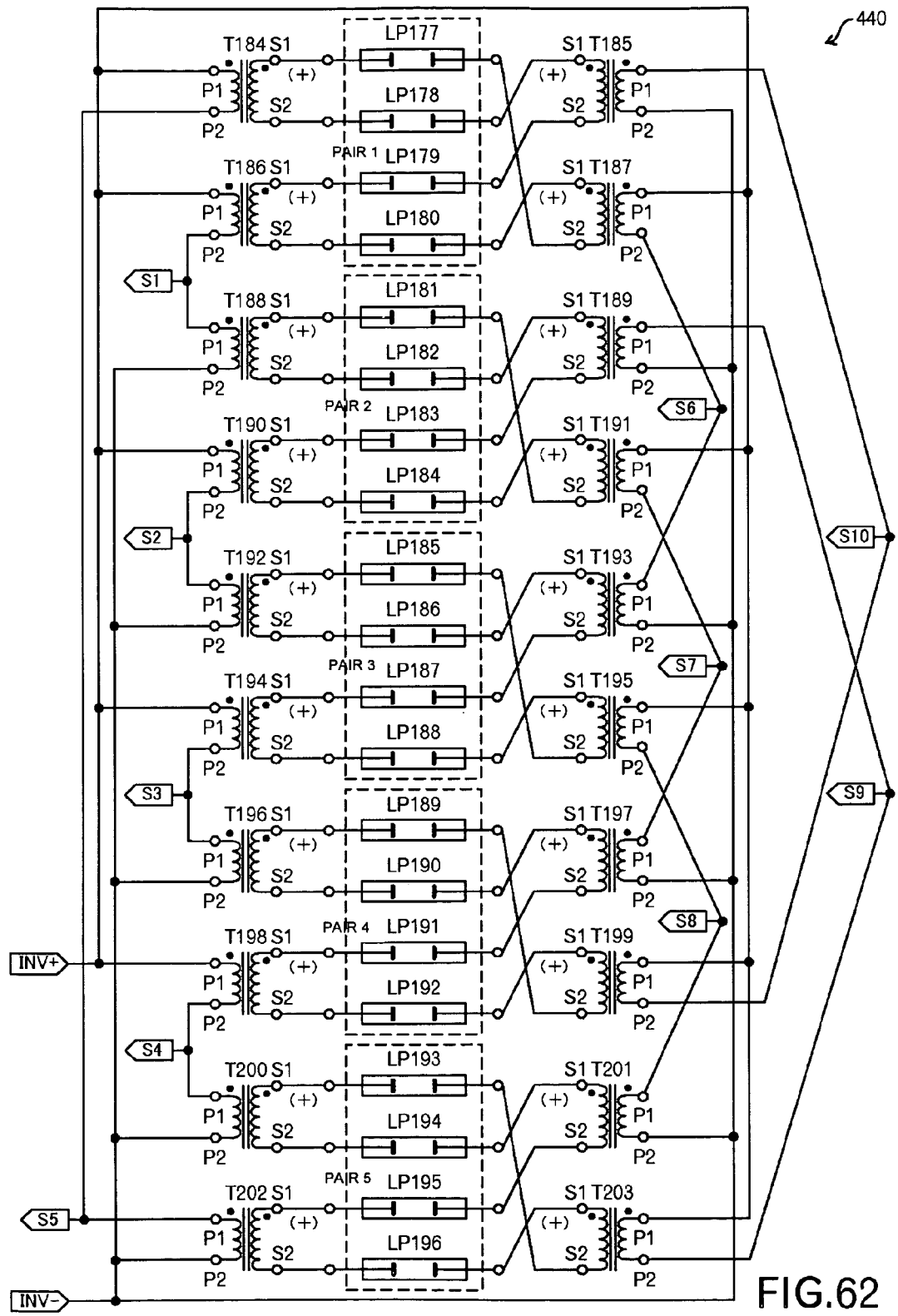
FIG. 62 is a circuit diagram according to a forty-fifth embodiment of the present invention.

A discharge tube lighting circuit 440 according to a forty-fifth embodiment of the present invention is shown in FIG. 62. The discharge tube lighting circuit 440 in FIG. 62 comprises transformers T184 through T203, and discharge tubes LP177 through LP196. Now, let us say that the discharge tubes LP177 through LP180 serve as a first pair, the discharge tubes LP181 through LP184 serve as a second pair, the discharge tubes LP185 through LP188 serve as a third pair, the discharge tubes LP189 through LP192 serve as a fourth pair, and the discharge tubes LP193 through LP196 serve as a fifth pair. Let us say that the discharge tubes in each pair are connected in series. Also, let us say that the transformers connected to the discharge tubes in each pair are belonged to the same pair.

A terminal P1 of the primary winding of the transformer T184 is connected to a terminal INV+, and a terminal P2 thereof is connected to a voltage detection terminal S5, and a terminal P1 of the primary winding of the transformer T202. A terminal P2 of the primary winding of the transformer T202 is connected to a terminal INV−. That is to say, the primary winding of the transformer T184 belonged to the first pair and the primary winding of the transformer T202 belonged to the fifth pair are connected in series.

A terminal S1 of the secondary winding of the transformer T184 is connected to one end of the discharge tube LP177, and the other end of the discharge tube LP177 is connected to a terminal S2 of the secondary winding of the transformer T187. A terminal S1 of the secondary winding of the transformer T187 is connected to one end of the discharge tube LP180, and the other end of the discharge tube LP180 is connected to a terminal S2 of the secondary winding of the transformer T186. A terminal S1 of the secondary winding of the transformer T186 is connected to one end of the discharge tube LP179, and the other end of the discharge tube LP179 is connected to a terminal S2 of the secondary winding of the transformer T185. A terminal S1 of the secondary winding of the transformer T185 is connected to one end of the discharge tube LP178, and the other end of the discharge tube LP178 is connected to a terminal S2 of the secondary winding of the transformer T184.

Thus, the discharge tubes LP177 through LP180 and the transformers T184 through T187 are belonged to the first pair, and also connected in series, and make up a closed loop. The discharge tubes LP177 through LP180 included in this closed loop are subjected to differential floating driving.

A terminal P1 of the primary winding of the transformer T185 is connected to a voltage detection terminal S10, and a terminal P2 of the primary winding of the transformer T199. A terminal P1 of the primary winding of the transformer T199 is connected to the terminal INV+. Also, a terminal P2 of the primary winding of the transformer T185 is connected to the terminal INV−. That is to say, the primary winding of the transformer T185 belonged to the first pair and the primary winding of the transformer T199 belonged to the fourth pair are connected in series.

A terminal P1 of the primary winding of the transformer T186 is connected to the terminal INV+, and a terminal P2 thereof is connected to a voltage detection terminal S1, and a terminal P1 of the primary winding of the transformer T188. A terminal P2 of the primary winding of the transformer T188 is connected to the terminal INV−. That is to say, the primary winding of the transformer T186 belonged to the first pair and the primary winding of the transformer T188 belonged to the second pair are connected in series.

A terminal P1 of the primary winding of the transformer T187 is connected to the terminal INV+, and a terminal P2 thereof is connected to a voltage detection terminal S6, and a terminal P1 of the primary winding of the transformer T193. A terminal P2 of the primary winding of the transformer T193 is connected to the terminal INV−. That is to say, the primary winding of the transformer T187 belonged to the first pair and the primary winding of the transformer T193 belonged to the third pair are connected in series.

As described above, a terminal P1 of the primary winding of the transformer T188 is connected to a voltage detection terminal S1, and a terminal P2 of the primary winding of the transformer T186, and a terminal P2 of the primary winding of the transformer T188 is connected to the terminal INV−. That is to say, the primary winding of the transformer T188 belonged to the second pair and the primary winding of the transformer T186 belonged to the first pair are connected in series.

Also, a terminal S1 of the secondary winding of the transformer T188 is connected to one end of the discharge tube LP181, and the other end of the discharge tube LP181 is connected to a terminal S2 of the secondary winding of the transformer T191. A terminal S1 of the secondary winding of the transformer T191 is connected to one end of the discharge tube LP184, and the other end of the discharge tube LP184 is connected to a terminal S2 of the secondary winding of the transformer T190. A terminal S1 of the secondary winding of the transformer T190 is connected to one end of the discharge tube LP183, and the other end of the discharge tube LP183 is connected to a terminal S2 of the secondary winding of the transformer T189. A terminal S1 of the secondary winding of the transformer T189 is connected to one end of the discharge tube LP182, and the other end of the discharge tube LP182 is connected to a terminal S2 of the secondary winding of the transformer T188.

Thus, the discharge tubes LP181 through LP184 and the transformers T188 through T191 are belonged to the second pair, and also connected in series, and make up a closed loop. The discharge tubes LP181 through LP184 included in this closed loop are subjected to differential floating driving.

A terminal P1 of the primary winding of the transformer T189 is connected to a voltage detection terminal S9, and a terminal P2 of the primary winding of the transformer T203, and a terminal P2 of the primary winding of the transformer T189 is connected to the terminal INV−. A terminal P1 of the primary winding of the transformer T203 is connected to the terminal INV+. That is to say, the primary winding of the transformer T189 belonged to the second pair and the primary winding of the transformer T203 belonged to the fifth pair are connected in series.

Also, a terminal P1 of the primary winding of the transformer T190 is connected to the terminal INV+, and a terminal P2 thereof is connected to a voltage detection terminal S2, and a terminal P1 of the primary winding of the transformer T192. A terminal P2 of the primary winding of the transformer T192 is connected to the terminal INV−. That is to say, the primary winding of the transformer T190 belonged to the second pair and the primary winding of the transformer T192 belonged to the third pair are connected in series.

Also, a terminal P1 of the primary winding of the transformer T191 is connected to the terminal INV+, and a terminal P2 thereof is connected to a voltage detection terminal S7, and a terminal P1 of the primary winding of the transformer T197. A terminal P2 of the primary winding of the transformer T197 is connected to the terminal INV−. That is to say, the primary winding of the transformer T191 belonged to the second pair and the primary winding of the transformer T197 belonged to the fourth pair are connected in series.

As described above, a terminal P1 of the primary winding of the transformer T192 is connected to a voltage detection terminal S2, and a terminal P2 of the primary winding of the transformer T190, and a terminal P2 of the primary winding of the transformer T192 is connected to the terminal INV−. That is to say, the primary winding of the transformer T192 belonged to the third pair and the primary winding of the transformer T190 belonged to the second pair are connected in series.

Also, a terminal S1 of the secondary winding of the transformer T192 is connected to one end of the discharge tube LP185, and the other end of the discharge tube LP185 is connected to a terminal S2 of the secondary winding of the transformer T195. A terminal S1 of the secondary winding of the transformer T195 is connected to one end of the discharge tube LP188, and the other end of the discharge tube LP188 is connected to a terminal S2 of the secondary winding of the transformer T194. A terminal S1 of the secondary winding of the transformer T194 is connected to one end of the discharge tube LP187, and the other end of the discharge tube LP187 is connected to a terminal S2 of the secondary winding of the transformer T193. A terminal S1 of the secondary winding of the transformer T193 is connected to one end of the discharge tube LP186, and the other end of the discharge tube LP186 is connected to a terminal S2 of the secondary winding of the transformer T192.

Thus, the discharge tubes LP185 through LP188 and the transformers T192 through T195 are belonged to the third pair, and also connected in series, and make up a closed loop. The discharge tubes LP185 through LP188 included in this closed loop are subjected to differential floating driving.

As described above, a terminal P1 of the primary winding of the transformer T193 is connected to a voltage detection terminal S6, and a terminal P2 of the primary winding of the transformer T187, and a terminal P2 of the primary winding of the transformer T193 is connected to the terminal INV−. That is to say, the primary winding of the transformer T193 belonged to the third pair and the primary winding of the transformer T187 belonged to the first pair are connected in series.

Also, a terminal P1 of the primary winding of the transformer T194 is connected to the terminal INV+, and a terminal P2 thereof is connected to a voltage detection terminal S3, and a terminal P1 of the primary winding of the transformer T196. A terminal P2 of the primary winding of the transformer T196 is connected to the terminal INV−. That is to say, the primary winding of the transformer T194 belonged to the third pair and the primary winding of the transformer T196 belonged to the fourth pair are connected in series.

Also, a terminal P1 of the primary winding of the transformer T195 is connected to the terminal INV+, and a terminal P2 thereof is connected to a voltage detection terminal S8, and a terminal P1 of the primary winding of the transformer T201. A terminal P2 of the primary winding of the transformer T201 is connected to the terminal INV−. That is to say, the primary winding of the transformer T195 belonged to the third pair and the primary winding of the transformer T201 belonged to the fifth pair are connected in series.

As described above, a terminal P1 of the primary winding of the transformer T196 is connected to a voltage detection terminal S3, and a terminal P2 of the primary winding of the transformer T194, and a terminal P2 of the primary winding of the transformer T196 is connected to the terminal INV−. That is to say, the primary winding of the transformer T196 belonged to the third pair and the primary winding of the transformer T194 belonged to the second pair are connected in series.

Also, a terminal S1 of the secondary winding of the transformer T196 is connected to one end of the discharge tube LP189, and the other end of the discharge tube LP189 is connected to a terminal S2 of the secondary winding of the transformer T199. A terminal S1 of the secondary winding of the transformer T199 is connected to one end of the discharge tube LP192, and the other end of the discharge tube LP192 is connected to a terminal S2 of the secondary winding of the transformer T198. A terminal S1 of the secondary winding of the transformer T191 is connected to one end of the discharge tube LP191, and the other end of the discharge tube LP191 is connected to a terminal S2 of the secondary winding of the transformer T197. A terminal S1 of the secondary winding of the transformer T197 is connected to one end of the discharge tube LP190, and the other end of the discharge tube LP190 is connected to a terminal S2 of the secondary winding of the transformer T196.

Thus, the discharge tubes LP189 through LP192 and the transformers T196 through T199 are belonged to the fourth pair, and also connected in series, and make up a closed loop. The discharge tubes LP189 through LP192 included in this closed loop are subjected to differential floating driving.

As described above, a terminal P1 of the primary winding of the transformer T197 is connected to a voltage detection terminal S7, and a terminal P2 of the primary winding of the transformer T191, and a terminal P2 of the primary winding of the transformer T197 is connected to the terminal INV−. That is to say, the primary winding of the transformer T197 belonged to the fourth pair and the primary winding of the transformer T191 belonged to the second pair are connected in series.

Also, a terminal P1 of the primary winding of the transformer T198 is connected to the terminal INV+, and a terminal P2 thereof is connected to a voltage detection terminal S4, and a terminal P1 of the primary winding of the transformer T200. A terminal P2 of the primary winding of the transformer T200 is connected to the terminal INV−. That is to say, the primary winding of the transformer T198 belonged to the fourth pair and the primary winding of the transformer T200 belonged to the fifth pair are connected in series.

As described above, a terminal P1 of the primary winding of the transformer T199 is connected to the terminal INV+, and a terminal P2 thereof is connected to a voltage detection terminal S10, and a terminal P1 of the primary winding of the transformer T185. That is to say, the primary winding of the transformer T199 belonged to the fourth pair and the primary winding of the transformer T185 belonged to the first pair are connected in series.

Further as described above, a terminal P1 of the primary winding of the transformer T200 is connected to a voltage detection terminal S4, and a terminal P2 of the primary winding of the transformer T198, and a terminal P2 of the primary winding of the transformer T200 is connected to the terminal INV−. That is to say, the primary winding of the transformer T200 belonged to the fifth pair and the primary winding of the transformer T198 belonged to the fourth pair are connected in series.

Also, a terminal S1 of the secondary winding of the transformer T200 is connected to one end of the discharge tube LP193, and the other end of the discharge tube LP193 is connected to a terminal S2 of the secondary winding of the transformer T203. A terminal S1 of the secondary winding of the transformer T203 is connected to one end of the discharge tube LP196, and the other end of the discharge tube LP196 is connected to a terminal S2 of the secondary winding of the transformer T202. A terminal S1 of the secondary winding of the transformer T202 is connected to one end of the discharge tube LP195, and the other end of the discharge tube LP195 is connected to a terminal S2 of the secondary winding of the transformer T201. A terminal S1 of the secondary winding of the transformer T201 is connected to one end of the discharge tube LP194, and the other end of the discharge tube LP194 is connected to a terminal S2 of the secondary winding of the transformer T200.

Thus, the discharge tubes LP193 through LP196 and the transformers T200 through T203 are belonged to the fifth pair, and also connected in series, and make up a closed loop. The discharge tubes LP193 through LP196 included in this closed loop are subjected to differential floating driving.

As described above, a terminal P1 of the primary winding of the transformer T201 is connected to a voltage detection terminal S8, and a terminal P2 of the primary winding of the transformer T195, and a terminal P2 of the primary winding of the transformer T201 is connected to the terminal INV−. That is to say, the primary winding of the transformer T201 belonged to the fifth pair and the primary winding of the transformer T195 belonged to the third pair are connected in series.

Also as described above, a terminal P1 of the primary winding of the transformer T202 is connected to a voltage detection terminal S5, and a terminal P2 of the primary winding of the transformer T184, and a terminal P2 of the primary winding of the transformer T202 is connected to the terminal INV−. That is to say, the primary winding of the transformer T202 belonged to the fifth pair and the primary winding of the transformer T184 belonged to the first pair are connected in series.

Further as described above, a terminal P1 of the primary winding of the transformer T203 is connected to the terminal INV+, and a terminal P2 thereof is connected to a voltage detection terminal S9, and a terminal P1 of the primary winding of the transformer T189. That is to say, the primary winding of the transformer T203 belonged to the fifth pair and the primary winding of the transformer T189 belonged to the second pair are connected in series.

The terminal INV+ is connected to a first terminal of an unshown inverter circuit, and the terminal INV− is connected to a second terminal of the inverter circuit. Also, the voltage detection terminals S1 through S10 are connected to a circuit shown in FIG. 60.

The principal difference between the forty-fourth embodiment and the forty-fifth embodiment is in that the number of the discharge tubes included in the closed loop is changed from two to four. Thus, upon the number of the discharge tubes becoming four, the primary windings of the four transformers can be connected to the primary windings of the transformers belonged to another pair. With the present embodiment, the primary windings of the four transformers are each connected to the primary winding of any transformer other than the four transformers. In the case of the transformer of the first pair, the transformer is connected to any one of the transformers of the second through fifth pairs. Also, in the event of arraying the discharge tubes in a row as shown in FIG. 62, with regard to the left side of the discharge tubes, the primary windings of the transformers of the adjacent pairs (let us say that the adjacent pairs of the fifth pair are the first pair and the fourth pair) are connected in cascade series, and with regard to the right side of the discharge tubes, the primary windings of the transformers belonged to the pairs having an interval of two pairs are connected in cascade series.

Figure 63:
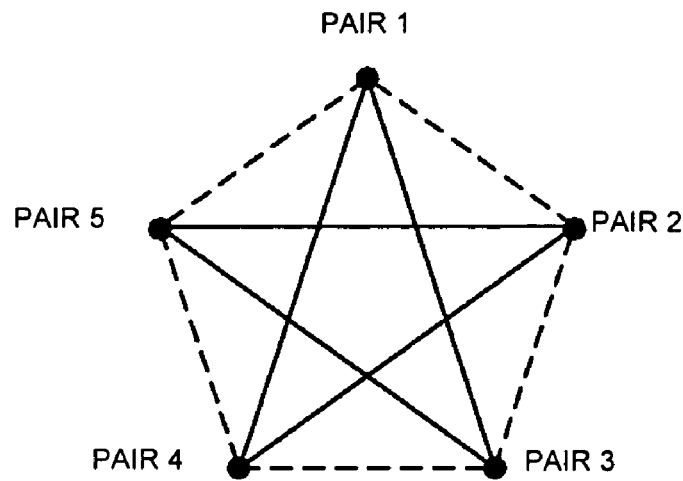
FIG. 63 is a diagram illustrating connection relations between pairs in a forty-fifth embodiment of the present invention.

The situation of connection between the pairs is summarized in FIG. 63. In FIG. 63, a dashed line represents connection to the adjacent pairs, and a solid line represents connection to the pairs having an interval of two pairs. The pairs to be connected with a dashed line are connected with the primary windings of the transformers on the left side of the discharge tubes, and the pairs to be connected with a solid line are connected with the primary windings of the transformers on the right side of the discharge tubes. Thus, arbitrary pairs are connected in series via the primary windings, thereby improving precision of current uniformity. Also, even the farthermost connection is the pairs having an interval of two pairs on the right side, so coupling is stronger than that in the first embodiment, and current uniformity improves.

Forty-sixth Embodiment

Figure 64:
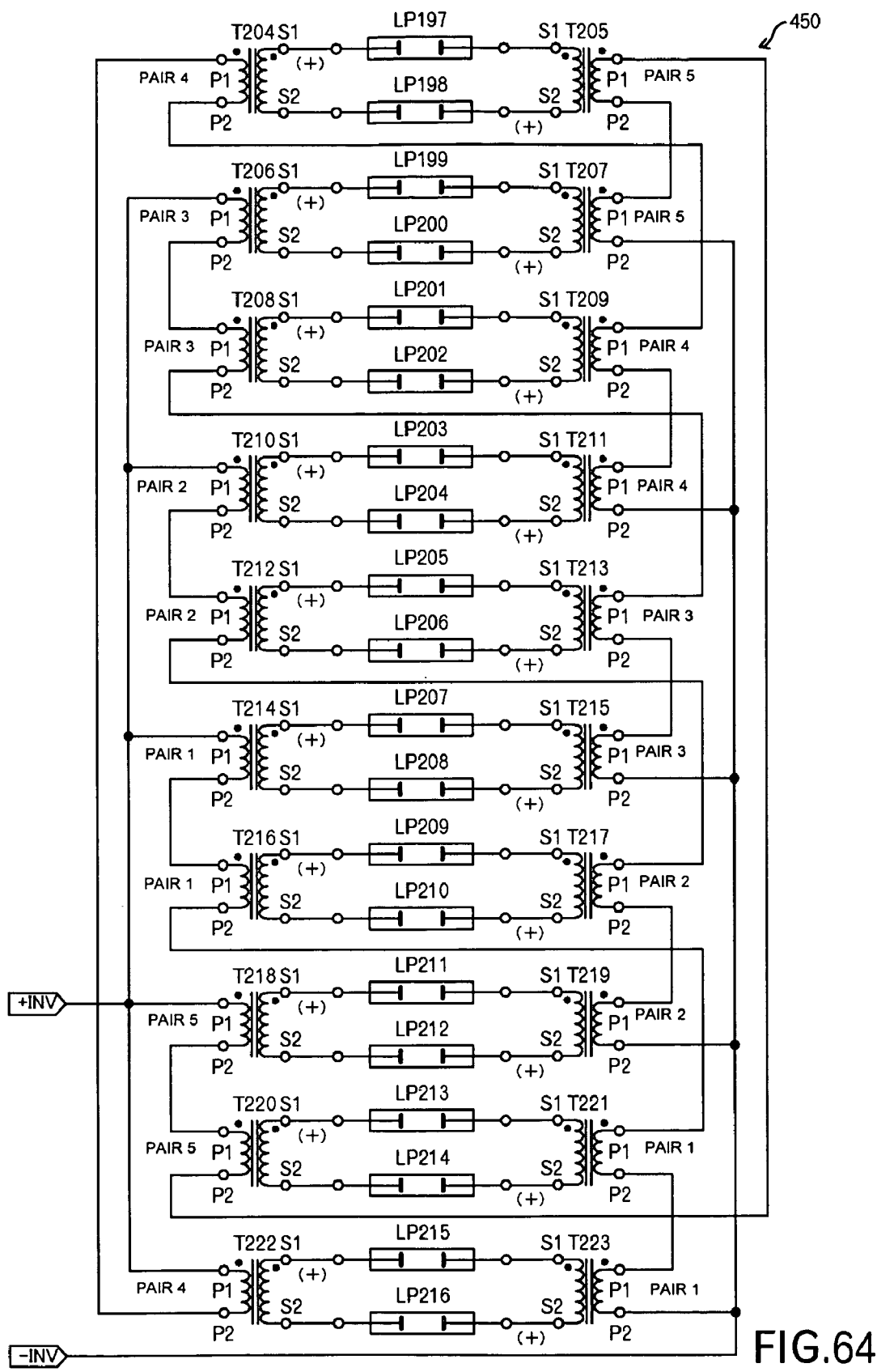
FIG. 64 is a circuit diagram in a forty-sixth embodiment of the present invention.

A discharge tube lighting circuit 450 according to a forty-sixth embodiment of the present invention is shown in FIG. 64. The discharge tube lighting circuit 450 comprises transformers T204 through T223, and discharge tubes LP197 through LP216. With the present embodiment, the transformers T214, T216, T221, and T223 make up a first pair, the transformers T210, T212, T217, and T219 make up a second pair, the transformers T206, T208, T213, and T215 make up a third pair, the transformers T204, T222, T209, and T211 make up a fourth pair, and the transformers T218, T220, T205, and T207 make up a fifth pair.

A terminal P1 of the primary winding of the transformer T204 is connected to a terminal P2 of the primary winding of the transformer T222, and a terminal P2 of the primary winding of the transformer T204 is connected to a terminal P1 of the primary winding of the transformer T209. A terminal P2 of the primary winding of the transformer T209 is connected to a terminal P1 of the primary winding of the transformer T211, and a terminal P2 of the primary winding of the transformer T211 is connected to a terminal −INV. A terminal P1 of the primary winding of the transformer T222 is connected to a terminal +INV. Thus, the primary windings of the transformers T204, T222, T209, and T211 of the fourth pair are connected in series.

Also, a terminal S1 of the secondary winding of the transformer T204 is connected to one end of the discharge tube LP197, and the other end of the discharge tube LP197 is connected to a terminal S1 of the secondary winding of the transformer T205. A terminal S2 of the secondary winding of the transformer T205 is connected to one end of the discharge tube LP198, and the other end of the discharge tube LP198 is connected to a terminal S2 of the secondary winding of the transformer T204. Thus, the secondary windings of the transformers T204 and T205 and the discharge tubes LP197 and LP198 are connected in series, and make up a closed loop. The discharge tubes LP197 and LP198 included in this closed loop are subjected to differential floating driving.

A terminal P1 of the primary winding of the transformer T205 is connected to a terminal P2 of the primary winding of the transformer T220, and a terminal P1 of the primary winding of the transformer T220 is connected to a terminal P2 of the primary winding of the transformer T218. A terminal P1 of the primary winding of the transformer T218 is connected to the terminal +INV. A terminal P2 of the primary winding of the transformer T205 is connected to a terminal P1 of the primary winding of the transformer T207, and a terminal P2 of the primary winding of the transformer T207 is connected to a terminal −INV. Thus, the primary windings of the transformers T205, T207, T218, and T220 of the fifth pair are connected in series.

A terminal S1 of the secondary winding of the transformer T207 is connected to one end of the discharge tube LP199, and the other end of the discharge tube LP199 is connected to a terminal S1 of the secondary winding of the transformer T206. A terminal S2 of the secondary winding of the transformer T206 is connected to one end of the discharge tube LP200, and the other end of the discharge tube LP200 is connected to a terminal S2 of the secondary winding of the transformer T207. Thus, the secondary windings of the transformers T206 and T207 and the discharge tubes LP199 and LP200 are connected in series, and make up a closed loop. The discharge tubes LP199 and LP200 included in this closed loop are subjected to differential floating driving.

A terminal P1 of the primary winding of the transformer T206 is connected to the terminal +INV. Also, a terminal P2 of the primary winding of the transformer T206 is connected to a terminal P1 of the primary winding of the transformer T208. A terminal P2 of the primary winding of the transformer T208 is connected to a terminal P1 of the primary winding of the transformer T213, and a terminal P2 of the primary winding of the transformer T213 is connected to a terminal P1 of the primary winding of the transformer T215. A terminal P2 of the primary winding of the transformer T215 is connected to the terminal −INV. Thus, the primary windings of the transformers T206, T208, T213, and T215 of the third pair are connected in series.

Also, a terminal S1 of the secondary winding of the transformer T208 is connected to one end of the discharge tube LP201, and the other end of the discharge tube LP201 is connected to a terminal S1 of the secondary winding of the transformer T209. A terminal S2 of the secondary winding of the transformer T209 is connected to one end of the discharge tube LP202, and the other end of the discharge tube LP202 is connected to a terminal S2 of the secondary winding of the transformer T208. Thus, the secondary windings of the transformers T208 and T209 and the discharge tubes LP201 and LP202 are connected in series, and make up a closed loop. The discharge tubes LP201 and LP202 included in this closed loop are subjected to differential floating driving.

Further, a terminal S1 of the secondary winding of the transformer T211 is connected to one end of the discharge tube LP203, and the other end of the discharge tube LP203 is connected to a terminal S1 of the secondary winding of the transformer T210. A terminal S2 of the secondary winding of the transformer T210 is connected to one end of the discharge tube LP204, and the other end of the discharge tube LP204 is connected to a terminal S2 of the secondary winding of the transformer T211. Thus, the secondary windings of the transformers T210 and T211 and the discharge tubes LP203 and LP204 are connected in series, and make up a closed loop. The discharge tubes LP203 and LP204 included in this closed loop are subjected to differential floating driving.

A terminal P1 of the primary winding of the transformer T210 is connected to the terminal +INV, and a terminal P2 thereof is connected to a terminal P1 of the primary winding of the transformer T212. A terminal P2 of the primary winding of the transformer T212 is connected to a terminal P1 of the primary winding of the transformer T217, and a terminal P2 of the primary winding of the transformer T217 is connected to a terminal P1 of the primary winding of the transformer T219. A terminal P2 of the primary winding of the transformer T219 is connected to the terminal −INV. Thus, the primary windings of the transformers T210, T212, T217, and T219 of the second pair are connected in series.

Also, a terminal S1 of the secondary winding of the transformer T212 is connected to one end of the discharge tube LP205, and the other end of the discharge tube LP205 is connected to a terminal S1 of the secondary winding of the transformer T213. A terminal S2 of the secondary winding of the transformer T213 is connected to one end of the discharge tube LP206, and the other end of the discharge tube LP206 is connected to a terminal S2 of the secondary winding of the transformer T212. Thus, the secondary windings of the transformers T212 and T213 and the discharge tubes LP205 and LP206 are connected in series, and make up a closed loop. The discharge tubes LP205 and LP206 included in this closed loop are subjected to differential floating driving.

Further, a terminal S1 of the secondary winding of the transformer T215 is connected to one end of the discharge tube LP207, and the other end of the discharge tube LP207 is connected to a terminal S1 of the secondary winding of the transformer T214. A terminal S2 of the secondary winding of the transformer T214 is connected to one end of the discharge tube LP208, and the other end of the discharge tube LP208 is connected to a terminal S2 of the secondary winding of the transformer T215. Thus, the secondary windings of the transformers T214 and T215 and the discharge tubes LP207 and LP208 are connected in series, and make up a closed loop. The discharge tubes LP207 and LP208 included in this closed loop are subjected to differential floating driving.

A terminal P1 of the primary winding of the transformer T214 is connected to the terminal +INV, and a terminal P2 thereof is connected to a terminal P1 of the primary winding of the transformer T216. A terminal P2 of the primary winding of the transformer T216 is connected to a terminal P1 of the primary winding of the transformer T221, and a terminal P2 of the primary winding of the transformer T221 is connected to a terminal P1 of the primary winding of the transformer T223. A terminal P2 of the primary winding of the transformer T223 is connected to the terminal −INV. Thus, the primary windings of the transformers T214, T216, T221, and T223 of the first pair are connected in series.

Also, a terminal S1 of the secondary winding of the transformer T216 is connected to one end of the discharge tube LP209, and the other end of the discharge tube LP209 is connected to a terminal S1 of the secondary winding of the transformer T217. A terminal S2 of the secondary winding of the transformer T217 is connected to one end of the discharge tube LP210, and the other end of the discharge tube LP210 is connected to a terminal S2 of the secondary winding of the transformer T216. Thus, the secondary windings of the transformers T216 and T217 and the discharge tubes LP209 and LP210 are connected in series, and make up a closed loop. The discharge tubes LP209 and LP210 included in this closed loop are subjected to differential floating driving.

Further, a terminal S1 of the secondary winding of the transformer T219 is connected to one end of the discharge tube LP211, and the other end of the discharge tube LP211 is connected to a terminal S1 of the secondary winding of the transformer T218. A terminal S2 of the secondary winding of the transformer T218 is connected to one end of the discharge tube LP212, and the other end of the discharge tube LP212 is connected to a terminal S2 of the secondary winding of the transformer T219. Thus, the secondary windings of the transformers T218 and T219 and the discharge tubes LP211 and LP212 are connected in series, and make up a closed loop. The discharge tubes LP211 and LP212 included in this closed loop are subjected to differential floating driving.

Also, a terminal S1 of the secondary winding of the transformer T220 is connected to one end of the discharge tube LP213, and the other end of the discharge tube LP213 is connected to a terminal S1 of the secondary winding of the transformer T221. A terminal S2 of the secondary winding of the transformer T221 is connected to one end of the discharge tube LP214, and the other end of the discharge tube LP214 is connected to a terminal S2 of the secondary winding of the transformer T220. Thus, the secondary windings of the transformers T220 and T221 and the discharge tubes LP213 and LP214 are connected in series, and make up a closed loop. The discharge tubes LP213 and LP214 included in this closed loop are subjected to differential floating driving.

Further, a terminal S1 of the secondary winding of the transformer T222 is connected to one end of the discharge tube LP215, and the other end of the discharge tube LP215 is connected to a terminal S1 of the secondary winding of the transformer T223. A terminal S2 of the secondary winding of the transformer T223 is connected to one end of the discharge tube LP216, and the other end of the discharge tube LP216 is connected to a terminal S2 of the secondary winding of the transformer T222. Thus, the secondary windings of the transformers T222 and T223 and the discharge tubes LP215 and LP216 are connected in series, and make up a closed loop. The discharge tubes LP215 and LP216 included in this closed loop are subjected to differential floating driving.

The terminal +INV is connected to a first terminal of an unshown inverter circuit, and the terminal −INV is connected to a second terminal of the inverter circuit.

Thus, the secondary windings of the four transformers belonged to the first pair belong to four separate closed loops. Another secondary winding transformer included in these closed loops belongs to the second pair, third pair, fourth pair, and fifth pair. Further, the secondary windings of the four transformers belonged to the second pair belong to four separate closed loops. Another secondary winding transformer included in these closed loops belongs to the first pair, third pair, fourth pair, and fifth pair.

Also, the secondary windings of the four transformers belonged to the third pair belong to four separate closed loops. Another secondary winding transformer included in these closed loops belongs to the first pair, second pair, fourth pair, and fifth pair. Also, the secondary windings of the four transformers belonged to the fourth pair belong to four separate closed loops. Another secondary winding transformer included in these closed loops belongs to the first pair, second pair, third pair, and fifth pair. Also, the secondary windings of the four transformers belonged to the fifth pair belong to four separate closed loops. Another secondary winding transformer included in these closed loops belongs to the first pair, second pair, third pair, and fourth pair.

Figure 65:
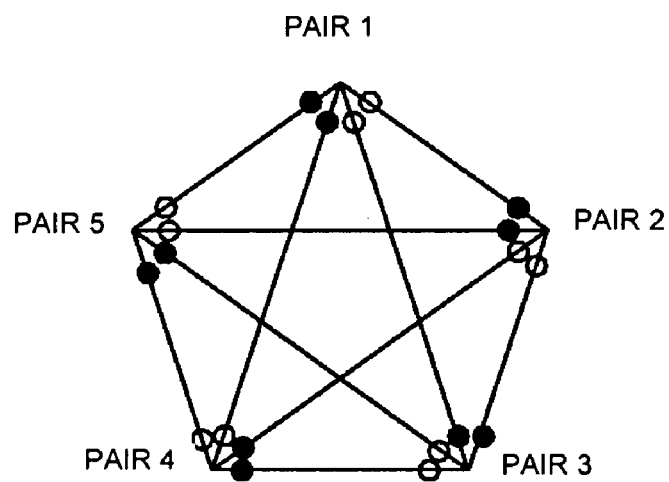
FIG. 65 is a diagram illustrating connection relations between pairs in a forty-seventh embodiment of the present invention.

The difference between the forty-fourth embodiment and the forty-sixth embodiment is in that the primary windings of the transformers are in 4 series. Thus, as schematically shown in FIG. 65, arbitrary pairs are connected via one closed loop including the secondary windings of the transformers, thereby improving precision of current uniformity. Note that the number of the discharge tubes on the secondary winding side of the transformers are restricted to two, so this also improves precision of current uniformity. Note that in FIG. 65, black circles represent that arbitrary pairs are connected from transformers on the right side of discharge tubes via a closed loop, and white circles represent that arbitrary pairs are connected from transformers on the left side of discharge tubes via a closed loop. All pairs are connected to the other pairs for each two pairs on the both sides via closed loops.

While description has been made regarding the embodiments of the present invention, the present invention is not restricted to these embodiments. For example, with regard to the number of primary windings to be connected in series, and the number of discharge tubes to be connected to the secondary windings, examples other than the above examples may be implemented. Also, an arrangement may be made wherein all of the transformers belonged to one pair are not connected to the transformers belonged to the other pairs, but a part of the transformers are connected to the transformers belonged to the other pairs. Also, the present invention may be applied to lamps such as LEDs and the like, other than discharge tubes.

What is claimed is:

1. A lamp lighting apparatus comprising:
a plurality of lamps; and
a plurality of transformers;
wherein one or more primary windings and/or one or more secondary windings of at least two of the transformers are connected in series with each other;
wherein the primary windings of the plurality of transformers are electrically connected to an AC power source, and the secondary windings of the plurality of the transformers are electrically connected to the plurality of lamps, and each lamp is differentially driven between at least two of the transformers, wherein the transformers are connected to opposite ends of the lamp and apply voltages of different polarities to the opposite ends of the lamp.

2. The lamp lighting apparatus according to claim 1 having a plurality of transformers each of which has its respective primary winding electrically connected to an AC power source, and its secondary winding connected to a corresponding lamp or lamps for lighting a plurality of lamps by high-power output of each transformer,
wherein said plurality of transformers are allocated into a first group connected to first terminals of said lamps, and a second group connected to second terminals of said lamps, and said plurality of lamps are lighted by differential driving between the transformer belonging to said first group and the transformer belonging to said second group;
wherein at least one or both of said first and second groups include the transformer of which the primary winding is connected to the primary winding of another transformer in series.

3. A lamp lighting apparatus for differentially driving lamps according to claim 1, comprising:
a first transformer which is associated with first terminals of first and second lamps; and
a second transformer which is associated with second terminals of said first and second lamps;
wherein a plurality of differential groups including said first and second transformers and said first and second lamps are configured;
wherein with said each differential group,
a closed loop is configured by the secondary windings of said first and second transformers and said first and second lamps, and
the primary winding of said first transformer is connected to the primary winding of the first transformer of said another differential group in series.

4. A lamp lighting apparatus according to claim 1 comprising at least first though third transformers;
wherein a first terminal of the secondary winding of said second transformer is connected to the secondary winding of said first transformer via a first lamp;
wherein a second terminal of the secondary winding of said second transformer is connected to the secondary winding of said third transformer via a second lamp;
wherein the secondary windings of said first though third transformers are connected in series via said first and second lamps;
wherein the primary windings of said first though third transformers are connected to an AC power source or sources such that an anti-polarity voltage is applied to both ends of said first lamp and said second lamp.

5. A lamp lighting apparatus according to claim 1 comprising:
a first transformer;
n intermediate transformers, wherein n is an integer greater than 1; and
a second transformer;
wherein the secondary winding of said first transformer, the secondary windings of said n intermediate transformers, the secondary winding of said second transformer, and a plurality of lamps are connected in series;
wherein of the secondary winding of said first transformer, the secondary windings of said n intermediate transformers, and the secondary winding of said second transformer, such that an anti-polarity voltage is generated at the terminals of the secondary windings of two transformers connected via said lamp, the primary windings of said two transformers are connected to an AC power source or sources.

6. A lamp lighting apparatus according to claim 1 comprising at least one transformer of which a plurality of secondary windings are provided in at least a single core;
wherein a first terminal of each of said plurality of secondary windings is connected to a terminal of another first secondary winding via a first lamp;
wherein a second terminal of each of said plurality of secondary windings is connected to a terminal of another second secondary winding via a second lamp;
wherein the primary winding of at least one transformer is connected to an AC power source.

7. A lamp lighting apparatus according to claim 1 comprising:
a first transformer of which a plurality of secondary windings are provided in at least a single core; and
a second transformer of which a plurality of secondary windings are provided in at least a single core;
wherein a first terminal of a first secondary winding of said first transformer is connected to a first secondary winding of said second transformer via a lamp;
wherein a second terminal of the first secondary winding of said first transformer is connected to a second secondary winding of said second transformer via a lamp;
wherein the plurality of secondary windings of said first transformer, and the plurality of second windings of said second transformer and a lamp are connected in series;

wherein the first windings of said first and second transformers are connected to an AC power source such that an anti-polarity voltage is applied to both ends of said each lamp.

8. A lamp lighting apparatus according to claim 1 comprising at least one transformer of which a plurality of secondary windings are provided in at least a single core;
   wherein said plurality of secondary windings and lamps are connected in series;
   wherein a first terminal of each of said plurality of secondary windings is associated with a set made up of a first lamp and a first secondary winding;
   wherein a second terminal of each of said plurality of secondary windings is associated with a set made up of a second lamp and a second secondary winding;
   wherein the primary winding of said at least one transformer is connected to an AC power source such that an anti-polarity voltage is applied to both ends of said each lamp.

9. A lamp lighting apparatus according to claim 1 comprising:
   first through third secondary windings provided by at least one transformer,
   a first lamp connected between a first terminal of said second secondary winding and said first secondary winding; and
   a second lamp connected between a second terminal of said second secondary winding and said third secondary winding;
   wherein said first through third secondary windings and said first and second lamps are connected in series;
   wherein the primary winding of said at least one transformer is connected to an AC power source.

10. A lamp lighting apparatus according to claim 1 of which three or more secondary windings and a plurality of lamps, which are provided by at least one transformer, are connected in series to form a closed loop,
    wherein at least two portions where said lamps are connected are included in the downstream of said secondary winding when the circulating direction of said closed loop is defined as one direction.

11. A lamp lighting apparatus according to claim 1 comprising a plurality of transformers;
    wherein the secondary windings of said plurality of transformers and two or more lamps are connected in series to make up a closed loop;
    wherein the primary windings of said plurality of transformers are connected to an AC power source;
    wherein at least one portion of said closed loop is grounded in a DC manner.

12. A lamp lighting apparatus according to claim 1 comprising first and second transformers each of which the primary winding is connected to an AC power source;
    wherein a closed loop is formed in which lamps are disposed in series between the secondary windings of said first and second transformers;
    wherein said first and second transformers apply first and second voltage, which have a different polarity, to opposite ends of said lamps;
    wherein said closed loop is grounded in a DC manner with a line where said first voltage occurs and with a line where said second voltage occurs respectively.

13. A lamp lighting apparatus according to claim 1 comprising first and second transformers each of which the primary winding is connected to an AC power source;
    wherein a closed loop is formed in which lamps are disposed in series between the secondary windings of said first and second transformers;
    wherein said first and second transformers apply first and second voltage, which have a different polarity, to opposite ends of said lamps;
    wherein a center tap is provided on the secondary windings of said first and second transformers;
    wherein said closed loop is grounded in a DC manner via said center tap.

14. The lamp lighting apparatus according to claim 1, wherein the secondary winding of each transformer has one terminal connected to an end of a lamp and another terminal connected to ground in a DC manner.

15. The lamp lighting apparatus according to claim 1, wherein a plurality of the secondary windings and the lamps are connected in series in a closed loop, and the secondary windings and lamps are alternately disposed along the closed loop.

16. A lamp lighting apparatus comprising:
    a plurality of lamps;
    a plurality of transformers;
    wherein one or more primary windings and/or one or more secondary windings of at least two of the transformers are connected in series with each other;
    wherein the plurality of transformers comprise a plurality of first transformers and a second transformer;
    wherein the primary winding of each first transformer is connected to the primary winding of at least one other first transformer in series;
    wherein the secondary winding of said each first transformer is connected to a first terminal of a corresponding lamp;
    wherein the secondary winding of said second transformer is connected to a second terminal of said lamp so as to supply an anti-polarity voltage to said lamp with said first transformer;
    wherein the primary windings of said first and second transformers are electrically connected to an AC power source.

17. A lamp lighting apparatus comprising:
    a plurality of lamps; and
    a plurality of transformers;
    wherein one or more primary windings and/or one or more secondary windings of at least two of the transformers are connected in series with each other;
    wherein at least a single transformer corresponds to a pair of lamps, and forming a loop together with the secondary winding of the transformer and the pair of lamps,
    wherein a plurality of the loops are provided and the primary winding of the transformer in a loop is connected to the primary winding of the transformer in another loop in series, and is further connected to a power source;
    wherein for each loop, the electric potential between the pair of lamps is substantially zero.

18. The lamp lighting apparatus according to claim 17, wherein each lamp has a region on one side that is lighter than a region on the other side of the lamp, and the plurality of lamps are arranged such that the lighter regions of the lamps are alternatively placed on opposite sides of the plurality of lamps.

19. A lamp lighting apparatus comprising:
    a plurality of lamps;
    a plurality of transformers; and wherein one or more primary windings and/or one or more secondary windings of at least two of the transformers are connected in series with each other;
wherein the plurality of transformers comprise at least first through third transformers;
wherein a first terminal of the secondary winding of said second transformer is connected to a first terminal of the secondary winding of said first transformer via a single first lamp or a plurality of first lamps;
wherein a second terminal of the secondary winding of said second transformer is connected to a first terminal of the secondary winding of said third transformer via a single second lamp or a plurality of second lamps;
wherein said first through third transformers, said single first lamp or plurality of first lamps, and said single second lamp or plurality of second lamps are connected in series;
wherein the primary windings of said first through third transformers are connected to an AC power source such that an anti-polarity voltage is generated at the first terminal of the secondary winding of said second transformer and at the first terminal of the secondary winding of said first transformer, and an anti-polarity voltage is generated at the second terminal of the secondary winding of said second transformer and at the first terminal of the secondary winding of said third transformer.

20. A lamp lighting apparatus comprising:
a plurality of lamps;
a plurality of transformers; and
wherein one or more primary windings and/or one or more secondary windings of at least two of the transformers are connected in series with each other;
wherein the plurality of transformers comprise at least first and second transformers;
wherein a plurality of lamps connected in series are connected between a first terminal of the secondary winding of said first transformer and a first terminal of the secondary winding of said second transformer;
wherein a plurality of other lamps connected in series are connected between a second terminal of the secondary winding of said first transformer and a second terminal of the secondary winding of said second transformer;
wherein the primary windings of said first and second transformers are connected to an AC power source such that an anti-polarity voltage is generated at the first terminal of the secondary winding of said first transformer and at the first terminal of the secondary winding of said second transformer, and an anti-polarity voltage is generated at the second terminal of the secondary winding of said first transformer and at the second terminal of the secondary winding of said second transformer.

21. A lamp lighting apparatus comprising:
a plurality of lamps;
a plurality of transformers;
wherein one or more primary windings and/or one or more secondary windings of at least two of the transformers are connected in series with each other;
wherein a plurality of secondary windings and a plurality of lamps, which are provided by at least one transformer, are connected in series to form a closed loop,
wherein at least one lamp is disposed between each pair of secondary windings of at least three secondary windings in the closed loop respectively.

22. The lamp lighting apparatus according to claim 21, wherein each secondary winding in the closed loop is separated from every other secondary winding in the closed loop by at least one lamp.

23. A lamp lighting apparatus comprising:
a plurality of lamps;
a plurality of transformers;
wherein one or more primary windings and/or one or more secondary windings of at least two of the transformers are connected in series with each other;
a plurality of closed loops where a predetermined number of lamps and the secondary windings of a predetermined number of transformers are connected in series, wherein at least one of the secondary windings in the closed loop is separated from every other secondary winding in the closed loop by at least one lamp;
wherein at least one of the primary windings of the transformers employed for said each closed loop is connected to the primary winding of the transformer employed for another closed loop in series.

24. A lamp lighting apparatus comprising:
a plurality of lamps;
a plurality of transformers;
wherein one or more primary windings and/or one or more secondary windings of at least two of the transformers are connected in series with each other;
a plurality of closed loops where a predetermined number of lamps and the secondary windings of a predetermined number of transformers are connected in series, wherein at least one of the secondary windings in the closed loop is separated from every other secondary winding in the closed loop by at least one lamp;
wherein all of the primary windings of the transformers employed for said each closed loop are connected to the primary winding of the transformer employed for another different closed loop in series respectively.

* * * * *